(12) United States Patent
Hosoe et al.

(10) Patent No.: US 10,809,486 B2
(45) Date of Patent: Oct. 20, 2020

(54) HEAT DISSIPATION MODULE AND SYSTEM CAMERA INCLUDING HEAT DISSIPATION MODULE

(71) Applicant: CANON KABUSHIKI KAISHA, Tokyo (JP)

(72) Inventors: Hiroshi Hosoe, Kawasaki (JP); Hirotaka Ifuku, Kawasaki (JP); Yosaku Endo, Yokohama (JP); Koichi Shigeta, Kawasaki (JP); Hideki Toichi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/185,170

(22) Filed: Nov. 9, 2018

(65) Prior Publication Data
US 2019/0154949 A1    May 23, 2019

(30) Foreign Application Priority Data

Nov. 21, 2017 (JP) ................................ 2017-223951
Nov. 21, 2017 (JP) ................................ 2017-223952
Dec. 4, 2017 (JP) ................................ 2017-232685

(51) Int. Cl.
*G02B 7/02* (2006.01)
*G05D 23/19* (2006.01)
(Continued)

(52) U.S. Cl.
CPC ......... *G02B 7/028* (2013.01); *G05D 23/1919* (2013.01); *H04N 5/2257* (2013.01); *H04N 5/22521* (2018.08); *H04N 5/232* (2013.01)

(58) Field of Classification Search
CPC .. G02B 7/028; H04N 5/22521; H04N 5/2257; H04N 5/232; H04N 5/23241; G05D 23/1919
See application file for complete search history.

(56) References Cited

U.S. PATENT DOCUMENTS 9,485,451 B2    11/2016 Kawamura
2010/0165188 A1*  7/2010 Jannard ................ H04N 5/2252
                                                        348/375
(Continued)

FOREIGN PATENT DOCUMENTS

JP    2009071516 A    4/2009
JP    2010056995 A    3/2010
(Continued)

*Primary Examiner* — Gevell V Selby
(74) *Attorney, Agent, or Firm* — Rossi, Kimms & McDowell LLP

(57) ABSTRACT

A heat dissipation module suitable for a system camera formed by a plurality of modules. A heat dissipation module has a first engagement structure which is provided on a first surface and with which a first mating module is removably engaged and a second engagement structure is provided on a second surface parallel to the first surface and with which a second mating module is removably engaged. A first heat reception portion is configured to receive heat from the first mating module. The heat dissipation module also has a first interface electrically connected to the first mating module, and a second interface electrically connected to the first interface and electrically connected to the second mating module. A fan unit is provided between the first surface and the second surface, for dissipating heat received by the first heat reception portion to the outside.

42 Claims, 92 Drawing Sheets

(51) Int. Cl.
*H04N 5/232* (2006.01)
*H04N 5/225* (2006.01)

(56) References Cited

U.S. PATENT DOCUMENTS

2014/0055667 A1* 2/2014 Kawamura .......... H04N 5/2252
348/373
2016/0295096 A1* 10/2016 Lever ................. H04N 5/23209
2016/0301819 A1* 10/2016 Petty .................. H04N 1/00981
2017/0131621 A1* 5/2017 Tang .................... H04N 5/2257

FOREIGN PATENT DOCUMENTS

| JP | 2012514391 A | 6/2012 |
| JP | 2012168446 A | 9/2012 |
| JP | 2013117691 A | 6/2013 |
| JP | 2014045345 A | 3/2014 |

* cited by examiner

HEAT DISSIPATION MODULE AND SYSTEM CAMERA INCLUDING HEAT DISSIPATION MODULE

BACKGROUND OF THE INVENTION

Field of the Invention

The present invention relates to a heat dissipation module for a system camera comprised of at least one heat dissipation module and an image pickup apparatus, such as a digital camera and a digital video camera, and a system camera including the heat dissipation module.

Description of the Related Art

The amount of image data handled by an image pickup apparatus, such as a digital video camera, has become enormous due to a higher resolution, such as 8K, a higher frame rate (HFR), such as 120 p and 240 p, and a higher dynamic range (HDR) of images. Further, power consumed to process and record such data has increased, and along with an increase in power consumption, heat generation has become a problem to be coped with.

To cope with the above-mentioned problem of heat generation, there has been proposed an image pickup apparatus incorporating a heat dissipation structure (such as an electric fan, a heat sink, and a heat exhaust duct). However, as the power consumption increases, a space occupied by the incorporated heat dissipation structure increased so as to obtain sufficient performance, which is an impediment to reducing the size of the image pickup apparatus. Further, in general, the heat dissipation structure incorporated in the image pickup apparatus is not designed on the assumption that the heat dissipation structure is removed by a user as desired.

Therefore, even in a case where the image pickup apparatus is in a power-saving operation mode, such as low-resolution imaging, which does not require special heat dissipation, or even in a case where the use environmental temperature of the image pickup apparatus is very low, the unnecessary heat dissipation structure cannot be separated from the image pickup apparatus, which makes it impossible for the image pickup apparatus to take an optimal form according to the situation.

To cope with this, Japanese Laid-Open Patent Publication (Kokai) No. 2010-56995 discloses a cooling device for an image pickup device, which can be removably mounted to the bottom of an image pickup apparatus. Further, Japanese Laid-Open Patent Publication (Kokai) No. 2012-168446 discloses an external device that is mounted to an image pickup apparatus to effectively dissipate heat by drawing air warmed within the image pickup apparatus from a portion via which the external device is mounted to the image pickup apparatus.

Incidentally, a system camera can formulate various forms of operation in accordance with a photographing condition by connecting function modules to a camera as desired. For example, there is a system camera which can be constructed, as desired, by combining any of a recorder module for recording photographed image data, a power supply module, a display module for displaying an image, and a transmission module for outputting an image to the outside in a predetermined format, with a camera including an image pickup device and a lens mount.

Further, there is a system camera which can be constructed by combining a control module used by a user to make various settings of the camera and manipulate the overall operation of the system, and a grip module for assisting the user in photographing, with a camera, as desired. Further, it is known that a system camera can be further flexibly constructed by standardizing interfaces of these modules to make the modules replaceable with each other, thereby making it possible to change the connection order of the modules as desired.

When it is considered to apply either of the above-described cooling device and external device, disclosed in Japanese Laid-Open Patent Publication (Kokai) No. 2010-56995 and Japanese Laid-Open Patent Publication (Kokai) No. 2012-168446, to such a system camera, the problem with the cooling device and the external device is that the coexistence with other various modules mounted to the camera is not taken into consideration. That is, each of the above-described cooling device and external device is mounted, as a terminal device, to an interface of the camera, and is not configured to be capable of being connected to the camera simultaneously with the other modules.

Further, a modularized system camera sometimes has a plurality of modules which require heat dissipation. For example, when performing high-resolution imaging, power consumed by the camera which performs high-resolution image processing and a recorder module which performs high-speed recording increases, and hence it is necessary to perform heat dissipation from these two modules. In this case, if the cooling device as disclosed in Japanese Laid-Open Patent Publication (Kokai) No. 2010-56995 is connected to each of the camera and the recorder module, this prevents the system camera from being made compact, which is not preferable.

To prevent this, it is desired to make it possible to dissipate heat from a plurality of modules using one device, but each of the cooling device and the external device, disclosed in Japanese Laid-Open Patent Publication (Kokai) No. 2010-56995 and Japanese Laid-Open Patent Publication (Kokai) No. 2012-168446, is provided to perform only heat dissipation from the camera, and is not configured to be capable of dissipating heat from a plurality of modules.

Further, to cope with the above-mentioned problem of heat generation, there has been proposed a technique for cooling an image pickup apparatus by removably attaching a heat dissipation module to the image pickup apparatus (see Japanese Laid-Open Patent Publication (Kokai) No. 2009-71516). On the other hand, there has been proposed an image pickup apparatus incorporating a cooling fan as a heat dissipation structure (see Japanese Laid-Open Patent Publication (Kokai) No. 2014-45345).

However, in Japanese Laid-Open Patent Publication (Kokai) No. 2009-71516, in a case where the use environmental temperature is very high when the heat dissipation module is not mounted to the image pickup apparatus, the temperature of a circuit board rises, and sometimes exceeds the guaranteed temperature of components mounted on the substrate, which may cause an operation failure. Further, the method of increasing the heat dissipation capability by rotating a small cooling fan provided on the heat dissipation module at higher speed has a problem that vibration of the cooling fan causes adverse effects on a video image, such as a shake of the video image, a problem that, in the case of an image pickup apparatus including a microphone, the vibration transferred to the microphone causes increased noise, and like other problems.

On the other hand, in Japanese Laid-Open Patent Publication (Kokai) No. 2014-45345, as the power consumption increases, the incorporated heat dissipation structure occupies a larger space in order to achieve sufficient performance, which is an impediment to reducing the size of the image pickup apparatus. Further, in general, the incorporated cooling fan is not mounted on the assumption that the cooling fan is removed by a user. Therefore, the proposed image pickup apparatus suffers from the aforementioned inconvenience: even in a case where the image pickup apparatus is in a power-saving operation mode, such as low-resolution imaging, which does not require special heat dissipation, or even in a case where the use environmental temperature of the image pickup apparatus is very low, the unnecessary heat dissipation structure cannot be separated from the image pickup apparatus, which makes it impossible for the image pickup apparatus to take am optimal form according to the situation.

A digital video camera or the like has a series of functions, such as an image pickup function, a power supply function, functions provided by an electronic circuit that acquires imaging data and performs predetermined processing on the imaging data, a recording function, a display function, and a user interface. On the other hand, in recent years, there is a system camera which is used in a state in which expansion modules having functions, such as the power supply function, the recording function, and the display function, are mounted to a camera having only the image pickup function and the functions provided by the electronic circuit.

In general, each expansion module is specialized in one function, and in many cases, a plurality of types of expansion modules each having a function necessary for the system are selectively mounted to the camera. Further, there is a system camera which achieves high performance of part of its functions by having an expansion module additionally mounted thereto. This system camera allows adjusting the performance of each function according to the form of use or replacing an expansion module when an associated one of the functions is increased in performance, which is convenient for users.

Incidentally, in such a system camera, it is expected that power consumption changes in accordance with the form of use or increases due to the increased performance of each function. Therefore, cooling means adaptable to the form of use of the camera is required. To meet this requirement, there has been proposed a digital system camera that has a camera and expansion modules, arranged in layers in an optical axis direction, and has a cooling unit included in at least one of the expansion modules (see e.g. Published Japanese Translation of PCT International Publication (Tokuhyo) No. 2012-514391)

However, according to Published Japanese Translation of PCT International Publication (Tokuhyo) No. 2012-514391, in a case where each expansion module of the system camera is configured to cool itself using the cooling unit included therein, even when cooling means is not required e.g. due to low use environmental temperature, the system camera is provided with the cooling unit, which makes the system redundant in configuration.

SUMMARY OF THE INVENTION

The present invention provides a heat dissipation module suitable for a system camera formed by a plurality of modules, and a system camera that includes the heat dissipation module.

Further, the present invention provides a system camera that is capable of removably mounting a heat dissipation module to an image pickup apparatus, further, is hardly affected by vibration of a cooling fan, and is capable of efficiently cooling the image pickup apparatus even in a state in which the heat dissipation module is removed from the image pickup apparatus.

Furthermore, the present invention provides a system camera that maintains rigidity of the whole system while avoiding increase in the size of the camera, and can be comfortably used by a user.

In a first aspect of the present invention, there is provided a heat dissipation module comprising a first engagement structure which is provided on a first surface and with which a first mating module is removably engaged, a first heat reception portion configured to receive heat from the first mating module, a first interface which is electrically connected to the first mating module, a second engagement structure which is provided on a second surface parallel to the first surface and with which a second mating module is removably engaged, a second interface which is electrically connected to the first interface and is electrically connected to the second mating module, and a fan unit which is provided between the first surface and the second surface, for dissipating heat received by the first heat reception portion to the outside.

In a second aspect of the present invention, there is provided a heat dissipation module that is removably mounted to an image pickup apparatus that includes a first cooling fan, an air outlet port, and a control unit, comprising a second cooling fan, and an air inlet port communicating with the air outlet port of the image pickup apparatus, wherein the heat dissipation module in a state mounted to the image pickup apparatus is electrically connected to the image pickup apparatus, and an operating state of the second cooling fan is controlled by the control unit of the image pickup apparatus.

In a third aspect of the present invention, there is provided a system camera including a heat dissipation module and a camera, wherein the heat dissipation module comprises a first engagement structure which is provided on a first surface and with which a first mating module is removably engaged, a first heat reception portion configured to receive heat from the first mating module, a first interface which is electrically connected to the first mating module, a second engagement structure which is provided on a second surface parallel to the first surface and with which a second mating module is removably engaged, a second interface which is electrically connected to the first interface and is electrically connected to the second mating module, and a fan unit which is provided between the first surface and the second surface, for dissipating heat received by the first heat reception portion to the outside, and wherein the camera forms the first mating module, and the first surface of the heat dissipation module is engaged with the camera.

In a fourth aspect of the present invention, there is provided a system camera comprising an image pickup apparatus having a first cooling fan and an air outlet port, a heat dissipation module that includes a second cooling fan and an air inlet port communicating with the air outlet port and is removably mounted to the image pickup apparatus, and a control unit that controls an operating state of the first cooling fan and an operating state of the second cooling fan, wherein the image pickup apparatus and the heat dissipation module are electrically connected to each other, in a state in which the heat dissipation module is mounted to the image pickup apparatus, and wherein the control unit at least changes one of the operating state of the first cooling fan and the operating state of the second cooling fan.

In a fifth aspect of the present invention, there is provided a system camera comprising a camera including at least one surface provided with a first ventilation port, and a first flow path including the first ventilation port, the camera being capable of performing heat exchange between an inside and an outside thereof via the first ventilation port, and a cooling module removably mounted to the camera, and including a base portion holding a fan unit and a first cover portion, wherein the heat dissipation module is mounted to the camera in a state in which the fan unit is disposed to overlap part of the first ventilation port, and the first cover portion covers at least part of a non-overlapping area of the first ventilation port where the fan unit does not overlap to thereby form the first flow path into a forced air cooling path.

With the configuration of the heat dissipation module according to the first aspect of the present invention, the heat dissipation module is capable of transferring and dissipating heat from one or both of mating modules, while electrically connecting the mating modules via the first surface and the second surface thereof, respectively. That is, it is possible to insert and connect the heat dissipation module between the two modules, whereby it is possible to add the heat dissipation capability to the system according to an operation purpose without impairing the expandability of the system.

With the configuration of the system camera including the heat dissipation module according to the third aspect of the present invention, the system camera is capable of having the heat dissipation module mounted thereon and removed therefrom according to a photographing condition of the camera, and hence the system camera can take an optimum form of operation, which improves the convenience for a user.

With the configuration of each of the heat dissipation module according to the second aspect of the present invention and the system camera according to the fourth aspect of the present invention, the heat dissipation module can be removably mounted to the image pickup apparatus. Further, the system camera is hardly affected by vibration of the cooling fan, and it is possible to effectively cool the image pickup apparatus even in a state in which the heat dissipation module is removed from the image pickup apparatus.

With the configuration of the system camera according to the fifth aspect of the present invention, the system camera is capable of maintaining the rigidity of the whole system while avoiding increase in size of the whole system due to mounting of the cooling module, and can be comfortably used by a user.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Figure 1A:
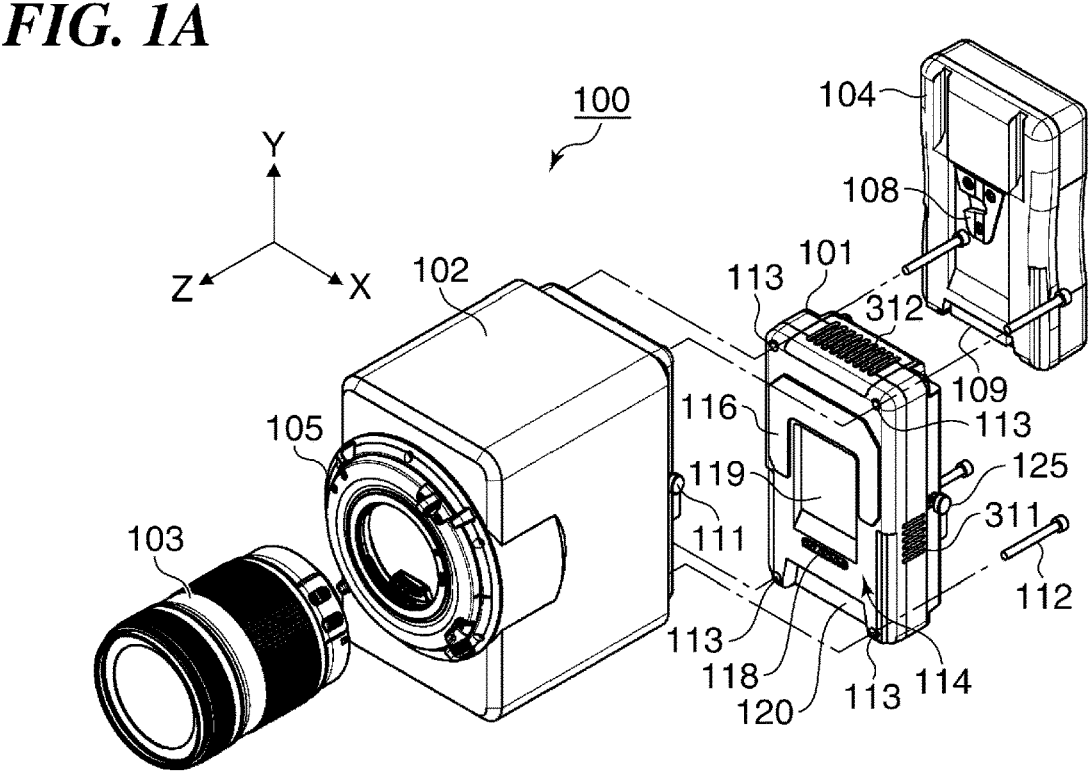
FIGS. 1A and 1B are exploded perspective views of a system camera according to a first embodiment of the present invention.
Figure 1B:
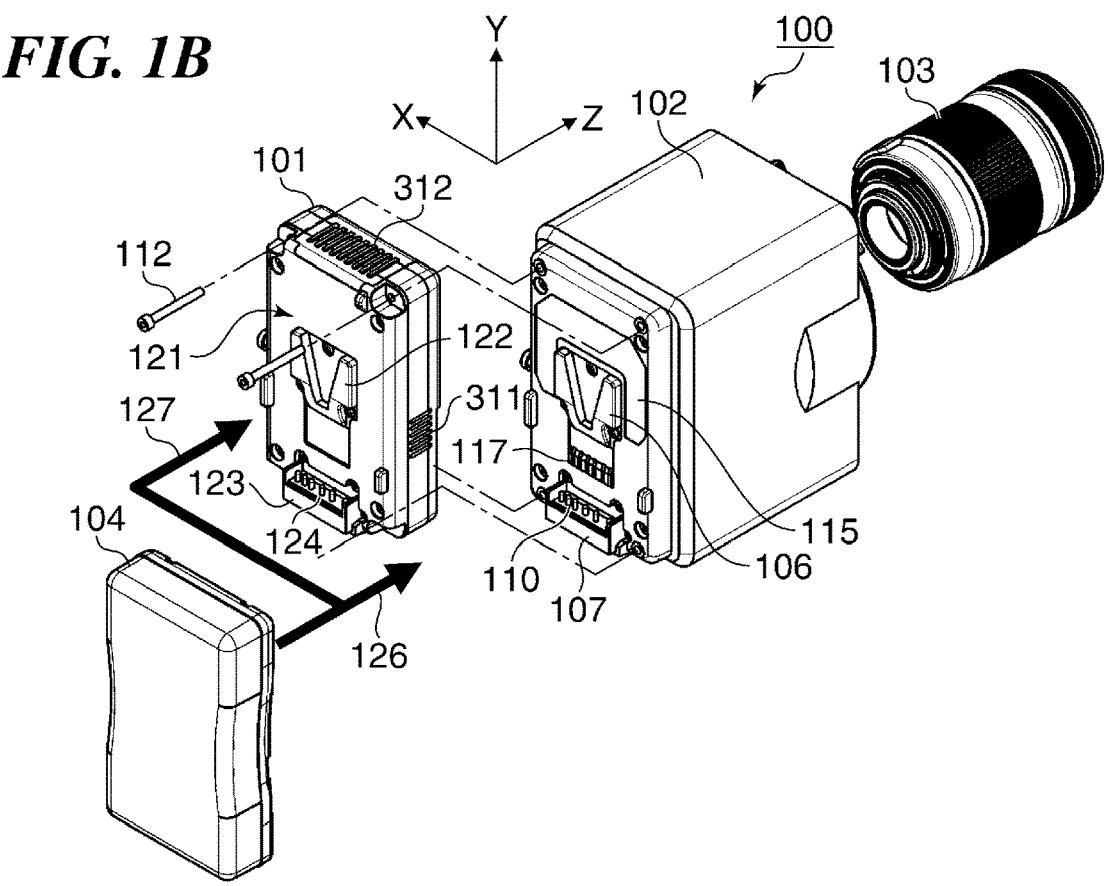
Figure 2A:
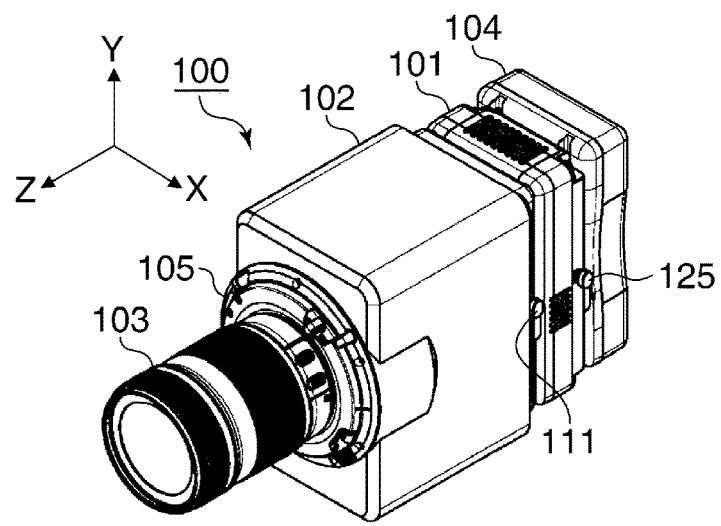
FIGS. 2A to 2C are perspective views each showing the appearance of an assembly of the system camera shown in FIGS. 1A and 1B.

FIG. 1A is an exploded perspective view of a system camera 100 according to a first embodiment of the present invention, as viewed from the front (object side), and FIG. 1B is an exploded perspective view of the system camera 100 shown in FIG. 1A, as viewed from the rear. FIG. 2A is a perspective view of an assembly of the system camera 100, as viewed from the front, FIG. 2B is a perspective view of the assembly shown in FIG. 2A, as viewed from the rear, and FIG. 2C is a perspective view of the system camera 100 in a state in which a heat dissipation module 101 is removed from the assembly shown in FIG. 2A.

To simplify the following description, an XYZ coordinate system as shown in each figure is defined. A direction in which an optical axis of the system camera 100 extends is set as a direction of a Z-axis, and a direction toward an object for photographing is defined as a positive direction of the Z-axis. On a plane perpendicular to the Z-axis, a direction of the width of the system camera 100 is set as a direction of an X-axis, and a top-bottom direction of the system camera 100 is set as a direction of a Y-axis. Particularly, a direction toward the top is defined as a positive direction of the Y-axis. Further, a side of each module as a component of the system camera 100 toward an object is referred to as a front side, and a side opposite thereto is referred to as a rear side.

As shown in FIG. 1, the system camera 100 according to the present embodiment is comprised of the modules of a camera body 102, a lens unit 103, a battery pack 104, and further, the heat dissipation module 101. These component modules can be mounted and connected in the Z-axis direction by a structure described hereinafter, and operate as the system camera 100 by being connected to each other.

Figure 2B:
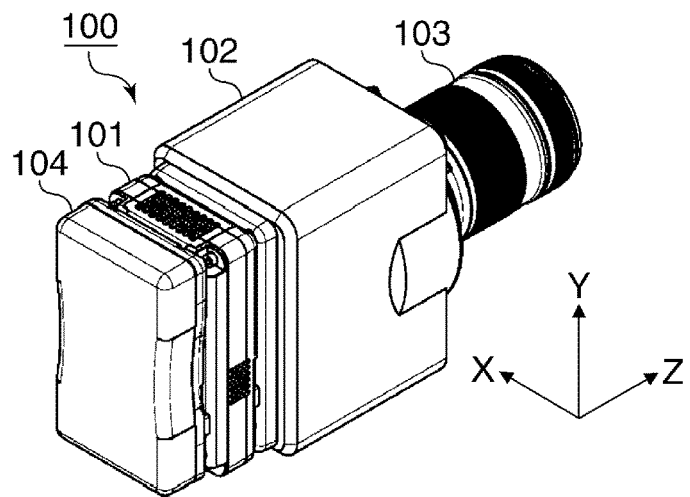
Figure 2C:
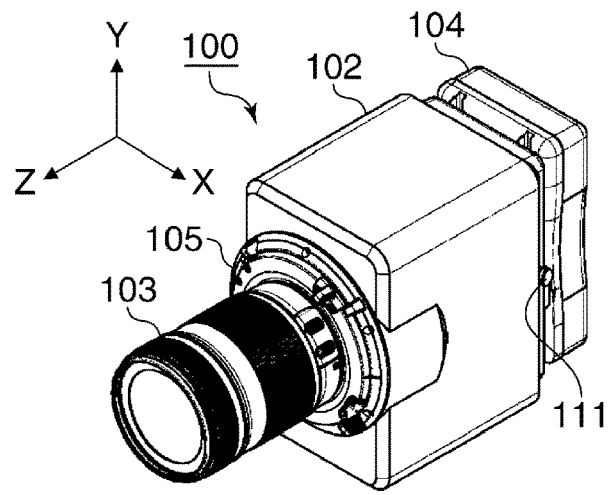

Particularly, as shown in FIGS. 2A to 2C, the system camera 100 is configured such that a user can select between two forms: A form in which the heat dissipation module 101 is connected (see FIGS. 2A and 2B) and a form in which the heat dissipation module 101 is not connected (see FIG. 2C). The following description will be given of the component modules of the system camera 100 and connection structures of these modules.

First, the camera body 102 has a lens mount 105 disposed on a front side (front surface) thereof, for mounting the lens unit 103, and the lens unit 103 can be changed according to a photographing condition. The camera body 102 converts an object optical image incident through the lens unit 103 to predetermined image signals using an incorporated image sensor (not shown). On a rear side (rear surface) of the camera body 102, there are arranged an engagement recess which is engaged with the battery pack 104 (hereinafter referred to as the battery engagement recess 106) and a battery terminal 107 which is electrically connected to the battery pack 104 to receive power supply.

On the other hand, the battery pack 104 has a rechargeable battery cell contained therein. On a surface of the battery pack 104, which is joined to the camera body 102, there are arranged an engagement protruding portion which fits in the battery engagement recess 106 (hereinafter referred to as the battery engagement protrusion 108) and a battery pack power supply terminal 109 which is connected to the battery terminal 107 to supply power.

Next, a description will be given of a structure for directly connecting the battery pack 104 to the camera body 102 (indicated by an arrow 126 in FIG. 1B). The battery engagement recess 106 of the camera body 102 and the battery engagement protrusion 108 of the battery pack 104 form respective female and male structure portions of an engagement structure in which two pairs of fitting rails substantially opposed to each other are each in a substantially V-shape arrangement and can be fitted to and separated from each other by sliding in the Y-axis direction. Since each pair of fitting rails are in the substantially V-shape arrangement, the fitted/separate state of the pairs of fitting rails can be switched by sliding one of them in one of the two directions, that is, the two are separated from each other e.g. by sliding the battery engagement protrusion 108 of the battery pack 104 in the positive direction of the Y-axis, and are fitted to each other e.g. by sliding the same in the negative direction of the Y-axis.

Further, the battery terminal 107 has contact pins 110 protruding in the positive direction of the Y-axis, on the other hand, the battery pack power supply terminal 109 has contact holes (not shown) extending from the bottom of the battery pack 104 in the Y-axis direction, and hence the contact pins 110 are inserted into and removed from the contact holes in the Y-axis direction. From the above, when the battery pack 104 is slid along the rear surface of the camera body 102 in the negative direction of the Y-axis, the battery engagement protrusion 108 is fitted in the battery engagement recess 106, and the battery terminal 107 is inserted in the battery pack power supply terminal 109 at the same time, whereby the battery pack 104 and the camera body 102 are electrically connected to each other.

Further, the sliding operation of the battery engagement recess 106 and the battery engagement protrusion 108 is restricted by a lock mechanism, not shown, which is provided on a portion of the camera body 102 in the vicinity of where the battery engagement recess 106 and the battery engagement protrusion 108 are fitted and brought into abutment with each other. With this, the position of the battery pack 104 is fixed, and the connection is completed. FIG. 2C shows the camera body 102 in a state having the battery pack 104 connected thereto. In this state, the camera body 102 is enabled to perform predetermined imaging and recording operations with electric power supplied from the battery pack 104.

When a lock release knob 111 of the camera body 102 is operated, the above-mentioned lock mechanism is operated in a restriction releasing direction, and the battery pack 104 is enabled to be slid. When the battery pack 104 is further slid in the positive direction of the Y-axis, the battery pack power supply terminal 109 and the battery terminal 107, and the battery engagement recess 106 and the battery engagement protrusion 108 are separated from each other, respectively, and finally, the battery pack 104 is removed from the camera body 102.

Incidentally, the heat dissipation module 101 which can be inserted and connected between the camera body 102 and the battery pack 104 is available for the system camera 100. For example, in a case where the system camera 100 is used in an operation mode in which the power consumption of the camera body 102 is high, causing a concern of generating much heat, in a case where the use environment temperature is high, and hence a temperature rise margin is small with respect to the guaranteed temperature of the camera body 102 due to heat generation, or in a like other case, heat is sometimes not sufficiently dissipated only by natural heat dissipation from the camera body 102.

By connecting the heat dissipation module 101 in such cases, it is possible to enhance the heat dissipation capability of the system camera 100. The following description will be given of the configuration of the system camera 100 including the heat dissipation module 101.

The heat dissipation module 101 is fastened and fixed to the camera body 102 with four bolts 112 (part of which is not shown) inserted through holes 113 formed in four corners of the heat dissipation module 101. On a surface of the heat dissipation module 101 via which the heat dissipation module 101 is mounted to the camera body 102 (hereinafter referred to as the camera-side mounting surface 114), there is provided a heat receiving surface (heat reception portion) 116 which is brought into contact with a heat transfer section 115 of the camera body 102 when the heat dissipation module 101 is mounted to the camera body 102. Details of the heat receiving surface 116 will be described hereinafter. Further, on the camera-side mounting surface (first surface) 114, there are provided a module contact terminal section 118 which is brought into electrically conductive contact with an expansion contact pad 117, and recesses 119 and 120 for avoiding interference with the battery engagement recess 106 and the battery terminal 107 on the rear side of the camera body 102.

A surface of the heat dissipation module 101, opposite from the camera-side mounting surface 114, is a surface on which the battery pack 104 is mounted (hereinafter referred to as the battery mounting surface 121). The battery mounting surface (second surface) 121 is provided with a battery engagement recess 122 and a module-side battery terminal 123, which are associated with the battery engagement protrusion 108 and the battery pack power supply terminal 109, respectively.

The battery engagement recess 122 may be formed by using the same component as the battery engagement recess 106, or may be formed by employing another structure insofar as the compatibility with the battery engagement protrusion 108 is maintained. Further, the module-side battery terminal 123 may have the same structure as the battery terminal 107, or another structure may be employed insofar as it is mechanically and electrically compatible with the battery pack power supply terminal 109.

Further, inside the heat dissipation module 101, terminals of the module contact terminal section 118 are electrically connected to contact pins 124 of the module-side battery terminal 123, respectively. Note that inside the camera body 102, pads of the expansion contact pad 117 are electrically connected in parallel to the contact pins 110 of the battery terminal 107.

Connection of the battery pack 104 to the heat dissipation module 101 (indicated by an arrow 127 in FIG. 1B) is the same as the above-described connection of the battery pack 104 to the camera body 102. By sliding the battery pack 104 in the negative direction of the Y-axis, the battery engagement protrusion 108 is engaged with the battery engagement recess 122, and the module-side battery terminal 123 is inserted into the battery pack power supply terminal 109, whereby the heat dissipation module 101 and the battery pack 104 are electrically connected. The sliding operation of the battery pack 104 is restricted by a lock mechanism, not shown, which is provided on the heat dissipation module 101, whereby the battery pack 104 is fixed.

FIGS. 2A and 2B show the system camera 100 in a state in which the camera body 102, the heat dissipation module 101, and the battery pack 104 are serially connected to each other. In this state, electric power of the battery pack 104 is supplied from the battery pack power supply terminal 109, via the module-side battery terminal 123 and the module contact terminal section 118 to the expansion contact pad 117 of the camera body 102, and then to the inside of the camera body 102, whereby the camera body 102 is enabled to perform the predetermined imaging and recording operations.

That is, it is possible to drive the system camera 100 using the same battery pack 104 irrespective of whether or not the heat dissipation module 101 is mounted. Further, when a lock release knob 125 of the heat dissipation module 101 is operated, the battery pack 104 is released from the sliding restricted state, whereby it is possible to remove the battery pack 104 from the heat dissipation module 101.

Figure 3A:
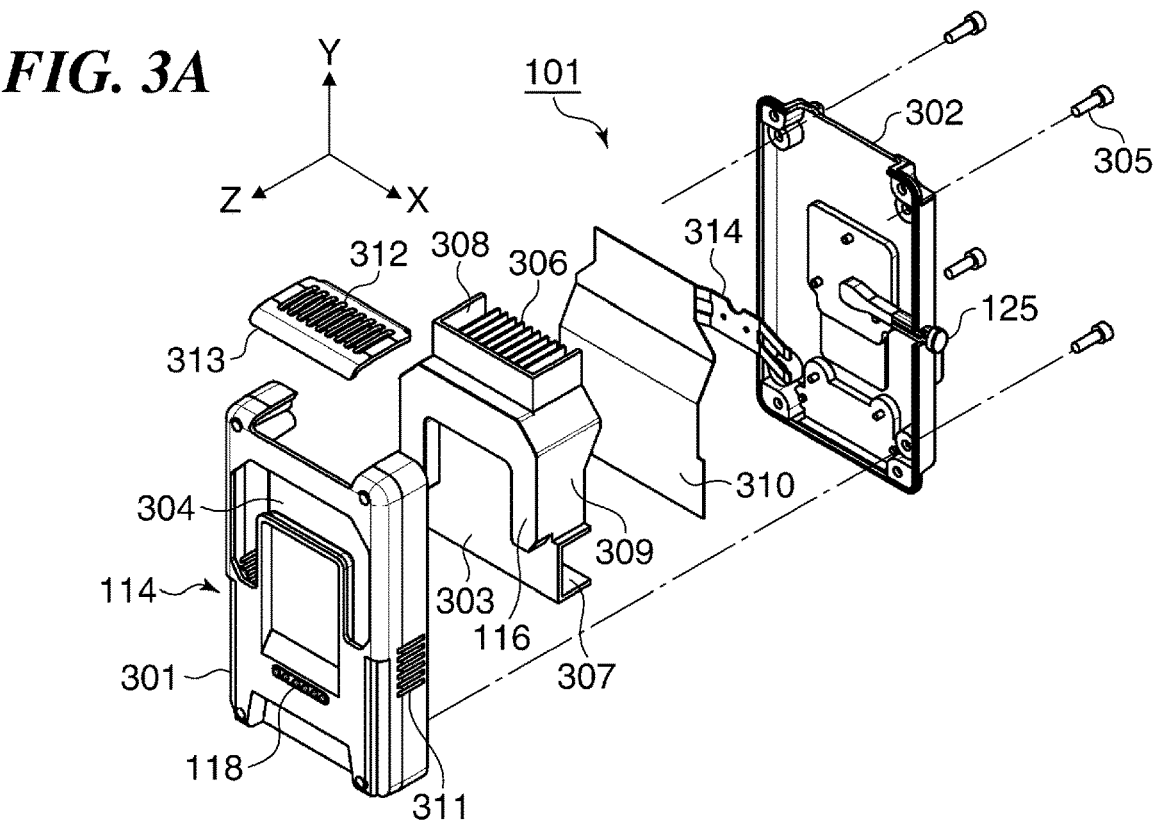
FIGS. 3A and 3B are exploded perspective views of a heat dissipation module.

Next, the structure of the heat dissipation module 101 will be described in detail, by additionally referring to FIGS. 3A and 3B. FIG. 3A is an exploded perspective view useful in explaining the structure of the heat dissipation module 101, as viewed from the front, and FIG. 3B is an exploded perspective view of the heat dissipation module 101 shown in FIG. 3A, as viewed from the rear.

Figure 3B:
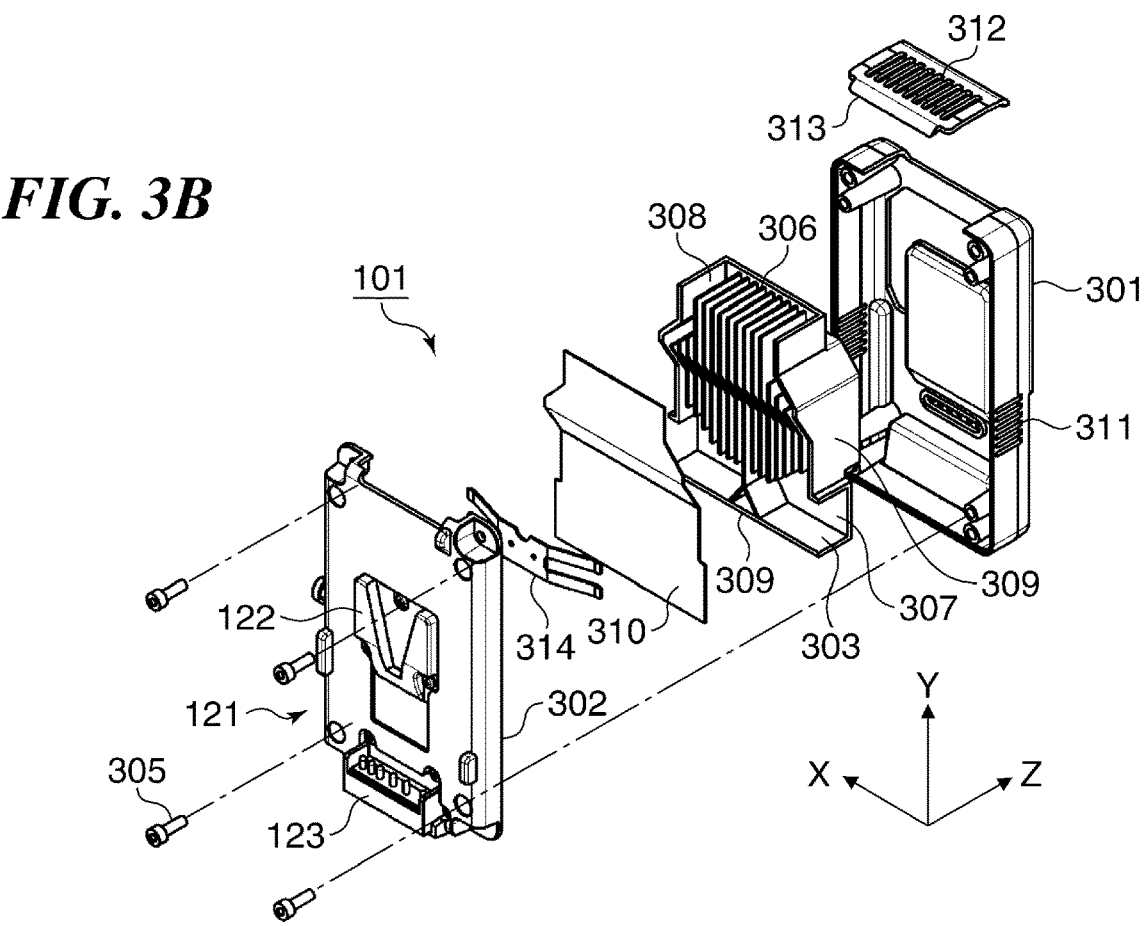

As shown in FIGS. 3A and 3B, the heat dissipation module 101 has its appearance formed by a front case 301 and a rear case 302, and accommodates a heat sink 303 therein. The front case 301 forms the camera-side mounting surface 114, and has the module contact terminal section 118 mounted thereon. Further, the front case 301 is formed with an opening 304 for exposing the heat receiving surface 116 which is one of the surfaces of the heat sink 303.

On the other hand, the rear case 302 forms the battery mounting surface 121, and has the battery engagement recess 122, the module-side battery terminal 123, and the lock release knob 125, arranged thereon. The module contact terminal section 118 and the contact pins 124 of the module-side battery terminal 123 are electrically connected, as mentioned above, e.g. by electric wires, not shown, or a flexible board, not shown.

The heat sink 303 is a radiator made of a material having high thermal conductivity, such as aluminum for die casting. The heat sink 303 has the heat receiving surface 116 exposed to outside the heat dissipation module 101, and has a surface opposite from the heat receiving surface 116, provided with a multiplicity of heat dissipation fins 306 erected thereon. The heat dissipation fins 306 are shielded from their surrounding by a partition wall 309 and a cover member 310, except outside air inlet ports 307 and a heat dissipation port 308, thereby forming duct-shaped airflow paths. The outside air inlet ports 307 are provided so as to open toward respective lateral sides of the heat dissipation module 101, and the heat dissipation port 308 is provided so as to open toward the top (top surface) of the heat dissipation module 101.

Slit-like openings 311 and 312 are provided at respective locations corresponding to the outside air inlet ports 307 and the heat dissipation port 308, respectively. The slit-like openings 311 are formed in the front case 301, and the slit-like opening 312 is formed in a lid cover 313. However, the lid cover 313 may be integrally formed with the front case 301 or the rear case 302.

Further, the heat sink 303 is pressed and urged toward the front case 301 by an urging spring 314. With this, the heat sink 303 is disposed in the heat dissipation module 101 such that when the heat dissipation module 101 is not mounted to the camera body 102, placing the heat sink 303 in a no-load state, the heat receiving surface 116 protrudes from the camera-side mounting surface 114 by a predetermined amount.

The heat dissipation module 101 is formed by assembling the above-described components, and fastening the front case 301 and the rear case 302 with fastening screws 305.

Figure 4:
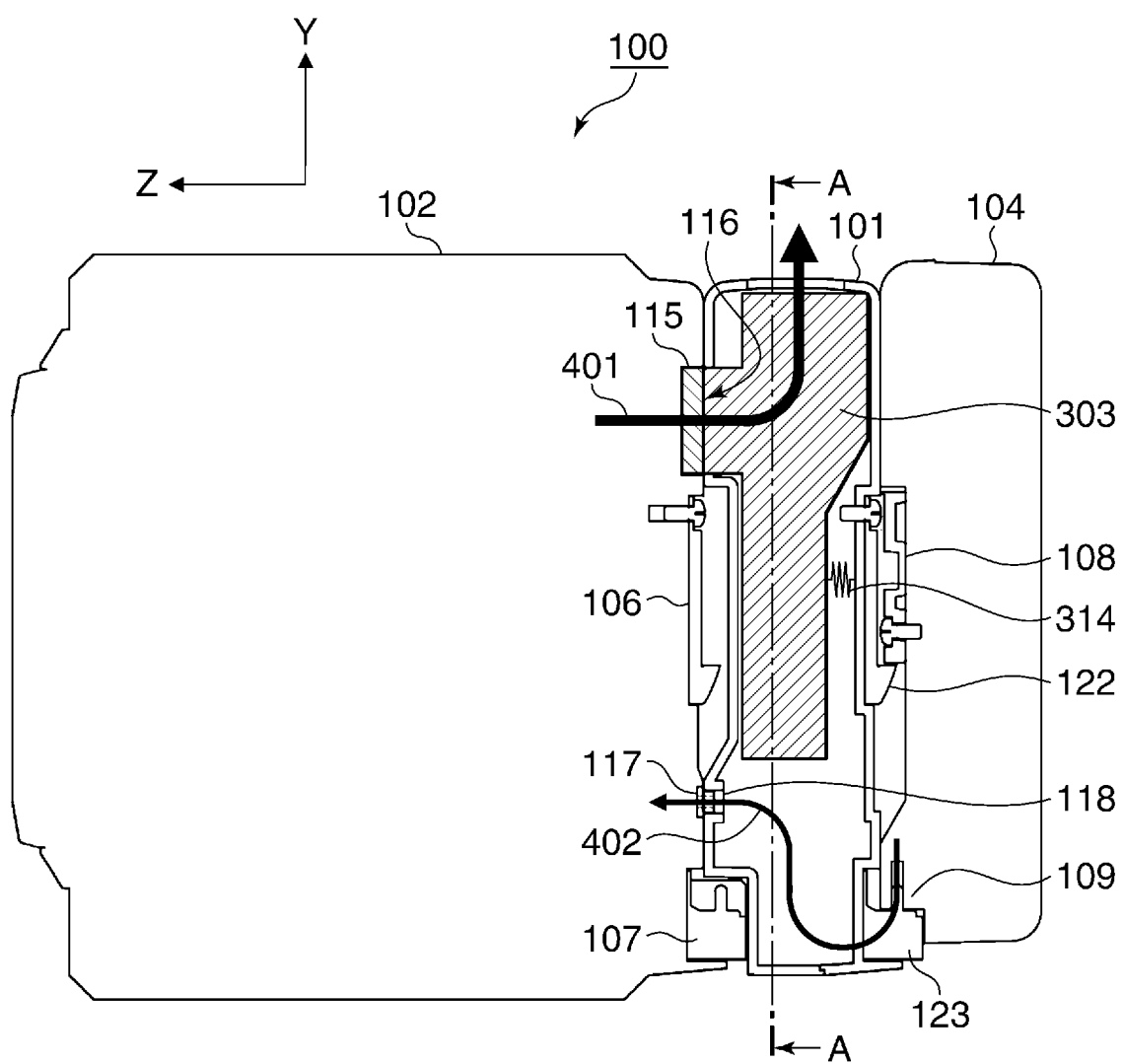
FIG. 4 is a schematic cross-sectional view of the system camera.

FIG. 4 is a schematic cross-sectional view of the system camera 100 formed by serially connecting the camera body 102, the heat dissipation module 101, and the battery pack 104 to each other. This cross-sectional view is obtained by cutting the system camera 100 along a vertical plane passing the optical axis. The lens unit 103 which is unnecessary for explanation is omitted from illustration. Further, FIG. 5 is a cross-sectional view taken along A-A in FIG. 4, showing a cross section of the heat dissipation module 101.

Figure 5:
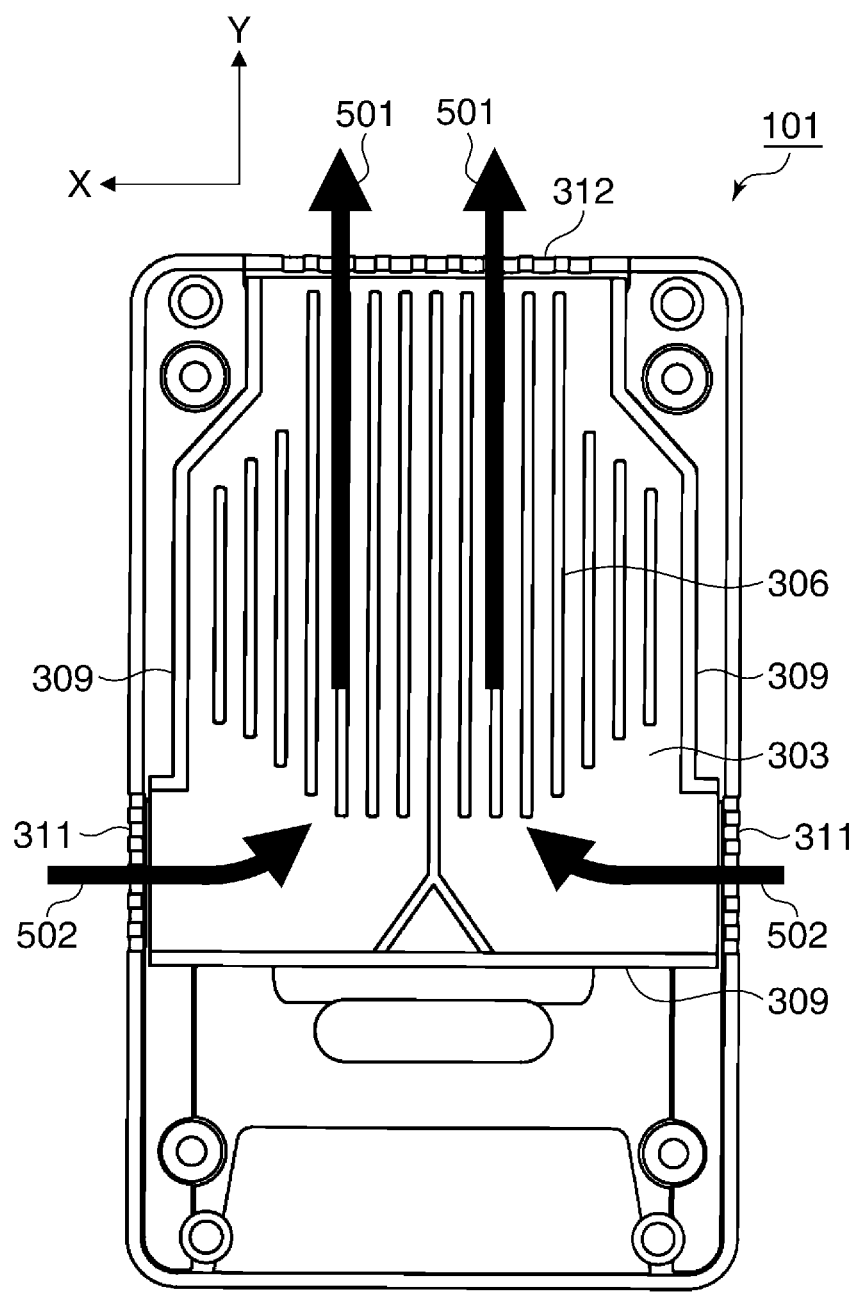
FIG. 5 is a cross-sectional view taken along A-A in FIG. 4.

The following description is given of the heat dissipation paths of the system camera 100 with reference to FIGS. 4 and 5. In FIG. 4, a heat moving passage 401 and a power supply path 402 from the battery are indicated by arrows. Heat generated within the camera body 102 is transferred to the heat transfer section 115, and then transferred to the heat receiving surface 116 which is in contact with the heat transfer section 115. Here, the heat transfer section 115 is a member for transferring heat generated in the camera body 102 to the heat dissipation module 101, and is fixed in a manner exposed from the rear surface of the camera body 102, i.e. part of the surface via which the camera body 102 is to be connected to the battery pack 104 or the heat dissipation module 101.

It is desirable that the heat transfer section 115 is made of a material having high thermal conductivity, such as copper or aluminum. Further, it is desirable that the heat transfer section 115 is provided in a manner slightly protruding from the main plane of the rear surface of the camera body 102 so as to be positively brought into contact with the heat receiving surface 116. Inside the camera body 102, to the heat transfer section 115, there are connected heat transfer paths formed by thermal conductivity members and extending from heat generation sources, such as an image sensor, a CPU that processes image signals at high speed, and a record processing section and a recording medium for recording a large amount of image data at high speed. The various known techniques can be applied to the material, structure, and so forth, of the heat transfer paths to the heat transfer section 115.

The heat transfer section 115 is exposed only on the part of the rear surface of the camera body 102, but any other form can be employed insofar as the heat transfer section 115 can be brought into contact with the heat receiving section 116. For example, the heat transfer section 115 may be exposed such that it forms the whole rear surface of the camera body 102, or the whole exterior of the camera body 102 may have high thermal conductivity so as to function as the heat transfer section 115.

In a state in which the heat dissipation module 101 is connected to the camera body 102, the heat receiving surface 116 is brought into contact with the heat transfer section 115 with a predetermined pressing force by action of the urging spring 314 which presses the heat sink 303. This reduces contact thermal resistance between the heat receiving surface 116 and the heat transfer section 115.

Heat transferred to the heat receiving surface 116 is diffused over the whole heat sink 303, and is transferred from the heat dissipation fins 306 to air surrounding the heat dissipation fins 306. As indicated by arrows 501 in FIG. 5, warmed air around the heat dissipation fins 306 is moved toward the top of the heat dissipation module 101 by the chimney effect, and is discharged to the outside through the slit-like opening 312 (heat discharge section).

On the other hand, fresh outside air is introduced through the slit-like openings 311 to replace the air which is heated and discharged to the outside (indicated by arrows 502). The introduced fresh outside air receives heat from the heat dissipation fins 306, and is discharged to the outside through the slit-like opening 312, as indicated by the arrows 501.

As described above, heat generated within the camera body 102 is discharged to the outside by the heat dissipation module 101. That is, heat dissipation from the camera body 102 is assisted and enhanced by the heat sink 303 included in the heat dissipation module 101, and hence it is possible to cope with heat generation in a high power consumption operation mode of the system camera 100.

Further, as indicated by the power supply path 402, electric power is supplied from the battery pack power supply terminal 109 to the expansion contact pad 117 via the module-side battery terminal 123 and the module contact terminal section 118, and is then supplied from the expansion contact pad 117 to the inside of the camera body 102. Therefore, it is possible to use the battery pack 104, similar to a case where the heat dissipation module 101 is not connected.

As described above, the heat dissipation module 101 has the engagement structures to be engaged with the camera body 102 and the battery pack 104, on the two surfaces thereof which are substantially opposite and parallel to each other, respectively, and can be inserted and connected between the camera body 102 and the battery pack 104.

Further, the heat dissipation module 101 has the heat receiving surface 116 as a thermal interface on the camera-side mounting surface 114 which is one of the above-mentioned two surfaces, and has a function of dissipating heat transferred to the heat receiving surface 116 from the camera body 102 to the outside via the heat sink 303 included therein. Therefore, it is possible to realize the optimum heat dissipation structure according to a use situation of the system camera 100 without changing the connectivity of the battery pack 104.

Figure 6A:
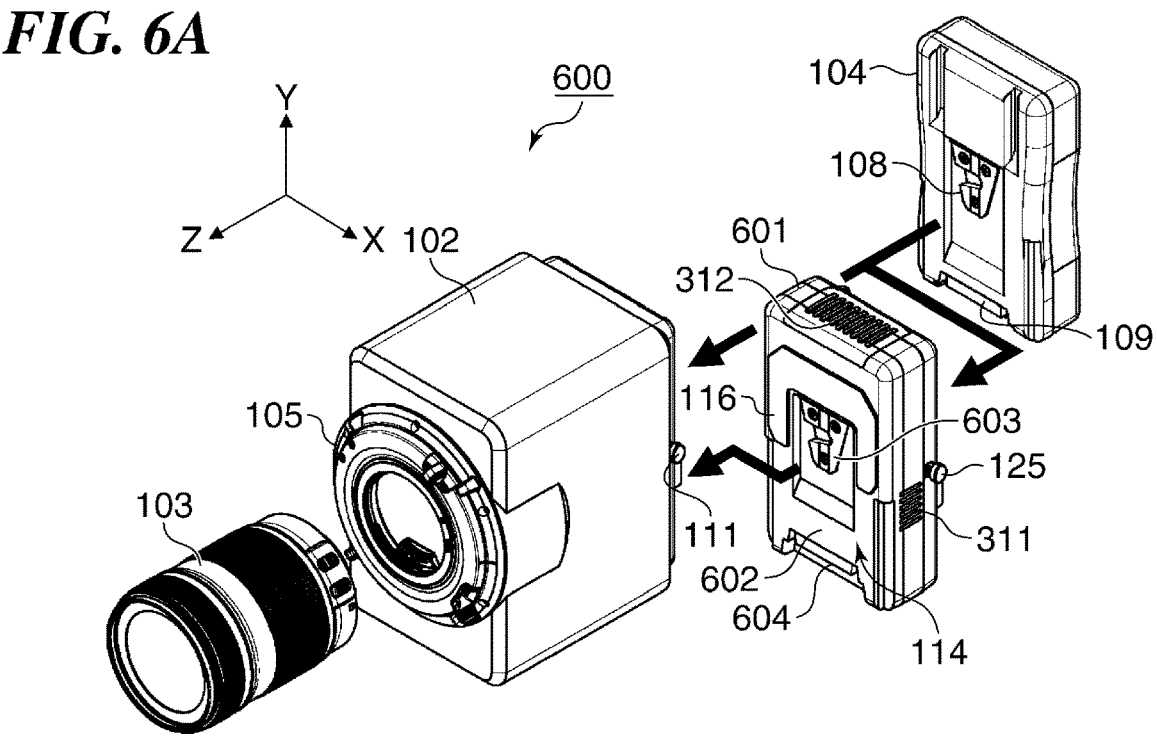
FIGS. 6A and 6B are exploded perspective views useful in explaining a variation of the system camera.
Figure 6B:
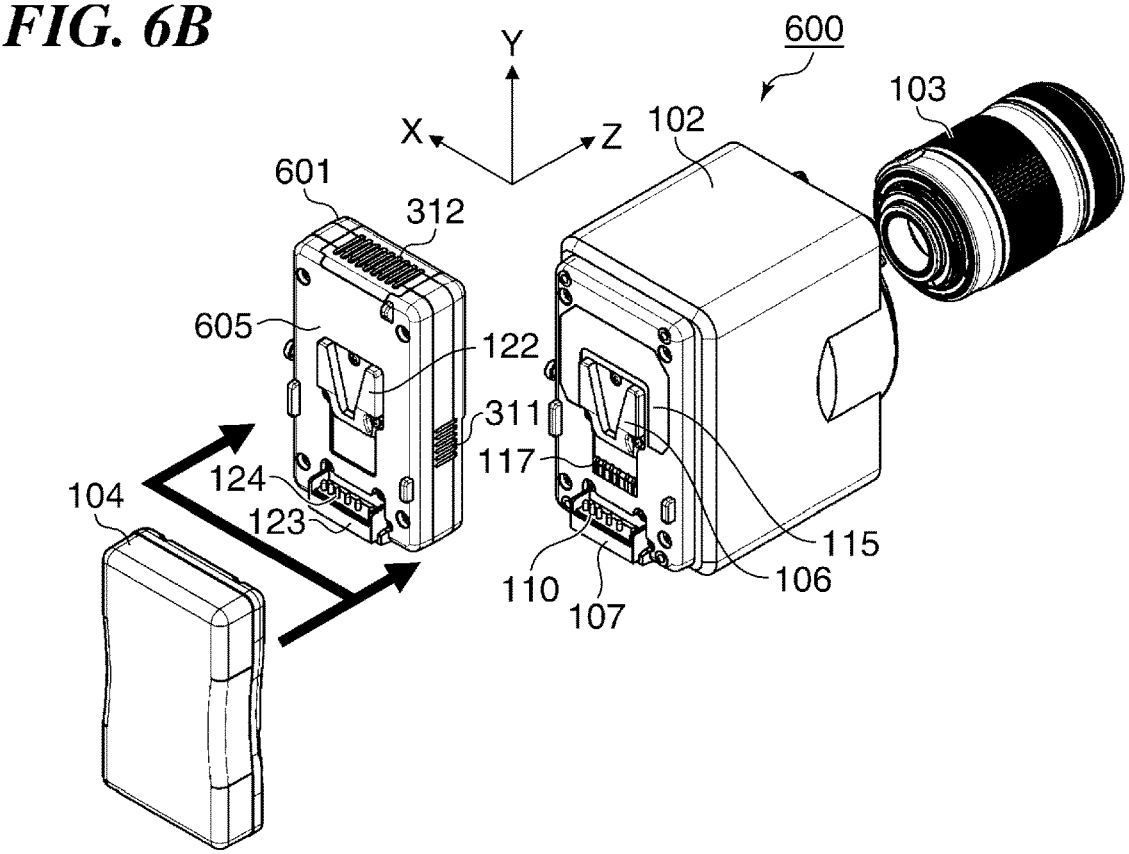

Next, a description will be given of a system camera 600 to which a heat dissipation module 601 as a variation of the heat dissipation module 101 is applied. FIGS. 6A and 6B are views showing the configuration of the system camera 600 which is comprised of the camera body 102, the lens unit 103, the battery pack 104, and the heat dissipation module 601. The heat dissipation module 601 differs from the above-described heat dissipation module 101 in the engagement structure to be engaged with the camera body 102. Except this point, the heat dissipation module 601 has the same structure and functions as the above-described heat dissipation module 101, and hence the description is given only of points specific to the heat dissipation module 601.

A front case 602 of the heat dissipation module 601 has a module engagement protrusion 603 associated with the battery engagement recess 106 and a module-side power supply terminal 604 associated with the battery terminal 107, mounted thereon. The module engagement protrusion 603 may be formed by using the same component as the battery engagement protrusion 108, or may employ another structure insofar as the compatibility with the battery engagement recess 106 is maintained. Further, the module-side power supply terminal 604 may also be formed by using the same structure as that of the battery pack power supply terminal 109, or may employ another structure insofar as it is mechanically and electrically compatible with the battery terminal 107.

A rear case 605 has the battery engagement recess 122 and the module-side battery terminal 123 arranged thereon, similar to the heat dissipation module 101. Further, inside the heat dissipation module 601, terminals of the module-side power supply terminal 604 are connected to the contact pins 124 of the module-side battery terminal 123, respectively.

That is, the heat dissipation module 601 employs the same structure as that of the battery pack 104 as the engagement structure to be engaged with the camera body 102.

With this engagement structure, the heat dissipation module 601 and the battery pack 104 can be mounted to and removed from the camera body 102 by the same operation. Therefore, the attachment and removal operability is improved, and it is possible to quickly mount or remove the heat dissipation module 601 e.g. in a photographing site. Further, if a structure using a general-purpose interface is employed, it is easy to imagine that the heat dissipation module can be commonly used in various system cameras.

As is clear from the above, it should be noted that the engagement interface structure for incorporating the heat dissipation module in the system is not particularly limitative, but various structures can be applied.

Figure 7A:
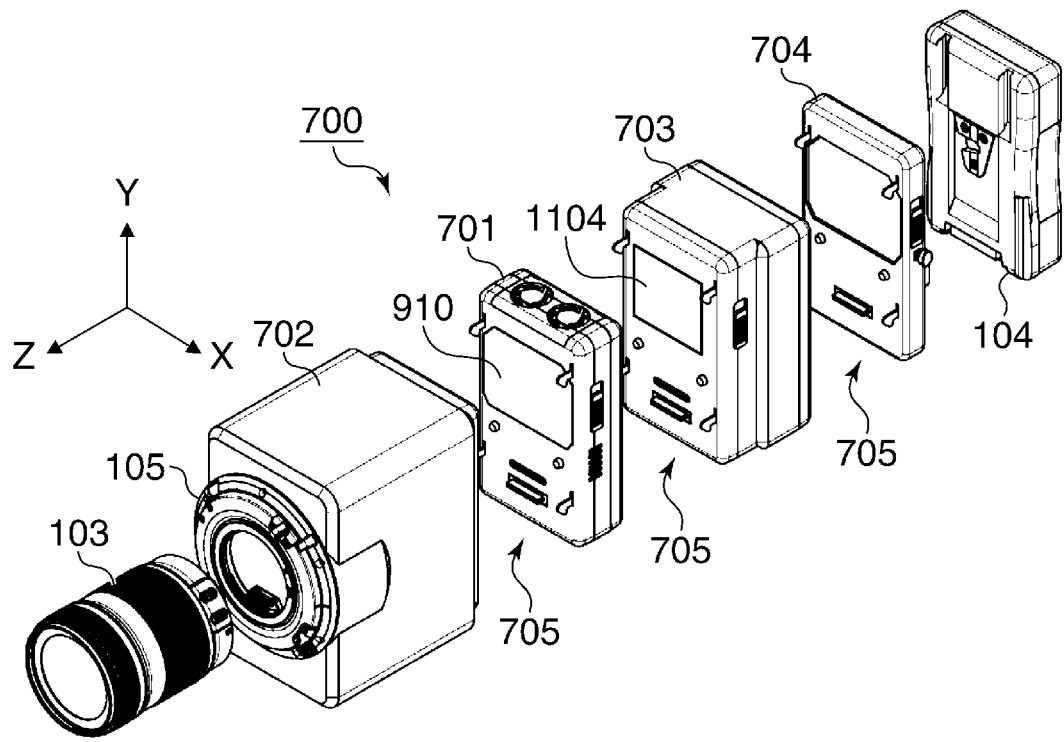
FIGS. 7A and 7B are exploded perspective views of a system camera according to a second embodiment of the present invention.
Figure 7B:
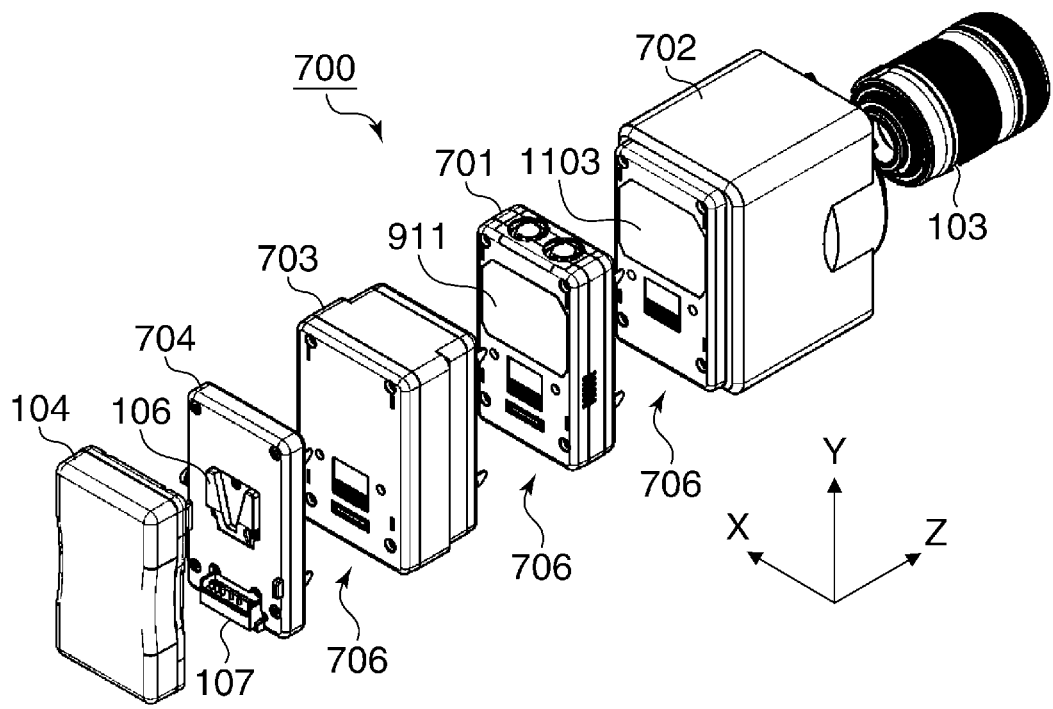
Figure 8A:
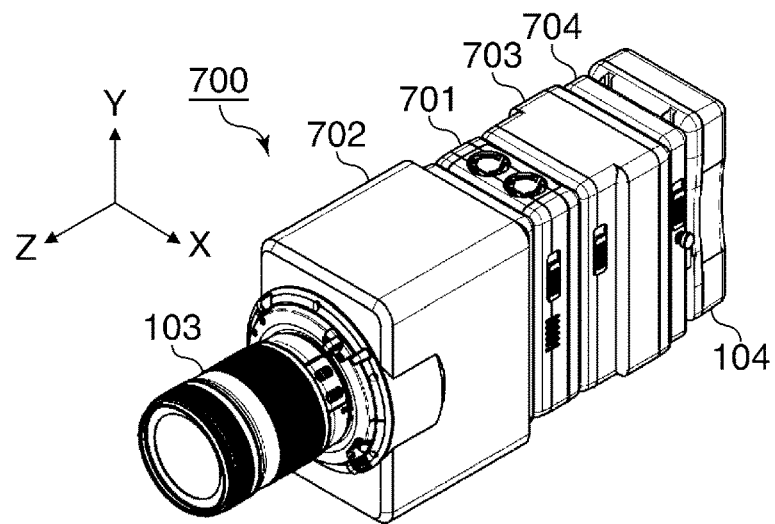
FIGS. 8A to 8C are perspective views each showing the appearance of an assembly of the system camera shown in FIGS. 7A and 7B.
Figure 8B:
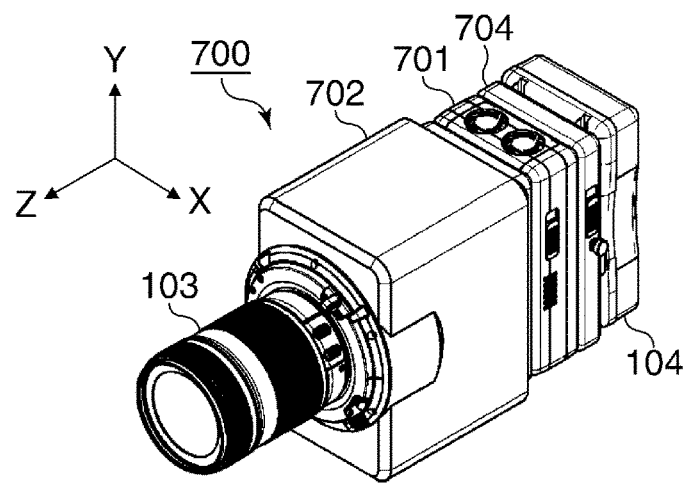
Figure 8C:
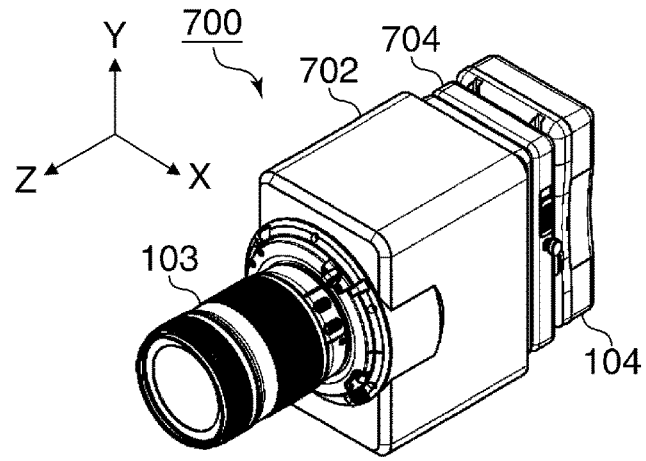
Figure 9A:
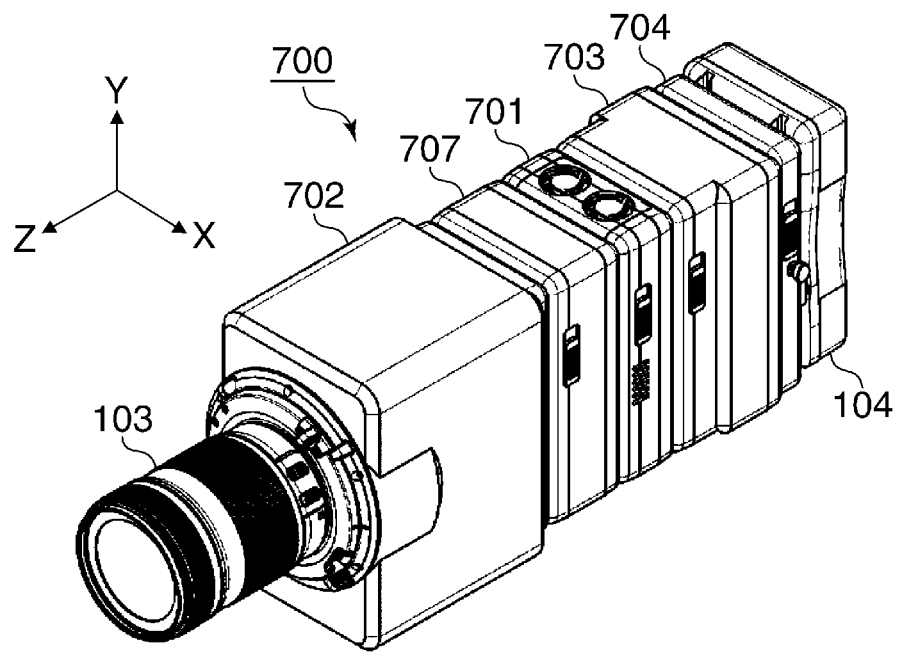
FIGS. 9A and 9B are perspective views each showing the appearance of an assembly of the system camera shown in FIGS. 7A and 7B.
Figure 9B:
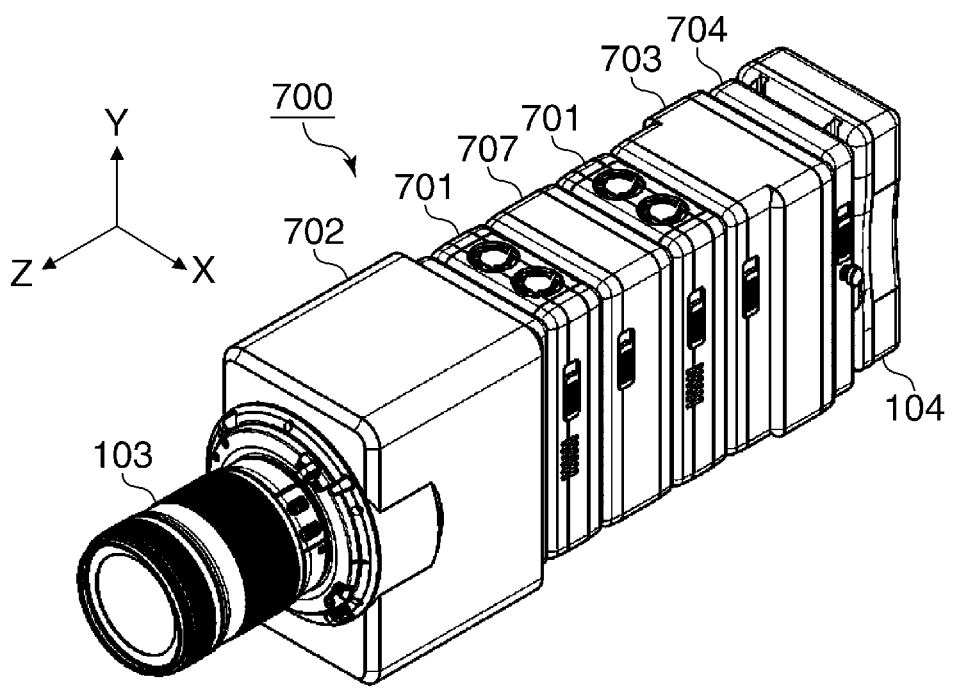

FIG. 7A is an exploded perspective view of a system camera 700 according to a second embodiment of the present invention, as viewed from the front (object side), and FIG. 7B is an exploded perspective view of the system camera 700 shown in FIG. 7A, as viewed from the rear. FIG. 8A is a perspective view of the system camera 700 shown in FIGS. 7A and 7B in an assembled state, as viewed from the front, FIG. 8B is a perspective view of the system camera 700 in a state in which a recorder module 703 is removed from the FIG. 8A state, and FIG. 8C is a perspective view of the system camera 700 in a state in which a heat dissipation module 701 is removed from the FIG. 8B state. FIGS. 9A and 9B are perspective views of the system camera 700 in respective states in which a module and modules is/are added anew to the FIG. 8A state.

Note that the XYZ coordinate system shown in each drawing has the same definition as in the above-described first embodiment. Further, similar to the above-described first embodiment, a side of each module as a component of the system camera 700 toward an object is referred to as a front side, and a side opposite thereto is referred to as a rear side. Further, the same component elements as those described in the first embodiment are denoted by the same reference numerals, and description thereof is omitted.

The component modules of the system camera 700 shown in FIGS. 7A and 7B are a camera body 702, the lens unit 103, the recorder module 703, a battery adapter module 704, the battery pack 104, and the heat dissipation module 701.

The camera body 702 has the lens mount 105 for mounting the lens unit 103, disposed on a front side (front surface) thereof, and converts an object optical image incident through the lens unit 103 to predetermined image signals by using an incorporated image sensor (not shown). A recording section for recording the image signals may be provided inside the camera body 702. The camera body 702 has a common engagement interface on a rear side (rear surface) thereof.

Although details of the common engagement interface will be described hereinafter, the common engagement interface refers to an inter-module connection structure having compatibility, which is comprised of a combination of an engaging mechanism on a male side (hooks, referred to hereinafter) or an engaged mechanism on a female side (slits, referred to hereinafter), each as a standardized mechanism, and an electrical connection mechanism. Particularly, a common engagement interface having the engaging mechanism is referred to as a male-side interface 705, and a common engagement interface having the engaged mechanism is referred to as a female-side interface 706.

The rear side of the camera body 702 is provided with the female-side interface 706. The recorder module 703 is a recording device for storing image signals photographed by the camera body 702 in a recording medium, not shown, in a predetermined data format. In recent years, particularly, the resolution of moving images has been made higher and higher, so that high-definition images (FHD) have already come into general use, and the technology for the next-generation video, such as a 4K or 8K video, is being developed.

Further, to obtain a higher presence smooth video and a higher-definition slow motion video, a technique for making a video signal with a higher frame rate of over 60 p, including 120 p or 240 p, is under development. Such a next-generation image requires a huge file volume of digital data, and to deal with the data, development of a large-capacity recording medium into which data can be written at high speed and a technique for compressing data at a high compression rate is under way.

However, the camera body 702 is required to be compact in size, and hence it is difficult to mount a large-sized internal recording system, and further, there is a problem in being adapted to a new technique in the future.

In view of this, the camera body 702 is configured to be capable of having the recorder module 703, as an interchangeable external recording device, connected thereto, so that selection of the recorder module 703 makes it possible to perform photographing with recording specifications (a compression format and a type of a recording medium used) suited to a purpose. The recorder module 703 has the male-side interface 705 on a front side (front surface) thereof, and the female-side interface 706 on a rear side (rear surface) thereof.

The battery adapter module 704 has the battery engagement recess 106 and the battery terminal 107 for being engaged with the battery pack 104 on a rear side (rear surface) thereof, and has the male-side interface 705 on a front side (front surface) thereof. That is, the battery adapter module 704 is an adapter for converting the engagement interface of the battery pack 104 to the common engagement interface.

The heat dissipation module 701 is a module which is connected so as to increase the heat dissipation capability, in a case where there is a concern that the temperature of the system camera 700 becomes high, such as a case where the camera is in a photographing mode with high power consumption, and a case where the use environmental temperature is high. Although details of the heat dissipation module 701 will be described hereinafter, the heat dissipation module 701 has the male-side interface 705 on a front side (front surface) thereof, and has the female-side interface 706 on a rear side (rear surface) thereof.

Since the above-described component modules have the connection compatibility by using the common engagement interface, the component modules can be connected in series in the Z-axis direction as shown in FIG. 8A. Alternatively, in a case where it is possible to cope with photographing only by using internal recording of the camera body 702 depending on a photographing condition, it is possible to construct the system without the recorder module 703 as shown in FIG. 8B. Further, in a case where the amount of heat generated in the camera body 102 brings about no problem, such as a case where the system camera 700 is used in a low power consumption mode, e.g. for performing low-resolution imaging, it is possible to construct a compact and lightweight system by removing the heat dissipation module 701 as shown in FIG. 8C.

Further, component modules which can be connected by the common engagement interface include various modules other than the above-described modules. As the component modules, there may be mentioned, for example, an input/output module which converts image signals or control signals to predetermined transmission signals, and outputs/inputs the signals to/from the outside, a display module which includes a display device, such as an LCD, and a user interface module operated by a user.

Further, it is possible to connect a handle module or a grip module which assists a user in holding the system camera 700, a shoulder pad module, and a gimbal adapter module which stabilizes the posture of the system camera 700, by the common engagement interface. Further, it is also possible to connect a mechanism module, such as a weight module for adjusting the weight balance, by the common engagement interface.

For example, FIGS. 9A and 9B show examples of the system camera 700 incorporating a wireless communication module 707 having the common engagement interface. The wireless communication module 707 is an example of the input/output module, and is used for transmitting and receiving image signals or control signals to and from an external apparatus by wireless communication.

The common engagement interface has the connection compatibility, and hence it is possible to interpose and connect the wireless communication module 707 between the camera body 702 and the heat dissipation module 701 as shown in FIG. 9A. Further, as shown in FIG. 9B, it is possible to add another heat dissipation module 701 between the camera body 702 and the wireless communication module 707.

As described above, the system camera 700 can be assembled by incorporating one or ones of various function modules, which are selected according to the purpose of use.

Further, since the common engagement interface is employed, there is no restriction on the order of connection of the modules, and it is possible to connect desired modules in a desired order.

Figure 10A:
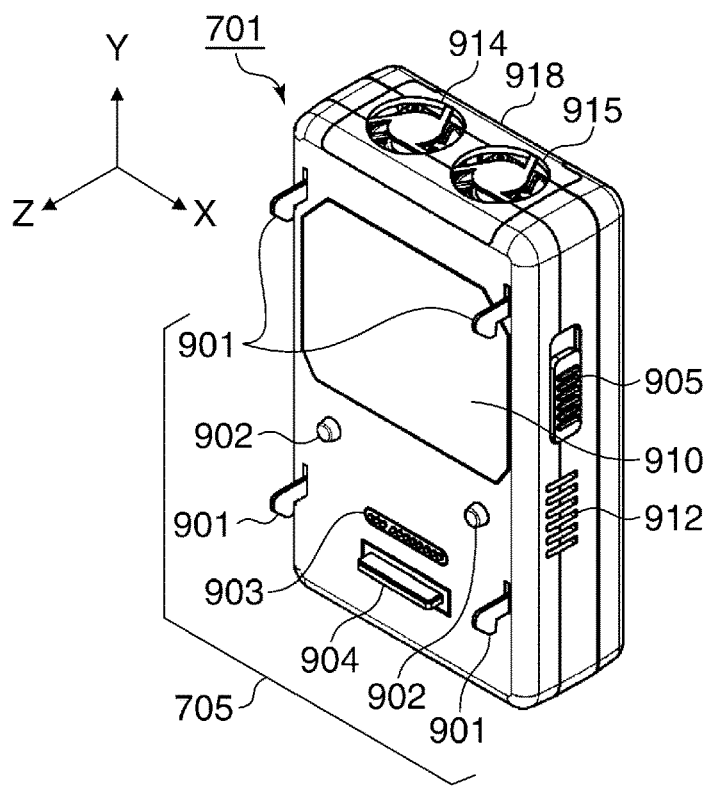
FIGS. 10A and 10B are perspective views each showing the appearance of a heat dissipation module.
Figure 10B:
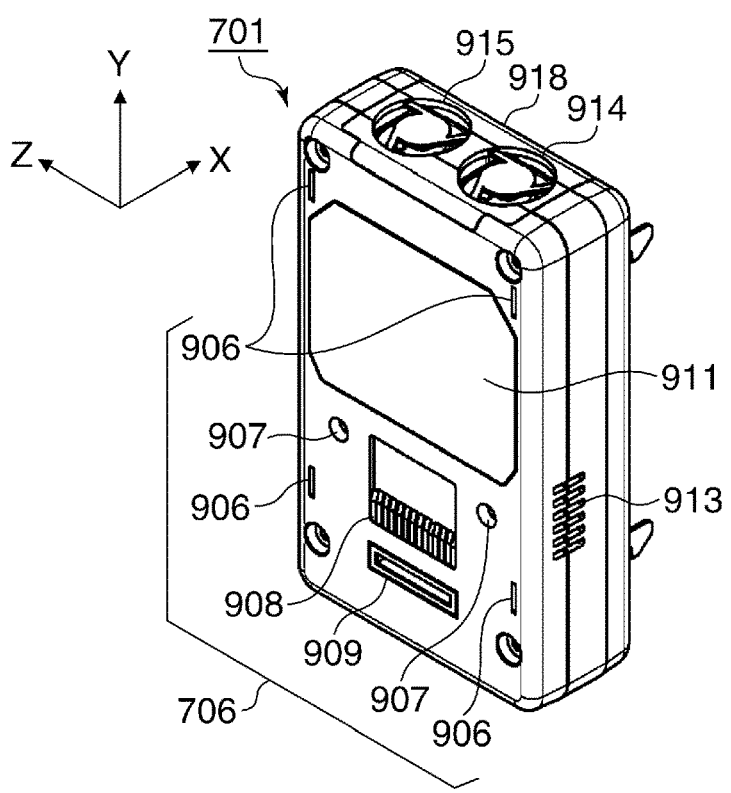
Figure 11A:
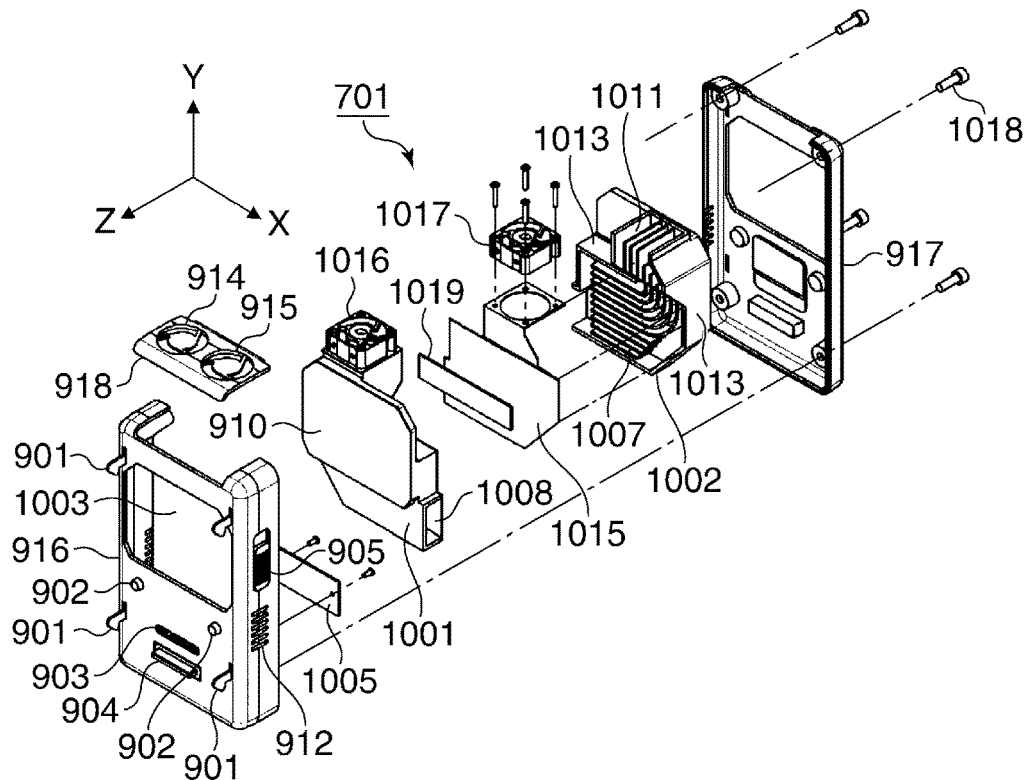
FIGS. 11A and 11B are exploded perspective views of the heat dissipation module.
Figure 11B:
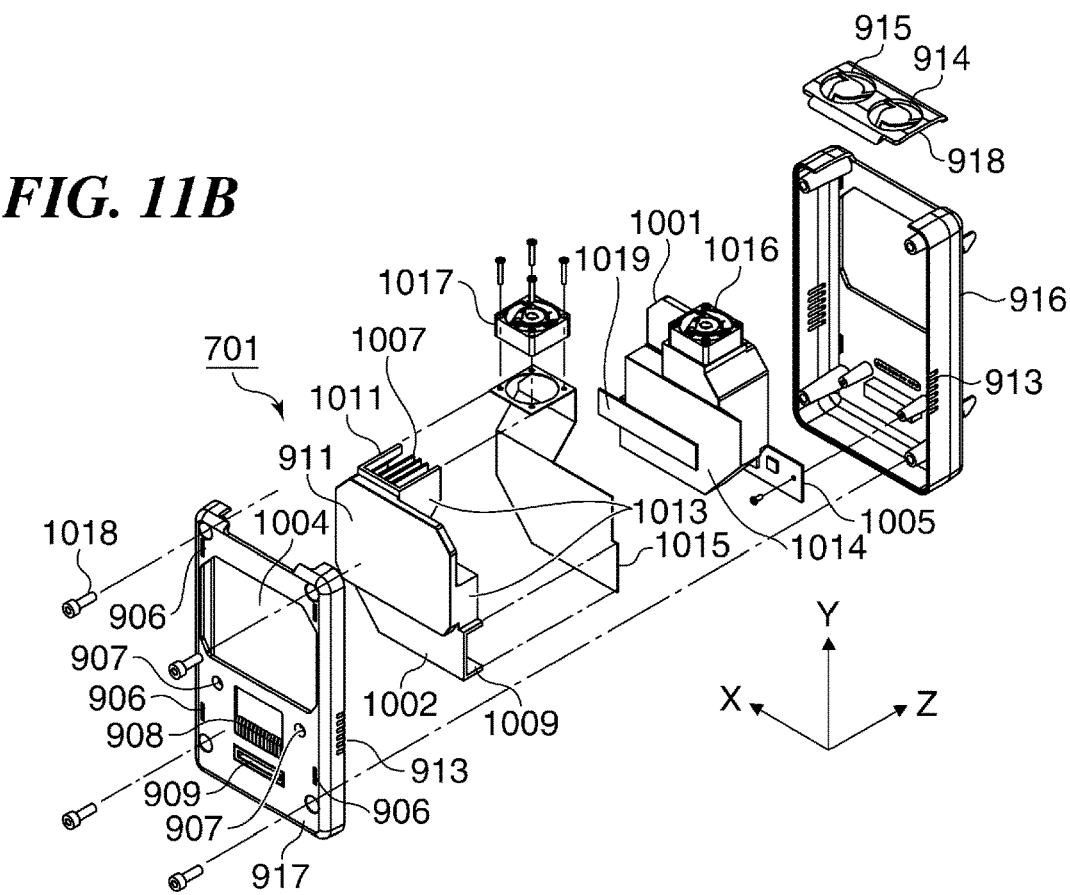

FIG. 10A is a perspective view showing the appearance of the heat dissipation module 701, as viewed from the front, and FIG. 10B is a perspective view showing the appearance of the heat dissipation module 701 shown in FIG. 10A, as viewed from the rear. FIG. 11A is an exploded perspective view of the heat dissipation module 701, as viewed from the front, and FIG. 11B is an exploded perspective view of the heat dissipation module 701 shown in FIG. 11A, as viewed from the rear.

The following description will be given of the details of the heat dissipation module 701 with reference to FIGS. 10A and 10B, and 11A and 11B. Further, the details of the common engagement interface will also be described taking the heat dissipation module 701 as a representative example.

First, the common engagement interface will be described. The heat dissipation module 701 has the male-side interface 705 on the front side. The male-side interface 705 is formed by hooks 901 and positioning dowels 902 as the engaging mechanism, and a male-side data signal terminal 903 and a male-side power supply terminal 904 as an electrical connection mechanism.

The hooks 901 are arranged in four approximate corners of the module casing, respectively, such that they extend in the positive direction of the Z-axis, and are each formed with an engaging lug extending in the negative direction of the Y-axis. Further, each hook 901 is urged in the negative direction of the Y-axis by a spring, not shown, and is on standby in a state brought into contact with a predetermined abutting portion. By operating a hook operation knob 905 provided on a side of the heat dissipation module 701, it is possible to slide and move the hooks 901 in the positive direction of the Y-axis against the spring force.

The other side, i.e. the rear side of the heat dissipation module 701 is provided with the female-side interface 706. The female-side interface 706 is formed by slits 906 as the engaged mechanism, positioning holes 907, a female-side data signal terminal 908, and a female-side power supply terminal 909 as the electrical connection mechanism. The slits 906 are rectangular holes in which the hooks 901 are inserted, respectively, and are each formed with an engaged surface, not shown, with which the lug of an associated one of the hooks 901 is engaged at an inner end of the slit.

In a state in which the male-side interface 705 and the female-side interface 706 are connected to each other, the positioning dowels 902 are fitted in the positioning holes 907, whereby the relative position in the X-axis and Y-axis directions is fixed. Further, the lugs of the hooks 901 are engaged with the engaged surfaces of the slits 906 in a state in which predetermined surfaces of the two interfaces are brought into contact with each other, whereby the position in the Z-axis direction is fixed.

At this time, the male-side data signal terminal 903 and the female-side data signal terminal 908, and the male-side power supply terminal 904 and the female-side power supply terminal 909 have electrical contacts brought into contact with each other, respectively, with a predetermined contact pressure, thereby being electrically connected such that data signals and power source power can be transmitted and received. When the hook operation knob 905 is operated, the lugs of the hooks 901 are moved in the positive direction of the Y-axis, and separated from the engaged surfaces, respectively, and hence the male-side interface 705 and the female-side interface 706 can be separated from each other in the Z-axis direction.

Note that the component elements of the common engagement interface are not limited to the above-described components, but any other element may be added according to a requirement of the system. For example, a detection switch or a detection sensor for detecting a connected state between the male-side interface 705 and the female-side interface 706 may be added. A data signal to be handled may be an electric signal as can be understood from the above, or may be a signal using another medium, such as an optical signal. It is possible to handle such a signal by setting a proper communication terminal compatible with the signal medium.

Further, part of the data signal terminals or the power supply terminals may be omitted. For example, as shown in FIGS. 7A and 7B, although the battery adapter module 704 has the male-side interface 705, the male-side data signal terminal 903 is omitted. As described hereinabove, since the battery adapter module 704 is a module for converting the engagement interface of the battery pack 104, and does not handle the data signals, the male-side data signal terminal 903 can be omitted. Further, it can be easily imagined that the shape and arrangement of the hooks, the positioning structure, and the structure and arrangement of the data signal terminal or the power supply terminal can be variously modified.

Next, the structure specific to the heat dissipation module 701 will be described. As shown in FIG. 10A, a first heat receiving surface 910 is exposed on the front surface of the heat dissipation module 701, which includes the male-side interface 705. Further, as shown in FIG. 10B, a second heat receiving surface 911 is exposed on the rear surface of the same, which includes the female-side interface 706. The heat dissipation module 701 has a first ventilation port 912 and a second ventilation port 913, which are in the form of slits, provided in respective lateral sides (side surfaces) thereof, and has a first air outlet 914 and a second air outlet port 915 formed in the top (top surface) thereof.

As shown in FIG. 11, the appearance of the heat dissipation module 701 is formed by a front case 916 and a rear case 917, and a first heat sink 1001 and a second heat sink 1002 are accommodated in the heat dissipation module 701. The hooks 901 and the hook operation knob 905 are assembled to the front case 916 such that they are operable in an interlocked manner, and the positioning dowels 902 are integrally formed with the front case 916. Further, the front case 916 is formed with a first opening 1003 for exposing the first heat receiving surface 910 which is one of the surfaces of the first heat sink 1001, and further, has the male-side data signal terminal 903 and the male-side power supply terminal 904 mounted thereon.

On the other hand, the rear case 917 is formed with the slits 906 and the positioning holes 907, and has the female-side data signal terminal 908 and the female-side power supply terminal 909 mounted thereon. The rear case 917 is formed with a second opening 1004 for exposing the second heat receiving surface 911 which is one of the surfaces of the second heat sink 1002.

The male-side data signal terminal 903 and the male-side power supply terminal 904 are electrically connected to the female-side data signal terminal 908 and the female-side power supply terminal 909, respectively, via a relay board 1005, e.g. by electric wires, not shown, or flexible boards, not shown. This enables the heat dissipation module 701 to relay the communication of data signals and the power supply from the power source between mating modules connected to the male-side interface 705 and the female-side interface 706, respectively.

Here, for example, the data signals communicated between the camera body 702 and the recorder module 703 are data signals of a high-resolution image, such as a 4K or 8K image, or data signals of a high-frame rate image, such as a 120 p or 240 p image, and to transmit and receive the data signals, high-speed communication is required. Therefore, the male-side data signal terminal 903 and the female-side data signal terminal 908 are connected to each other based on a standard which makes it possible to perform high-speed data signal communication.

The first heat sink 1001 and the second heat sink 1002 are radiators formed by using a material having high thermal conductivity, such as aluminum for die casting In the present example, the first heat sink 1001 and the second heat sink 1002 are each comprised of components having the same shape, which are arranged in an opposed relationship, and hence the description is given of the second heat sink 1002 as a representative.

A side of the second heat sink 1002, opposite from the second heat receiving surface 911, has a plurality of heat dissipation fins 1007 erected thereon. The heat dissipation fins 107 are shielded from their surrounding by a partition wall 1013 and a cover member 1015, except outside air inlet ports 1009 and an outlet port 1011, thereby forming duct-shaped airflow paths.

An electric fan 1017 is mounted on the top of the outlet port 1011 so as to generate a stream of air in the positive direction of the Y-axis. When the heat dissipation module 701 is in an assembled state, the outside air inlet port 1009 is opposed to the second ventilation port 913, and the second air outlet port 915 is arranged above the electric fan 1017.

The first heat sink 1001 is similarly constructed, and the first heat sink 1001 has heat dissipation fins 1006, which form airflow paths in combination with a cover member 1014. Further, an outside air inlet port 1008 is opposed to the first ventilation port 912, and the first air outlet 914 is arranged above an electric fan 1016. A cushion 1019 (heat insulation member) having elasticity and heat insulating property, which blocks heat conduction, is sandwiched, in a compressed state, between the cover member 1014 and the cover member 1015. With this, the first heat sink 1001 is urged toward the front side of the heat dissipation module 701 and the second heat sink 1002 is urged toward the rear side of the same, such that they protrude from front side and the rear side, each by a predetermined amount.

The electric fans 1016 and 1017 are electrically connected to the relay board 1005 by electric wires, not shown, and can receive driving electric power and control signals as described hereinafter. Further, the electric fans 1016 and 1017 can each deliver a signal based on the fan rotational speed thereof to the relay board 1005.

Although the first air outlet 914 and the second air outlet port 915 are formed in a lid cover 918, the lid cover 918 may be integrally formed with the front case 916 or the rear case 917. The heat dissipation module 701 is formed by assembling the above-described components, and fastening the front case 916 and the rear case 917 with fastening screws 1018.

Figure 12:
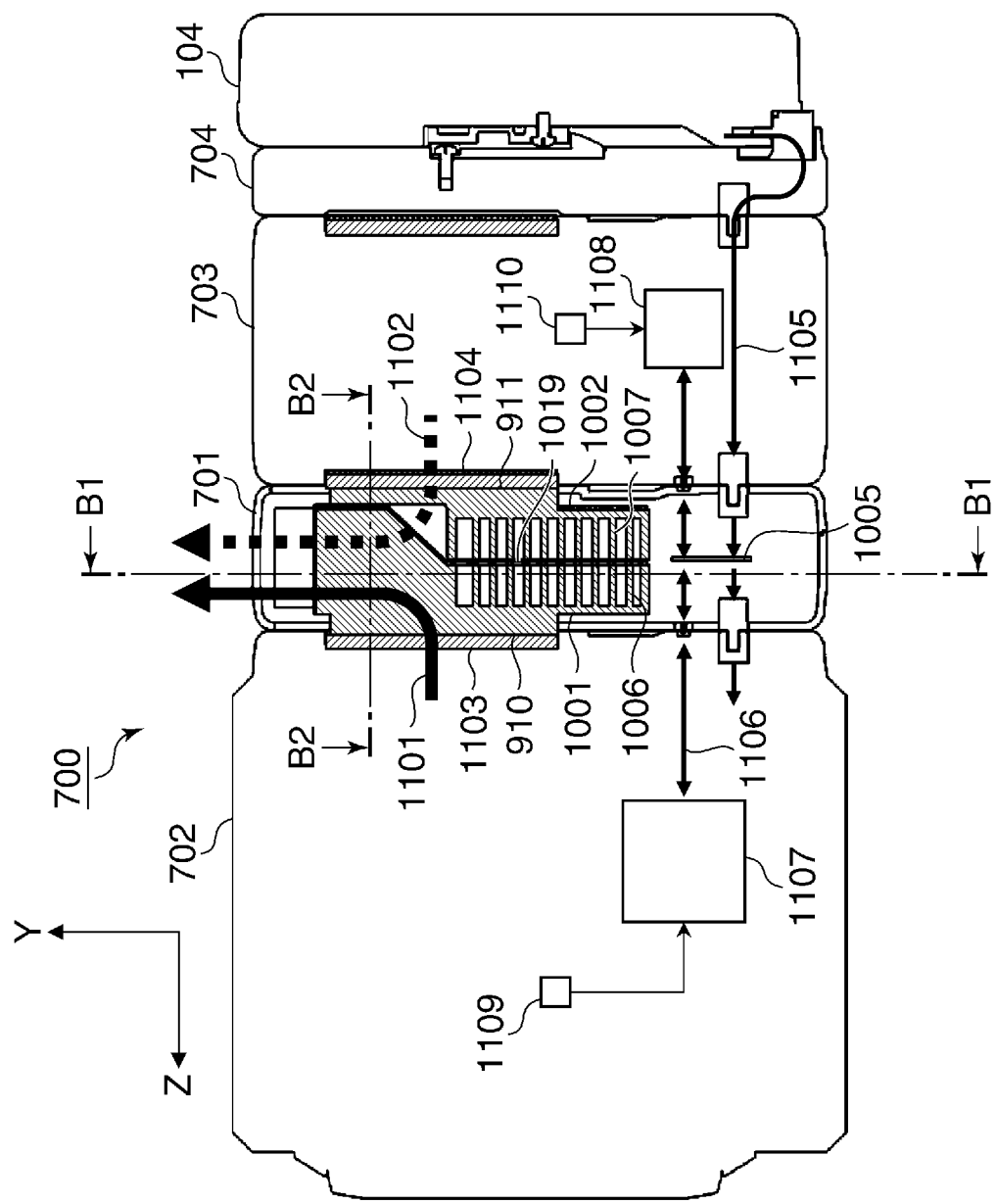
FIG. 12 is a schematic cross-sectional view of the system camera.
Figure 13A:
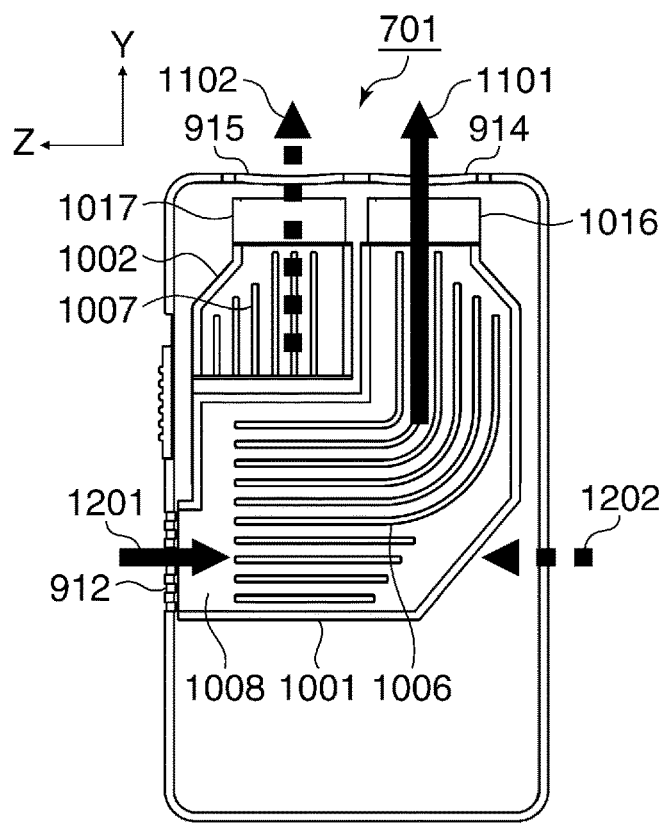
FIG. 13A is a cross-sectional view taken along B1-B1 in FIG. 12.
Figure 13B:
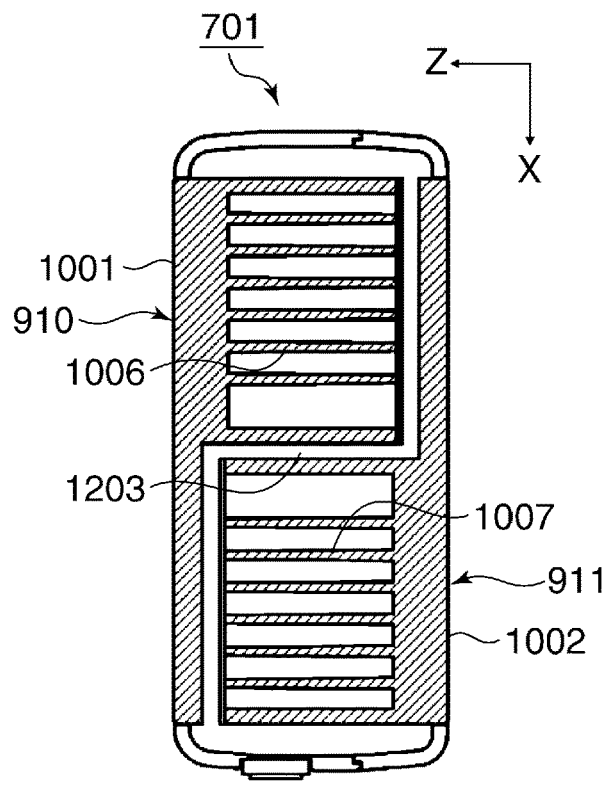
FIG. 13B is a cross-sectional view taken along B2-B2 in FIG. 12.

FIG. 12 is a schematic cross-sectional view of the system camera 700 shown in FIG. 8A. This cross-sectional view is obtained by cutting the system camera 700 along a vertical plane passing the optical axis. The lens unit 103 which is unnecessary for explanation is omitted from illustration, and hence the cross-sectional view shows the arrangement in which the camera body 702, the heat dissipation module 701, the recorder module 703, the battery adapter module 704, and the battery pack 104 are connected. FIG. 13A is a cross-sectional view taken along B1-B1 in FIG. 12, and FIG. 13B is a cross-sectional view taken along B2-B2 in FIG. 12, both of which show the cross section of the heat dissipation module 701.

The following description will be given of heat dissipation paths of the system camera 700 with reference to FIGS. 12, 13A, and 13B. In FIG. 12, a first thermal path 1101 and a second thermal path 1102 are indicated by arrows. Heat generated within the camera body 702 is transferred from a heat transfer section 1103 to the first heat receiving surface 910 as indicated by the first thermal path 1101. The first heat receiving surface 910 is brought into contact with the heat transfer section 1103 by a reaction force of the cushion 1019 with a predetermined urging force, which reduces contact thermal resistance. Note that the heat transfer section 1103 has the same function as that of the heat transfer section 115 of the first embodiment, and therefore, the description of the heat transfer section 115 should be referred to.

As indicated by the first thermal path 1101, the heat transferred to the first heat receiving surface 910 is diffused over the whole first heat sink 1001, and is transferred from the heat dissipation fins 1006 to air therearound. As shown in FIG. 13A, the warmed air around the heat dissipation fins 1006 is discharged from the first air outlet 914 to the outside of the heat dissipation module 701 by the operation of the electric fan 1016.

On the other hand, fresh outside air is introduced from the first ventilation port 912 through the outside air inlet port 1008 to replace the air discharged to the outside (indicated by an arrow 1201 in FIG. 13A). The introduced fresh outside air receives heat from the heat dissipation fins 1006, and is discharged from the first air outlet 914 to the outside, as indicated by the first thermal path 1101.

Similarly, heat generated within the recorder module 703 is transferred from a heat transfer section 1104 to the second heat receiving surface 911 as indicated by the second thermal path 1102. The second heat receiving surface 911 is also brought into contact with the heat transfer section 1104 by a reaction force of the cushion 1019 with a predetermined urging force, which reduces contact thermal resistance. The heat transfer section 1104 has the same function as that of the heat transfer section 115 of the first embodiment. The heat transferred to the second heat receiving surface 911 is diffused over the whole second heat sink 1002, transferred from the heat dissipation fins 1007 to air therearound, and is discharged from the second air outlet port 915 to the outside by the operation of the electric fan 1017.

Fresh outside air is introduced from the second ventilation port 913 through the outside air inlet port 1009 to replace the air discharged to the outside (indicated by an arrow 1202 in FIG. 13A), receives heat from the heat dissipation fins 1007, and is discharged from the second air outlet port 915 to the outside.

Thus, heat generated in the camera body 702 and the recorder module 703 is dissipated to the outside of the heat dissipation module 701 by repeating air circulation by the operation of the electric fans 1016 and 1017. Particularly, as shown in FIG. 13B, the first heat sink 1001 and the second heat sink 1002 are arranged in a manner urged in directions away from each other by the reaction force of the cushion 1019 such that they have a space 1203 therebetween so as not to be brought into contact with each other, and hence the first heat sink 1001 and the second heat sink 1002 are thermally independent of each other.

Next, a power supply path 1105 from the battery pack 104 will be described with reference to FIG. 12. As indicated by the power supply path 1105, electric power from the battery pack 104 is finally supplied to the camera body 702 via the battery adapter module 704, the recorder module 703, and the power supply terminals included in the common engagement interface of the heat dissipation module 701. At an intermediate point of the power supply path 1105, the recorder module 703 takes out electric power necessary for driving the same. Further, the power supply path 1105 passes the relay board 1005 of the heat dissipation module 701, and electric power for driving the electric fans is taken out by an electric fan control element (not shown) mounted on the relay board 1005.

Next, a data signal transfer path 1106 will be described with reference to FIG. 12. As indicated by the data signal transfer path 1106, image data signals and control signals can be exchanged via the data signal terminals included in the common engagement interfaces of the camera body 702, the heat dissipation module 701, and the recorder module 703. Transmission and reception of signals are executed by cooperative control of a camera body controller 1107 and a recorder controller 1108.

The control signals include a data signal of camera body internal temperature data acquired by a thermistor 1109 included inside the camera body 702 and a data signal of recorder internal temperature data acquired by a thermistor 1110 included inside the recorder module 703. The data signals pass the relay board 1005 of the heat dissipation module 701, and at this time, an electric fan control element (not shown) mounted on the relay board 1005 receives the above-mentioned data signal of the temperature data, thereby being capable of controlling the driving of the electric fans 1016 and 1017 based on the received data signal.

More specifically, in a case where the camera body internal temperature or the recorder internal temperature is higher than a target temperature which is specified, the driving of the electric fans is controlled such that the rotational speed of the electric fans is increased whereby the heat dissipation capability is enhanced. Inversely, in a case where the camera body internal temperature or the recorder internal temperature is lower than the target temperature, the driving of the electric fans is controlled such that the rotational speed of the electric fans is reduced, whereby noise of the fans and power consumption of the fans is reduced though the heat dissipation capability is lowered. Particularly, the electric fan 1016 is associated with heat dissipation from the first heat receiving surface 910, i.e. from the camera body 702, whereas the electric fan 1017 is associated with heat dissipation from the second heat receiving surface 911, i.e. from the recorder module 703, and the electric fans 1016 and 1017 are thermally independent of each other.

Therefore, it is possible to perform optimum heat dissipation according to the respective conditions of the camera body 702 and the recorder module 703 by independently controlling the rotational speeds of the electric fans 1016 and 1017. Note that the control signals for determining the rotational speeds of the electric fans may be generated within the heat dissipation module 701 as mentioned above, or may be generated by the camera body controller 1107 or the recorder controller 1108, and delivered to the electric fan control element through the data signal path 1106.

Further, as described with reference to FIGS. 8A to 8C, and 9A and 9B, the system camera 700 can connect various function modules in a desired order. That is, although in the above description, heat is dissipated by inserting and connecting the heat dissipation module 701 between the camera body 702 and the recorder module 703, the connection order is not limited to this, but heat can be dissipated by connecting the heat dissipation module 701 to another module. For example, as shown in FIG. 9A, the heat dissipation module 701 can dissipate heat from the wireless communication module 707.

Further, even when the plurality of heat dissipation modules 701 are assembled as shown in FIG. 9B, each heat dissipation module 701 can operate as described above. The configuration shown in FIG. 9B is characterized in that heat can be dissipated from both of the front side (front surface) and the rear side (rear surface) of the wireless communication module 707. In this case, the electric fan control signals having different contents may be delivered from the wireless communication module 707 to the heat dissipation modules 701 on the front and rear side of the wireless communication module 707, respectively.

As described above, the heat dissipation module 701 according to the present embodiment has a structure which includes the common engagement interfaces on the two surfaces opposite and parallel to each other, respectively, and enables the heat dissipation module 701 to be incorporated at a desired location in the system, whereby it is possible to dissipate heat from various component modules without impairing the expandability of the system. Further, the one heat dissipation module 701 has a structure capable of dissipating heat from two modules connected to the front side (front surface) and the rear side (rear surface) thereof, which contributes to making the system compact in size.

Figure 14A:
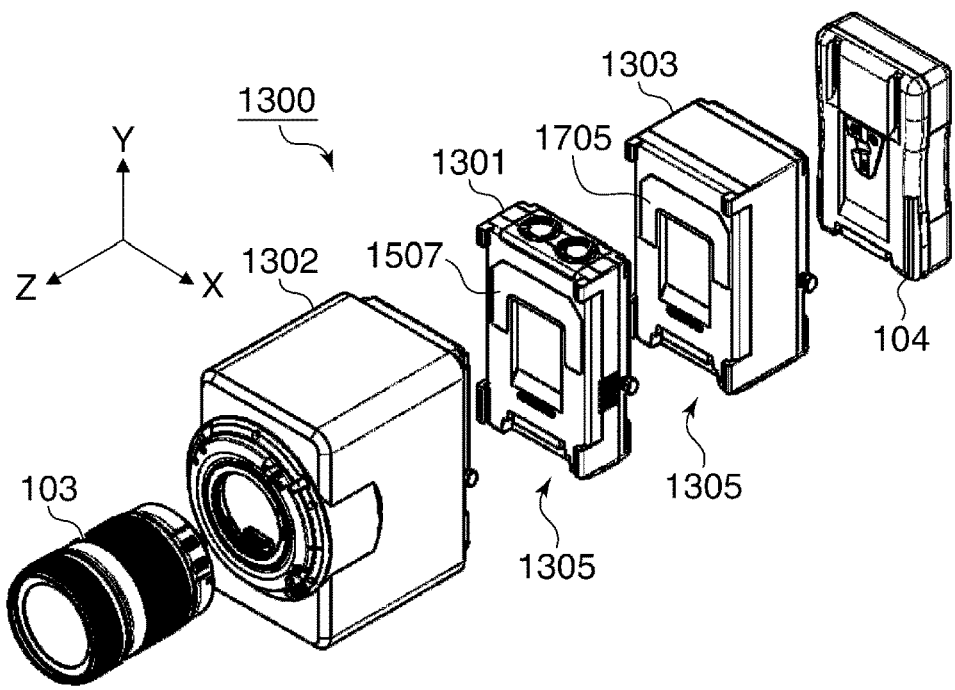
FIGS. 14A and 14B are exploded perspective views of a system camera according to a third embodiment of the present invention.
Figure 14B:
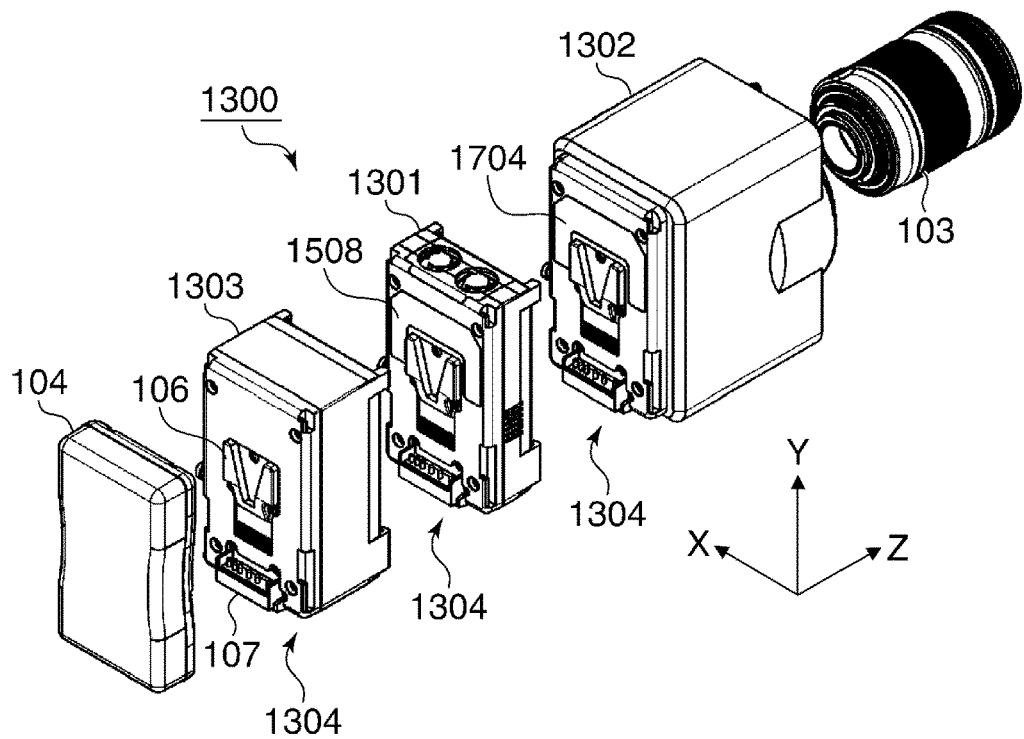
Figure 15A:
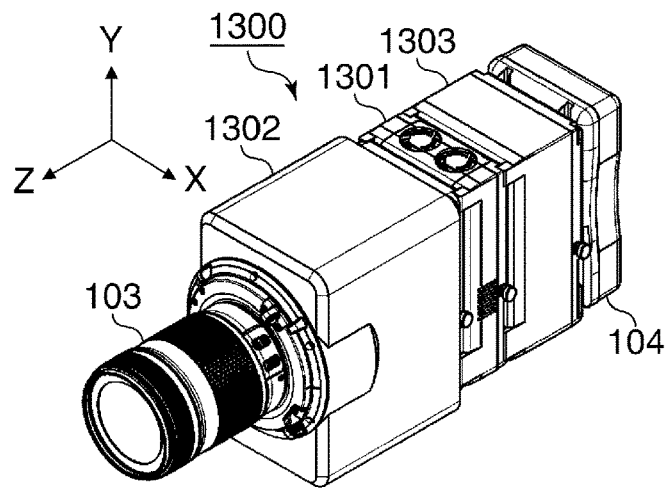
FIGS. 15A to 15C are perspective views each showing the appearance of an assembly of the system camera shown in FIGS. 14A and 14B.
Figure 15B:
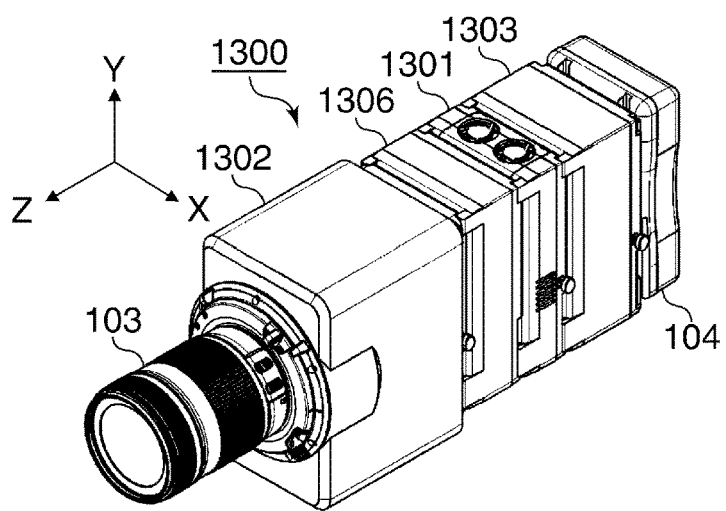
Figure 15C:
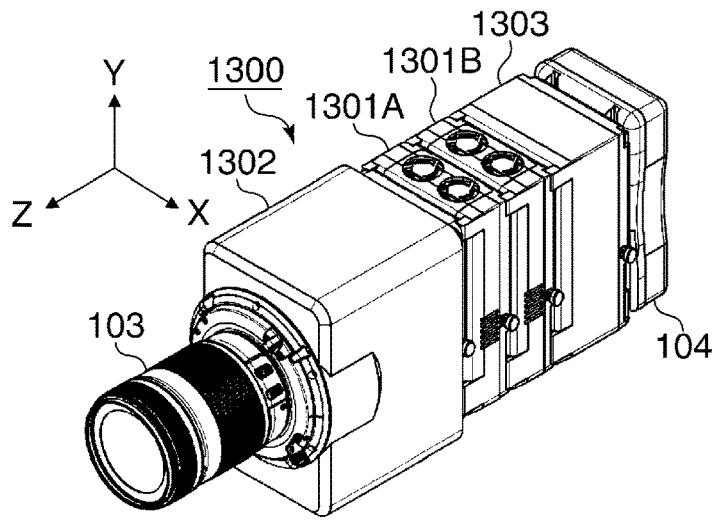

FIG. 14A is an exploded perspective view of a system camera 1300 according to a third embodiment of the present invention, as viewed from the front (object side). FIG. 14B is an exploded perspective view of the system camera shown in FIG. 14A, as viewed from the rear. FIG. 15A is a perspective view showing the appearance of the system camera 1300 in an assembled state, and FIGS. 15B and 15C are perspective views each showing the appearance of the system camera 1300 in a state in which a module is added to the system camera 1300 shown in FIG. 15A.

Note that the XYZ coordinate system shown in each drawing has the same definition as in the above-described first embodiment. Further, similar to the above-described first embodiment, a side of each module as a component of the system camera 1300 toward an object is referred to as a front side, and a side opposite thereto is referred to as a rear side. Further, the same component elements as those described in the first and embodiments are denoted by the same reference numerals, and description thereof is omitted.

The component modules of the system camera 1300 shown in FIGS. 14A and 14B are a camera body 1302, the lens unit 103, a recorder module 1303, the battery pack 104, and a heat dissipation module 1301. Although the main functions of the camera body 1302 and the recorder module 1303 are the same as those of the camera body 702 and the recorder module 703 of the second embodiment, the camera body 1302 and the recorder module 1303 each have a second common engagement interface different from the interfaces of the camera body 702 and the recorder module 703. Although details of the second common engagement interface will be described hereinafter, the second common engagement interface is formed by a male-side interface 1304 having male-type rails and a female-side interface 1305 having female-type rails.

The rear side (rear surface) of the camera body 1302 is provided with the male-side interface 1304. The heat dissipation module 1301 and the recorder module 1303 each have the female-side interface 1305 on the front side (front surface), and the male-side interface 1304 on the rear side (rear surface). Although described hereinafter, the male-side interface 1304 includes the battery engagement recess 106 and the battery terminal 107 for being engaged with the battery pack 104. Therefore, the battery pack 104 can be connected to any of the camera body 1302, the recorder module 1303, and the heat dissipation module 1301, described hereinafter.

The above-mentioned component modules can be connected in series in the Z-axis direction by the second common engagement interfaces as shown in FIG. 15A. Further, similar to the system camera 700 according to the second embodiment, it is possible to envisage various modules which can be connected by the second common engagement interfaces. For example, FIG. 15B shows the system camera 130 in a state in which a wireless communication module 1306 is inserted and connected between the camera body 1302 and the heat dissipation module 1301. Further, it is possible to connect a plurality of same modules (1301A and 1301B) as in the case of the heat dissipation modules 1301 shown in FIG. 15C.

As described above, the system camera 1300 can be constructed by connecting various function modules selected according to the purpose of use of the system camera 1300, in a desired order.

Figure 16A:
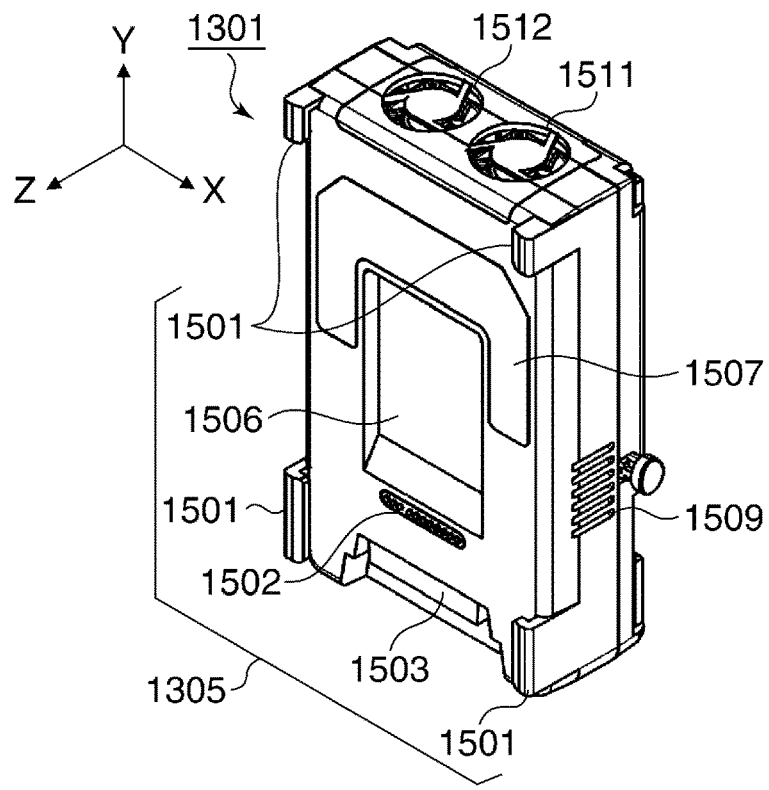
FIGS. 16A and 16B are perspective views each showing the appearance of a heat dissipation module.
Figure 16B:
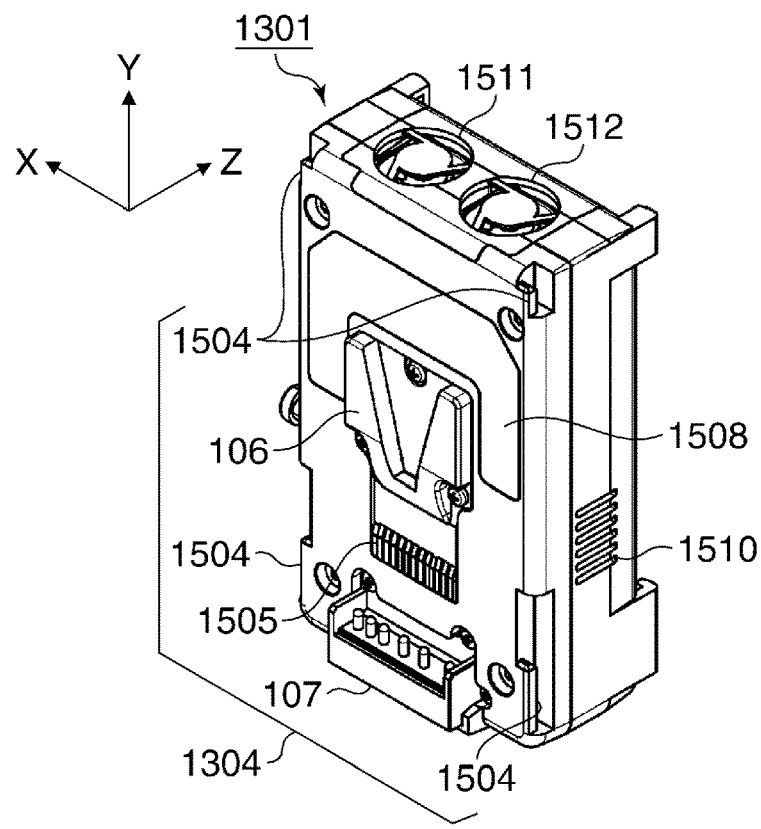
Figure 17A:
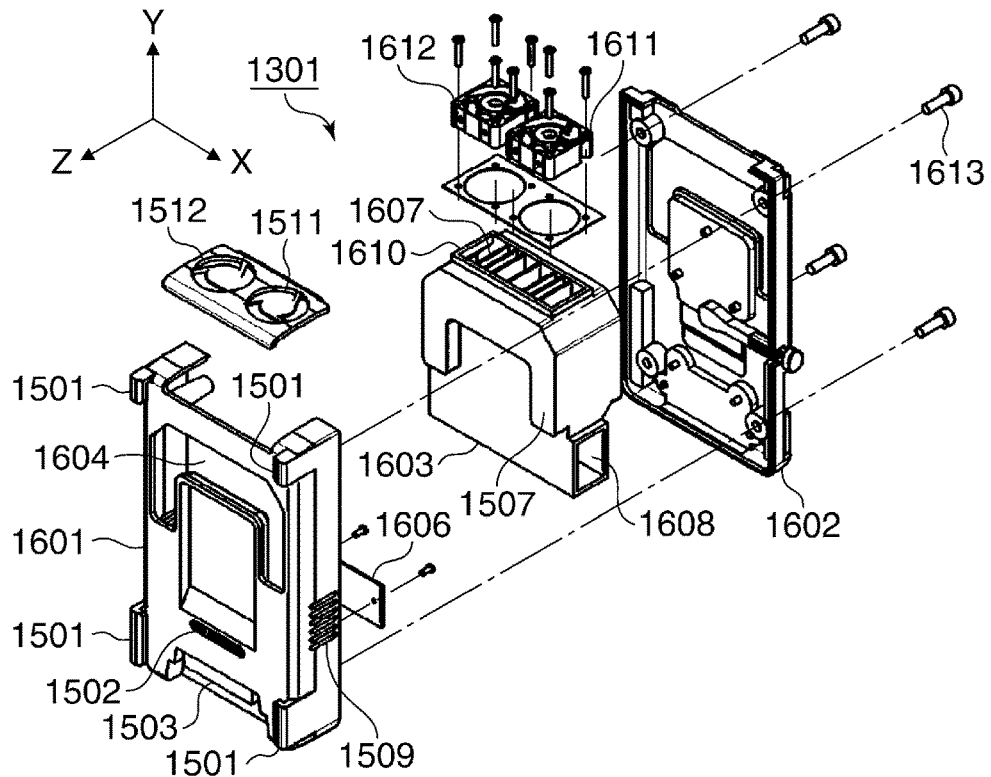
FIGS. 17A and 17B are exploded perspective views of the heat dissipation module.
Figure 17B:
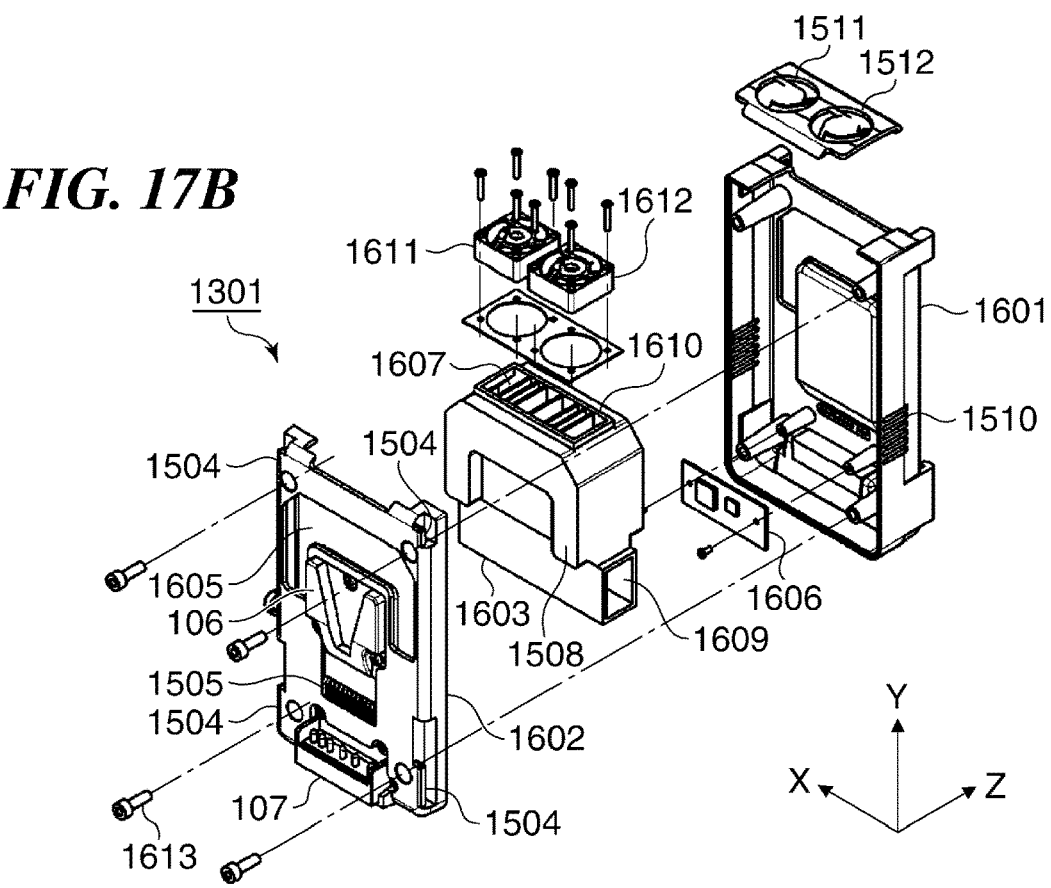

FIG. 16A is a perspective view showing the appearance of the heat dissipation module 1301, as viewed from the front, and FIG. 16B is a perspective view of the heat dissipation module 1301 shown in FIG. 16A, as viewed from the rear. FIG. 17A is an exploded perspective view of the heat dissipation module 1301, as viewed from the front, and FIG. 17B is an exploded perspective view of the heat dissipation module 1301 shown in FIG. 17A, as viewed from the rear.

The following description will be given of the heat dissipation module 1301 and the second common engagement interface with reference to FIGS. 16A, 16B, 17A, and 17B.

First, the second common engagement interface will be described. The heat dissipation module 1301 has the female-side interface 1305 on the front side thereof. The female-side interface 1305 is formed by female-type rails 1501 provided on four approximate corners of the module casing, a female-side data signal terminal 1502, and a module power supply terminal 1503 having the connection compatibility with the battery terminal 107.

The heat dissipation module 1301 has the male-side interface 1304 on the rear side thereof. The male-side interface 1304 is formed by male-type rails 1504 provided on four approximate corners of the module casing, the battery engagement recess 106, a male-side data signal terminal 1505, and the battery terminal 107. The female-type rails 1501 and the male-type rails 1504 are fitted to and separated from each other by sliding the female-type rails 1501 and the male-type rails 1504 relative to each other in the Y-axis direction. When a module on the side of the female-side interface 1305 is slid in the negative direction of the Y-axis from a state in which predetermined surfaces of the two interfaces are brought into contact with each other, the both rails are fitted to each other, and finally, predetermined rail abutment portions of the both rails are brought into abutment with each other.

When the both rails are in the vicinity of the abutment position, the module power supply terminal 1503 is fitted to the battery terminal 107, whereby the both terminals become electrically conductive with each other. Similarly, the female-side data signal terminal 1502 is brought into sliding contact with the male-side data signal terminal 1505, whereby the both terminals become electrically conductive with each other. This is defined as a connected state between the modules. The female-side interface 1305 is formed with a recess 1506 for avoiding the interference with the battery engagement recess 106 in the state connected to the male-side interface 1304.

Further, when the module on the side of the female-side interface 1305 is slid in the positive direction of the Y-axis from the connected state mentioned above, the module power supply terminal 1503 is separated from the battery terminal 107. At this time, the female-side data signal terminal 1502 is slidably moved on the male-side data signal terminal 1505, and is finally separated from the male-side data signal terminal 1505. When the female-type rails 1501 reach a release position where the female-type rails 1501 are not engaged with the male-type rails 1504 in the Z-axis direction, it is possible to separate the female-side interface 1305 from the male-side interface 1304 in the negative direction of the Z-axis.

Note that, similar to the second embodiment, the component elements of the second common engagement interface are not limited to those described above. The data signals to be handled are not limited to electric signals. The data signal terminals and the power supply terminals can be partially omitted. Further, it can be easily imagined that the shape and arrangement of the rails, and the structure and arrangement of the data signal terminal or the power supply terminal can be variously modified.

Next, the structure specific to the heat dissipation module 1301 will be described. A first heat receiving surface 1507 is exposed on the front surface of the heat dissipation module 1301, which includes the female-side interface 1305. Further, a second heat receiving surface 1508 is also exposed on the rear surface of the heat dissipation module 1301, which includes the male-side interface 1304. On the heat dissipation module 1301, the first heat receiving surface 1507 and the second heat receiving surface 1508 are surfaces to be brought into contact with mating modules. The heat dissipation module 1301 has a first ventilation port 1509 and a second ventilation port 1510, which are in the form of slits, provided in respective lateral sides (side surfaces) thereof, and has a first air outlet 1511 and a second air outlet 1512 formed in the top (top surface) thereof.

As shown in FIGS. 17A and 17B, the appearance of the heat dissipation module 1301 is formed by a front case 1601 and a rear case 1602. A heat sink 1603 is accommodated in the heat dissipation module 1301. The female-type rails 1501 are integrally formed with the front case 1601, and the front case 1601 is formed with a first opening 1604 for exposing the first heat receiving surface 1507 which is one of the surfaces of the heat sink 1603. Further, the front case 1601 has the female-side data signal terminal 1502 and the module power supply terminal 1503 mounted thereon.

On the other hand, the rear case 1602 is formed with the male-type rails 1504, and has the battery engagement recess 106, the battery terminal 107, and the male-side data signal terminal 1505, arranged thereon. Further, the rear case 1602 is formed with a second opening 1605 for exposing the second heat receiving surface 1508 which is another of the surfaces of the heat sink 1603. The female-side data signal terminal 1502 and the module power supply terminal 1503 are electrically connected to the male-side data signal terminal 1505 and the battery terminal 107, respectively, via a relay board 1606, e.g. by electric wires, not shown, or flexible boards, not shown.

The heat sink 1603 is a radiator made of a material having high thermal conductivity, such as aluminum for die casting, and has a structure in which the first heat receiving surface 1507 and the second heat receiving surface 1508 are connected by a plurality of heat dissipation fins 1607. The heat sink 1603 is formed with duct-shaped airflow paths such that air flows from outside air inlet ports 1608 and 1609 to an outlet port 1610. Electric fans 1611 and 1612 are disposed above the outlet port 1610 of the heat sink 1603 such that streams of air are generated in the positive direction of the Y-axis. The electric fans 1611 and 1612 are electrically connected to the relay board 1606 by electric wires, not shown, and can receive driving electric power and control signals as described hereinafter. Further, the electric fans 1611 and 1612 can each deliver a signal based on the fan rotational speed thereof to the relay board 1606.

When the heat dissipation module 1301 is in an assembled state, the outside air inlet ports 1608 and 1609 are opposed to the first ventilation port 1509 and the second ventilation port 1510, respectively. Further, the first air outlet 1511 is arranged above the electric fan 1611, and the second air outlet 1512 is arranged above the electric fan 1612. The heat dissipation module 1301 is formed by assembling the above-described components, and fastening the front case 1601 and the rear case 1602 with fastening screws 1613.

Figure 18:
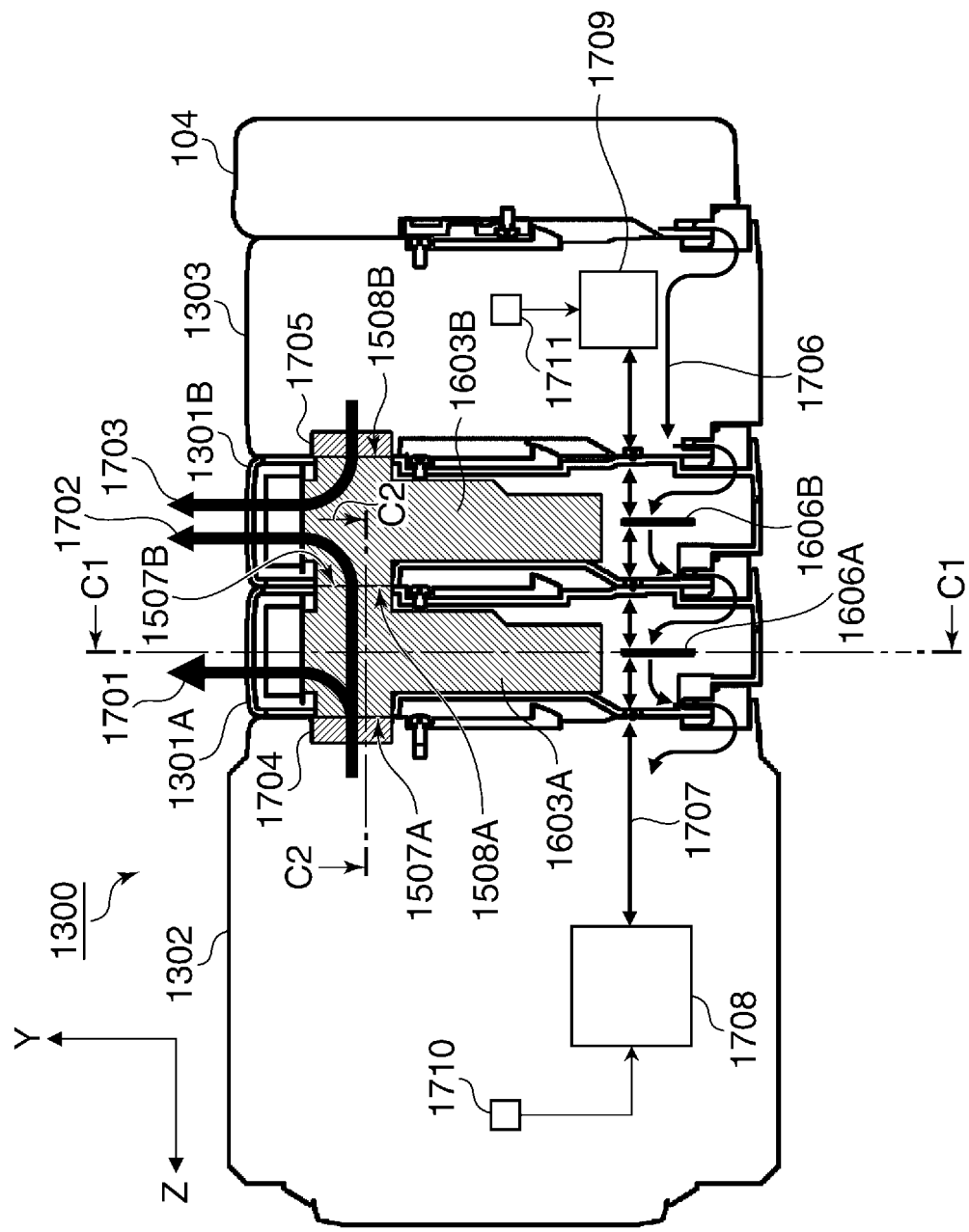
FIG. 18 is a schematic cross-sectional view of the system camera.

FIG. 18 is a schematic cross-sectional view of the system camera 1300 configured as shown in FIG. 15C. This cross-sectional view is obtained by cutting the system camera 1300 along a vertical plane passing the optical axis. The lens unit 103 which is unnecessary for explanation is omitted from illustration, and hence the cross-sectional view shows the configuration in which the camera body 1302, the heat dissipation modules 1301, the recorder module 1303, and the battery pack 104 are connected, and particularly, this arrangement is characterized in that two heat dissipation modules 1301 are connected.

Figure 19A:
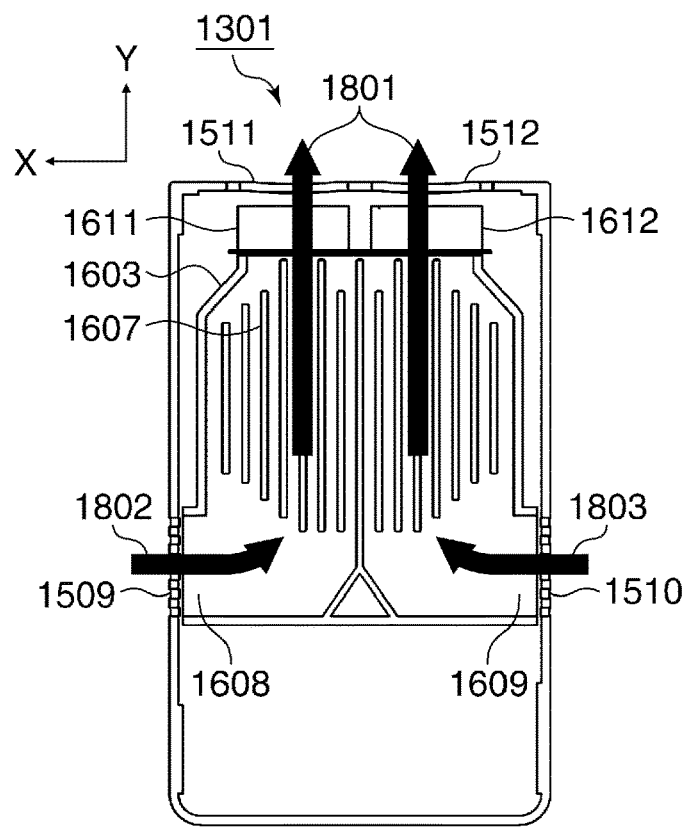
FIG. 19A is a cross-sectional view taken along C1-C1 in FIG. 18.
Figure 19B:
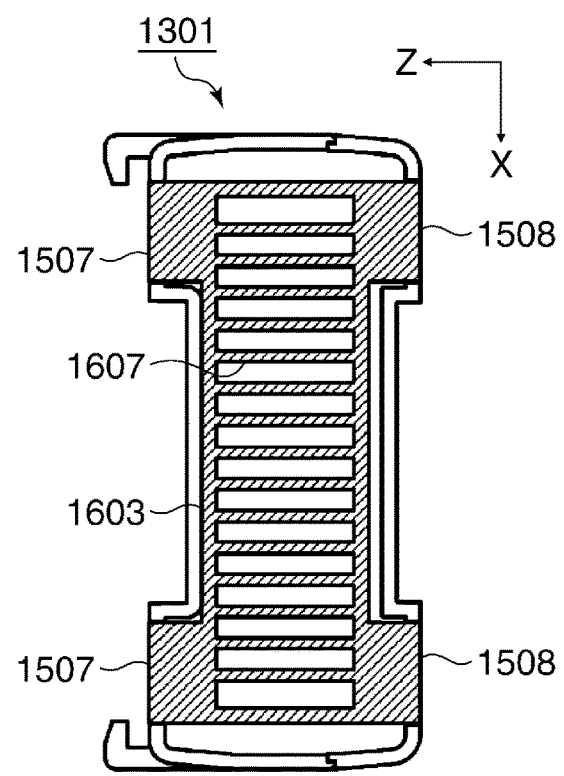
FIG. 19B is a cross-sectional view taken along C2-C2 in FIG. 18.

Hereafter, the heat dissipation module connected to the camera body 1302 is referred to as the heat dissipation module 1301A, and the heat dissipation module connected to the recorder module 1303 is referred to as the heat dissipation module 1301B for convenience of explanation. Further, the component elements of the heat dissipation modules 1301A and 1301B each have a letter suffix A or B added to reference numeral thereof, for differentiation. Further, FIG. 19A is a cross-sectional view taken along C1-C1 in FIG. 18, and FIG. 19B is a cross-sectional view taken along C2-C2 in FIG. 18. Note that although FIGS. 19A and 19B both show the cross section of the heat dissipation module 1301A, the heat dissipation module 1301B has the same structure as that of the heat dissipation module 1301A.

The following description will be given of the heat dissipation paths of the system camera 1300 with reference to FIGS. 18, 19A, and 19B. In FIG. 18, a first heat dissipation path 1701, a second heat dissipation path 1702, and a third heat dissipation path 1703 are indicated by arrows. Heat generated in the camera body 1302 is transferred from a heat transfer section 1704 to a first heat receiving surface 1507A of the heat dissipation module 1301A as indicated by the first heat dissipation path 1701. The heat transfer section 1704 has the same function as that of the heat transfer section 115 of the first embodiment, and therefore, the description of the heat transfer section 115 should be referred to. As indicated by the first heat dissipation path 1701, the heat transferred to the first heat receiving surface 1507A is diffused over the whole heat sink 1603A of the heat dissipation module 1301A, and then transferred from the heat dissipation fins 1607A to air therearound.

Next, the operation for dissipating heat from the heat dissipation fins 1607A will be described with reference to FIG. 19A. Not that the operation illustrated in FIG. 19A is the common operation to the heat dissipation module 1301A and the heat dissipation module 1301B, and hence the letter suffix for differentiation therebetween is omitted from each reference numeral. The warmed air around the heat dissipation fins 1607 is discharged from the first air outlet ports 1511 and 1512 to the outside of the heat dissipation module 1301 by the operation of the electric fans 1611 and 1612 (indicated by arrows 1801).

On the other hand, fresh outside air is introduced from the first ventilation port 1509 and the second ventilation port 1510 into the heat dissipation module 1301 through the outside air inlet ports 1608 and 1609 to replace the air discharged to the outside (indicated by arrows 1802 and 1803). The introduced new air receives heat from the heat dissipation fins 1607, and is discharged from the first air outlet 1511 and the second air outlet 1512 to the outside.

The heat generated in the camera body 1302 is thus dissipated to the outside. However, there is a case where the amount of heat generated in the camera body 1302 and transferred to the heat sink 1603A is larger than an amount of heat dissipated by the electric fans 1611 and 1612, depending on an operation mode of the system camera 1300. In this case, the heat dissipation module 1301B is connected to the heat dissipation module 1301A. Part of heat which cannot be dissipated can be thus transferred from the second heat receiving surface 1508A connected to the heat dissipation fins 1607A to the first heat receiving surface 1507B of the heat dissipation module 1301B. This path for transfer of the part of the heat corresponds to the second heat dissipation path 1702.

Further, heat generated in the recorder module 1303 is transferred from a heat transfer section 1705 to the second heat receiving surface 1508B of the heat dissipation module 1301B. This path for transfer of heat corresponds to the third heat dissipation path 1703. Note that the heat transfer section 1705 has the same function as that of the heat transfer section 115 of the first embodiment. Heat transferred through the second heat dissipation path 1702 and the third heat dissipation path 1703 is diffused over the whole heat sink 1603B, and transferred from the heat dissipation fins 1607B to air therearound. The operation for dissipating heat from the heat dissipation fins 1607B is the same as that described with reference to FIG. 19A.

As described above, heat generated in the camera body 1302 and the recorder module 1303 is dissipated by the cooperation of the two heat dissipation modules 1301A and 1301B.

Next, a power supply path 1706 from the battery pack 104 will be described. As indicated by the power supply path 1706, electric power from the battery pack 104 is finally supplied to the camera body 1302 via the power supply terminals included in the common engagement interfaces of the recorder module 1303, the heat dissipation module 1301B, and the heat dissipation module 1301A. At an intermediate point of the power supply path 1706, the recorder module 1303 takes out electric power necessary for driving the same. Further, the power supply path 1706 passes the relay boards 1606A and 1606B of the heat dissipation modules 1301A and 1301B, respectively, and electric power for driving the electric fans is taken out from the power supply path 1706 by electric fan control elements (not shown) mounted on the relay boards 1606A and 1606B, respectively.

Next, a data signal transfer path 1707 will be described. As indicated by the data signal transfer path 1707, the image data signals and the control signals can be exchanged via the data signal terminals included in the common engagement interfaces of the camera body 1302, the heat dissipation modules 1301A and 1301A, and the recorder module 1303. Transmission and reception of signals are executed by cooperative control of a camera body controller 1708 and a recorder controller 1709.

The control signals include a data signal of camera body internal temperature data acquired by a thermistor 1710 included in the camera body 1302 and a data signal of recorder internal temperature data acquired by a thermistor 1711 included in the recorder module 1303. The data signals pass the relay board 1606A of the heat dissipation module 1301A and the relay board 1606B of the heat dissipation module 1301B. At this time, the electric fan control elements (not shown) mounted on the relay boards 1606A and 1606B each receive the data signals of the above-mentioned temperature data, thereby being capable of controlling the driving of the electric fans 1611A, 1612A, 1611B, and 1612B based on the received data signals.

For example, in a case where the camera body internal temperature or the recorder internal temperature is higher than a target temperature which is specified, the driving of the electric fans is controlled such that the rotational speed of the electric fans is increased whereby the heat dissipation capability is enhanced. Inversely, in a case where the camera body internal temperature or the recorder internal temperature is lower than the target temperature, the driving of the electric fans is controlled such that the rotational speed of the electric fans is reduced, whereby noise of the fans and power consumption of the fans is reduced though the heat dissipation capability is lowered.

Further, in a case where it is unnecessary to perform heat dissipation because the recorder module 1303 is in a resting state, the electric fans 1611B and 1612B of the heat dissipation module 1301B may be stopped. Further, for example, in a case where the amount of heat generation by the recorder module 1303 is much smaller than that of the camera body 1302, heat dissipation may be controlled such that heat is dissipated from the camera body 1302 not only by the heat dissipation module 1301A, but also by making use heat transfer via the second heat dissipation path 1702 shown in FIG. 18.

More specifically, the driving of the electric fans 1611A, 1612A, 1611B, and 1612B is controlled such that the rotational speeds of the electric fans 1611A and 1612A are reduced, and the rotational speeds of the electric fans 1611B and 1612B becomes higher than a rotational speed required for dissipating heat from the recorder module 1303. By doing this, it is possible to dissipate heat from the camera body 1302 by making use of the remaining heat dissipation capability of the heat dissipation module 1301B, which makes it possible to equalize the heat dissipation load on the heat dissipation modules. This is effective for reduction of driving noise of the electric fans, and extension of the service life of the electric fans. Note that the control signals for determining the rotational speeds of the electric fans may be generated within the heat dissipation module 1301 as mentioned above, or may be generated by the camera body controller 1708 or the recorder controller 1709, and delivered to the electric fan control elements through the data signal path 1707.

Although the above description is given of the heat dissipation operation in the system configuration in which the two heat dissipation modules, i.e. the heat dissipation module 1301A and the heat dissipation module 1301B, are connected, the same idea or method can be applied to a system in which more heat dissipation modules are connected. As a matter of course, in a system in which only one heat dissipation module 1301 is connected as well, it is possible to dissipate heat from mating modules connected to the front side (front surface) and the rear side (rear surface) of the heat dissipation module 1301.

Further, as described above with reference to FIGS. 15A to 15C, the system camera 1300 can also have various function modules connected thereto in a desired order, and hence the heat dissipation module 1301 may dissipate heat from another module other than the camera body 1302 and the recorder module 1303. For example, in FIG. 15B, it is possible to dissipate heat from the wireless communication module 1306.

As described above, the heat dissipation module 1301 according to the present embodiment has a structure which includes the common engagement interfaces on the two surfaces opposite and parallel to each other, respectively, and enables the heat dissipation module 1301 to be incorporated at a desired location in the system, whereby it is possible to dissipate heat from various component modules without impairing the expandability of the system. Further, this structure makes it possible to dissipate heat from two modules, using one heat dissipation module 1301 having the two modules connected to the front side (front surface) and the rear side (rear surface) thereof, and thermally connect the two modules connected to the front side (front surface) and the rear side (rear surface) of the heat dissipation module 1301. This makes it possible to positively transfer heat within the system camera, and construct a more efficient heat dissipation system.

Note that although in the first to third embodiments, the heat dissipation modules 101, 701, and 1301 are the same in that ventilation ports for taking in outside air are arranged in the lateral sides (side surfaces) thereof, and the outlet ports for discharging warmed air are arranged in the top (top surface) thereof, this arrangement is not particularly limitative. Each of the front side (front surface) and the rear side (rear surface) of the heat dissipation module has a possibility of being closed by a mating module to be connected, and hence it is suitable to arrange each ventilation port and each air outlet port in any of the lateral sides, top, and bottom of the module. However, a position on the sides, top, or bottom, where the ventilation port or the air outlet port is arranged, can be variously changed.

Figure 20A:
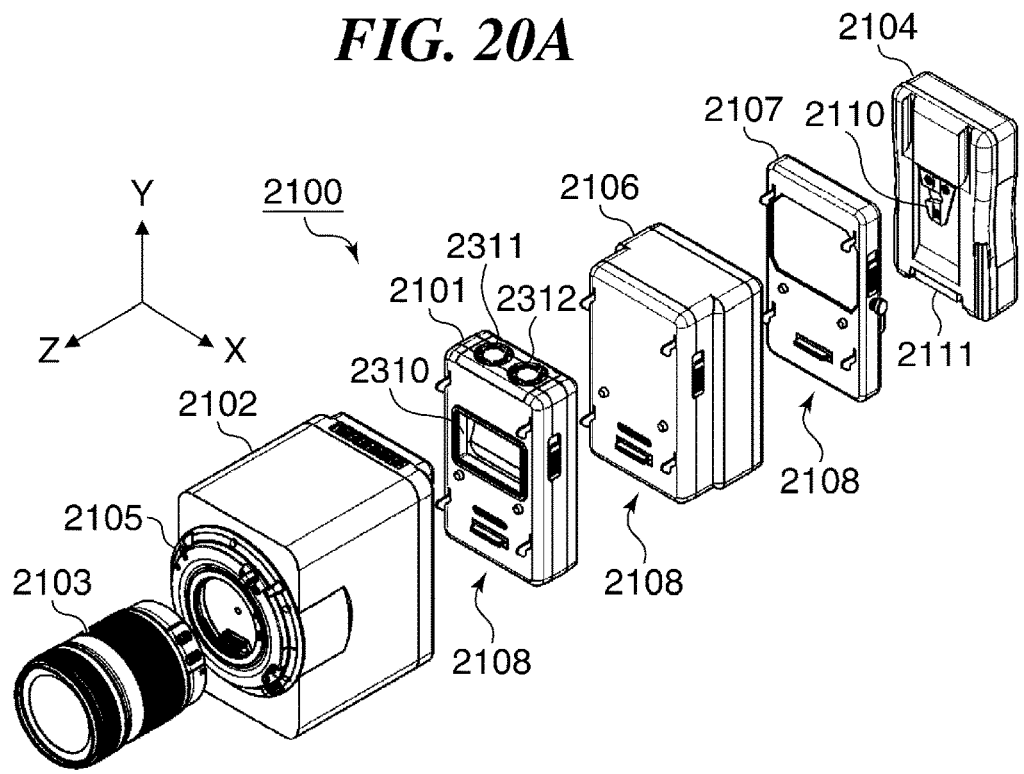
FIGS. 20A and 20B are exploded perspective views of a system camera according to a fourth embodiment of the present invention.
Figure 20B:
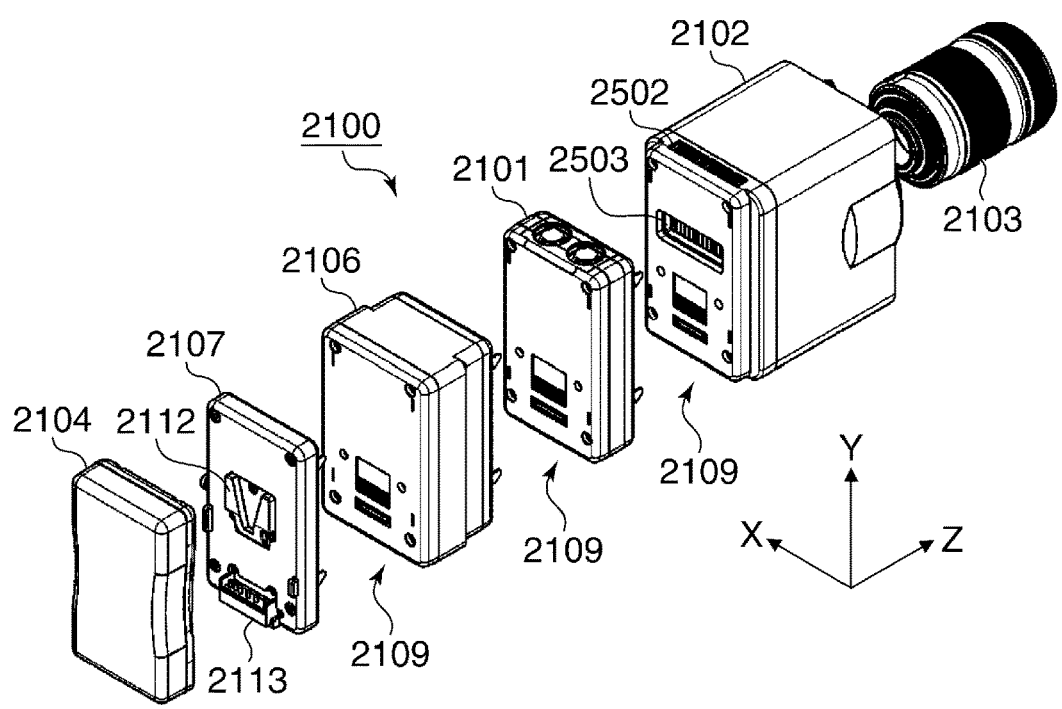
Figure 21A:
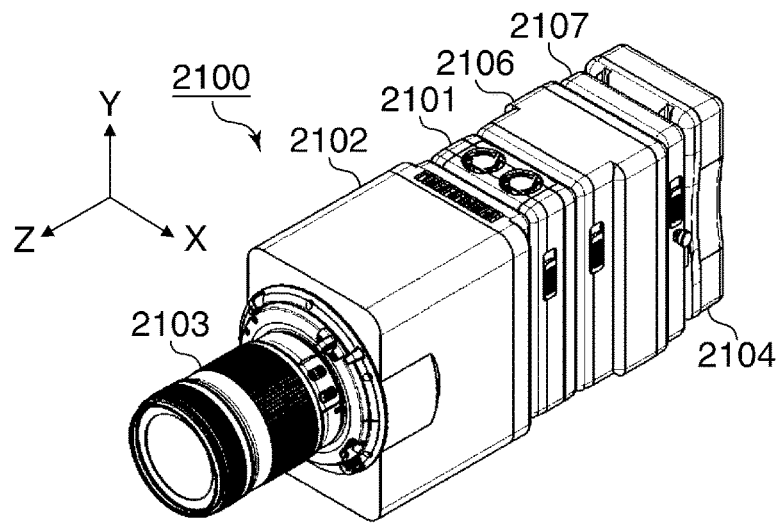
FIGS. 21A to 21C are perspective views each showing the appearance of an assembly of the system camera shown in FIGS. 20A and 20B.
Figure 21B:
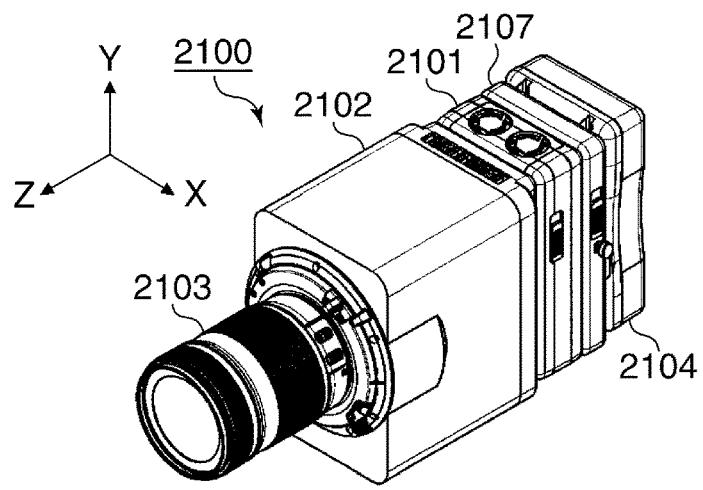
Figure 21C:
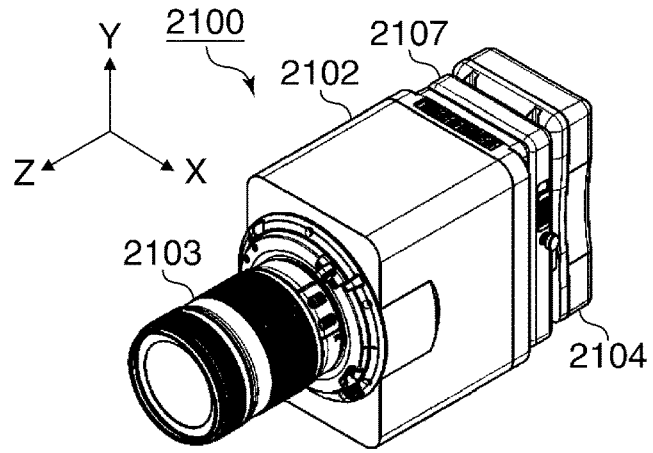

FIG. 20A is an exploded perspective view of a system camera 2100 according to a fourth embodiment of the present invention, as viewed from the front (object side), and FIG. 20B is an exploded perspective view of the system camera 2100 shown in FIG. 20A, as viewed from the rear. FIG. 21A is a perspective view showing the appearance of the system camera 2100 shown in FIG. 20A in an assembled state, and FIGS. 21B and 21C are perspective views each showing the appearance of the system camera 2100 shown in FIG. 21A in a state in which a predetermined module or predetermined modules is/are removed. Note that for convenience of explanation, the XYZ coordinate system as shown in each figure has the same definition as in the above-described embodiments. That is, a direction in which an optical axis of the system camera 2100 extends is set as a direction of a Z-axis, and a direction toward a object for photographing is defined as a positive direction of the Z-axis. On a plane perpendicular to the Z-axis, a direction of the width of the system camera 2100 is set as a direction of an X-axis, and a top-bottom direction of the system camera 2100 is set as a direction of a Y-axis. Particularly, a direction toward the top is defined as a positive direction of the Y-axis. Further, a side of each module as a component of the system camera 2100 toward an object is referred to as a front side, and a side opposite thereto is referred to as a rear side.

As shown in FIGS. 20A and 20B, the system camera 2100 according to the present embodiment is comprised of a camera body 2102, a lens unit 2103, a recorder module 2106, a battery adapter module 2107, a battery pack 2104, and a heat dissipation module 2101. These component modules can be mounted and connected in the Z-axis direction by a structure described hereinafter, and operate as the system camera 2100, by being connected to each other.

The following description will be given of the component modules of the system camera 2100 and a structure of connecting those modules. First, the camera body 2102 has a lens mount 2105 disposed on a front side (front surface) thereof, for mounting the lens unit 2103, and the lens unit 2103 can be changed according to a photographing condition. The camera body 2102 converts an object optical image incident through the lens unit 2103 to predetermined image signals by using an incorporated image sensor (not shown). Note that a recording section for recording the image signals may be provided inside the camera body 2102.

The camera body 2102 has a common engagement interface disposed on a rear side (rear surface) thereof. Although details of the common engagement interface will be described hereinafter, the common engagement interface refers to an inter-module connection structure having compatibility, which is comprised of a combination of an engaging mechanism on a male side (hooks, referred to hereinafter) or an engaged mechanism on a female side (slits, referred to hereinafter), each as a standardized mechanism, and an electrical connection mechanism. Particularly, a common engagement interface having the engaging mechanism is referred to as a male-side interface 2108, and a common engagement interface having the engaged mechanism is referred to as a female-side interface 2109. The rear side of the camera body 2102 is provided with the female-side interface 2109.

The recorder module 2105 is a recording device for storing image signals photographed by the camera body 2102 in a recording medium, not shown, in a predetermined data format. In recent years, particularly, the resolution of moving images has been made higher and higher, so that high-definition images (FHD) have already come into general use, and the technology for the next-generation video, such as a 4K or 8K video, is being developed. Further, to obtain a higher presence smooth video and a higher-definition slow motion video, a technique for making a video signal with a higher frame rate of over 60 p, including 120 p or 240 p, is under development. Such a next-generation image requires a huge file volume of digital data, and to deal with the data, development of a large-capacity recording medium into which data can be written at high speed and a technique for compressing data at a high compression rate is under way.

However, the camera body 2102 is required to be compact in size, and hence it is difficult to mount a large-sized internal recording system, and further, there is a problem in being adapted to a new technique in the future. In view of this, the camera body 2102 is configured to be capable of having the recorder module 2106, as an interchangeable external recording device, connected thereto, so that selection of the recorder module 2106 makes it possible to perform photographing with recording specifications (a compression format and a type of a recording medium used)

suited to a purpose. The recorder module 2106 has the male-side interface 2108 on a front side (front surface) thereof, and the female-side interface 2109 on a rear side (rear surface) thereof.

The battery pack 2104 has a rechargeable battery cell arranged therein, and is provided with a protruding portion which is engaged with a mating module (hereinafter referred to as the battery engagement protrusion 2110) and a battery pack output terminal 2111 which outputs electric power. On a rear side (rear surface) of the battery adapter module 2107, there are arranged an engagement recess which is engaged with the battery engagement protrusion 2110 (hereinafter referred to as the battery engagement recess 2112), and a battery terminal 2113 which is electrically connected to the battery pack output terminal 2111 to receive power supply. On a front side (front surface) of the battery adapter module 2107, there is arranged the male-side interface 2108. That is, the battery adapter module 2107 is an adapter for converting the engagement interface of the battery pack 2104 to the common engagement interface.

Incidentally, in a case where the system camera 2100 is used in an operation mode in which the power consumption of the camera body 2102 is high, causing a concern of generating much heat, in a case where the use environment temperature is high, and hence a temperature rise margin is small with respect to the guaranteed temperature of the camera body 2102 due to heat generation, or in a like other case, heat is sometimes not sufficiently dissipated only by natural heat dissipation from the camera body 2102. By connecting the heat dissipation module 2101 in such cases, it is possible to enhance the heat dissipation capability of the system camera 2100. Although details will be described hereinafter, the heat dissipation module 2101 has the male-side interface 2108 on a front side (front surface) thereof, and the female-side interface 2109 on a rear side (rear surface) thereof.

Since the above-described component modules have the connection compatibility by using the common engagement interface, the component modules can be connected in series in the Z-axis direction as shown in FIG. 21A. Alternatively, in a case where it is possible to cope with photographing only by using internal recording of the camera body 2102 depending on a photographing condition, it is possible to construct the system without the recorder module 2106 as shown in FIG. 21B. Further, in a case where the amount of heat generated in the camera body 102 brings about no problem, such as a case where the system camera 2100 is used in a low power consumption mode, e.g. for performing low-resolution imaging, it is possible to construct a compact and lightweight system by removing the heat dissipation module 2101 as shown in FIG. 21C.

Further, component modules which can be connected by the common engagement interface include various modules other than the above-described modules. As the component modules, there may be mentioned, for example, an input/output module or a wireless communication module which converts image signals or control signals to predetermined transmission signals, and outputs/inputs the signals to/from the outside, a display module which includes a display device, such as an LCD, and a user interface module.

Further, it is possible to connect a handle module or a grip module which assists a user in holding the system camera 2100, a shoulder pad module, and a gimbal adapter module which stabilizes the posture of the system camera 2100, by the common engagement interface. Further, it is also possible to connect a mechanism module, such as a weight module for adjusting the weight balance, by the common engagement interface. Further, it is also possible to connect a mechanism module, such as a weight module for adjusting the weight balance, by the common engagement interface. The system camera 2100 can be assembled by incorporating one or ones of such various function modules, which are selected according to the purpose of use. Especially, since the common engagement interface is employed, there is no restriction on the order of connection of the modules, and it is possible to connect desired modules in a desired order.

Figure 22A:
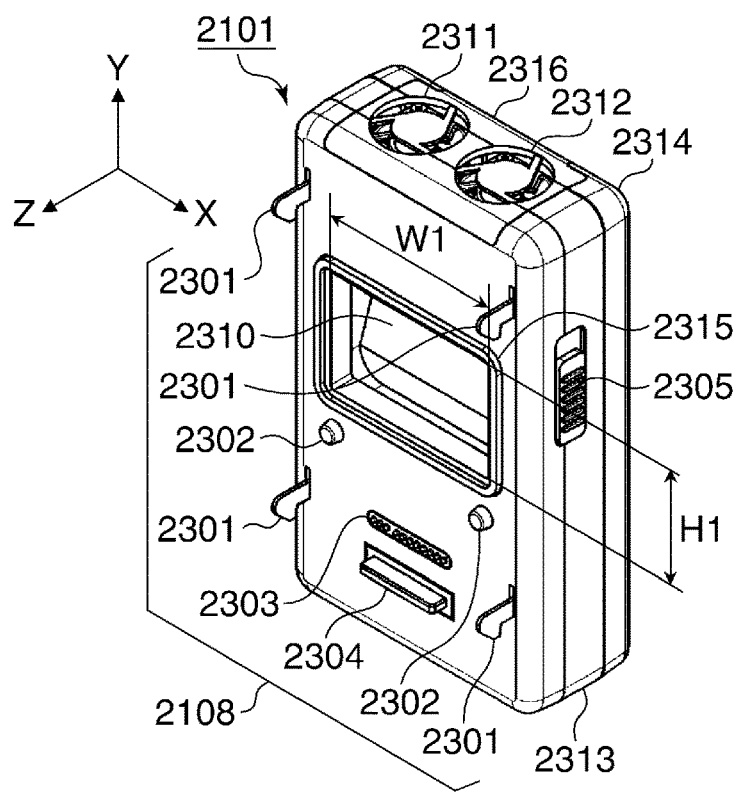
FIGS. 22A and 22B are perspective views each showing the appearance of a heat dissipation module.
Figure 22B:
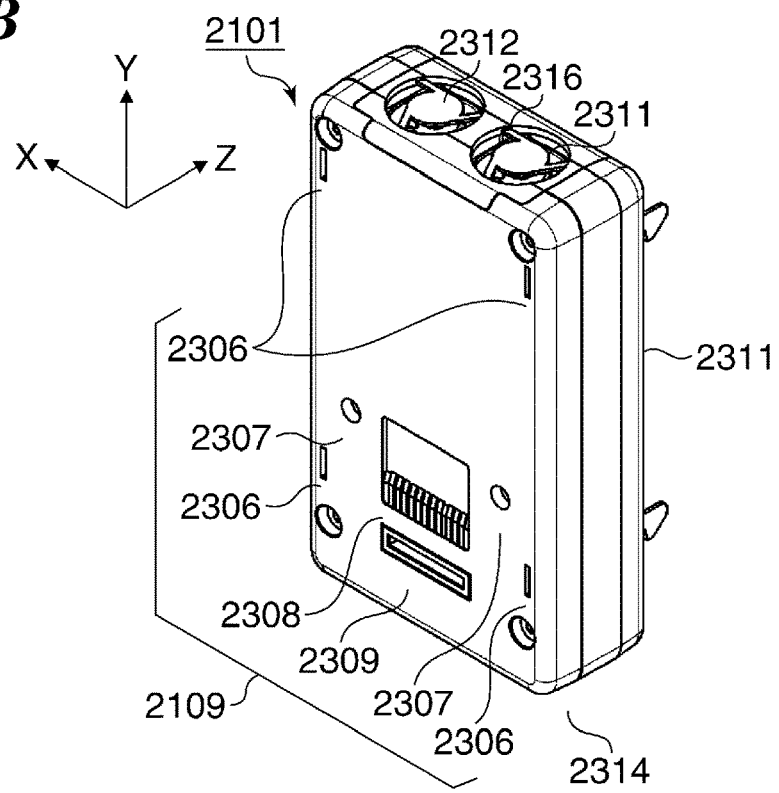
Figure 23A:
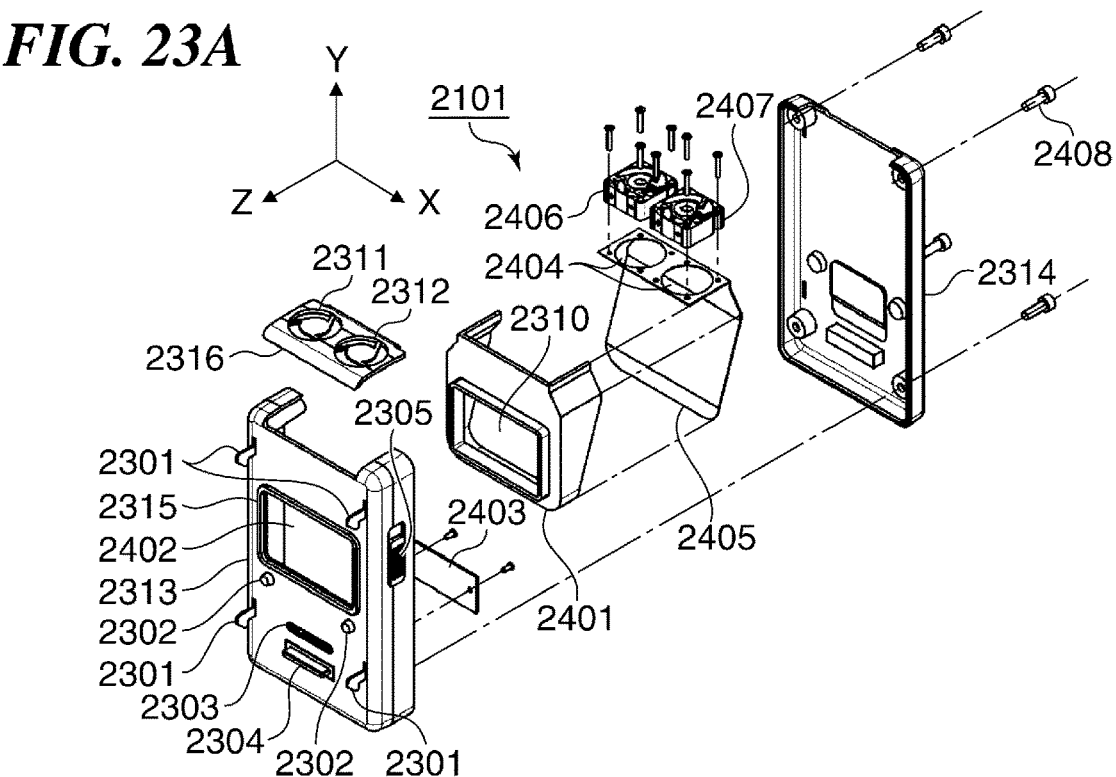
FIGS. 23A and 23B are exploded perspective views of the heat dissipation module.
Figure 23B:
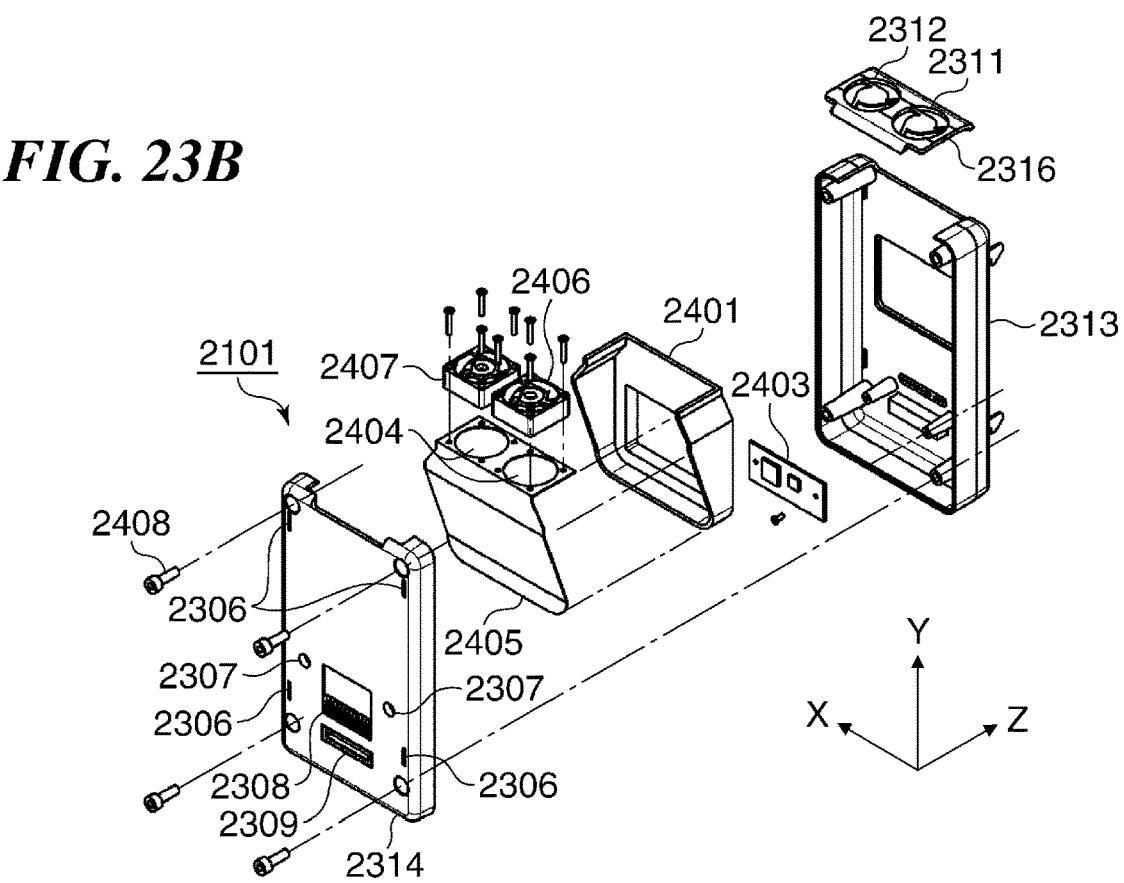

FIG. 22A is a perspective view showing the appearance of the heat dissipation module 2101, as viewed from the front, and FIG. 22B is a perspective view of the heat dissipation module 2101 shown in FIG. 22A, as viewed from the rear. FIG. 23A is an exploded perspective view of the heat dissipation module 2101, as viewed from the front, and FIG. 23B is an exploded perspective view of the heat dissipation module 2101 shown in FIG. 23A, as viewed from the rear.

The following description will be given of the details of the heat dissipation module 2101 with reference to FIGS. 22A, 22B, 23A, and 23B. Further, the details of the common engagement interface will also be described taking the heat dissipation module 2101 as a representative example. First, the common engagement interface will be described.

The heat dissipation module 2101 has the male-side interface 2108 on the front side. The male-side interface 2108 is comprised of hooks 2301 as the engaging mechanism, positioning dowels 2302, and a male-side data signal terminal 2303 and a male-side power supply terminal 2304 as the electrical connection mechanism. The hooks 2301 are arranged in four approximate corners of the module casing, respectively, such that they each extend in the positive direction of the Z-axis, and are each formed with an engaging lug extending in the negative direction of the Y-axis. Further, each hook 2301 is urged in the negative direction of the Y-axis by a spring, not shown, and is on standby in a state brought into contact with a predetermined abutting portion. By operating a hook operation knob 2305 on a side surface of the heat dissipation module 2101, it is possible to slide and move the hooks 2301 in the positive direction of the Y-axis against the spring force.

The other side, i.e. the rear side of the heat dissipation module 2101 is provided with the female-side interface 2109. The female-side interface 2109 is formed by slits 2306 as the engaged mechanism, positioning holes 2307, and a female-side data signal terminal 2308 and a female-side power supply terminal 2309 as the electrical connection mechanism. The slits 2306 are rectangular holes in which the hooks 2301 are inserted, respectively, and are each formed with an engaged surface, not shown, with which the lug of an associated one of the hooks 2301 is engaged at an inner end of the slit.

In a state in which the male-side interface 2108 and the female-side interface 2109 are connected, the positioning dowels 2302 are fitted in the positioning holes 2307, respectively, and the relative position between the male-side interface 2108 and the female-side interface 2109 in the directions of the X-axis and the Y-axis is fixed. Further, the hooks 2301 are engaged with the slits 2306, respectively, in a state in which the predetermined surfaces of the two interfaces 2108 and 2109 are brought into contact with each other, whereby the position of the heat dissipation module 2101 in the Z-axis direction is fixed.

At this time, electrical contacts of the male-side data signal terminal 2303 are brought into contact with electrical contacts of the female-side data signal terminal 2308, respectively, with a predetermined contact pressure, and electrical contacts of the male-side power supply terminal 2304 are brought into contact with electrical contacts of the female-side power supply terminal 2309, respectively, with a predetermined contact pressure, whereby the terminals are electrically connected such that data signals and electric power can be transmitted and received. When the hook operation knob 2305 is operated, the hooks 2301 are moved in the positive direction of the Y-axis, and are separated from the engaged surfaces, respectively, and hence the male-side interface 2108 and the female-side interface 2109 can be separated from each other in the Z-axis direction.

Note that the component elements of the common engagement interface are not limited to the above-described components, but any other element may be added based on a requirement of the system. For example, a detection switch or a detection sensor for detecting the connected state between the male-side interface 2108 and the female-side interface 2109 may be added. A data signal to be handled may be an electric signal as can be understood from the above, or may be a signal using another medium, such as an optical signal. It is possible to handle such a signal by setting a proper communication terminal compatible with the signal medium. Further, some of the data signal terminals or the power supply terminals may be omitted.

For example, as shown in FIGS. 20A and 20B, although the male-side interface 2108 is provided on the battery adapter module 2107, the male-side data signal terminal 2303 is omitted therefrom. As mentioned above, since the battery adapter module 2107 is a module for converting the engagement interface of the battery pack 2104 and does not handle the data signals, the male-side data signal terminal 2303 can be omitted. Further, the shape and arrangement of the hooks, the positioning structure, and the structure and arrangement of the data signal terminal or the power supply terminal can be variously modified.

Next, the structure specific to the heat dissipation module 2101 will be described. The heat dissipation module 2101 has a duct air inlet port 2310 exposed on the front surface having the male-side interface 2108. In the top of the heat dissipation module 2101, there are formed a first air outlet port 2311 and a second air outlet port 2312.

As shown in FIGS. 23A and 23B, the appearance of the heat dissipation module 2101 is formed by a front case 2313 and a rear case 2314. The hooks 2301 and the hook operation knob 2305 are assembled to the front case 2313 such that they are operable in an interlocked manner, and the positioning dowels 2302 are integrally formed with the front case 2313. Further, the front case 2313 is formed with a case opening 2402 for exposing the duct air inlet port 2310 which is part of the duct 2401, and further, a seal member 2315 is affixed to the front case 2313 such that it surrounds the exposed duct air inlet port 2310. Further, the male-side data signal terminal 2303 and the male-side power supply terminal 2304 are mounted on the front case 2313.

On the other hand, the rear case 2314 is formed with the slits 2306 and the positioning holes 2307, and has the female-side data signal terminal 2308 and the female-side power supply terminal 2309 mounted thereon. The male-side data signal terminal 2303 and the male-side power supply terminal 2304 are electrically connected to the female-side data signal terminal 2308 and the female-side power supply terminal 2309, respectively, via a relay board 2403, e.g. by electric wires, not shown, or flexible boards, not shown. This enables the heat dissipation module 2101 to relay the communication of data signals and the power supply from the power source between mating modules connected to the male-side interface 2108 and the female-side interface 2109, respectively.

Here, for example, the data signals communicated between the camera body 2102 and the recorder module 2106 are data signals of a high-resolution image, such as a 4K or 8K image, or data signals of a high-frame rate image, such as a 120 p or 240 p image, and very high-speed communication is required to transmit and receive these data signals Therefore, the male-side data signal terminal 2303 and the female-side data signal terminal 2308 are connected to each other based on the standard which makes it possible to perform high-speed data signal communication.

The duct 2401 is accommodated in the heat dissipation module 2101. Resin is suitable for a material of the duct 2401, but this is not limitative. A cover member 2405, which is a thin sheet metal and is formed with duct air outlet ports 2404, is attached to the duct 2401, thereby forming an air chamber communicating between the duct air inlet port 2310 and the duct air outlet ports 2404. Electric fans 2406 and 2407 are mounted to the duct air outlet ports 2404 of the cover member 2405, respectively, such that a stream of air from the air chamber in the duct 2401 in the positive direction of the Y-axis is generated by driving the electric fans 2406 and 2407. The electric fans 2406 and 2407 are electrically connected to the relay board 2403 by electric wires, not shown, and can receive driving electric power and control signals, as described hereinafter. Further, the electric fans 2406 and 2407 can each deliver a signal based on the fan rotational speed thereof to the relay board 2403.

The first air outlet port 2311 and the second air outlet port 2312 are arranged above the electric fans 2406 and 2407, respectively. That is, when the electric fans 2406 and 2407 are driven, air flows in from the duct air inlet port 2310, and is discharged from the first air outlet port 2311 and the second air outlet port 2312 to the outside of the heat dissipation module 2101.

Although the first air outlet port 2311 and the second air outlet port 2312 are formed in a lid cover 2316, the lid cover 2316 may be integrally formed with the front case 2313 or the rear case 2314. Ultimately, the heat dissipation module 2101 is formed by assembling the above-described components, and fastening the front case 2313 and the rear case 2314 with fastening screws 2408.

Figure 24A:
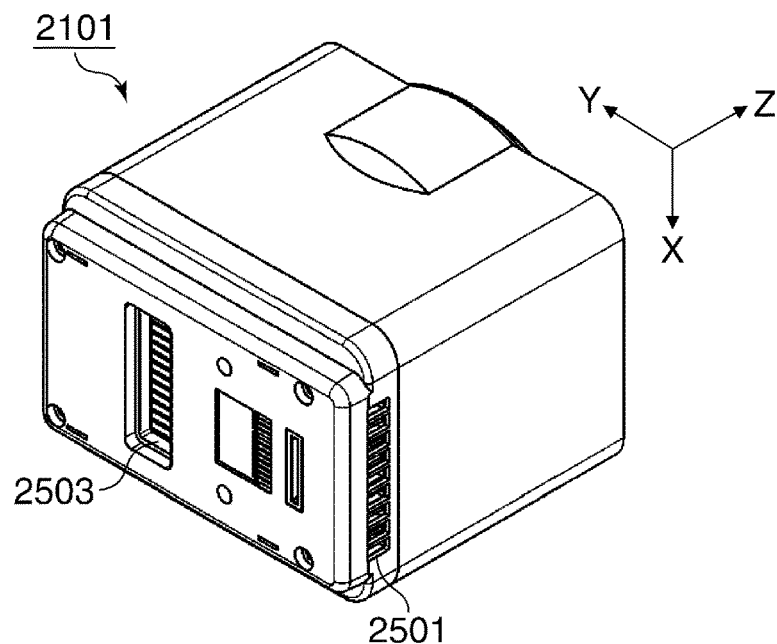
FIGS. 24A and 24B are perspective views each showing the appearance of a camera body.
Figure 24B:
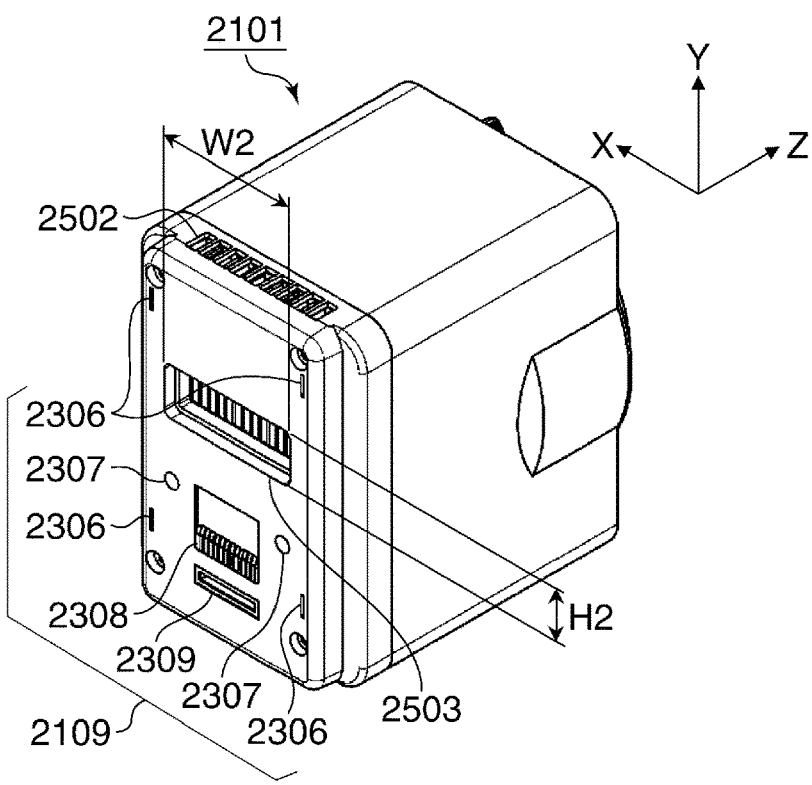

Next, the structure of the camera body 2102 will be described with reference to FIGS. 24A, 24B, and 25. FIG. 24A is a perspective view showing the appearance of the camera body 2102, including the appearance of the bottom, and FIG. 24B is a perspective view showing the appearance of the camera body 2102, as viewed from the rear. The bottom (bottom surface) of the camera body 2102 is formed with a first ventilation port 2501. The top (top surface) of the camera body 2102 is formed with a second ventilation port 2502. The rear side (rear surface) of the camera body 2102 is provided with the female-side interface 2109, in which the slits 2306, the positioning holes 2307, the female-side data signal terminal 2308, and the female-side power supply terminal 2309 are arranged. Further, the rear side of the camera body 2102 is formed with a third ventilation port 2503.

Figure 25:
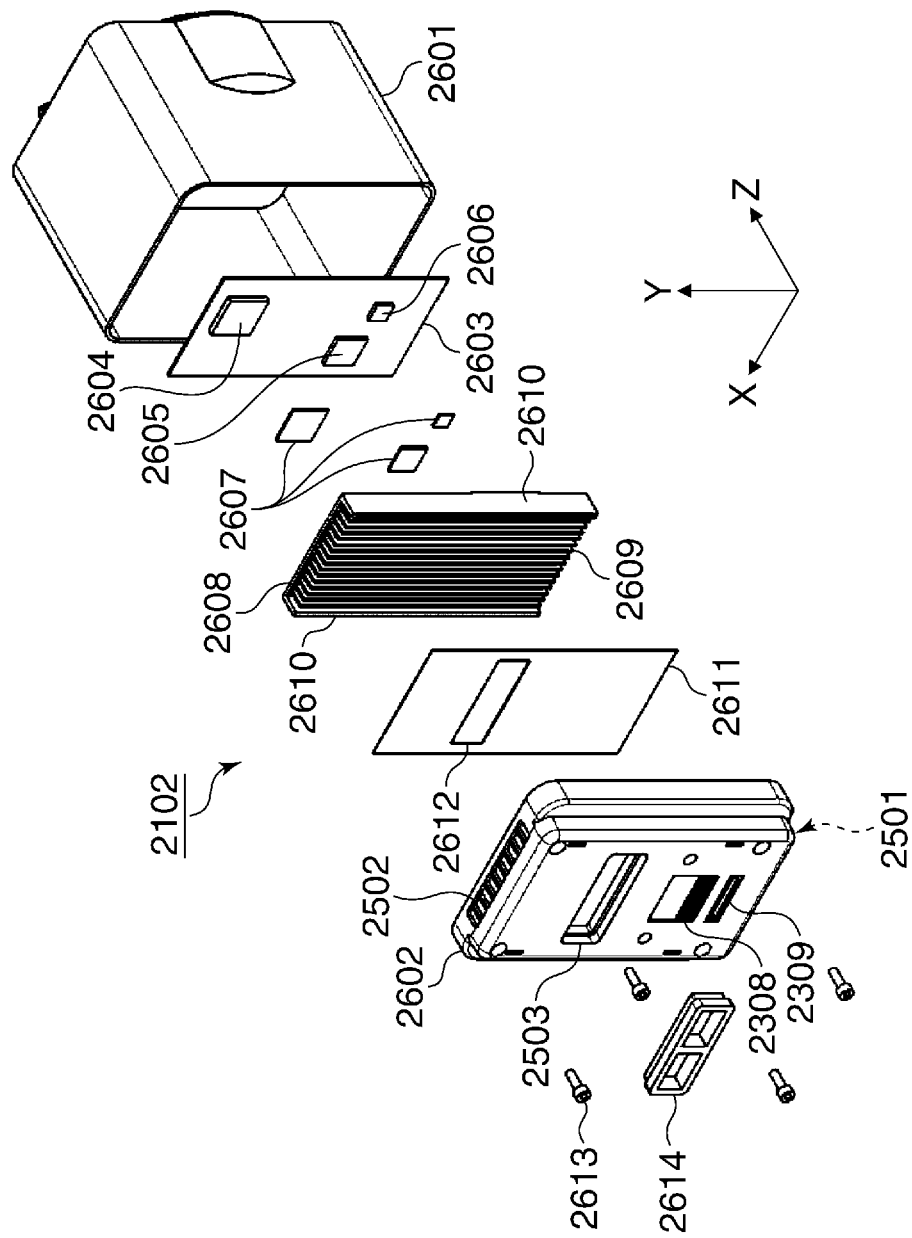
FIG. 25 is an exploded perspective view of the camera body.

FIG. 25 is an exploded perspective view of the camera body 2102, as viewed from the rear, showing the heat dissipation structure of a main board 2603. A rear cover 2602 has the components of the above-mentioned female-side interface 2109, and is formed with the first ventilation port 2501 in the bottom, the second ventilation port 2502 in the top, and the third ventilation port 2503 in the rear. A CPU 2604 that processes image signals at high speed is mounted on the main board 2603.

Further, a communication controller 2605 that transmits and receives image data encoded to predetermined data signals, via the female-side data signal terminal 2308, is mounted on the main board 2603. Further, a power supply controller 2606 that controls electric power supplied from the female-side power supply terminal 2309 to distribute the electric power to the components of the camera body 2102 is mounted on the main board 2603. The CPU 2604, the communication controller 2605, and the power supply controller 2606 generate heat during driving of the camera body 2102, and hence heat dissipation is performed by the heat dissipation structure described as follows. In the following description, the CPU 2604, the communication controller 2605, and the power supply controller 2606 are also generically referred to as the heat source elements.

The heat source elements are each pressed by a camera duct 2608 with heat transfer sheets 2607 interposed therebetween, and are thermally connected to the camera duct 2608. The camera duct 2608 is a radiator made of a material having high thermal conductivity, such as aluminum for die casting. The front side of the camera duct 2608 is formed with a surface to which the heat transfer sheets 2607 are attached, and the rear side of the camera duct 2608 is provided with a plurality of heat dissipation fins 2609 extending in a direction parallel to the Y-axis. Further, the lateral sides of the camera duct 2608 in the X-axis direction are each provided with a partition wall 2610. Further, to the rear side of the camera duct 2608, a duct cover 2611 is attached.

The duct cover 2611 is formed with a rectangular hole 2612 at a location opposed to the third ventilation port 2503. When the duct cover 2611 is attached to the camera duct 2608, a duct is formed which have three open portions, i.e. the top and bottom of the camera duct 2608 and the rectangular hole 2612.

The camera body 2102 is formed by assembling the above-described components, and fastening the rear cover 2602 to a body case 2601 with fastening screws 2613. Note that the top and the bottom of the camera duct 2608 are arranged at respective locations opposed to the second ventilation port 2502 and the first ventilation port 2501. Further, a ventilation port cap 2614 is a cover member for closing the third ventilation port 2503 in a case where the heat dissipation module 2101 is not connected as shown in FIG. 21C, and has a structure enabling the user to attach and remove the same to and from the rear cover 2602, e.g. by press-fitting.

Figure 26A:
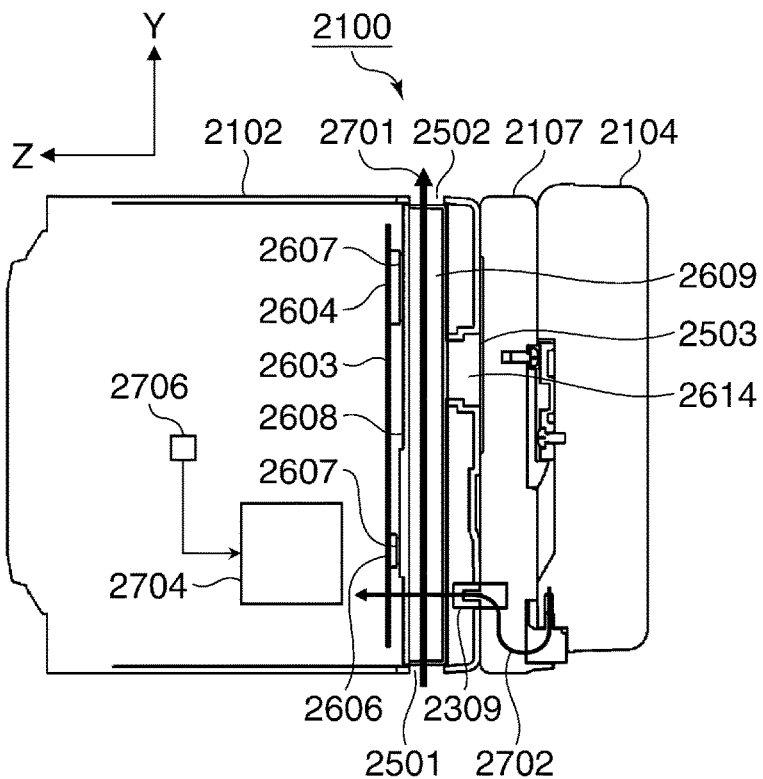
FIGS. 26A and 26B are schematic cross-sectional views of the system camera.
Figure 26B:
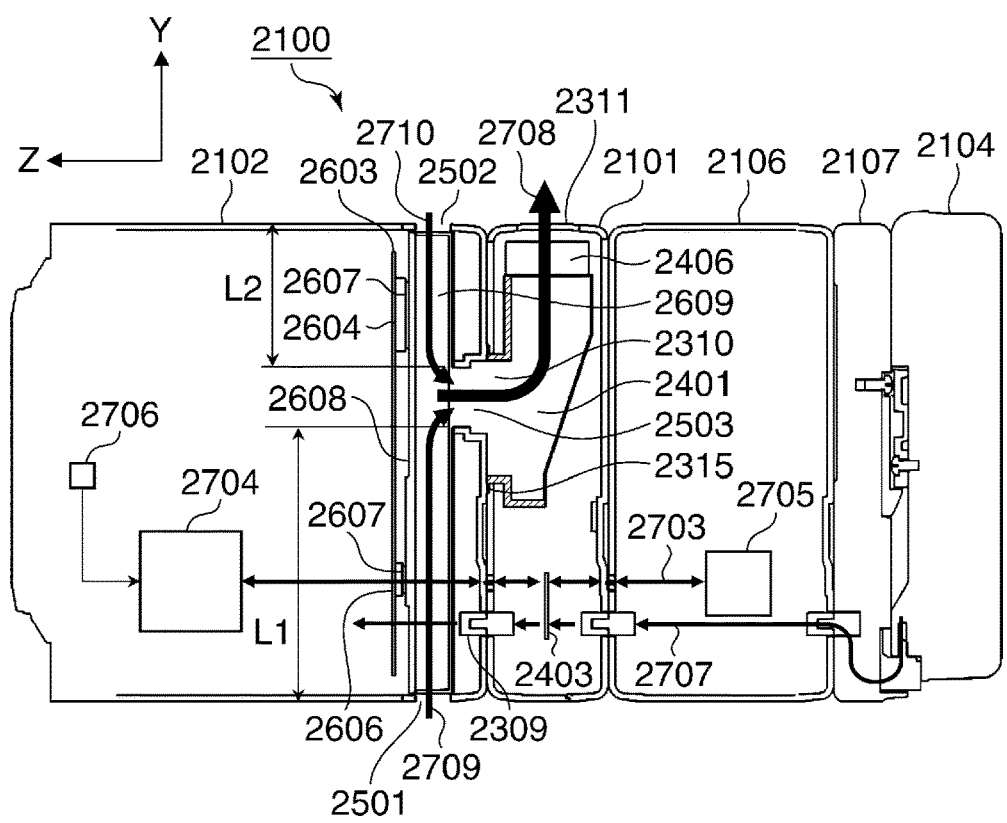

Next, the heat dissipation operation performed by the system camera 2100 will be described with reference to FIGS. 26A and 26B. FIG. 26A is a schematic cross-sectional view of the system camera 2100 shown in FIG. 21C in which the heat dissipation module 2101 is not connected, and FIG. 26B is a schematic cross-sectional view of the system camera 2100 shown in FIG. 21A in which the heat dissipation module 2101 is connected. Both of FIGS. 26A and 26B are the cross-sectional views obtained by cutting the system camera 2100 along a vertical plane passing the optical axis. The lens unit 103 which is unnecessary for explanation is omitted from illustration.

First, the configuration of the system camera 2100 in which the heat dissipation module 2101 is not connected will be described with reference to FIG. 26A. Heat generated from the heat source elements including the CPU 2604 is transferred to the camera duct 2608 via the heat transfer sheets 2607, and is diffused to the heat dissipation fins 2609. The heat diffused over the heat dissipation fins 2609 is transferred to air around the heat dissipation fins 2609, and the warmed air is moved toward the top of the camera body 2102 by the chimney effect. As mentioned above, in a case where the heat dissipation module 2101 is not connected, the third ventilation port 2503 is closed by the ventilation port cap 2614, so that the warmed air is discharged only from the second ventilation port 2502 to the outside of the camera body 2102, and fresh outside air replacing the discharged air is introduced from the first ventilation port 2501 into the camera duct 2608.

Thus, as indicated by an arrow of an airflow path 2701, heat generated from the heat source elements is discharged to the outside of the camera body 2102. Further, as indicated by an arrow of a power supply path 2702, electric power is supplied from the battery pack 2104 to the female-side power supply terminal 2309 of the camera body 2102 via the battery adapter module 2107.

Next, the configuration of the system camera 2100 in which the heat dissipation module 2101 is connected will be described with reference to FIG. 26B. When connecting the heat dissipation module 2101, the ventilation port cap 2614 is removed from the camera body 2102, whereby the third ventilation port 2503 is opened. Then, when the heat dissipation module 2101 is connected to the camera body 2102, the duct air inlet port 2310 and the third ventilation port 2503 are connected, so that an air chamber communicating between the duct 2401 and the camera duct 2608 is formed. A connection portion between the duct air inlet port 2310 and the third ventilation port 2503 is airtightly sealed by the seal member 2315 arranged to surround the periphery of the connection portion.

In a state in which the modules have been connected, as indicated by a data signal path 2703, image data signals and control signals are exchanged via the data signal terminals included in the common engagement interfaces of the camera body 2102, the heat dissipation module 2101, and the recorder module 2106. Transmission and reception of the signals are executed by cooperative control of a camera body controller 2704 and a recorder controller 2705. The signals pass the relay board 2403 of the heat dissipation module 2101, and hence it is possible to configure the electric fan control element (not shown) mounted on the relay board 2403 such that it receives an associated signal output from the camera body controller 2704.

Therefore, by detecting whether or not the electric fan control element can receive the associated signal from the camera body controller 2704, it is possible to determine whether or not the heat dissipation module 2101 has been mounted to the camera body 2102. Further, it is possible to cause the camera body internal temperature data acquired by a thermistor 2706 provided inside the camera body 2102 to be included in the control signals, and hence the electric fan control element can receive the temperature data, and control the driving of the electric fans 2406 and 2407 based on the received temperature data.

Next, as indicated by a power supply path 2707, electric power from the battery pack 2104 is supplied to the camera body 2102 via the power supply terminals included in the common engagement interfaces of the battery adapter module 2107, the recorder module 2106, and the heat dissipation module 2101. At an intermediate point of the power supply path 2707, the recorder module 2106 takes out electric power necessary for driving the same. Further, the power supply path 2707 passes the relay board 2404 of the heat dissipation module 2101, and electric power for driving the electric fans is taken out from the power supply path 2707 by an electric fan control element (not shown) mounted on the relay board 2403.

With the above-described configuration, the heat dissipation module 2101 mounted to the camera body 2102 drives the electric fans 2406 and 2407 at a predetermined rotational speed based on the camera body internal temperature data acquired by the thermistor 2706. By driving the electric fans 2406 and 2407, the warmed air in the camera duct 2608 flows through the third ventilation port 2503 and is discharged from the first air outlet port 2311 and the second air outlet port 2312, as indicated by an arrow of an airflow path 2708.

To replace the air discharged through the third ventilation port 2503, fresh outside air is introduced from the first ventilation port 2501 and the second ventilation port 2502 into the camera duct 2608. An airflow path 2709 indicates a path of airflow from the first ventilation port 2501, and an airflow path 2710 indicates a path of airflow from the second ventilation port 2502, by respective arrows. The fresh outside air flowing from the airflow path 2709 and the airflow path 2710 receives heat from the heat dissipation fins 2609, and then flows through the third ventilation port 2503, finally being discharged to the outside of the heat dissipation module 2101. With the above-described flows of air, heat generated from the heat source elements of the camera body 2102 is dissipated to the outside by driving the heat dissipation module 2101.

In the case of the configuration shown in FIG. 26A, in which the heat dissipation module 2101 is not connected, the first ventilation port 2501 is an outside air suction port, and the second ventilation port 2502 is a warmed air discharge port. On the other hand, in the case of the configuration shown in FIG. 26B, in which the heat dissipation module 2101 is connected, the first ventilation port 2501 and the second ventilation port 2502 both function as outside air suction ports. As a result, it is possible to draw a larger amount of outside air into the camera duct 2608 than in the case of the configuration in which the heat dissipation module 2101 is not connected. Therefore, it is possible to dissipate a larger amount of heat without changing the structure of the camera body 2102.

Further, in the case of the configuration in which the heat dissipation module 2101 is not connected, warmer air flows in the vicinity of the second ventilation port 2502 than in the vicinity of the first ventilation port 2501, and hence the efficiency of heat dissipation from the heat dissipation fins 2609 is reduced. On the other hand, in the case of the configuration in which the heat dissipation module 2101 is connected, outside air also flows into the camera duct 2608 from the second ventilation port 2502. For this reason, the heat dissipation efficiency is increased by drawing cool outside air into the vicinity of the heat dissipation fins 2609 near the second ventilation port 2502, whereby it is possible to effectively dissipate heat from a heat source element arranged in the vicinity of the second ventilation port 2502.

Here, particularly, the position of the third ventilation port 2503 is set such that a distance L2 from the second ventilation port 2502 to the third ventilation port 2503 is shorter than a distance L1 from the first ventilation port 2501 to the third ventilation port 2503. With this setting, the airflow path 2710 is shorter in length and lower in ventilation resistance than the airflow path 2709, and hence the flow rate of air through the airflow path 2710 is relatively larger than that of air through the airflow path 2709. Therefore, it is possible to more effectively dissipate heat from the heat source element arranged in the vicinity of the second ventilation port 2502, i.e. the CPU 2604 in the case of the present embodiment.

Of course, the relationship between the distances L1 and L2 may be changed so as to make the balance of the airflow rates optimum according to the arrangement of the heat source elements from which heat is to be dissipated. That is, the position of the third ventilation port 2503 may be changed. With this point taken into account, it is desirable to set the height dimension (indicated by H1 in FIG. 22A) of the duct air inlet port 2310 to be sufficiently larger than the height dimension (indicated by H2 in FIG. 24B) of the third ventilation port 2503. With this setting, it is possible to cope with heat dissipation from a camera body which is different in the position of the third ventilation port 2503, using the same heat dissipation module 2101, which makes it possible to improve versatility thereof.

Further, if the width dimension (indicated by W1 in FIG. 22A) of the duct air inlet port 2310 is sufficiently larger than the width dimension (indicated by W2 in FIG. 24B) of the third ventilation port 2503, similarly, it is possible to cope with heat dissipation from various camera bodies which are different in the position of the third ventilation port 2503, using the same heat dissipation module 2101.

The electric fans 2406 and 2407 can perform the following control based on the camera body internal temperature data acquired by the thermistor 2706: In a case where the camera body internal temperature is higher than a specified target temperature, the electric fans are controlled such that the rotational speed thereof is increased to thereby enhance the heat dissipation capability. Inversely, in a case where the camera body internal temperature is lower than the specified target temperature, the electric fans are controlled such that the rotational speed thereof is reduced, or such that one of the electric fans is stopped, whereby the noise and power consumption of the fans are reduced although the heat dissipation capability is reduced.

Note that the control signal for controlling the electric fans may be generated within the heat dissipation module 2101 as described above, or may be generated by the camera body controller 2704 and be delivered to the electric fan control element via the data signal path 2703.

Further, as described hereinabove, the system camera 2100 can be comprised of various function modules, and a module requiring heat dissipation is not limited only to the camera body 2102. The recorder module 2106 which performs the high-speed recording operation, or an external communication module (not shown) which performs high-speed communication with an external device sometimes also requires heat dissipation, depending on an operation mode.

In such a case, by replacing the camera body 2102 of the present embodiment with a desired module, it is possible to apply the heat dissipation module 2101 of the present embodiment to the system including the desired module. Further, by forming the duct air inlet port 2310 in the rear surface of the heat dissipation module 2101, heat from a mating module connected to the rear surface of the heat dissipation module 2101 may be dissipated.

Further, the engagement structure which connects the heat dissipation module 2101 to another module, such as the camera body 2102, is not limited to the structure using the hooks 2301. Not only the structure using the hooks 2301, but also a structure that fastens a module using fastening members, such as bolts, may be employed, or a rail type engagement structure may be provided. Particularly, it can be easily imaged that, by employing an engagement structure using a general-purpose interface, the heat dissipation module can be commonly used among various system cameras.

Further, although in the present embodiment, the first air outlet port 2311 and the second air outlet port 2312 are arranged in the top surface of the heat dissipation module 2101, this arrangement is not particularly limitative. Each of the front side (front surface) and the rear side (rear surface) of the heat dissipation module 2101 has a possibility of being closed by a mating module to be connected, and hence it is suitable to arrange each outlet port in any of the sides, top, and bottom of the module. However, a position on the sides, top, or bottom of the heat dissipation module 2101, where a ventilation port or an outlet port is arranged, can be variously modified.

Similarly, the arrangement of the first ventilation port 2501 and the second ventilation port 2502 of the camera body 2102 is not particularly limitative. In a case where a heat dissipation structure making use of the chimney effect as in the present embodiment is used, it is appropriate to arrange the second ventilation port 2502, which is an outlet port, in the top of the camera body 2102. However, the first ventilation port 2501 may be arranged in a lateral side of the camera body 2102, or may be arranged over a plurality of surfaces. Various modifications are also possible with respect to this point.

As described above, the heat dissipation module 2101 according to the present embodiment has a structure which includes the common engagement interfaces on the two surfaces opposite and parallel to each other, respectively, and makes it possible to dissipate heat from various component modules including the camera body 2102 without impairing the expandability of the system. Further, it is possible to perform more effective heat dissipation by changing the airflow path used for the heat dissipation without changing the structure of e.g. the camera body 2102 connected to the heat dissipation module 2101.

Figure 27A:
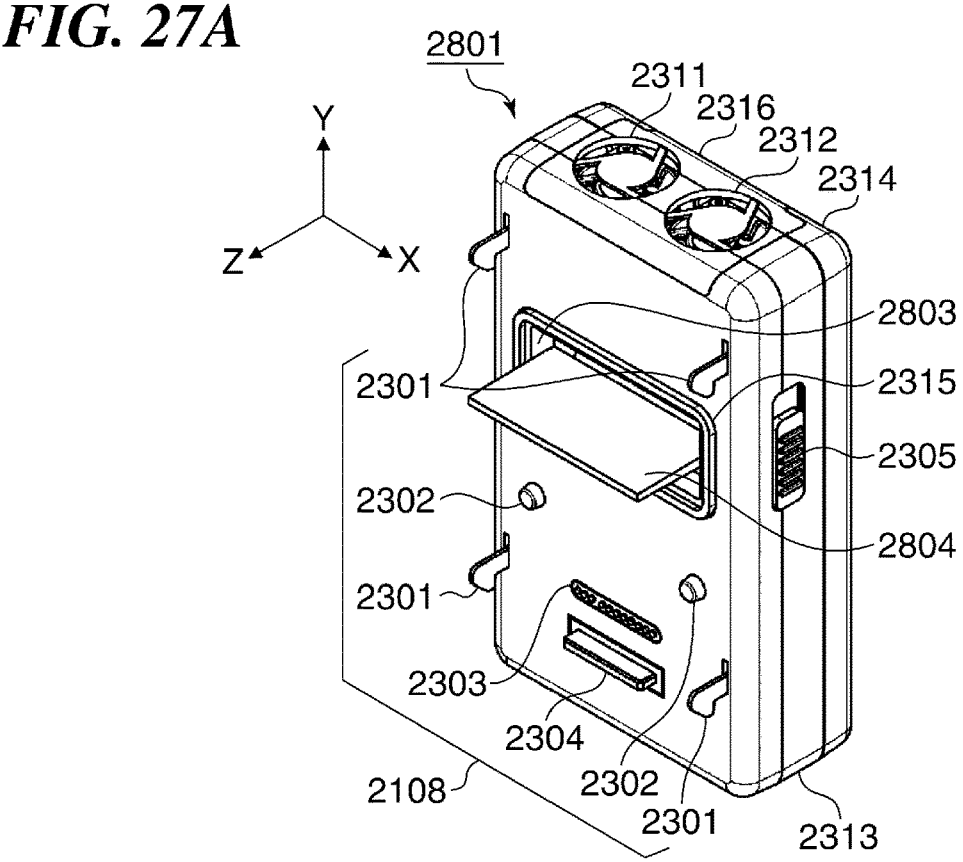
FIGS. 27A and 27B are views each showing the appearance of a heat dissipation module of a system camera according to a fifth embodiment of the present invention.
Figure 27B:
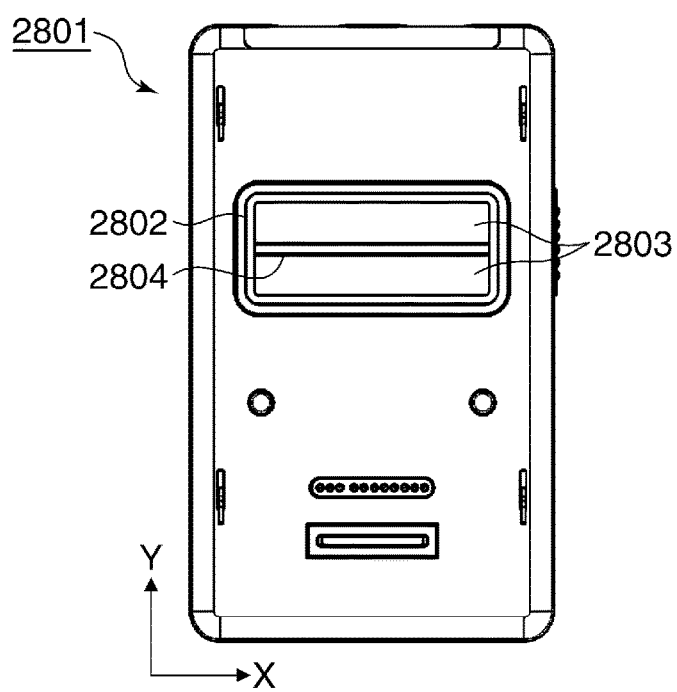

FIG. 27A is a perspective view showing the appearance of a heat dissipation module 2801 of a system camera 2100A according to a fifth embodiment of the present invention, as viewed from the front, and FIG. 27B is a front view of the heat dissipation module 2801 shown in FIG. 27A. The following description of the system camera 2100A according to the present embodiment is given by referring to another example of the structure of the heat dissipation module and an associated internal structure of the camera body different from that of the system camera 2100 according to the fourth embodiment. Therefore, the same component elements as those of the fourth embodiment are denoted by the same reference numerals, and description thereof is omitted. Note that the XYZ coordinate system has the same definition as in the above-described embodiments. A side of each module toward an object is referred to as a front side, and an opposite side thereto is referred to as a rear side.

The heat dissipation module 2801 has a duct 2802 formed inside, and a horizontal partition plate 2804 protruding from a duct air inlet port 2803 in the Z-axis direction is integrally formed with the duct 2802. Further, as shown in FIG. 27B, the partition plate 2804 divides the duct air inlet port 2803 into two sections in the Y-axis direction. The partition plate 2804 has a shape which changes the cross-sectional area of the airflow path of at least one section of the two ventilation spaces partitioned from each other.

Figure 28:
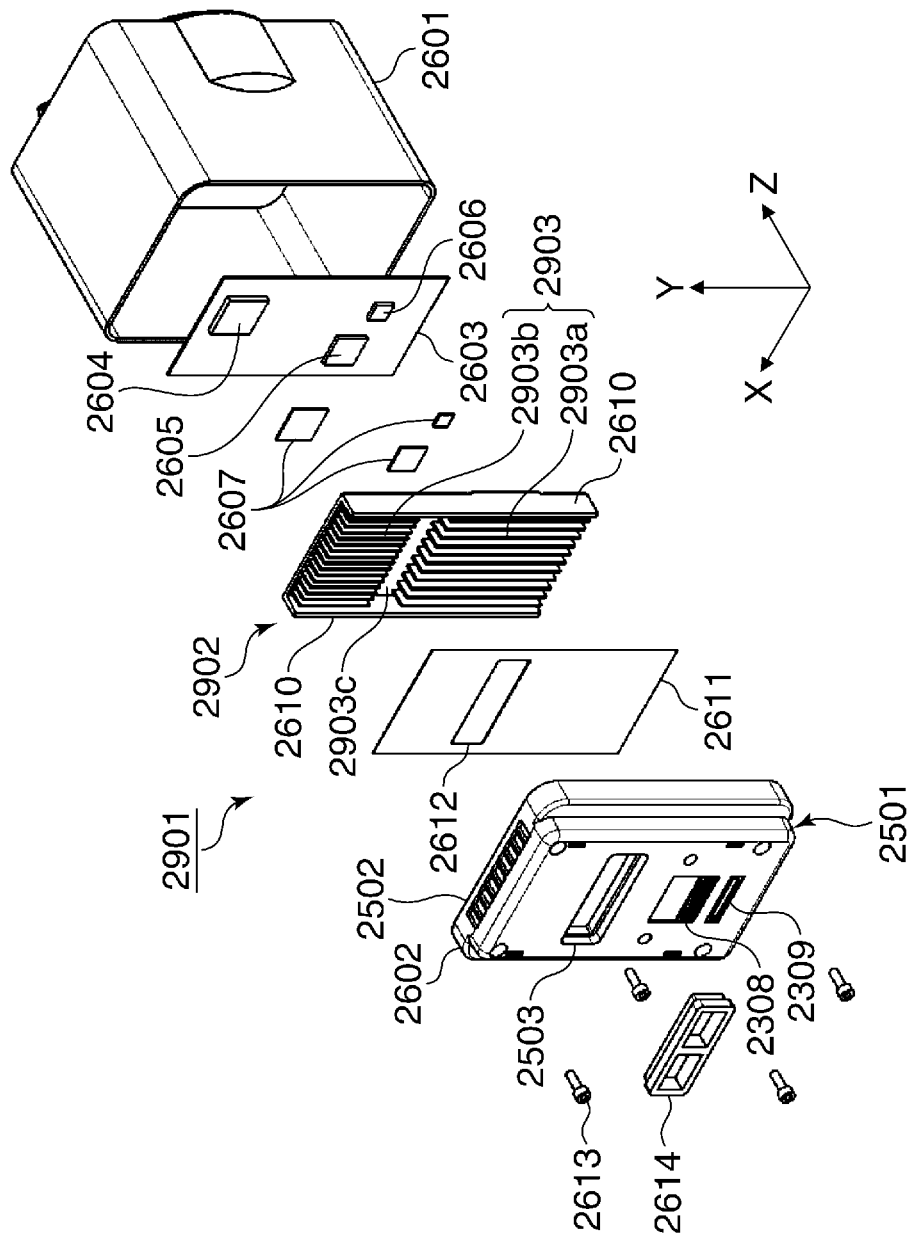
FIG. 28 is an exploded perspective view of a camera body.

FIG. 28 is an exploded perspective view of a camera body 2901, as viewed from the rear. The camera body 2901 differs from the camera body 2102 of the fourth embodiment in the shape of heat dissipation fins 2903 of a camera duct 2902. The heat dissipation fins 2903 are formed with a cutout portion 2903c by cutting out part overlapping the third ventilation port 2503 as viewed from the rear side of the camera body 2901, and are divided into heat dissipation fins 2903a toward the first ventilation port 2501 and heat dissipation fins 2903b toward the second ventilation port 2502.

Figure 29:
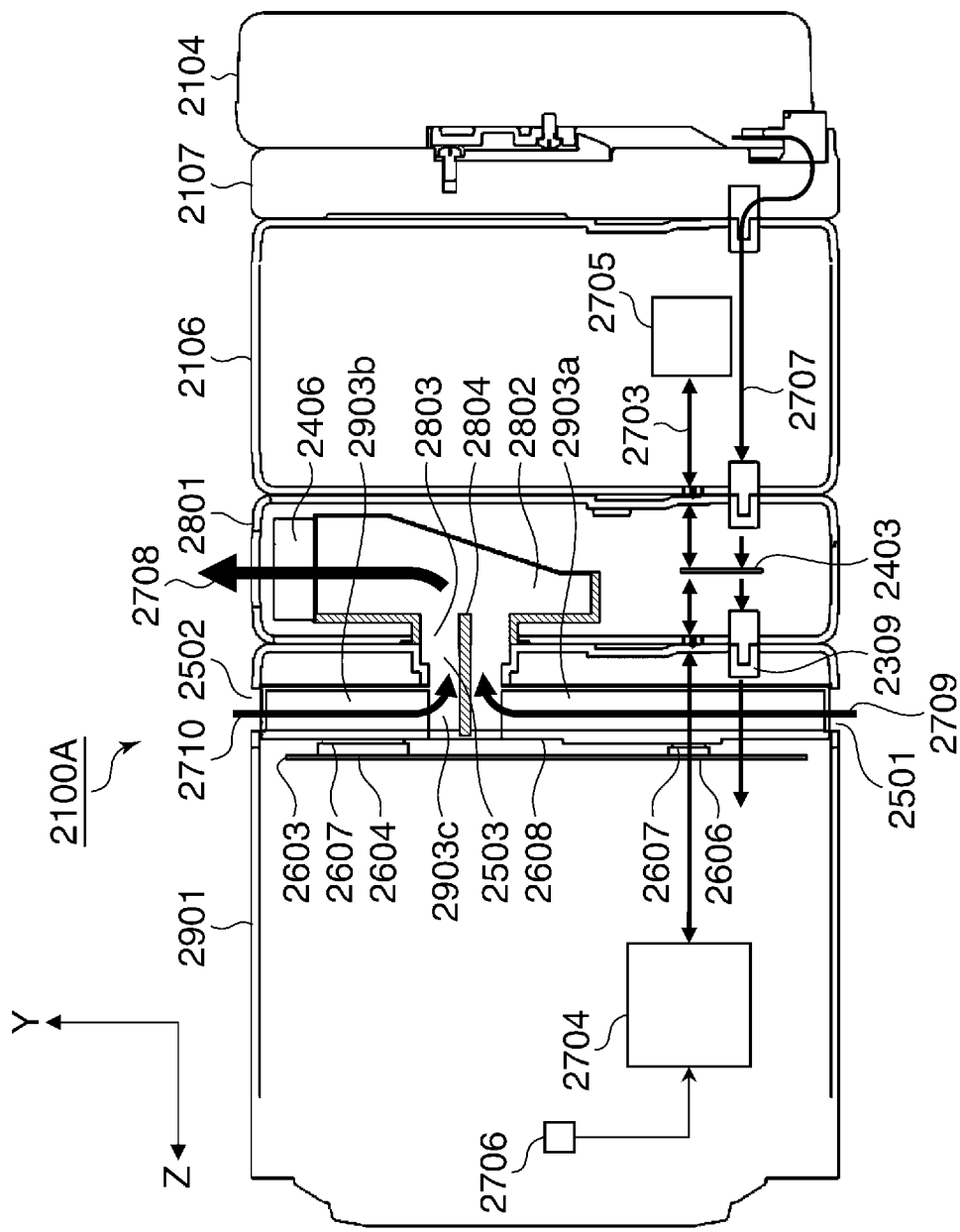
FIG. 29 is a schematic cross-sectional view of the system camera.

FIG. 29 is a schematic cross-sectional view of the system camera 2100A incorporating the heat dissipation module 2801 and the camera body 2901, which is obtained by cutting the system camera 2100A along a vertical plane passing the optical axis. The partition plate 2804 protruding from the heat dissipation module 2801 passes the third ventilation port 2503, and enters the cutout portion 2903c. With this, the partition plate 2804 forms a baffle board, and smoothly guides air to the duct 2802, without collision of respective streams of air flowing from the airflow path 2709 and the airflow path 2710 to the duct air inlet port 2803. That is, the efficiency of circulation of air for heat dissipation is improved, and in turn, the heat dissipation efficiency is improved.

Figure 30A:
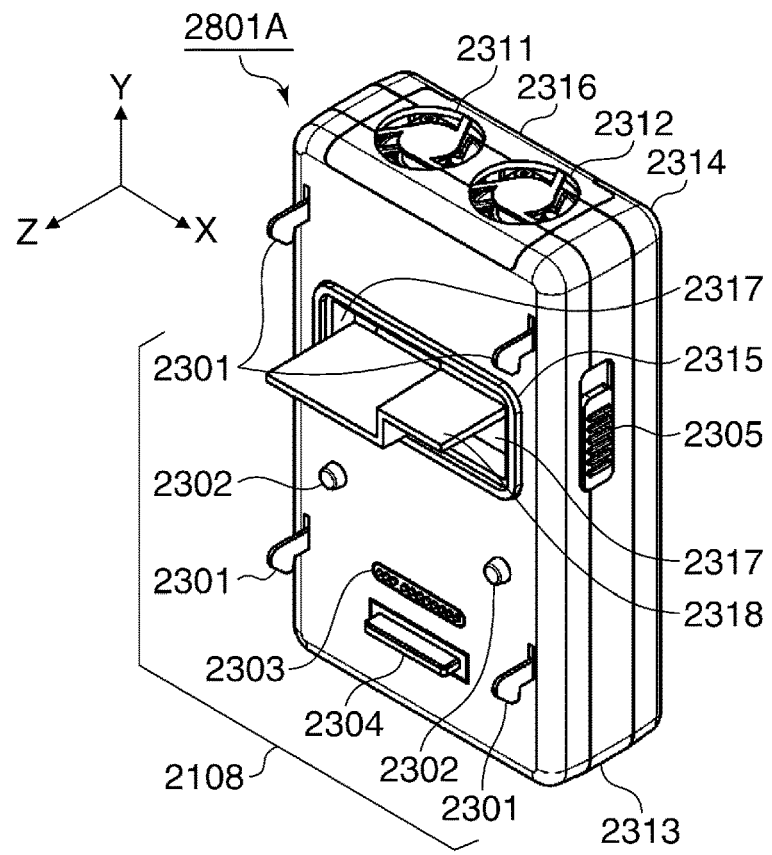
FIGS. 30A and 30B are views each showing the appearance of a variation of the heat dissipation module.
Figure 30B:
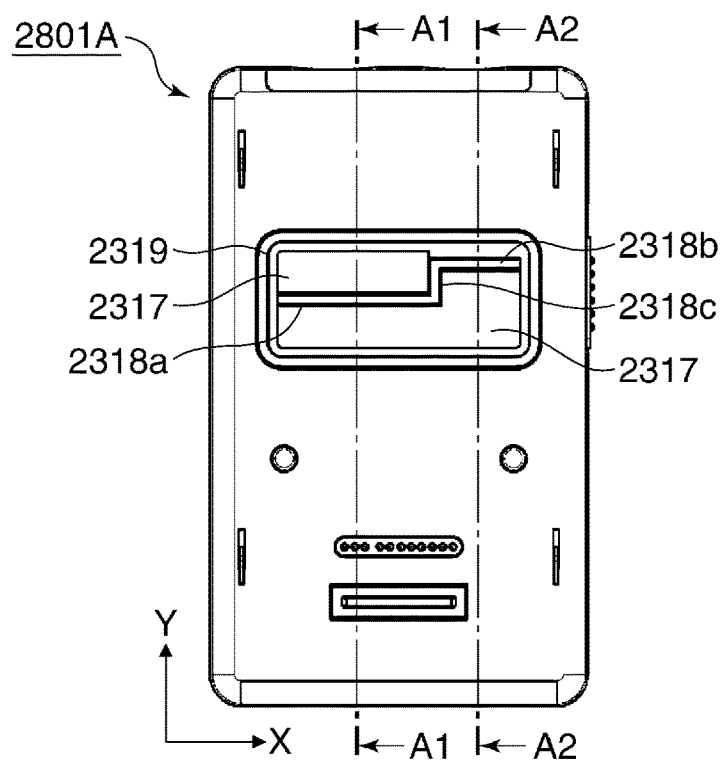

FIG. 30A is a view of the appearance of another dissipation module 2801A as a variation of the heat dissipation module 2801, as viewed from the front. FIG. 30B is a front view of the heat dissipation module 2801A of the FIG. 30A. A duct 2319 of the heat dissipation module 2801A is integrally formed with a partition plate 2318 protruding from a duct air inlet port 2317 in the Z-axis direction. The partition plate 2318 is formed by a first part 2318a which divides the duct air inlet port 2317 into two sections in the Y-axis direction similar to the partition plate 2804, a second part 2318b which is in contact with an upper side of the duct air inlet port 2317, and a third part 2318c which connects the first part 2318a and the second part 2318b. That is, the partition plate 2318 has a shape which changes the cross-sectional area of the airflow path of at least one section of the ventilation spaces partitioned from each other.

Figure 31A:
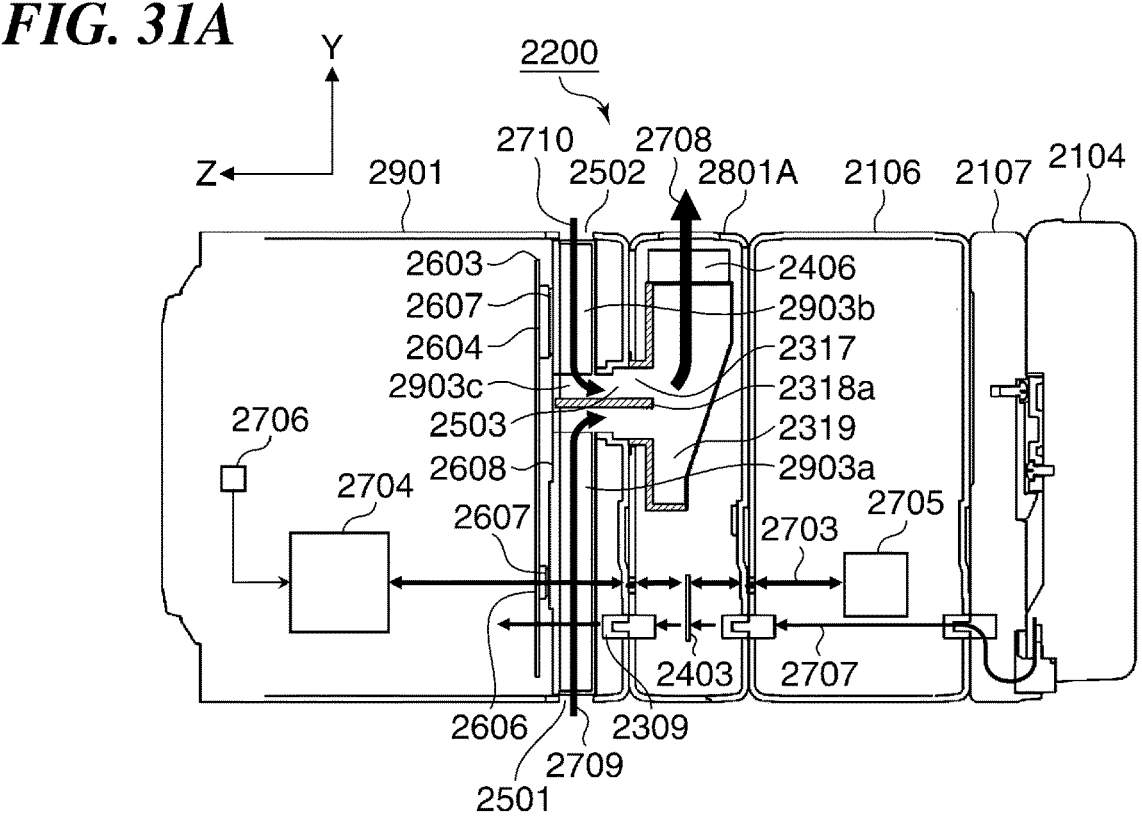
FIGS. 31A and 31B are schematic cross-sectional views of the system camera.
Figure 31B:
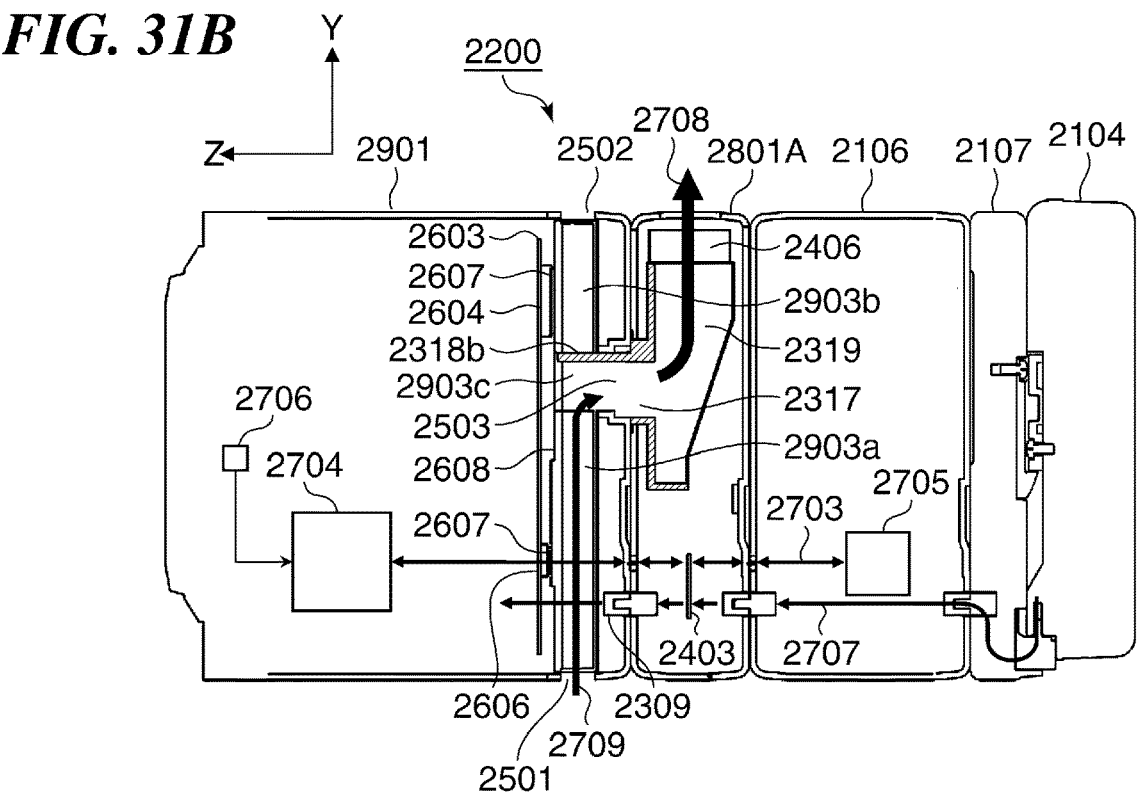

FIG. 31A is a schematic cross-sectional view of a system camera 2200 formed by assembling the dissipation module 2801A to the camera body 2901, which is taken along A1-A1 in FIG. 30B. FIG. 31B is a schematic cross-sectional view of the system camera 2200, which is taken along A2-A2 in FIG. 30B. The first part 2318a of the partition plate 2318 divides the duct air inlet port 2317 in the Y-axis direction, and functions as a baffle board for preventing collision of respective streams of air flowing through the airflow path 2709 and the airflow path 2710 as shown in FIG. 31A.

On the other hand, as shown in FIG. 31B, since the second part 2318b of the partition plate 2318 is in contact with the upper side of the duct air inlet port 2317, and further, very closely to an end of the heat dissipation fins 2903b, the second part 2318b closes a passage through which a stream of air from the airflow path 2710 flows into the duct 2319.

Figure 32:
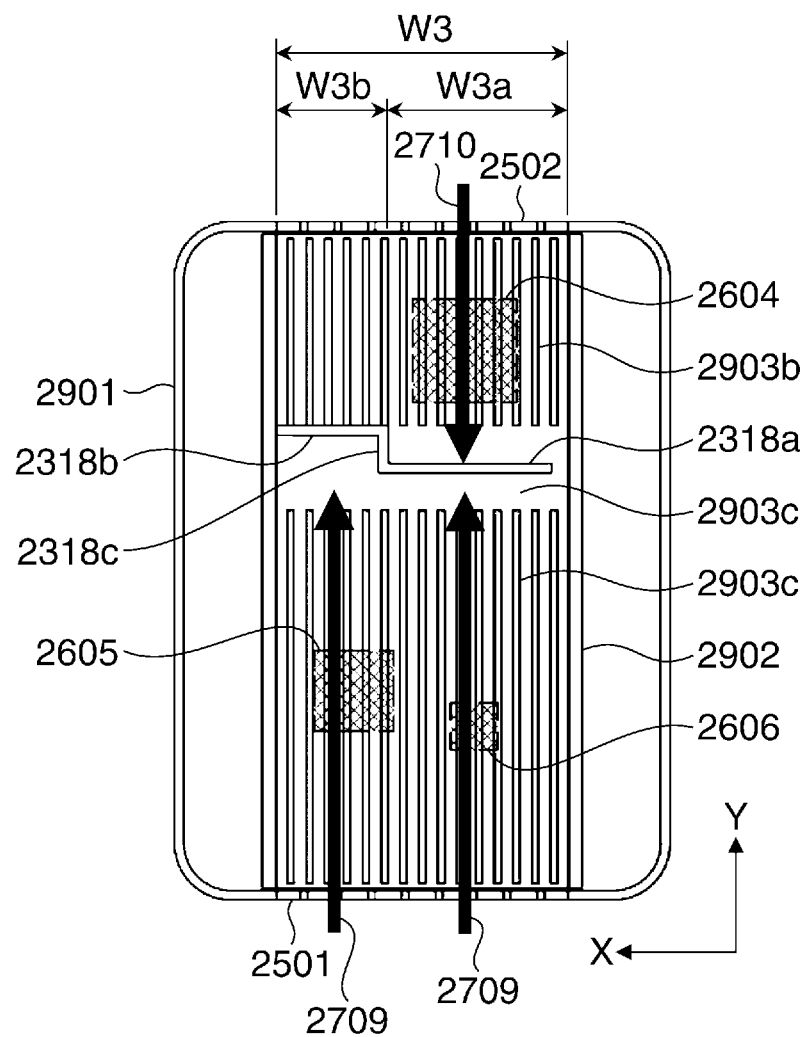
FIG. 32 is a schematic view showing a positional relationship between heat dissipation fins, heat source elements, and a partition plate.

FIG. 32 is a schematic view showing a positional relationship between the heat dissipation fins 2903, heat source elements, and a partition plate 2318, as viewed from the rear of the system camera 2200 formed by connecting the dissipation module 2801A to the camera body 290. As mentioned above, part of the airflow path 2710, i.e. an airflow path indicated by a range W3b is closed by the second part 2318b of the partition plate 2318. On the other hand, the first part 2318a of the partition plate 2318 causes air to smoothly flow in a range W3a in which the CPU 2604 requiring heat dissipation is disposed. Thus, by narrowing the airflow path 2710 to a necessary range, it is possible to make it easier for air to flow, and improve the heat dissipation efficiency.

As described above, modification of the airflow path of the camera duct 2902 by attaching the heat dissipation module 2801A thereto, it is possible to change the airflow rate balance between the airflow path 2709 and the airflow path 2710. Further, it is possible to change the balance of the heat dissipation capability between the airflow path 2709 and the airflow path 2710, and thereby build the efficient heat dissipation structure.

As described above, the heat dissipation modules 2801 and 2801A of the present embodiment make it possible to perform more efficient heat dissipation as the system camera by modifying the airflow path from a mating module connected thereto. The present embodiment has the same configuration and advantageous effects in the other respects as the fourth embodiment.

Figure 33A:
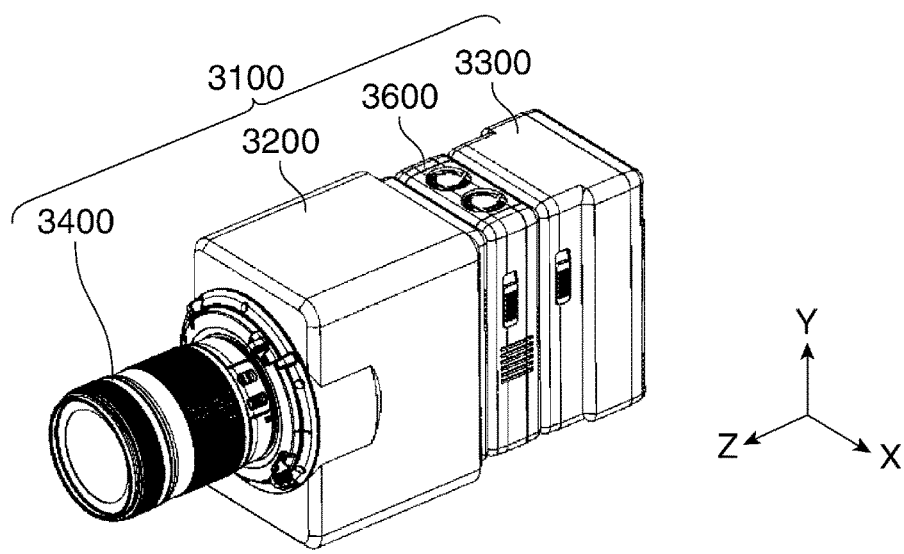
FIGS. 33A to 33C are perspective views of a system camera according to a sixth embodiment of the present invention.
Figure 33B:
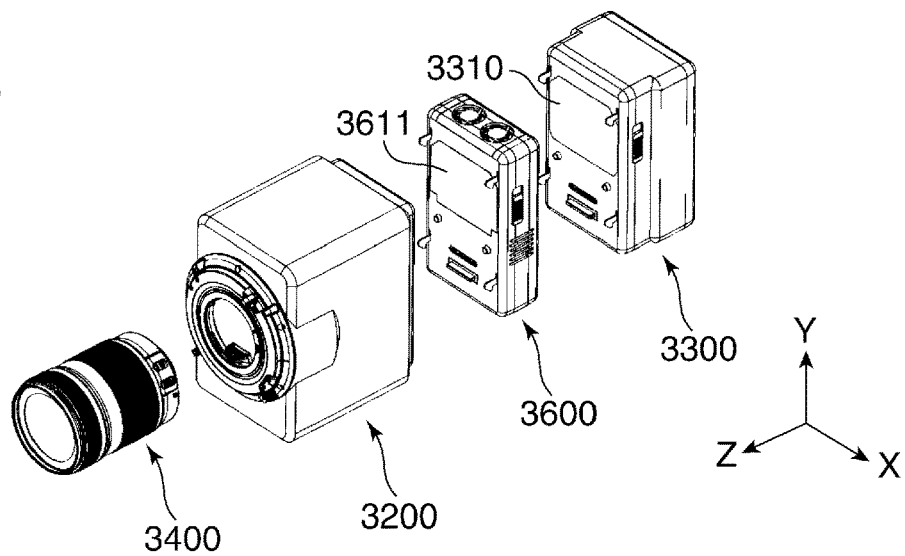
Figure 33C:
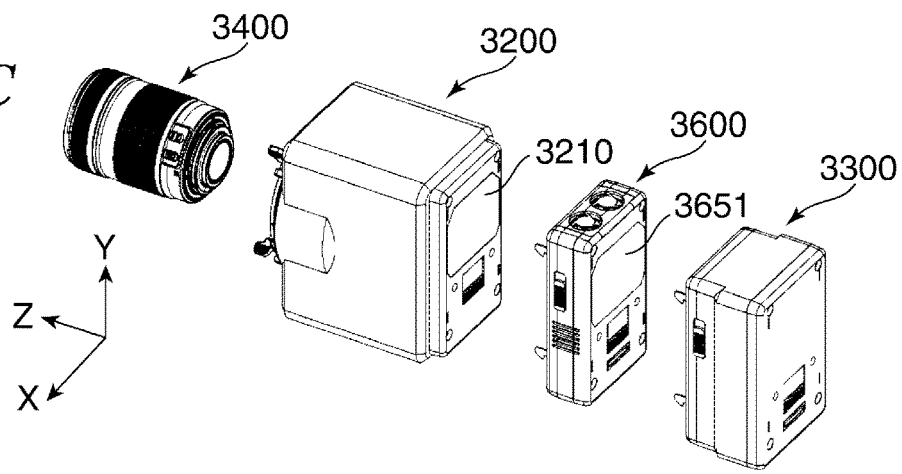

FIG. 33A is a perspective view showing the appearance of a system camera 3100 according to a sixth embodiment of the present invention, as viewed from the front. FIG. 33B is an exploded perspective view of the system camera 3100 shown in FIG. 33A. FIG. 33C is an exploded perspective view of the system camera 3100 shown in FIG. 33B, as viewed from the rear. To simplify the following explanation, the XYZ coordinate system has the same definition as in the above-described embodiments. The direction in which the optical axis of the system camera 3200 extends is set as the direction of the Z-axis, and the direction toward an object for photographing is defined as the positive direction of the Z-axis. On a plane perpendicular to the Z-axis, the direction of the width of the system camera 3100 is set as the direction of the X-axis, and the top-bottom direction of the system camera 3100 is set as the direction of the Y-axis. Particularly, the direction toward the top is defined as the positive direction of the Y-axis. Further, the direction of the X-axis is also referred to as a left-right direction, the direction of the Y-axis is also referred to as a top-bottom direction, and the direction of the Z-axis is also referred to as a front-rear direction. The positive direction of the X-axis is defined as a direction toward the right. The positive direction of the Y-axis is defined as a direction toward the top. The positive direction of the Z-axis is defined as a direction toward the front.

The system camera 3100 is comprised of the camera body 3200, a lens unit 3400, a heat dissipation module 3600, and a recorder module 3300. Each component modules adjacent to each other in the Z-axis direction are mechanically and electrically connected to each other, whereby these modules operate as the system camera 3100.

The modules as components of the system camera 3100 except the lens unit 3400 each include a common engagement interface. Although details of the common engagement interface will be described hereinafter, the common engagement interface refers to an inter-module connection structure having compatibility, which is comprised of a combination of a standardized male-side engaging mechanism (hooks 3633, referred to hereinafter) or a female-side engaged mechanism (slits 3636, referred to hereinafter) and an electrical connection mechanism. Particularly, a common engagement interface having the engaging mechanism is referred to as a male-side interface, and a common engagement interface having the engaged mechanism is referred to as a female-side interface.

Although not described using reference numeral in FIGS. 33A to 33C, the camera body 3200 includes the female-side interface on the rear side (rear surface) thereof. The heat dissipation module 3600 includes the male-side interface on the front side (front surface) thereof, and the female-side interface on the rear side thereof. The recorder module 3300 includes the male-side interface on the front side (front surface) thereof. Each component module thus includes an engagement mechanism, which enables the camera body 3200, the heat dissipation module 3600, and the recorder module 3300 to be mechanically and electrically connected to each other. Further, since the common engagement interface has the connection compatibility, the camera unit 3200 and the recorder module 3300 can be directly connected to form another system camera.

Figure 34A:
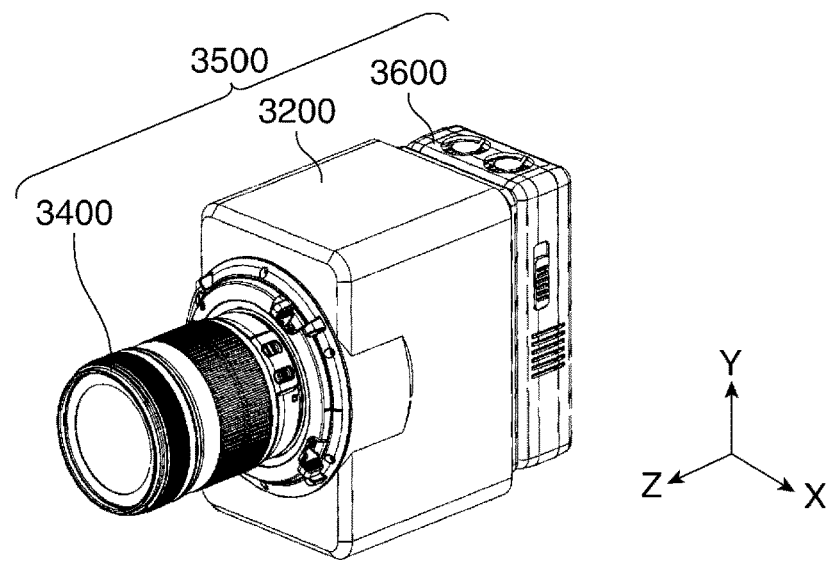
FIGS. 34A to 34C are perspective views of the system camera shown in FIG. 33 in a state in which a recorder module is removed therefrom.
Figure 34B:
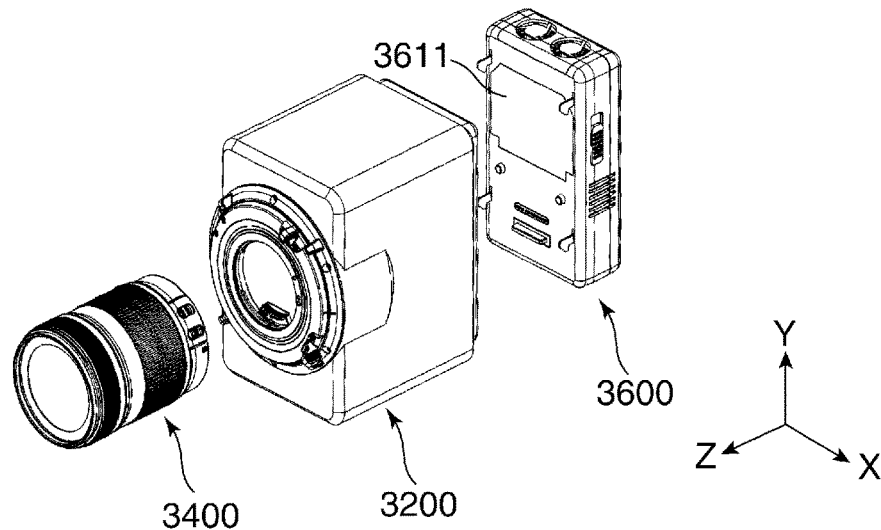
Figure 34C:
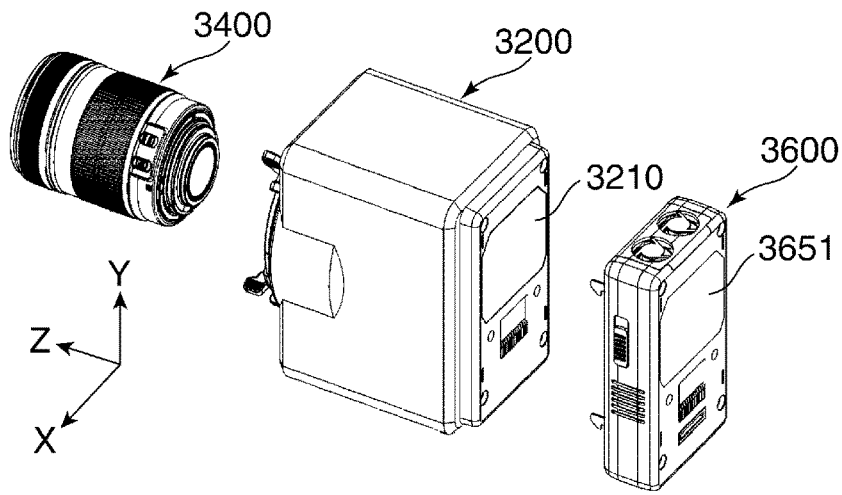

FIG. 34A is a perspective view showing the appearance of a system camera 3500 in a state in which the recorder module 3300 is removed from the system camera 3100, as viewed from the front. FIG. 34B is an exploded perspective view of the system camera 3500. FIG. 34C is an exploded perspective view of the system camera 3500 shown in FIG. 34B, as viewed from the rear.

The system camera 3500 is comprised of the camera body 3200, the lens unit 3400, and the heat dissipation module 3600. The camera body 3200 has a moving image recording function. The lens unit 3400 that makes light beams incident, the camera body 3200 that converts the light beams into electric signals and records the electric signals, and the heat dissipation module 3600 that cools the camera body 3200 cause the system camera 3500 to function as a camera.

However, by further connecting the recorder module 3300 to the rear side of the heat dissipation module 3600 to form the system camera 3100, it is possible to perform high-speed and high-resolution moving image recording. In this case, the heat dissipation module 3600 cools both of the camera body 3200 and the recorder module 3300. Thus, a user of the system camera can select between the two forms of use.

The function of the heat dissipation module 3600 of the system camera 3100 will be described with reference to FIGS. 33A to 33C. The camera body 3200 has a camera heat transfer section 3210 on the rear surface thereof. The camera heat transfer section 3210 transfers heat generated in the camera body 3200 to the heat dissipation module 3600. Heat is transferred from heat sources within the camera body 3200, such as an image sensor, a CPU that processes a photographed image signal at high speed, a recording processor which records a large amount of image data at high speed, or a recording medium, to the camera heat transfer section 3210 via a thermally conductive material. As the method of transferring heat from the heat generation source to the camera heat transfer section 3210, various known techniques can be applied, and hence description thereof is omitted.

The recorder module 3300 includes a recorder heat transfer section 3310 on the front surface thereof. The recorder heat transfer section 3310 transfers heat generated in the recorder module 3300 to the heat dissipation module 3600. Heat is transferred from each heat source within the recorder module 3300 to the recorder heat transfer section 3310 by connecting a thermally conductive material therebetween. It is desirable that the camera heat transfer section 3210 and the recorder heat transfer section 3310 are formed of a material having high thermal conductivity, such as copper or aluminum.

The heat dissipation module 3600 includes a first heat receiving surface 3611 on the front side, and a second heat receiving surface 3651 on the rear side. The first heat receiving surface 3611 is connected to the camera heat transfer section 3210 to transfer heat generated in the camera body 3200 to the heat dissipation module 3600. The second heat receiving surface 3651 is connected to the recorder heat transfer section 3310 to transfer heat generated in the recorder module 3300 to the heat dissipation module 3600. The heat dissipation module 3600 has a function of dissipating heat transferred from the first heat receiving surface 3611 and the second heat receiving surface 3651 to the outside. Details of the heat dissipation module 3600 will be described hereinafter.

Next, the function of the heat dissipation module 3600 of the system camera 3500 will be described with reference to FIGS. 34A to 34C. In the system camera 3500, the camera heat transfer section 3210 of the camera body 3200 and the first heat receiving surface 3611 of the heat dissipation module 3600 are connected to each other, and the heat dissipation module 3600 dissipates heat transferred from the first heat receiving surface 3611 to the outside. Thus, when the heat dissipation module 3600 is assembled in the system camera 3100, the heat dissipation module 3600 dissipates heat transferred from the front surface and the rear surface to the outside, and when the heat dissipation module 3600 is assembled in the system camera 3500, the heat dissipation module 3600 dissipates heat transferred only from the front surface to the outside.

The heat dissipation module 3600 changes the heat dissipation method depending on these two different forms of use thereof, and has a function of performing efficient heat dissipation in each form of use. This function will be described with reference to the structure of the heat dissipation module 3600. In the following description, a form of use of the heat dissipation module 3600, which provides the optimum heat discharging method when the heat dissipation module 3600 is assembled in the system camera 3100, is referred to as the first form of use, and a form of use of the heat dissipation module 3600, which provides the optimum heat discharging method when the heat dissipation module 3600 is assembled in the system camera 3500, is referred to as the second form of use.

Figure 35A:
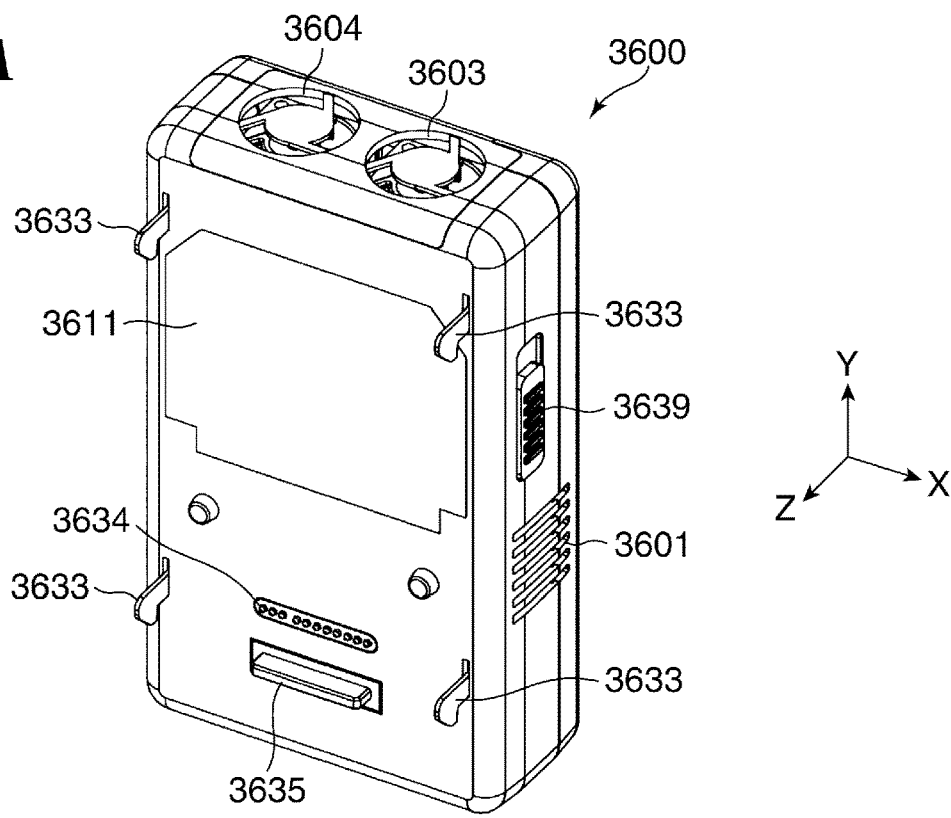
FIGS. 35A and 35B are perspective views each showing the appearance of a heat dissipation module.
Figure 35B:
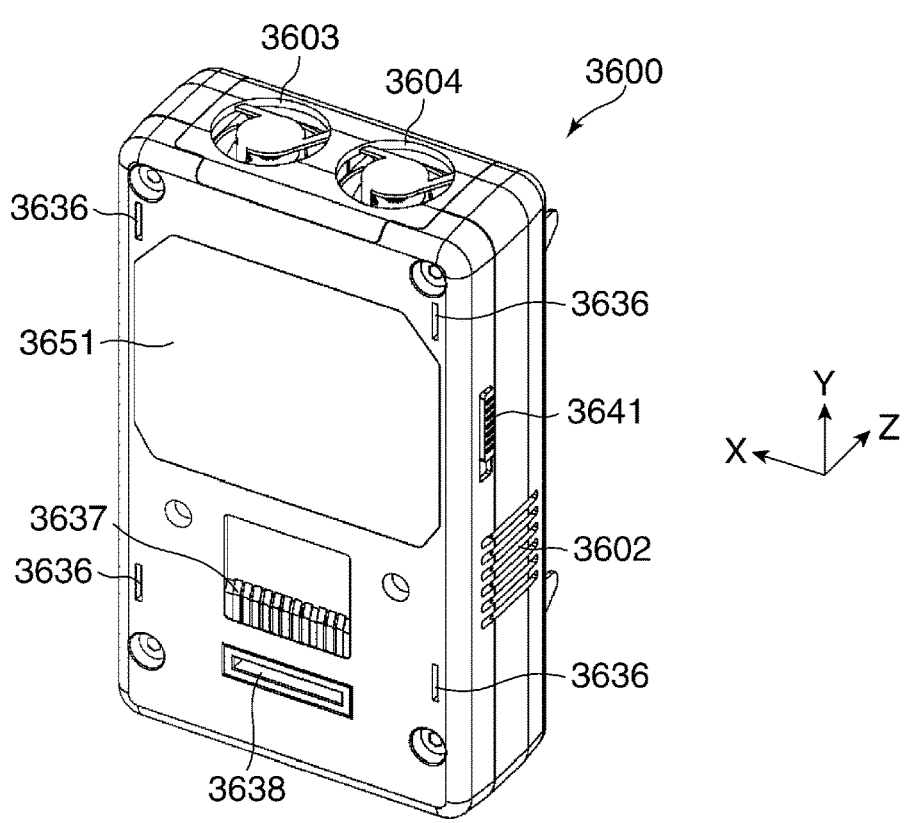

FIG. 35A is a perspective view of the heat dissipation module 3600, as viewed from the front. FIG. 35B is a perspective view of the heat dissipation module 3600, as viewed from the rear. The first heat receiving surface 3611 is exposed on the front surface of the heat dissipation module 3600, and the second heat receiving surface 3651 is exposed on the rear surface of the heat dissipation module 3600. The heat dissipation module 3600 has opposite lateral sides (side surfaces) formed with a first ventilation port 3601 and a second ventilation port 3602, each in the form of slits, respectively, and a top (top surface) formed with a first outlet port 3603 and a second outlet port 3604. The lateral side (side surface) of the heat dissipation module 3600, formed with the second ventilation port 3602, is provided with an operating portion 3641. The operating portion 3641 will be described hereinafter.

On the front side (front surface) of the heat dissipation module 3600, there are arranged the hooks 3633 as the engaging mechanism, and a male-side data signal terminal 3634 and a male-side power supply terminal 3635 as an electrical connection mechanism. The hooks 3633, the male-side data signal terminal 3634, and the male-side power supply terminal 3635 form the male-side interface of the above-mentioned common engagement interface. The hooks 3633 are arranged in four approximate corners of the module casing such that they each extend in the positive direction of the Z-axis, and are each formed with an engaging lug extending in the negative direction of the Y-axis. Further, each hook 3633 is urged in the negative direction of the Y-axis by a spring, not shown, and is on standby in a state brought into abutment with a predetermined abutting portion. By operating a hook operation knob 3639 on the lateral side of the heat dissipation module 3600, it is possible to slidably move the hooks 3633 in the positive direction of the Y-axis against the spring force.

On the rear side (rear surface) of the heat dissipation module 3600, there are arranged the slits 3636, a female-side data signal terminal 3637, and a female-side power supply terminal 3638. The slits 3636, the female-side data signal terminal 3637, and the female-side power supply terminal 3638 form the female-side interface of the above-mentioned common engagement interface. The slits 3636 are rectangular holes in which the hooks 36331 are inserted, respectively, and are each formed with an engaged surface, not shown, with which the lug of an associated one of the hooks 3633 is engaged at an inner end of the slit.

In a state in which the male-side interface and the female-side interface are connected to each other, the hooks 3633 are engaged in the slits 3636. Further, electrical contacts of the male-side data signal terminal 3634 are brought into contact with electrical contacts of the female-side data signal terminal 3637, respectively, with a predetermined contact pressure, and electrical contacts of the male-side power supply terminal 3635 are brought into contact with electrical contacts of the female-side power supply terminal 3638, respectively, with a predetermined contact pressure, whereby the terminals are electrically connected such that data signals and electric power can be transmitted and received.

Figure 36A:
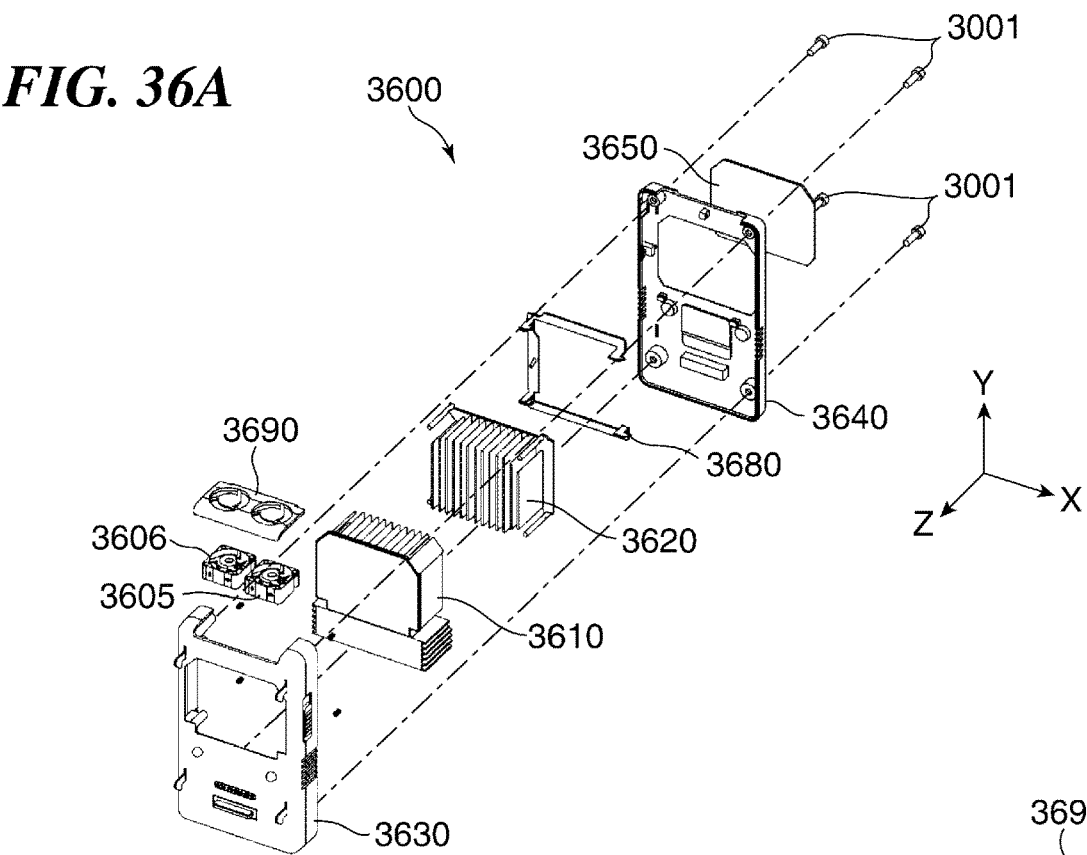
FIGS. 36A and 36B are exploded perspective views of the heat dissipation module.
Figure 36B:
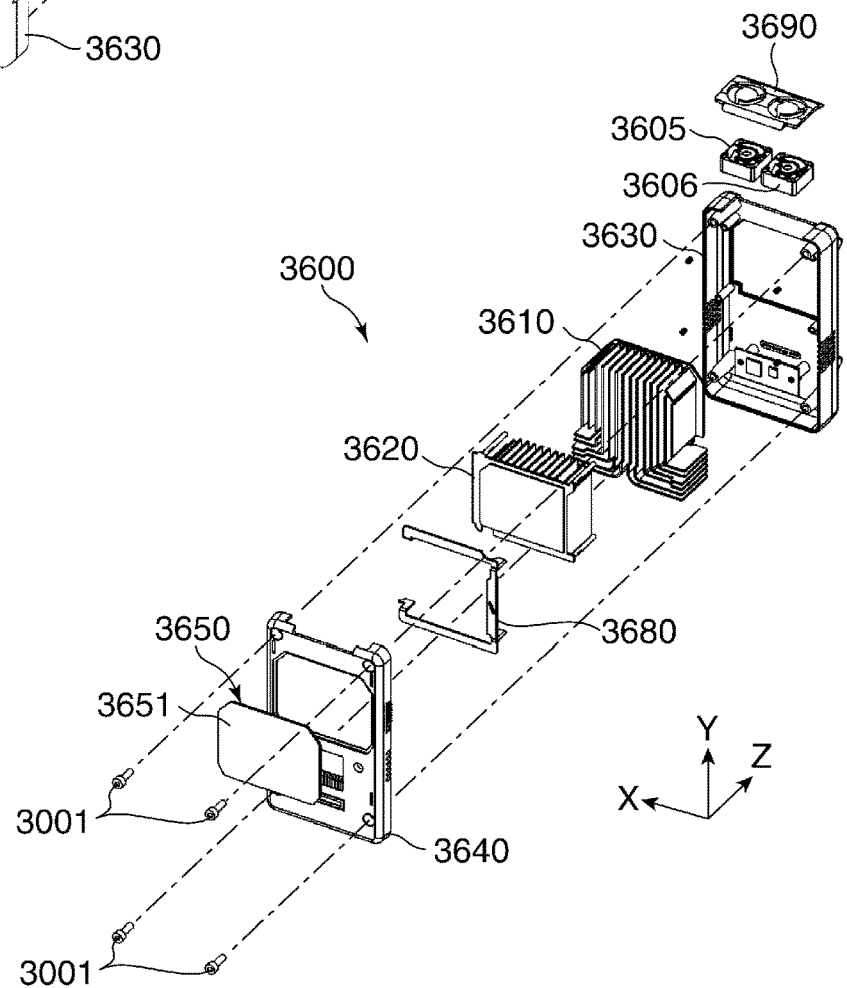

FIG. 36A is an exploded perspective view of the heat dissipation module 3600, as viewed from the front. FIG. 36B is an exploded perspective view of the heat dissipation module 3600, as viewed from the rear. The heat dissipation module 3600 is mainly comprised of the following components: A front case 3630 mainly forms the front side appearance of the heat dissipation module 3600. A rear case 3640 mainly forms the rear side appearance of the heat dissipation module 3600. A top cover 3690 mainly forms the top side appearance of the heat dissipation module 3600.

A first heat sink 3610 and a second heat sink 3620 form a path for transferring heat from the outside of the heat dissipation module 3600, and further form a passage of air within the heat dissipation module 3600. A first fan 3605 and a second fan 3606 are arranged under the top cover 3690. Operation of the first fan 3605 and the second fan 3606 causes air to flow through the passage within the heat dissipation module 3600.

A movable mechanism member 3680 is a component of a movable mechanism of the second heat sink 3620. The second heat sink 3620 assumes different positions in the Z-axis direction depending on the first form of use and the second form of use. The first form of use and the second form of use can be switched by the movable mechanism member 3680. Details of the movable mechanism will be described hereinafter.

A rear plate 3650 is fixed to the rear case 3640, and serves to transfer heat from a module mounted to the rear side (rear surface) of the heat dissipation module 3600 to the inside of the heat dissipation module 3600. As shown in FIG. 36B, the rear side of the rear plate 3650 forms the second heat receiving surface 3651. The heat dissipation module 3600 is formed by assembling the above-mentioned components, and fastening the front case 3630 and the rear case 3640 with fastening screws 3001.

Figure 37A:
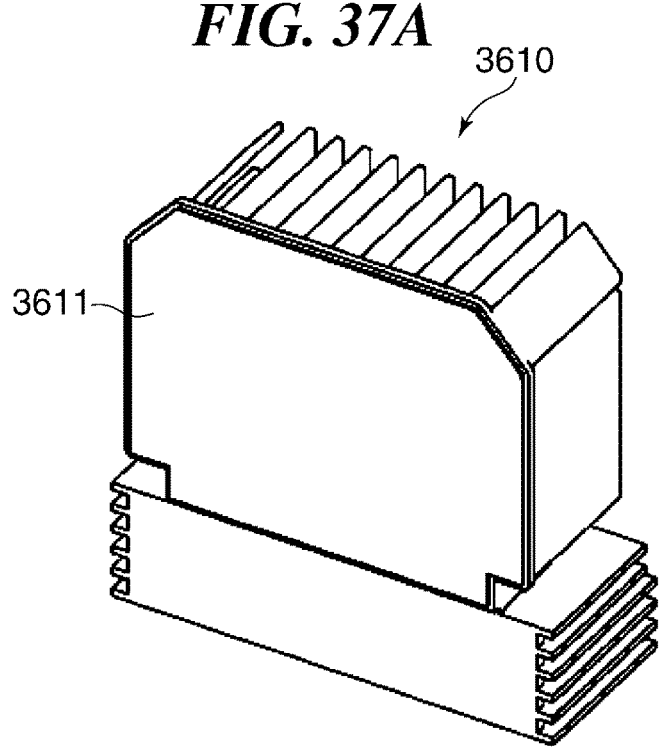
FIGS. 37A and 37B are perspective views of a first heat sink.
Figure 37B:
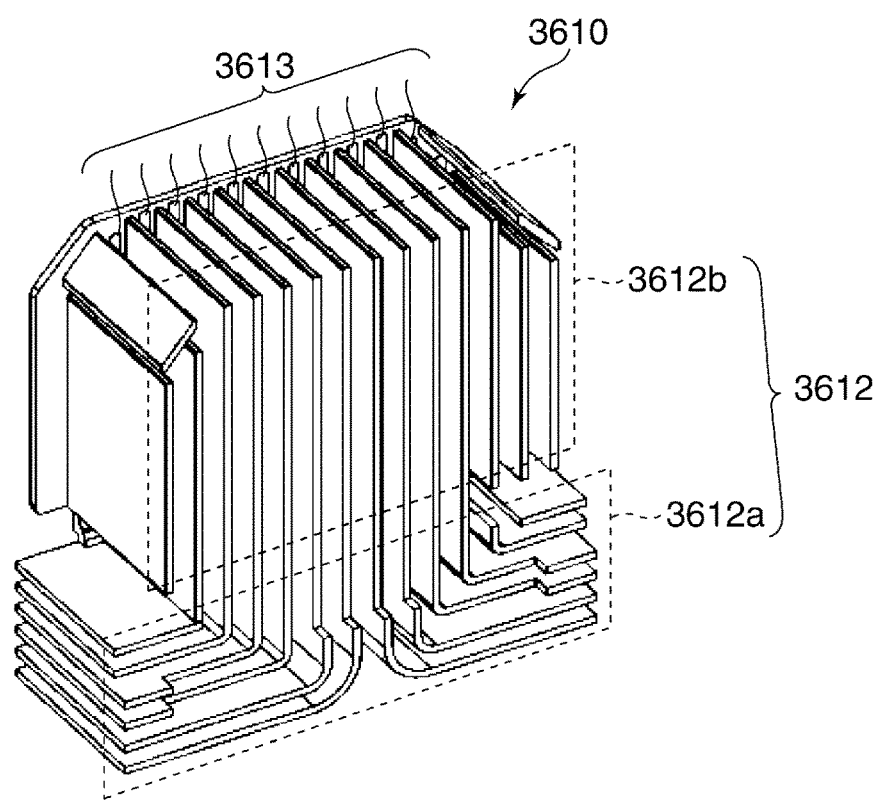

FIG. 37A is a perspective view of the first heat sink 3610, as viewed from the front. FIG. 37B is a perspective view of the first heat sink 3610, as viewed from the rear. The first heat sink 3610 is a radiator made of a material having high thermal conductivity, such as aluminum for die casting, and has the first heat receiving surface 3611 exposed to the outside of the heat dissipation module 3600. On a side of the first heat sink 3610 opposite to the first heat receiving surface 3611, there is formed a first heat dissipation fin section 3612 comprised of a large number of fins erected. The first heat dissipation fin section 3612 includes a horizontal fin part 3612*a* extending in a substantially horizontal direction and a vertical fin part 3612*b* extending in a substantially vertical direction. Elastic bodies 3613 formed of heat dissipation rubber are each disposed between adjacent ones of the fins of the vertical fin part 3612*b*. The elastic bodies 3613 will be described hereinafter.

Figure 38A:
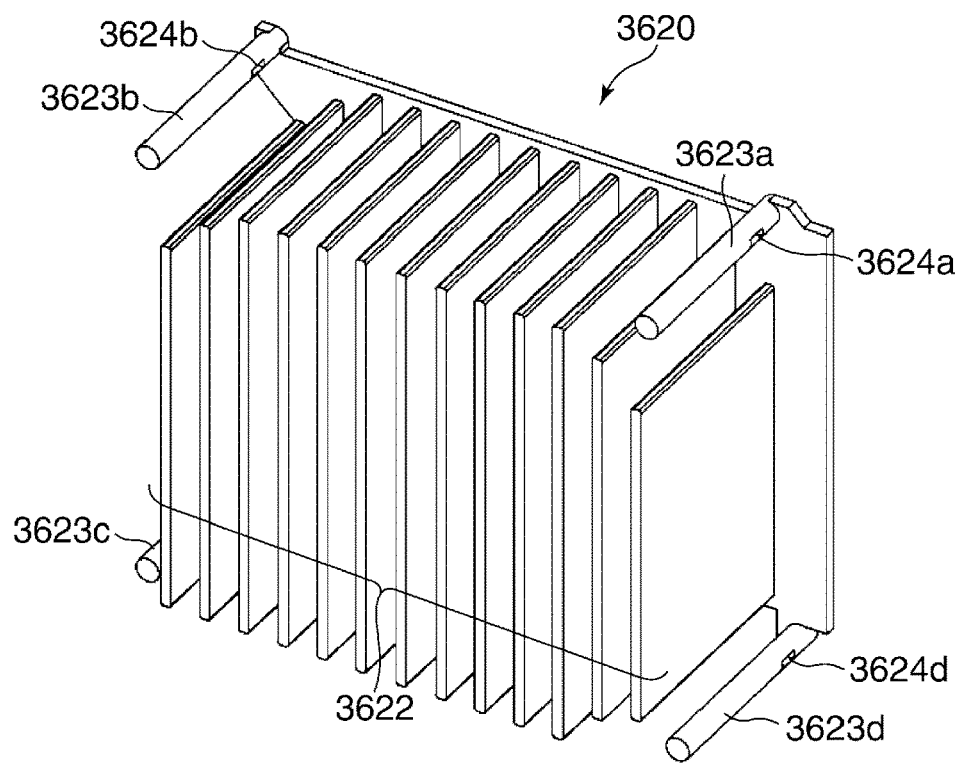
FIGS. 38A and 38B are perspective views of a second heat sink.
Figure 38B:
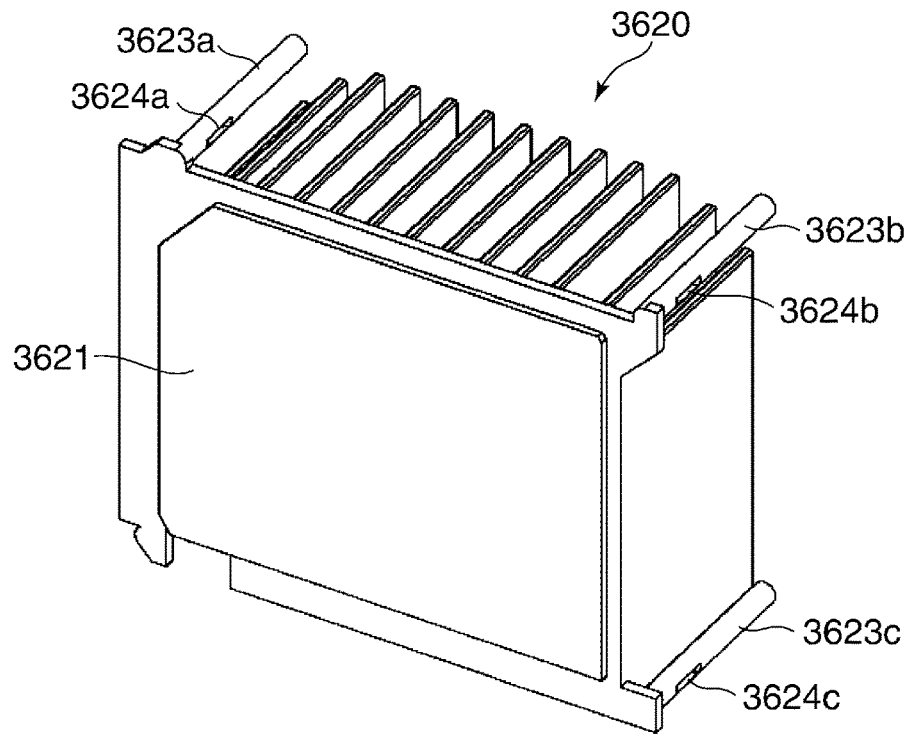

FIG. 38A is a perspective view of the second heat sink 3620, as viewed from the front. FIG. 38B is a perspective view of the second heat sink 3620, as viewed from the rear. Similar to the first heat sink 3610, the second heat sink 3620 is a radiator made of a material having high thermal conductivity, such as aluminum for die casting. The second heat sink 3620 has an internal heat receiving surface 3621, and on a side of the first heat sink 3620 opposite to the internal heat receiving surface 3621, there is formed a second heat dissipation fin section 3622 comprised of a large number of fins erected each extending in the vertical direction.

The second heat sink 3620 has first to fourth shaft portions 3623*a* to 3623*d* arranged in the four corners. Further, the first to fourth shaft portions 3623*a* to 3623*d* are formed with first to fourth slits 3624*a* to 3624*d*, respectively, each in the form of a through groove. The function of the first to fourth shaft portions 3623*a* to 3623*d* and the first to fourth slits 3624*a* to 3624*d* will be described hereinafter.

Figure 39:
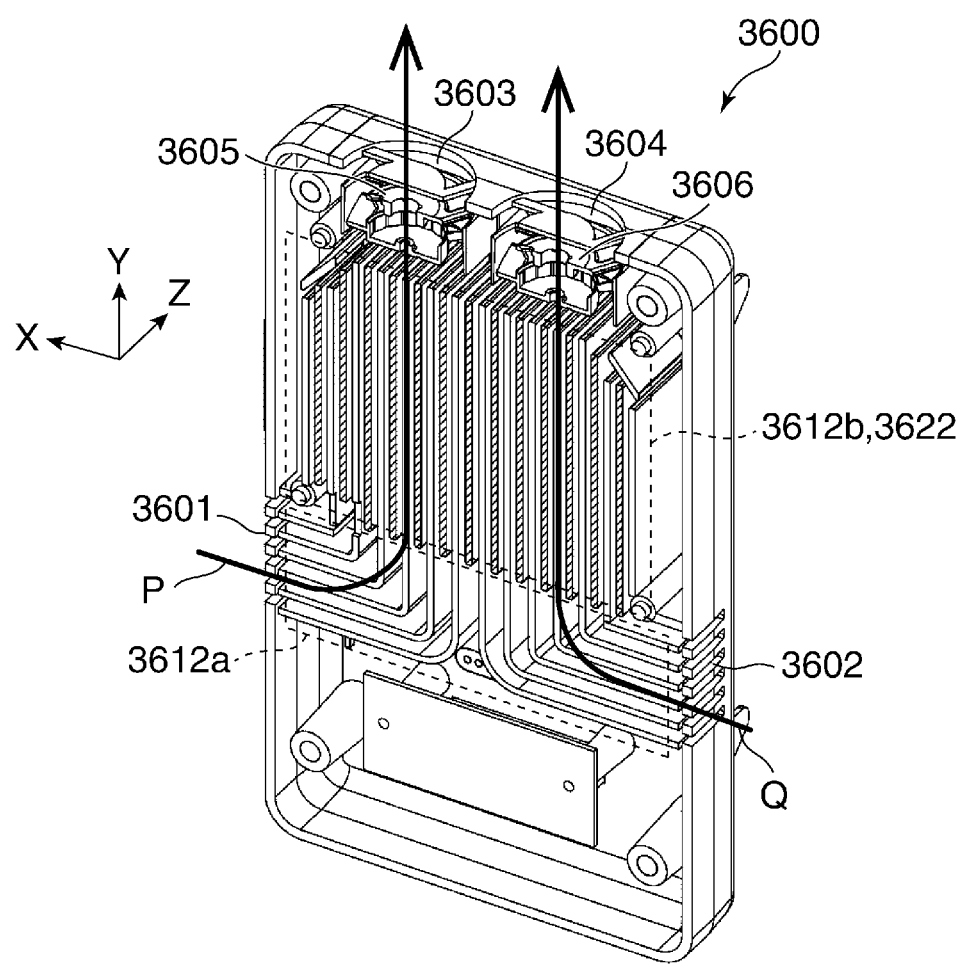
FIG. 39 is a perspective view useful in explaining airflow paths in the heat dissipation module.

FIG. 39 is a perspective view useful in explaining airflow paths in the heat dissipation module 3600. Directions of airflows in the heat dissipation module 3600 are schematically indicated by arrows P and Q. The first heat dissipation fin section 3612 has the horizontal fin part 3612*a* thereof connected to the first ventilation port 3601 and the second ventilation port 3602 formed in the lateral sides (side surfaces) of the heat dissipation module 3600, to thereby introduce air outside the heat dissipation module 3600 into the heat dissipation module 3600 in the horizontal direction.

The vertical fin part 3612*b* of the first dissipation fin part 3612 causes the introduced air to flow upward, and the second heat dissipation fin section 3622 is disposed at a location which substantially coincides with the vertical fin part 3612*b* in the top-bottom direction and is displaced therefrom in the left-right direction. The fins of the first dissipation fin part 3612 and those of the second heat dissipation fin section 3622 have the same fin pitch, and are arranged such that the fins of the second heat dissipation fin section 3622 are inserted between associated ones of the fins of the vertical fin part 3612*b* of the first dissipation fin part 3612. In FIG. 39, hatching indicates the cross section of each fin of the second heat dissipation fin 3622. The fins of the vertical fin part 3612*b* and the fins of the second heat dissipation fin section 3622 inserted therebetween form passages for guiding air upward from the bottom.

The first fan 3605 and the second fan 3606 are arranged in the vicinities of the first outlet port 3603 and the second outlet port 3604, respectively. The first fan 3605 and the second fan 3606 are operated to guide air from the bottom upward to the first outlet port 3603 and the second outlet port 3604, respectively.

By thus forming the airflow path, air outside the heat dissipation module 3600 is drawn from the first ventilation port 3601 and the second ventilation port 3602 into the heat dissipation module 3600 by the operations of the first fan 3605 and the second fan 3606. Then, the drawn air is guided to the first fan 3605 and the second fan 3606 by the first heat dissipation fin section 3612 and the second heat dissipation fin section 3622, and is discharged from the first outlet port 3603 and the second outlet port 3604 to the outside of the heat dissipation module 3600.

As described above, the first heat sink 3610 and the second heat sink 3620 receive heat from the outside of the heat dissipation module 3600, and are warmed. The heat dissipation module 3600 cools the first heat sink 3610 and the second heat sink 3620 by causing outside air to flow through the above-mentioned passages. As a result, the heat dissipation module 3600 performs a function of receiving heat from the outside and dissipating the received heat.

Although the outline of the airflow path in the heat dissipation module 3600 has been described above, the position of the second heat dissipation fin section 3622 in the Z-axis direction is different between the first form of use and the second form of use, and hence the airflow path is partially different between the first form of use and the second form of use.

The following description will be given of a difference in the position of the second heat dissipation fin section 3622 and a difference in the airflow path, between the first form of use and the second form of use. Further, the heat transfer path in the first form of use and the heat transfer path in the second form of use will be described.

Figure 40:
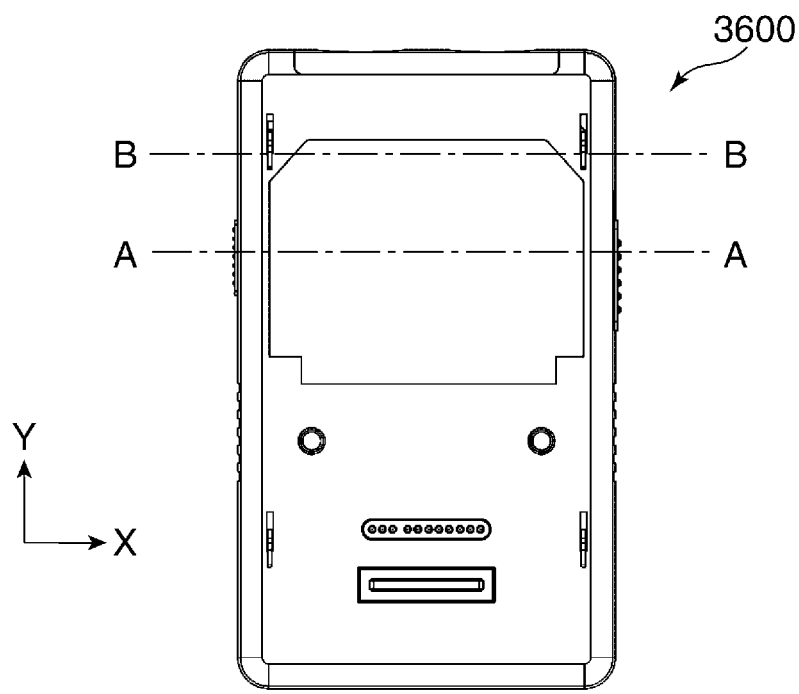
FIG. 40 is a front view of the heat dissipation module.
Figure 41A:
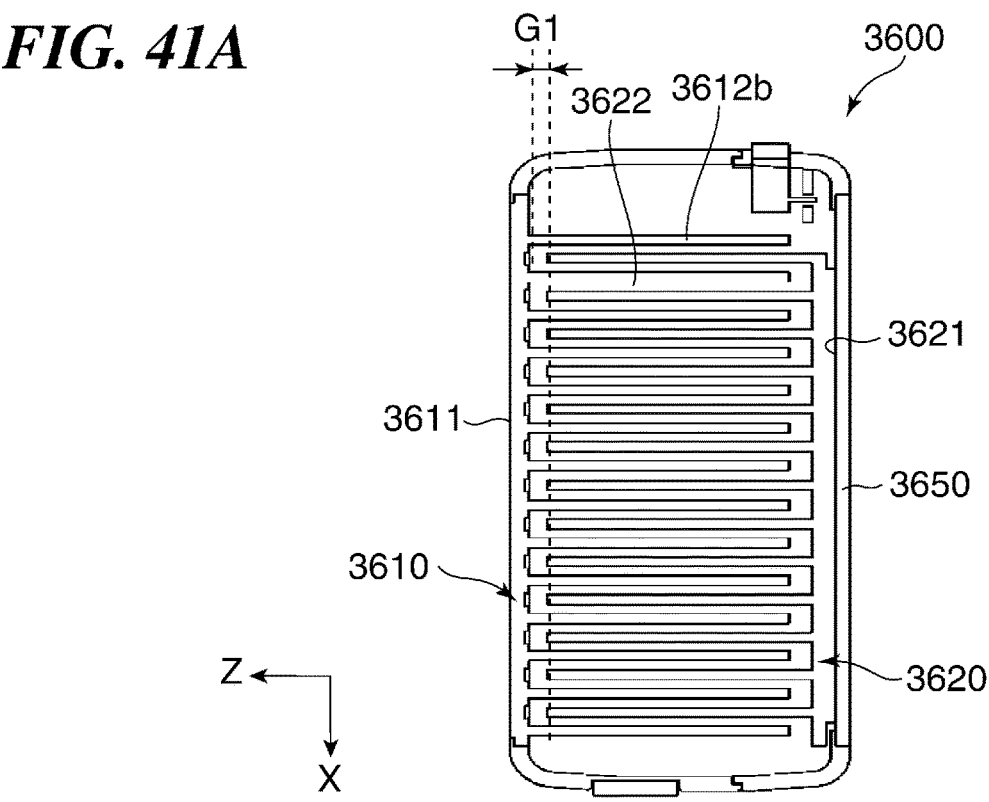
FIGS. 41A and 41B are cross-sectional views of the heat dissipation module.
Figure 41B:
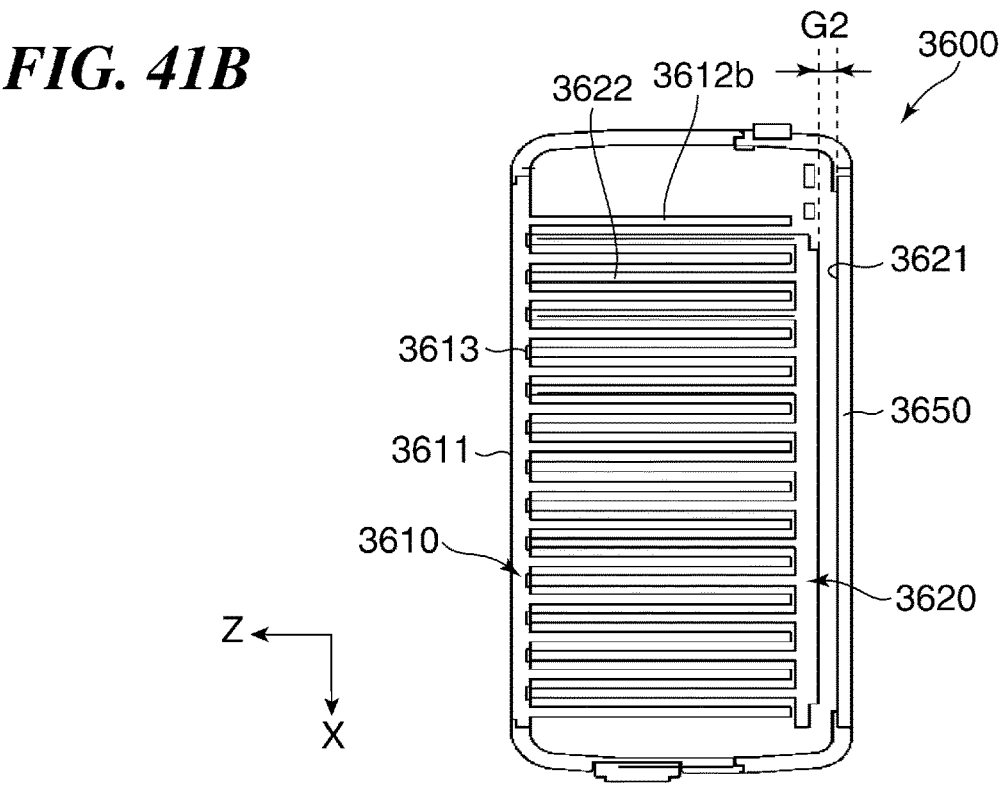

FIG. 40 is a front view of the heat dissipation module 3600. FIG. 41A is a cross-sectional view taken along A-A in FIG. 40 in the first form of use. FIG. 41B is a cross-sectional view taken along A-A in FIG. 40 in the second form of use. As shown in FIG. 41A, in the first form of use, the second heat sink 3620 is in a position shifted in the negative direction of the Z-axis (rearward) such that the internal heat receiving surface 3621 is brought into contact with the rear plate 3650. At this time, a space G1 is formed in the Z-axis direction between the front end of the second heat dissipation fin section 3622 and the first heat sink 3610.

As shown in FIG. 41B, in the second form of use, the second heat sink 3620 is in a position shifted in the positive direction of the Z-axis (frontward) such that the front ends of the fins of the second heat dissipation fin section 3622 are brought into contact with the first heat sink 3610. At this time, a space G2 is formed in the Z-axis direction between the internal heat receiving surface 3621 and the rear plate 3650. The fins of the second heat dissipation fin section 3622 are brought into contact with respective associated one of the elastic bodies 3613 of the first heat sink 3610.

Figure 42:
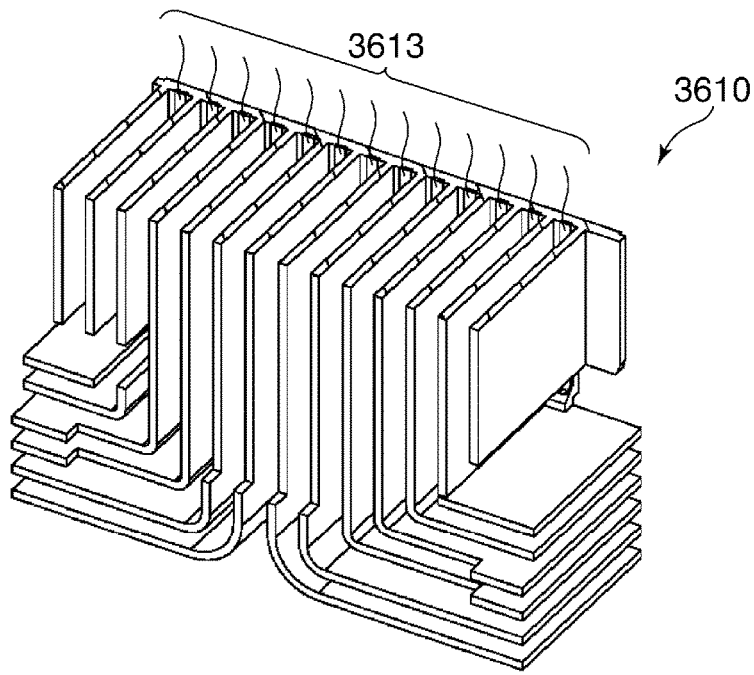
FIG. 42 is a perspective view of the first heat sink, showing where elastic bodies are arranged.

FIG. 42 is a perspective view of the first heat sink 3610, showing where the elastic bodies 3613 are arranged. Each elastic body 3613 is formed to fill the recess between each adjacent ones of the fins of the first heat dissipation fin section 3612, as shown in FIG. 42.

Next, the difference of the heat transfer path between the first form of use and the second form of use will be described with reference to FIGS. 41A and 41B. In the first form of use, heat transferred from the camera heat transfer section 3210 (see FIG. 33C) to the first heat receiving surface 3611 is transferred to the first heat dissipation fin section 3612. Further, heat transferred from the recorder heat transfer section 3310 (see FIG. 33B) to the second heat receiving surface 3651 is further transferred from the rear plate 3650 to the internal heat receiving surface 3621 of the second heat sink 3620, and then transferred to the second heat dissipation fin section 3622. The heat transferred to the heat dissipation fin sections 3612 and 3622 is transferred to air drawn from the outside by the first fan 3605 and the second fan 3606, and is discharged to the outside.

As described above, in the first form of use, when heat is transferred from the both sides of the first heat receiving surface 3611 and the second heat receiving surface 3651, it is possible to efficiently dissipate heat by the two heat sinks 3610 and 3620. For this reason, the first form of use is suitable for a system in which the heat sources are mounted on the front and rear sides of the heat dissipation module 3600, such as the system camera 3100.

In the second form of use, heat transferred from the camera heat transfer section 3210 (see FIG. 34C) to the first heat receiving surface 3611 is transferred to the first heat dissipation fin section 3612. Further, heat from the camera heat transfer section 3210 is also transferred to the second heat sink 3620 by the elastic bodies 3613 as the contact portions between the front ends of the fins of the second heat dissipation fin section 3622 and the first heat sink 3610. That is, the first heat sink 3610 and the second heat sink 3620 are connected, whereby a heat sink having a large surface area is formed.

For this reason, it is possible to more efficiently dissipate heat by using the two heat sinks of the first heat sink 3610 and the second heat sink 3620 than by dissipating heat transferred to the first heat receiving surface 3611 using only the first heat sink 3610. Therefore, the second form of use is suitable for a system in which heat sources are mounted only on the front side (front surface) of the heat dissipation module 3600, such as the system camera 3500.

Further, as shown in FIG. 34C, in the system camera 3500, the second heat receiving surface 3651 of the heat dissipation module 3600 is exposed on the appearance. However, in the second form of use, the second heat sink 3620 and the rear plate 3650 forming the second heat receiving surface 3641 are not thermally connected. Therefore, heat from the camera body 3200 is prevented from being transferred to the second heat receiving surface 3651, which prevents the externally appearing portion i.e. the second heat receiving surface 3651 from becoming too hot for the user of the system camera 3500.

Note that it is desirable to form each elastic body 3613 using a material which is low in contact thermal resistance, and has elasticity, such as heat dissipation rubber. By forming the elastic bodies 3613 using such a material, it is possible to efficiently transfer heat from the first heat sink 3610 to the second heat sink 3620 via the elastic bodies 3613. Note that each elastic body 3613 may be formed of a cushioning material which does not have high heat transfer performance, other than the material, such as heat dissipation rubber. By sufficiently compressing and deforming the elastic body 3613 to make the first heat sink 3610 and the second heat sink 3620 close to each other, it is possible to transfer heat from the first heat sink 3610 to the second heat sink 3620.

Next, the difference of the airflow path between the first form of use and the second form of use will be described. The second heat dissipation fin section 3622 assumes a different position in the Z-axis direction, whereby the airflow path in an overlapping area, appearing in FIG. 39, of the vertical fin part 3612b and the second heat dissipation fin section 3622 is made different.

A shown in FIG. 41A, in the first form of use, air flows between the fins of the vertical fin part 3612b and the fins of the second heat dissipation fin section 3622 in the above-mentioned overlapping area. As shown in FIG. 41B, in the second form of use, there is a space between the internal heat receiving surface 3621 and the rear plate 3650 in the above-mentioned overlapping area and hence this space also forms an airflow passage, where air flows. Air also flows between the fins of the vertical fin part 3612b and the fins of the second heat dissipation fin section 3622.

As described above, the second heat sink 3620 is positioned closer to the first heat sink 3610 in the second form of use than in the first form of use, and the space formed between the internal heat receiving surface 3621 and the rear plate 3650 by the amount of movement of the second heat sink 3620 functions as the airflow passage. Therefore, it is possible to secure the cross-sectional area of the airflow path, which is substantially equal between the first form of use and the second form of use, with a small change in the ventilation resistance.

Figure 43A:
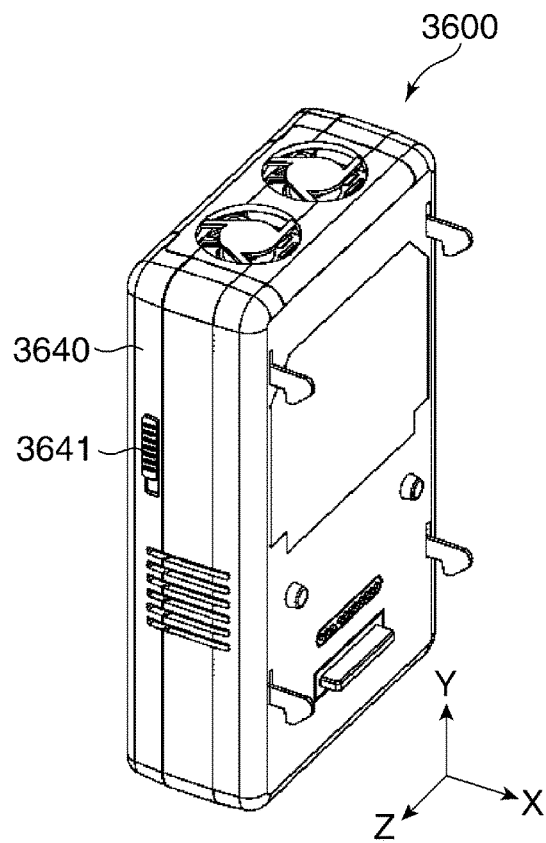
FIGS. 43A and 43B are perspective views of the heat dissipation module in a first form of use and a second form of use, respectively.

Next, the operation and the mechanism for changing the position of the second heat sink 3620 in the front-rear direction will be described. FIG. 43A is a perspective view of the heat dissipation module 3600 in the first form of use, as viewed from the front, and FIG. 43B is a perspective view of the heat dissipation module 3600 in the second form of use, as viewed from the front.

Figure 43B:
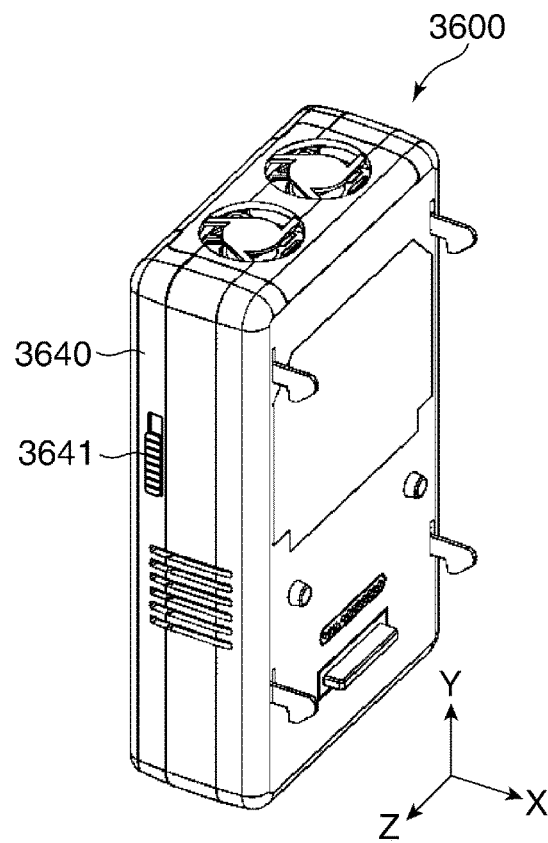

As shown in FIGS. 43A and 43B, the rear case 3640 includes the operating portion 3641. The operating portion 3641 is arranged such that it is capable of changing its vertical position with respect to the rear case 3640. When the operating portion 3641 is in an upper position as shown in FIG. 43A, the heat dissipation module 3600 takes the first form of use, and the second heat sink 3620 is in a rear position as shown in FIG. 41A. When the operating portion 3641 is in a lower position as shown in FIG. 43B, the heat dissipation module 3600 takes the second form of use, and the second heat sink 3620 is in a front position as shown in FIG. 41B. The user of the heat dissipation module 3600 can switch the form of use between the first form of use and the second form of use by operating the operating portion 3641 from the upper position to the lower position or from the lower position to the upper position. The vertical position of the operating portion 3641 is defined by a plate spring 3642 included in the heat dissipation module 3600.

Figure 44A:
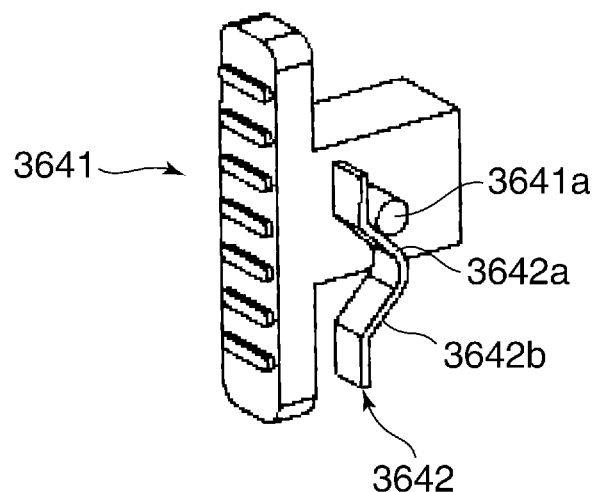
FIGS. 44A and 44B are perspective views of an operating portion and a plate spring.
Figure 44B:
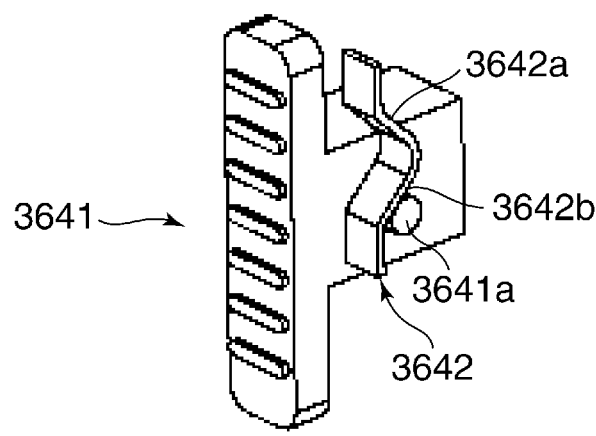

FIG. 44A is a perspective view showing a relationship between the operating portion 3641 and the plate spring 3642 in the first form of use. FIG. 44B is a perspective view showing a relationship between the operating portion 3641 and the plate spring 3642 in the second form of use. The operating portion 3641 includes a first protrusion 3641a on the front side thereof. The plate spring 3642 is formed by bending a thin plate of metal, such as stainless steel, such that it can be deformed by applying a predetermined load. As shown in FIG. 44, the plate spring 3642 has an upper inclined portion 3642a and a lower inclined portion 3642b.

In the first form of use shown in FIG. 44A, the first protrusion 3641a is brought into contact with the upper inclined portion 3642a, whereby the plate spring 3642 applies an upward urging force to the operating portion 3641. In the second form of use shown in FIG. 44B, the first protrusion 3641a is brought into contact with the lower inclined portion 3642b, whereby the plate spring 3642 applies a downward urging force to the operating portion 3641. Thus, the two positions i.e. the upper and lower positions of the operating portion 3641 are defined by the plate spring 3642.

Figure 45A:
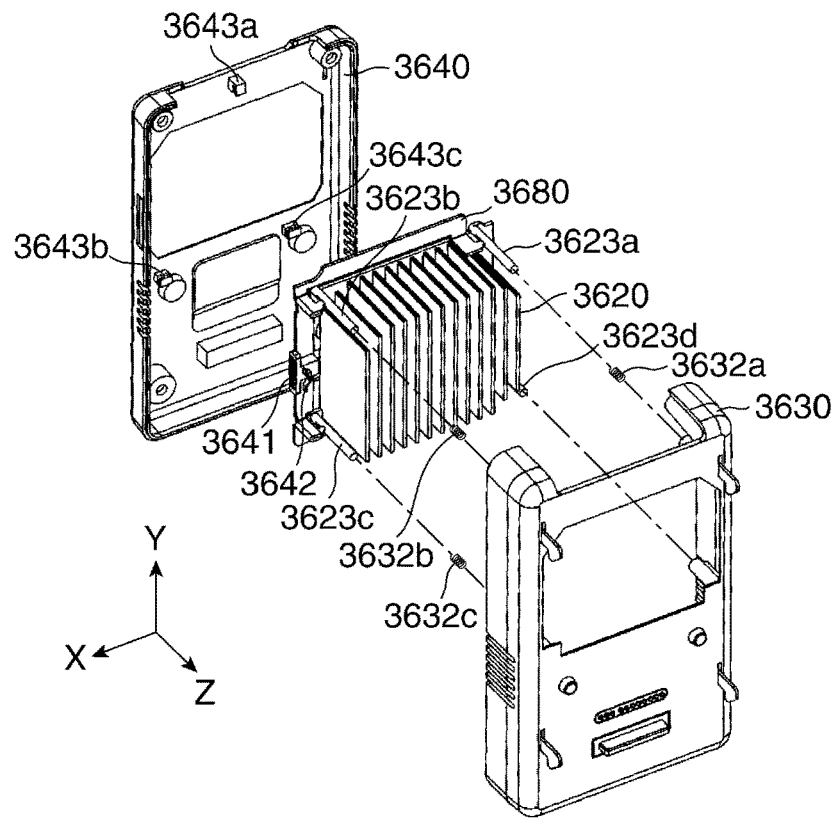
FIGS. 45A and 45B are exploded perspective views of the heat dissipation module, showing a movable mechanism in the second heat sink.
Figure 45B:
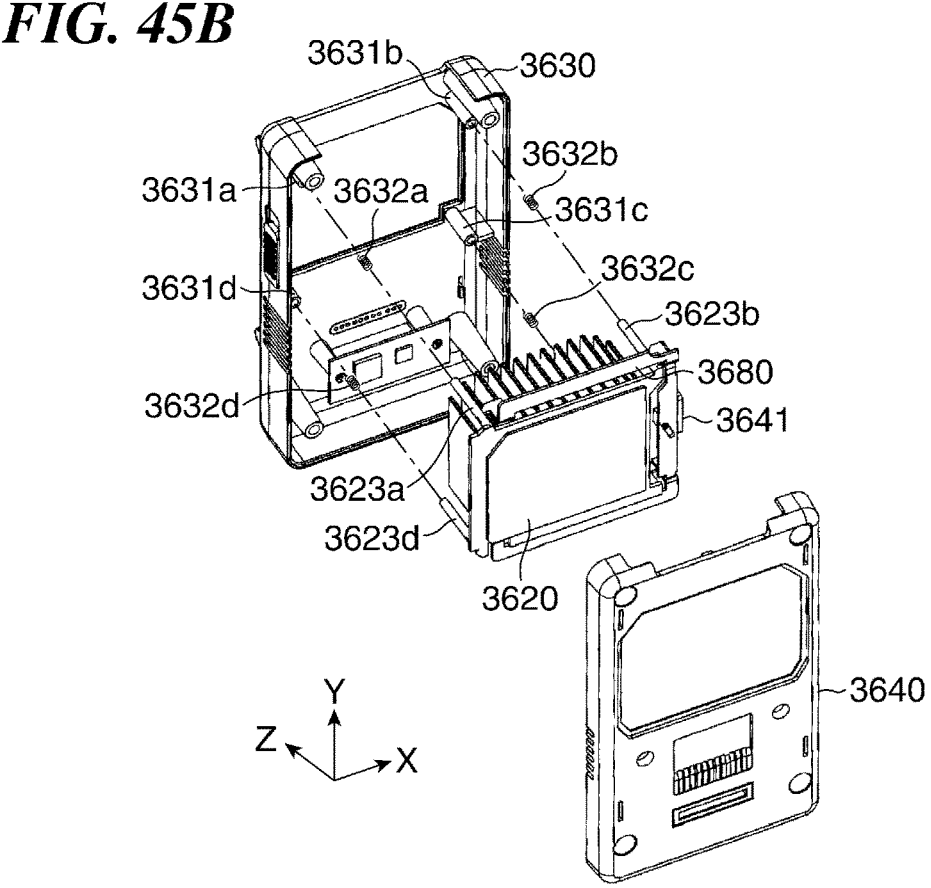

FIG. 45A is an exploded perspective view of the heat dissipation module 3600, showing the movable mechanism of the second heat sink 3620, as viewed from the front. FIG. 45B is an exploded perspective view of the heat dissipation module 3620 shown in FIG. 45A, as viewed from the rear. Note that components unnecessary for explanation of the movable mechanism are omitted from illustration.

Inside the heat dissipation module 3600, the operating portion 3641 is connected to the movable mechanism member 3680. The plate spring 3642 defines the vertical position of the operating portion 3641. The movable mechanism member 3680 is a component which is connected to the second heat sink 3620 and defines the position of the second heat sink 3620 in the front-rear direction. The movable mechanism member 3680 is held by first to third holding portions 3643a to 3643c of the rear case 3640 shown in FIG. 45A. The holding structure will be described hereinafter with reference to FIG. 47.

The front case 3630 has first to fourth holes 3631a to 3631d formed on the rear surface. The first to fourth shaft portions 3623a to 3623d of the second heat sink 3620 are inserted in the first to fourth holes 3631a to 3631d, respectively, whereby the posture and the position of the second heat sink in the X-Y directions are defined.

First to fourth springs 3632a to 3632d are also inserted in the first to fourth holes 3631a to 3631d. The first to fourth springs 3632a to 3632d are sandwiched and compressed between the front case 3630 and the first to fourth shaft portions 3623a to 3623d of the second heat sink 3620, thereby urging the second heat sink 3620 rearward.

Next, the operation for moving the movable mechanism member 3680 by the operating portion 3641 will be described.

Figure 46A:
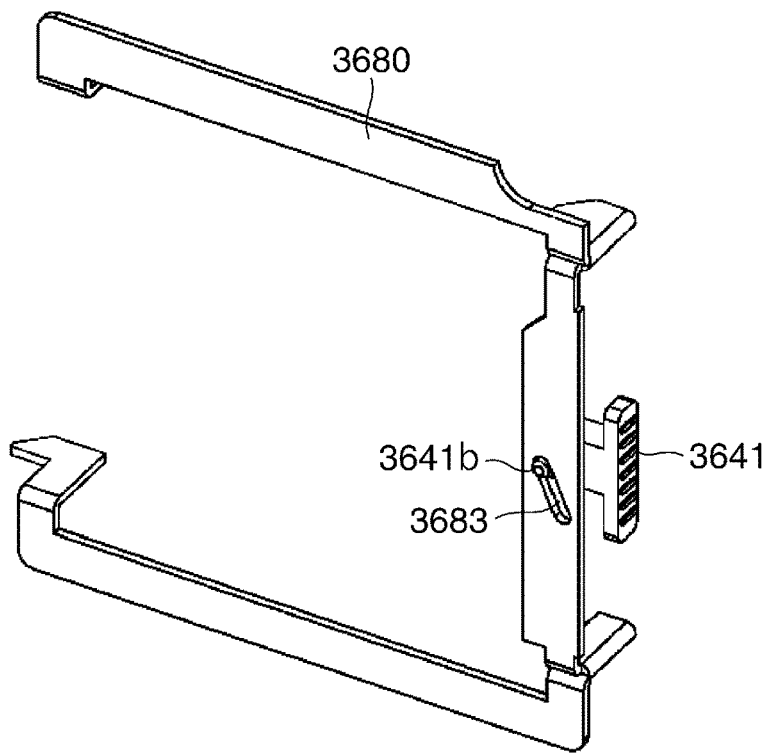
FIGS. 46A and 46B are perspective views showing connection between a movable mechanism member and the operating portion.
Figure 46B:
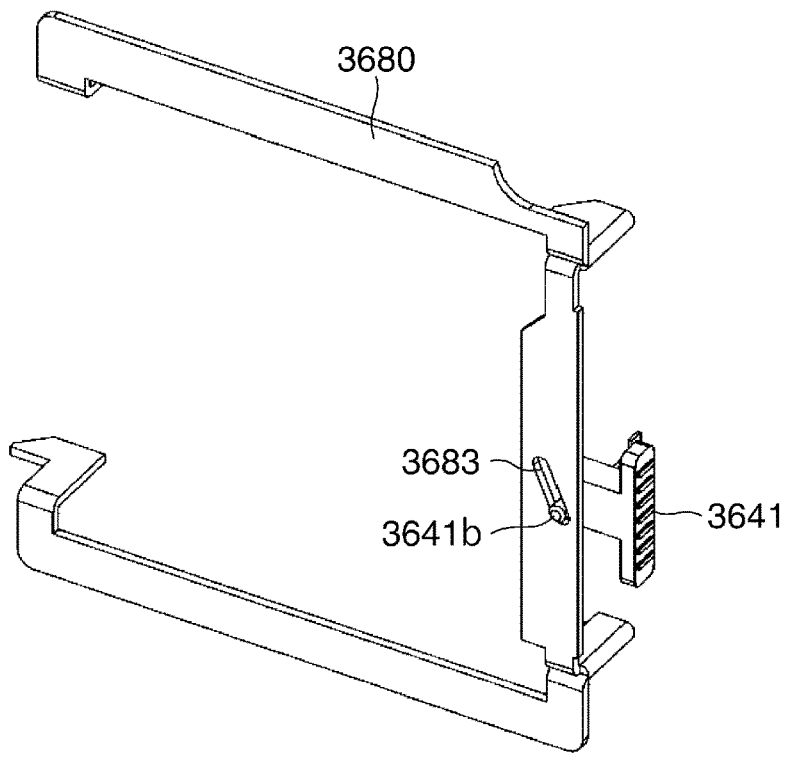
Figure 47A:
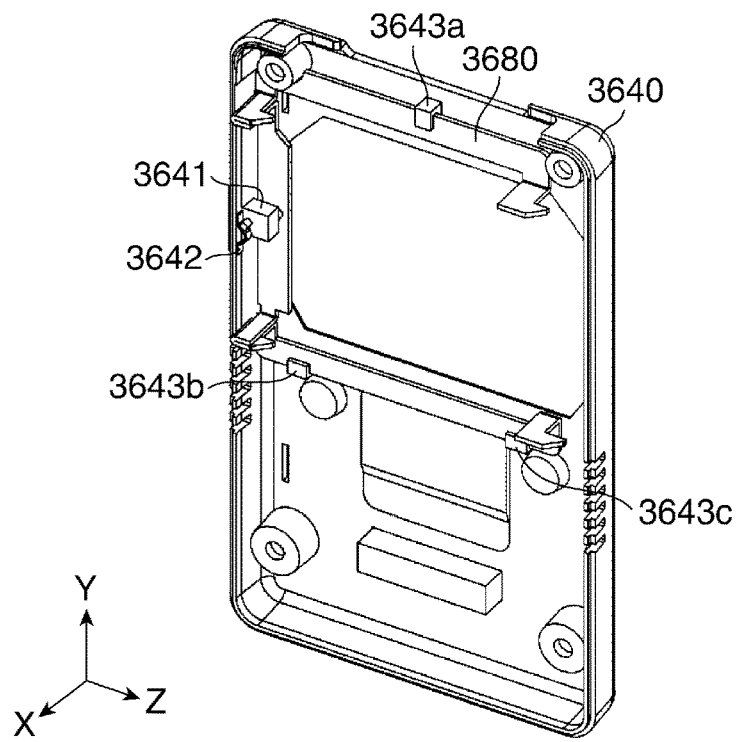
FIGS. 47A and 47B are perspective views of a rear case and the movable mechanism member.
Figure 47B:
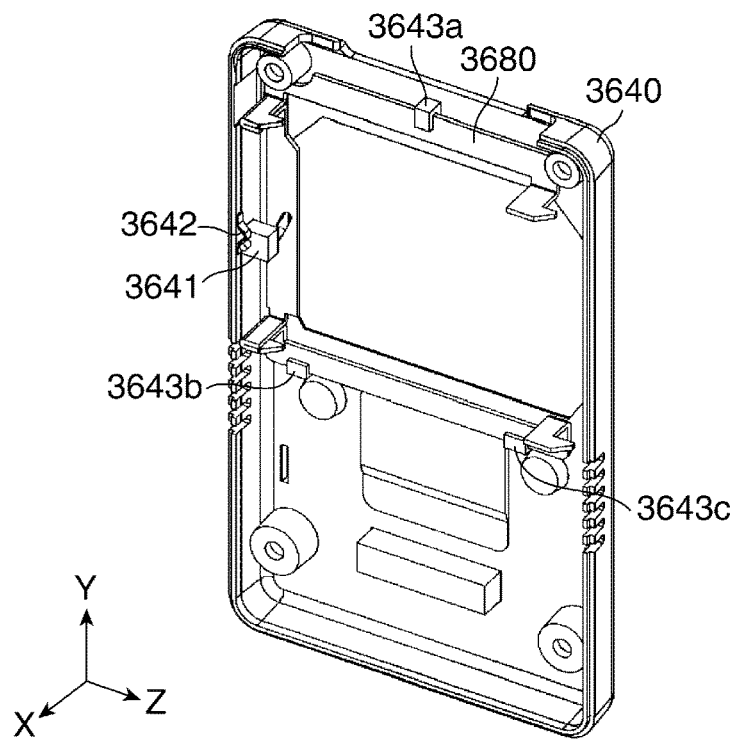

FIG. 46A is a perspective view showing connection between the movable mechanism member 3680 and the operating portion 3641 in the first form of use, as viewed from the rear. FIG. 46B is a perspective view showing connection between the movable mechanism member 3680 and the operating portion 3641 in the second form of use, as viewed from the rear. FIG. 47A is a perspective view of the movable mechanism member 3680 in the first form of use, as viewed from the front, which is useful in explaining a moving operation thereof. FIG. 47B is a perspective view of the movable mechanism member 3680 in the second form of use, as viewed from the front, which is useful in explaining a moving operation thereof.

As shown in FIG. 46, the operating portion 3641 has a second protrusion 3641b formed on the rear surface thereof, and the movable mechanism member 3680 has an oval shaped slot 3683. The second protrusion 3641b is fitted in the slot 3683.

As shown in FIGS. 47A and 47B, the movable mechanism member 3680 is held by the first to third holding portions 3643a to 3643c, whereby the movable mechanism member 3680 is restricted from moving in the Z-direction (front-rear direction) and the Y direction (top-bottom direction). The movable mechanism member 3680 can move only in the X-direction (left-right direction). Therefore, when the vertical position of the operating portion 3641 is changed as shown in FIGS. 46A and 46B, and FIGS. 47A and 47B, the position of fitting between the second protrusion 3641b and the slot 3683 is changed, and as a result, the position of the movable mechanism member 3680 in the left-right direction is changed.

More specifically, when the operating portion 3641 is in the upper position in the first form of use, the movable mechanism member 3680 is in a position shifted in the negative direction of the X-axis (leftward), whereas when the operating portion 3641 is in the lower position in the second form of use, the movable mechanism member 3680 is in a position shifted in the positive direction of the X-axis (rightward). Thus, the movable mechanism member 3680 is moved in the left-right direction according to the vertical movement of the operating portion 3641. Further, the second heat sink 3620 is moved in the front-rear direction according to the movement of the movable mechanism member 3680 in the left-right direction.

Figure 48A:
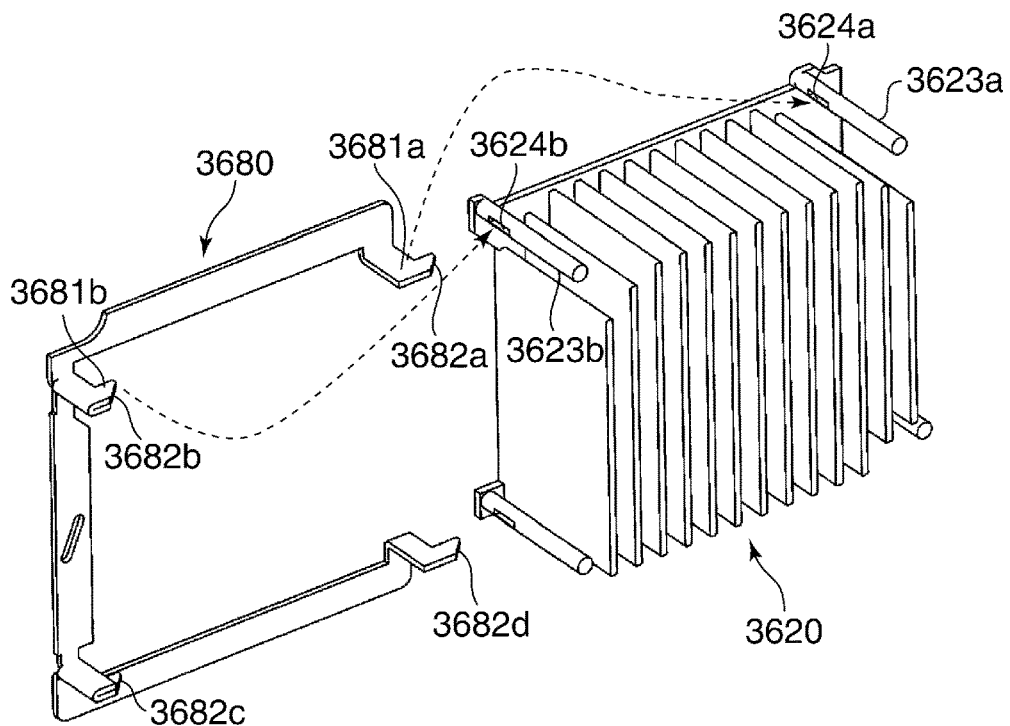
FIGS. 48A and 48B are perspective views showing a relationship between the second heat sink and the movable mechanism member.
Figure 48B:
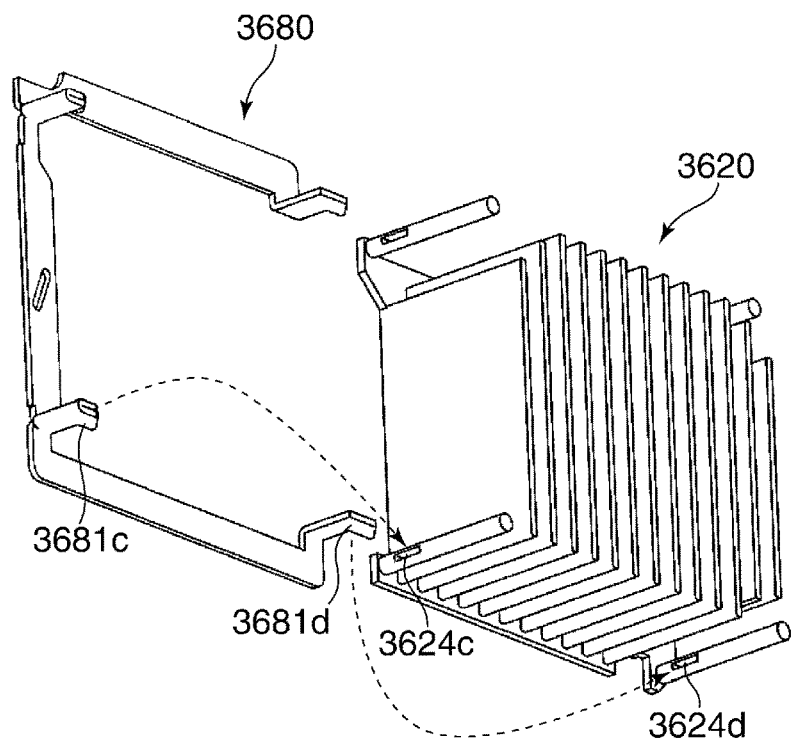

FIG. 48A is a perspective view showing a relationship between the second heat sink 3620 and the movable mechanism member 3680 as viewed from above and the front. FIG. 48B is a perspective view showing a relationship between the second heat sink 3620 and the movable mechanism member 3680 as viewed from below and the front.

As mentioned above, the second heat sink 3620 has the first to fourth slits 3624a to 3624d. The movable mechanism member 3680 is a component formed of a metallic material having high rigidity, such as stainless steel, and has first to fourth protrusions 3681a to 3681d. Further, the first to fourth protrusions 3681a to 3681d are formed with first to fourth protruding inclined surfaces 3682a to 3682d, respectively. The first to fourth protrusions 3681a to 3681d are inserted in the first to fourth slits 3624a to 3624d, respectively, whereby the position of the second heat sink 3620 is restricted by the movable mechanism member 3680.

Figure 49A:
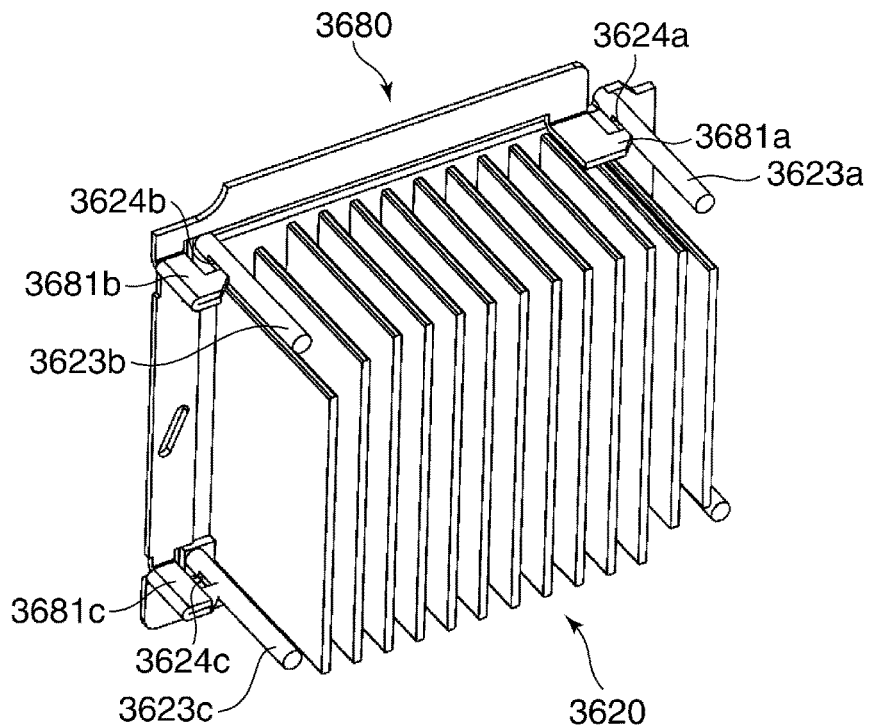
FIGS. 49A and 49B are perspective views showing the movable mechanism member in a state inserted in the second heat sink.
Figure 49B:
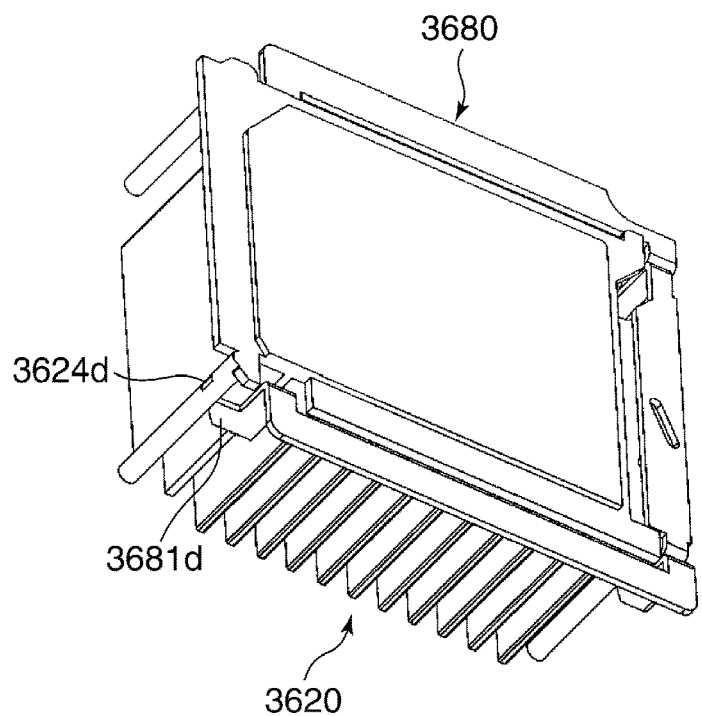

FIG. 49A is a perspective view showing a state in which the first to fourth protrusions 3681a to 3681d are inserted in the first to fourth slits 3624a to 3624d, respectively, as viewed from above and the front. FIG. 49B is a perspective view showing a state in which the first to fourth protrusions 3681a to 3681d are inserted in the first to fourth slits 3624a to 3624d, respectively, as viewed from below and the rear. In the state shown in FIGS. 49A and 49B, the operation of the movable mechanism member 3680 and the operation of the second heat sink 3620 are interlocked.

Figure 50A:
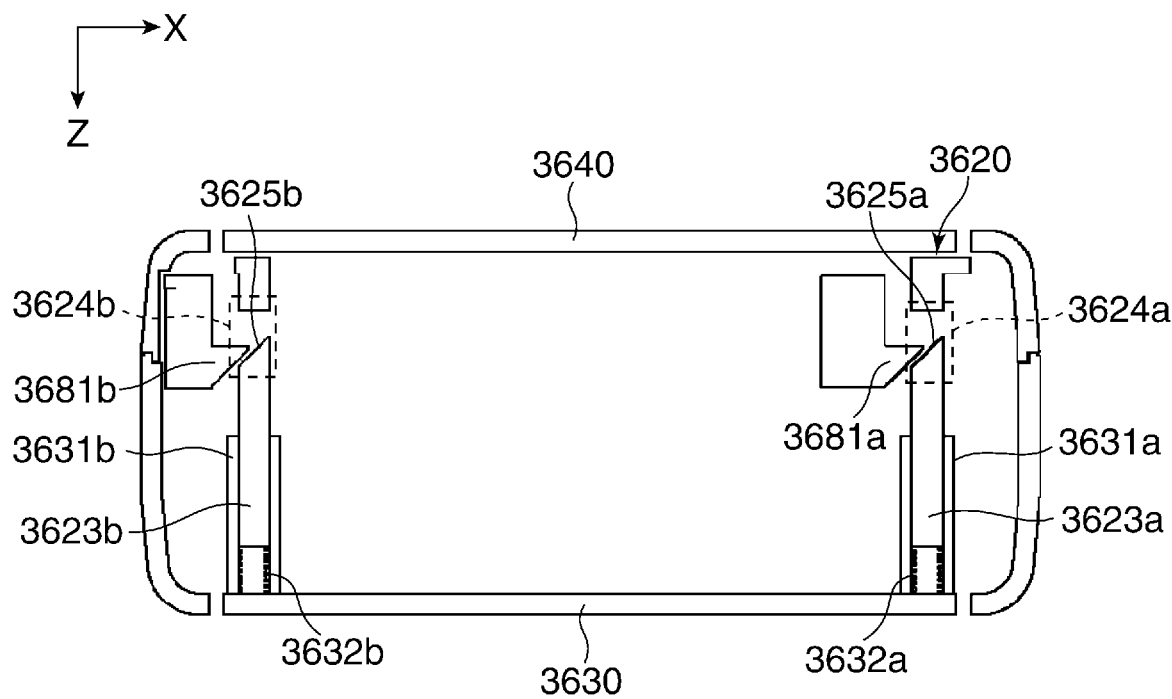
FIGS. 50A and 50B are cross-sectional views of the heat dissipation module in the first form of use and the second form of use, respectively.
Figure 50B:
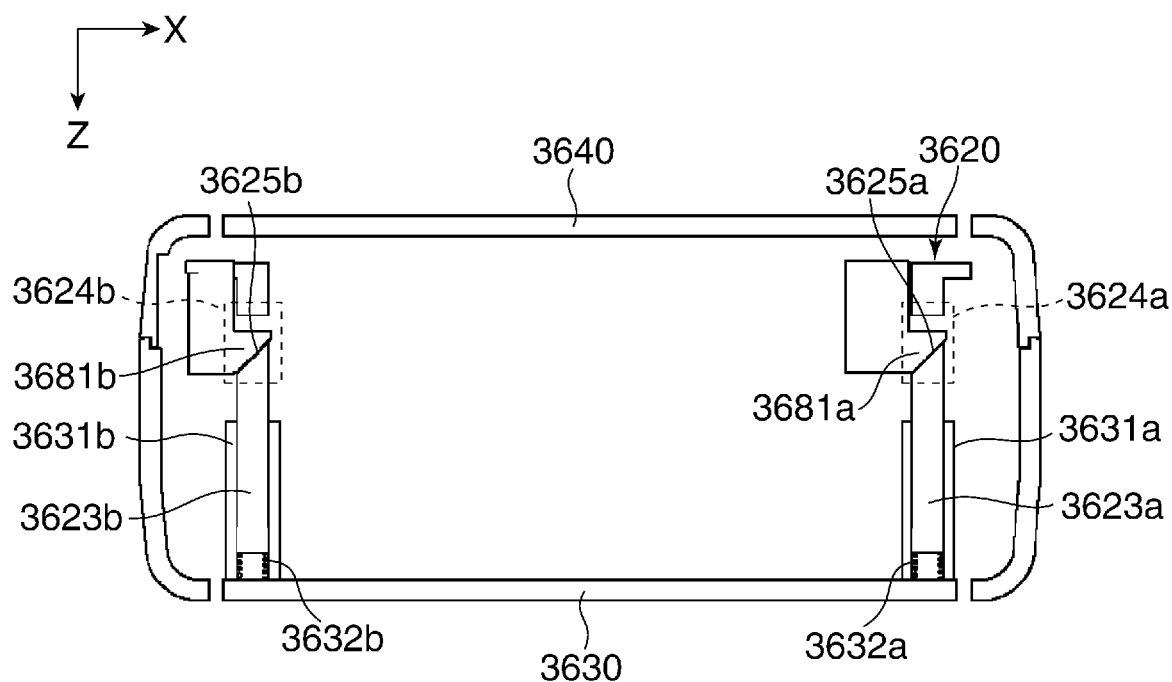

FIG. 50A is a cross-sectional view of the heat dissipation module 3600 in the first form of use, taken along B-B in FIG. 40. FIG. 50B is a cross-sectional view of the heat dissipation module 3600 in the second form of use, taken along B-B in FIG. 40. As shown in FIGS. 50A and 50B, the first and second slits 3624a and 3624b have first and second slit inclined surfaces 3625a and 3625b, respectively. Although not shown, the third and fourth slits 3624c and 3624d have third and fourth slit inclined surfaces 3625c and 3625d, respectively. The cross-sectional view taken along B-B in FIG. 40 is obtained by cutting the heat dissipation module 3600 along a line passing the center of the first shaft portion 3623a and the second shaft portion 3623b of the second heat sink 3620. The front-rear movement mechanism of the second heat sink 3620 will be described with reference to FIGS. 50A and 50B.

In the first form of use shown in FIG. 50A, the first and second protrusions 3681a and 3681b are not in contact with the first and second slit inclined surfaces 3625a and 3625b of the first and second slits 3624a and 3624b, respectively. At this time, the first shaft portion 3623a and the second shaft portion 3623b of the second heat sink 3620 are slidably fitted in the first and second holes 3631a and 3631b, respectively, and are urged by the first and second springs 3632a and 3632b in the negative direction of the Z-axis (rearward), respectively.

In the second form of use shown in FIG. 50B, the movable mechanism member 3680 is shifted in the positive direction of the X-axis (rightward) than in the case of the first form of use, by the above-described mechanism. At this time, the first and second protrusion 3681a and 3681b of the movable mechanism member 3680 are brought into contact with the first and second slit inclined surfaces 3625a and 3625b, respectively, and press the first and second shaft portions 3623a and 3623b in the positive direction of the Z-axis (toward the front).

Note that although the third and fourth shaft portions 3623c and 3623d are not shown, similar to the first and second shaft portions 3623a and 3623b, the third and fourth protrusions 3681c and 3681d of the movable mechanism member 3680 are brought into contact with the third and fourth slit inclined surfaces 3625c and 3625d of the third and fourth slits 3624c and 3624d, respectively, and press the third and fourth shaft portions 3623c and 3623d in the positive direction of the Z-axis (toward the front). Thus, the second heat sink 3620 is pressed in by the movable mechanism member 3680 with a larger force than the urging force of the first to fourth springs 3632a to 3632d, and is moved in the positive direction of the Z-axis (toward the front). In short, the second heat sink 3620 is moved in the front-rear direction by the movement of the movable mechanism member 3680 in the left-right direction.

As described above, the heat dissipation module 3600 according to the present embodiment has a structure which includes the common engagement interfaces on the two surfaces opposite and parallel to each other, respectively, and makes it possible to dissipate heat from various component modules including the camera body 3200 without impairing the expandability of the system. Further, the user of the heat dissipation module 3600 can switch between the first form of use and the second form of use of the heat dissipation module 3600 by operating the operating portion 3641.

Figure 51A:
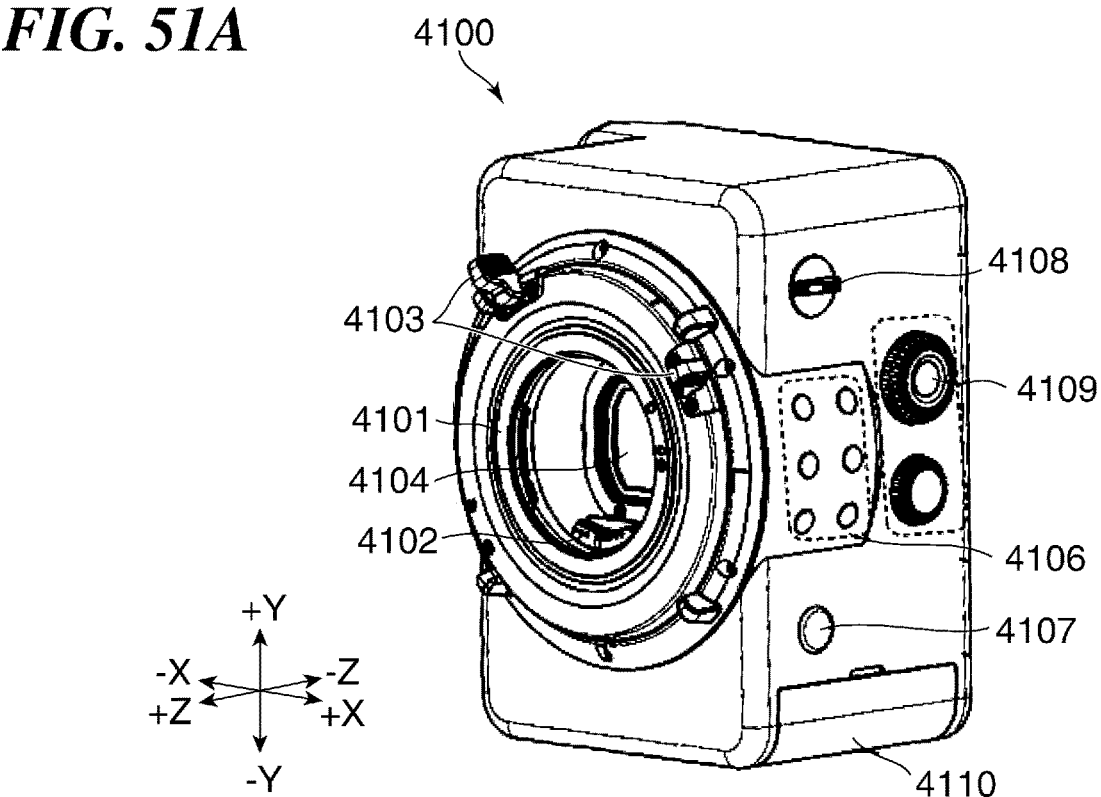
FIGS. 51A and 51B are perspective views of a camera body of a system camera according to a seventh embodiment of the present invention.
Figure 51B:
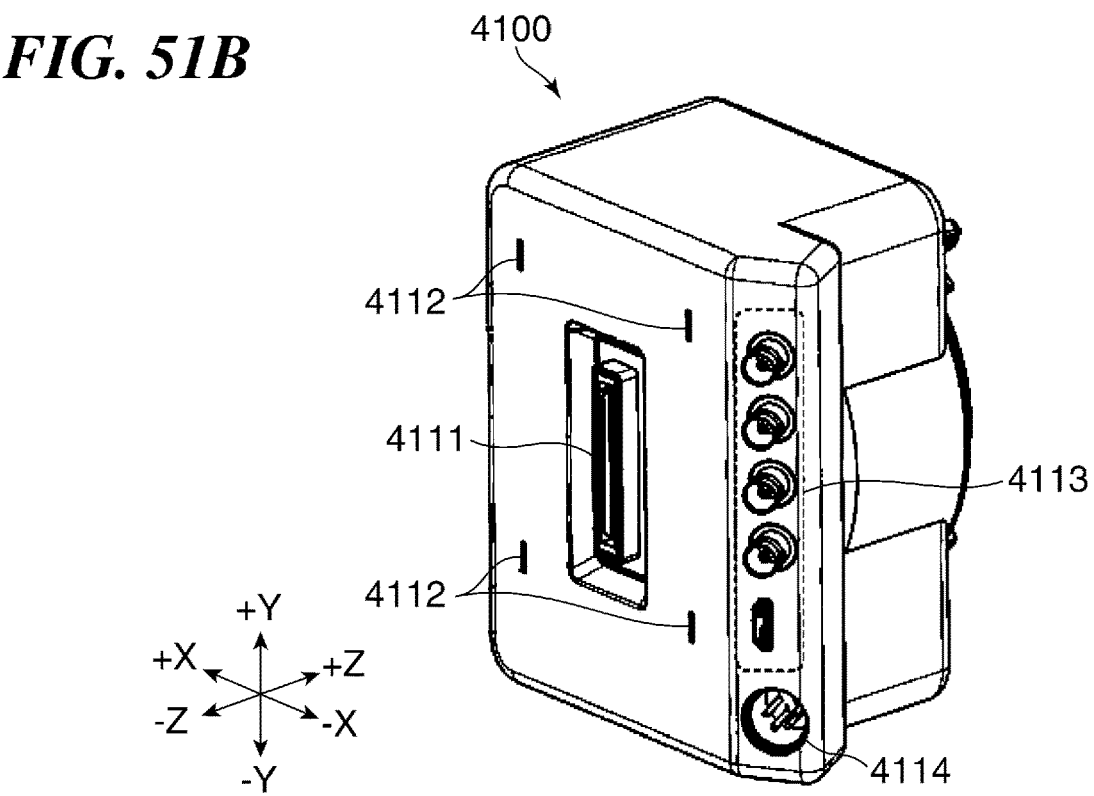
Figure 52A:
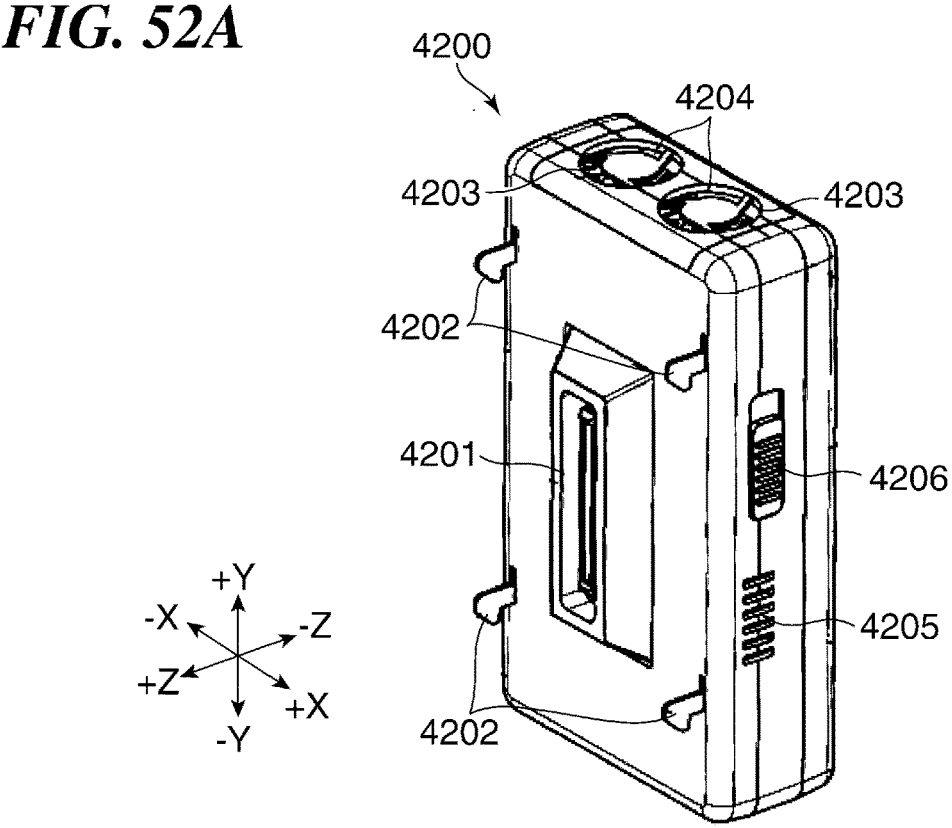
FIGS. 52A and 52B are perspective views of a heat dissipation module.
Figure 52B:
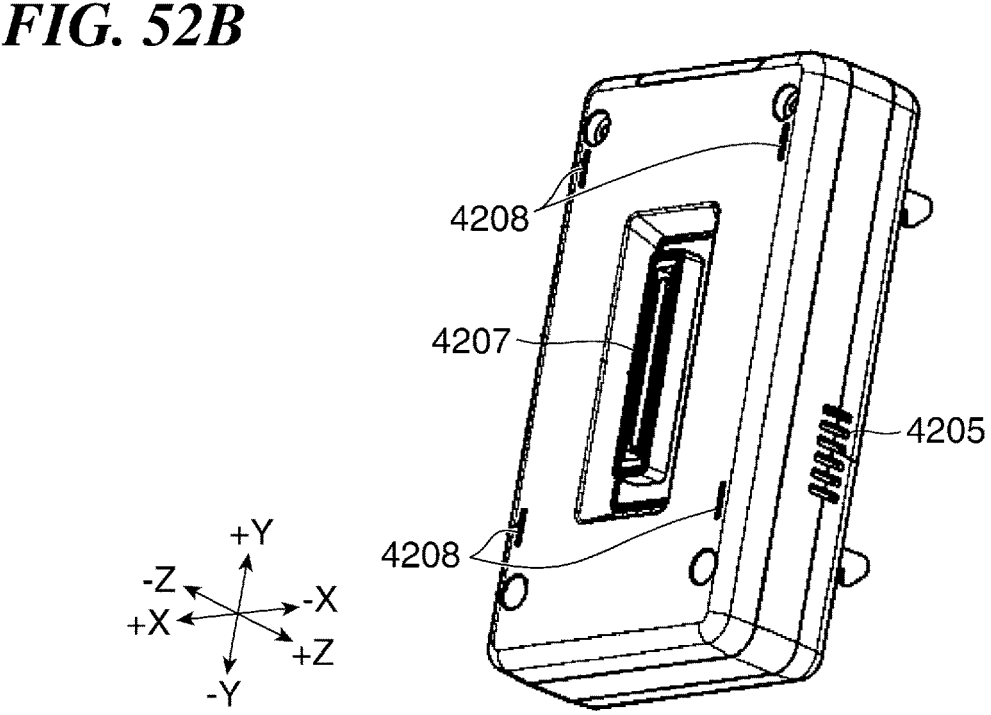
Figure 53A:
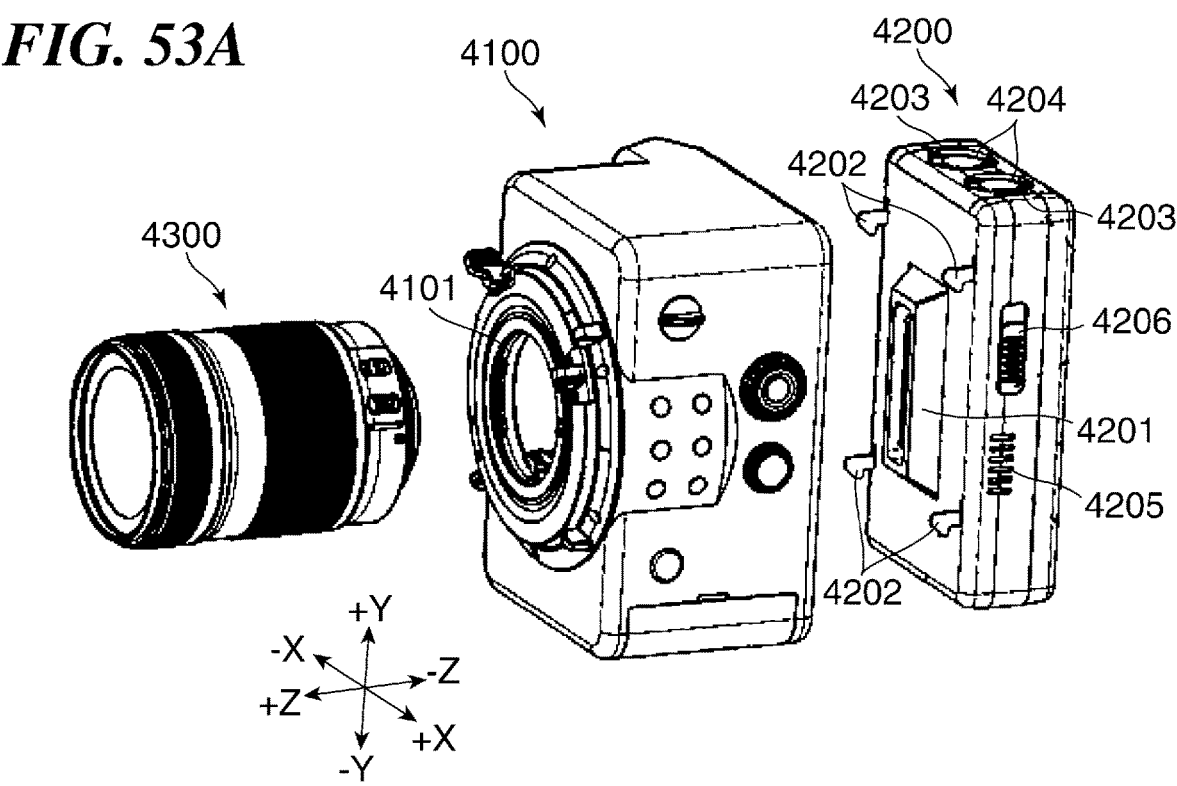
FIGS. 53A and 53B are perspective views of the system camera.
Figure 53B:
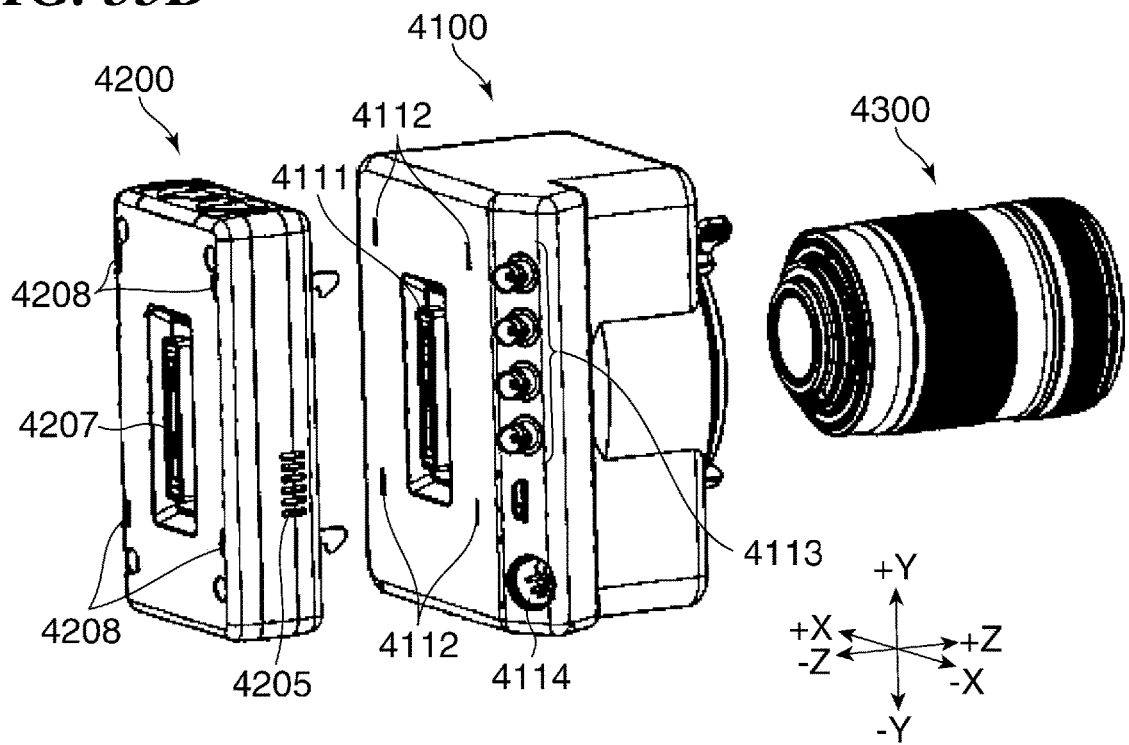

FIG. 51A is a perspective view showing the appearance of a camera body 4100 of a system camera according to a seventh embodiment of the present invention, as viewed from the front. FIG. 51B is a perspective view showing the appearance of the camera body 4100 shown in FIG. 51A, as viewed from the rear. FIG. 52A is a perspective view showing the appearance of a heat dissipation module 4200 which is removably mounted to the camera body 4100 shown in FIGS. 51A and 51B, as viewed from the front. FIG. 52B is a perspective view showing the appearance of the heat dissipation module 4200 shown in FIG. 52A, as viewed from the rear. FIG. 53A is an exploded perspective view of the system camera formed by attaching the heat dissipation module 4200 and a lens unit 4300 to the camera body 4100. FIG. 53B is an exploded perspective view of the system camera shown in FIG. 53A, as viewed from the rear.

Note that in the present embodiment, in each figure, a surface as viewed from the positive direction of the Z-axis is referred to as the front surface, a surface opposite to the front surface is referred to as the rear surface, a surface on the right side (in the positive direction of the X-axis) as viewed from the front is referred to as the right side surface, a surface on the left side as viewed from the front is referred to as the left side surface, a surface on the upper side (in the positive direction of the Y-axis) as viewed from the front is referred to as the upper surface, and a surface on the lower side as viewed from the front is referred to as the lower surface.

As shown in FIGS. 51A and 51B, on the front surface of a camera body 4100, there are arranged a lens mount 4101, a lens contact 4102 which detects attachment of an interchangeable lens unit 4300 and electrically controls the lens unit 4300, and a lens attachment/removal knob 4103 operated for attaching or removing the lens unit 4300. Further, the camera body 4100 has an image pickup device 4104 and a sensor board arranged at respective locations rearward of the lens mount 4101 inside thereof. The image pickup device 4104 receives light of an object image, and the sensor board converts a video signal obtained by the image pickup device 4104 to a predetermined signal.

On the right side surface of the camera body 4100, there are arranged an operation button group 4106 for causing the camera body 4100 to perform a predetermined operation according to an operation of a photographer, a REC button 4107, a power switch 4108, an operation dial group 4109, and a recording medium container cover 4110 under which a recording medium is accommodated. The camera body 4100 has a camera connection unit 4111 on the rear surface thereof, for electrically and thermally connecting the camera body 4100 and a heat dissipation module 4200 to each other. Further, on the rear surface of the camera body 4100, there are arranged a camera engaging holes 4112 for mechanically fixing the heat dissipation module 4200 and the camera body 4100 to each other, an external connection terminal group 4113, and a power supply terminal 4114. Details of the camera connection unit 4111 will be described hereinafter.

As shown in FIGS. 52A and 52B, the heat dissipation module 4200 has a front surface, i.e. a surface connected to the camera body 4100, provided with a heat dissipation module front-side connection unit 4201 for electrically and thermally connecting between the camera body 4100 and the heat dissipation module 4200. Further, the front surface of the heat dissipation module 4200 is provided with heat dissipation module engaging lugs 4202 for mechanically fixing the camera body 4100 and the heat dissipation module 4200 to each other. Details of the heat dissipation module front-side connection unit 4201 will be described hereinafter.

The heat dissipation module 4200 has an upper part provided with fans 4203 and outlet ports 4204 for discharging air to the outside by driving the fans 4203. The heat dissipation module 4200 has opposite side surfaces each formed with an air inlet port 4205 for drawing air from the outside by driving the fans 4203. Further, the heat dissipation module 4200 has the right side surface provided with a lock release lever 4206 for lifting the heat dissipation module engaging lug 4202 upward, which is supported in the heat dissipation module 4200 in a state urged downward.

The heat dissipation module 4200 has a rear surface provided with a heat dissipation module rear-side connection unit 4207 for electrically and thermally connecting between the heat dissipation module 4200 and the recorder module or the like, not shown, which can be connected to the heat dissipation module 4200 from the rear side. Further, the rear surface of the heat dissipation module 4200 is formed with heat dissipation module engagement holes 4208 for mechanically fixing the heat dissipation module 4200 and the recorder module or the like to each other.

As shown in FIGS. 53A and 53B, the lens unit 4300 can be mounted to and removed from the lens mount 4101 provided on the front surface of the camera body 4100, and the heat dissipation module 4200 can be mounted to and removed from the rear side of the camera body 4100. When the camera connection unit 4111 of the camera body 4100 and the heat dissipation module front-side connection unit 4201 of the heat dissipation module 4200 are connected to each other, the camera body 4100 and the heat dissipation module 4200 are electrically and thermally connected to each other.

Further, the heat dissipation module rear-side connection unit 4207 has the same shape as that of the camera connection unit 4111. The recorder module or the like, not shown, can be mounted to and removed from the camera connection unit 4111 on the rear surface of the camera body 4100 or the heat dissipation module rear-side connection unit 4207 on the rear surface of the heat dissipation module 4200.

Figure 54:
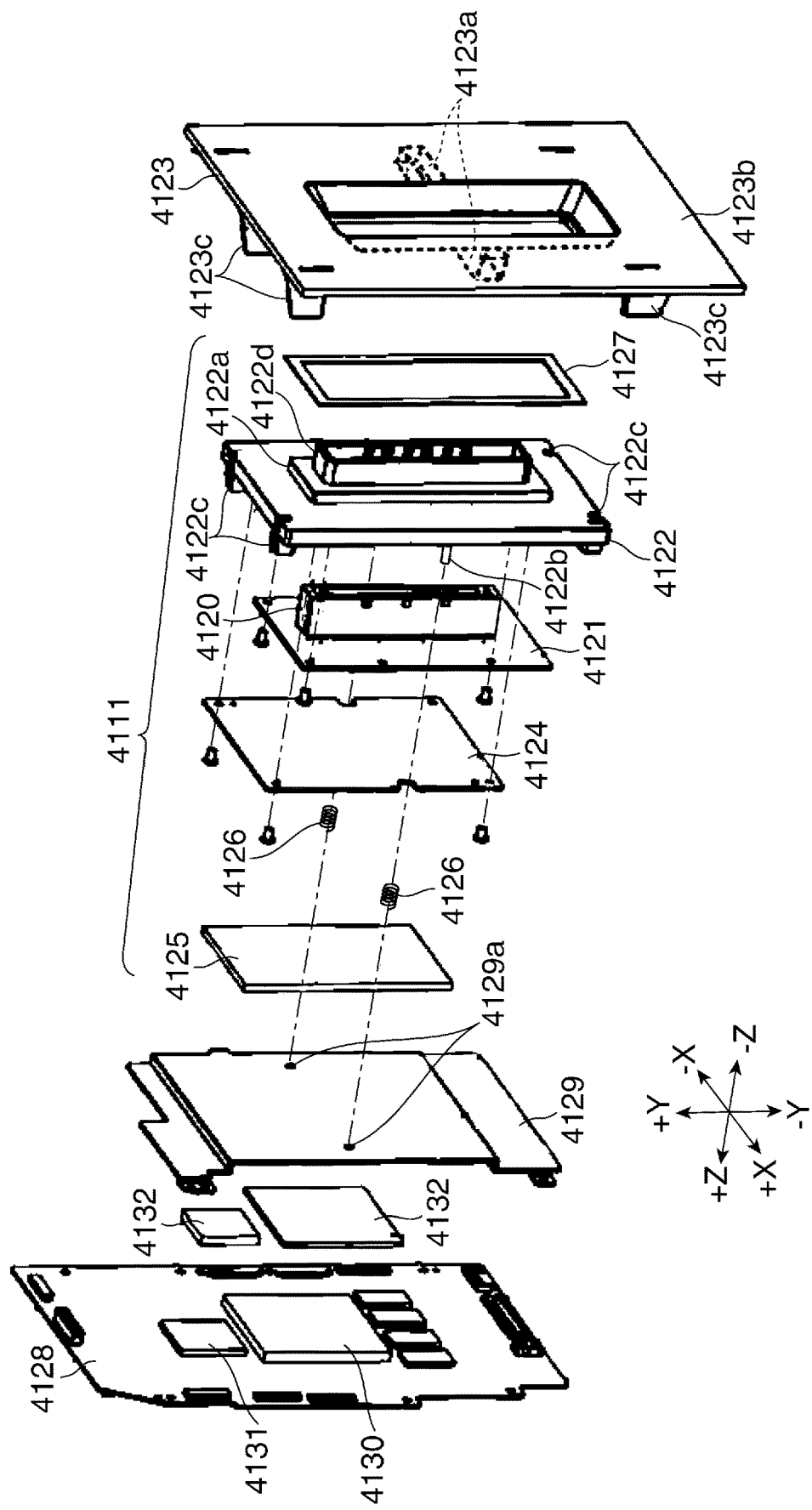
FIG. 54 is an exploded perspective view showing a structure of a camera connection unit and components associated therewith.
Figure 55:
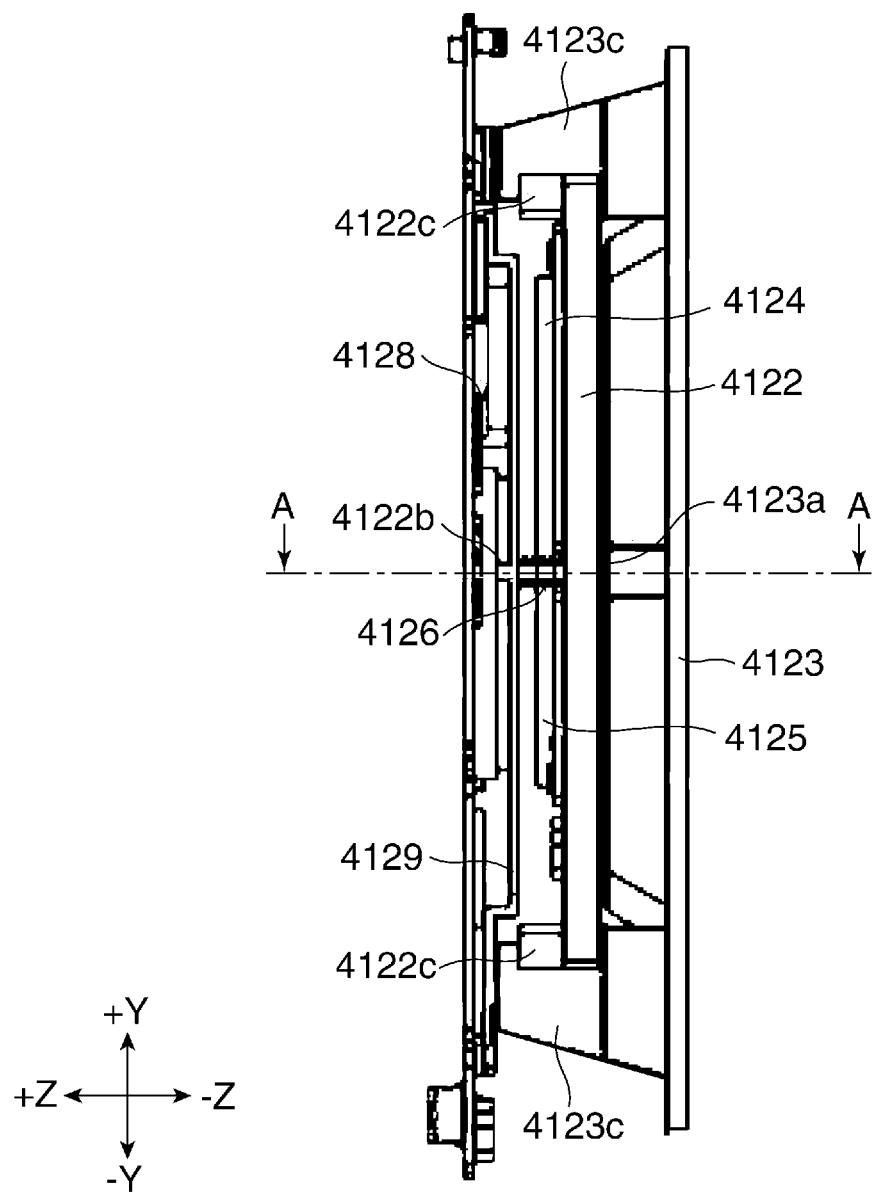
FIG. 55 is a right side view of the assembly of the structure shown in FIG. 54.
Figure 56:
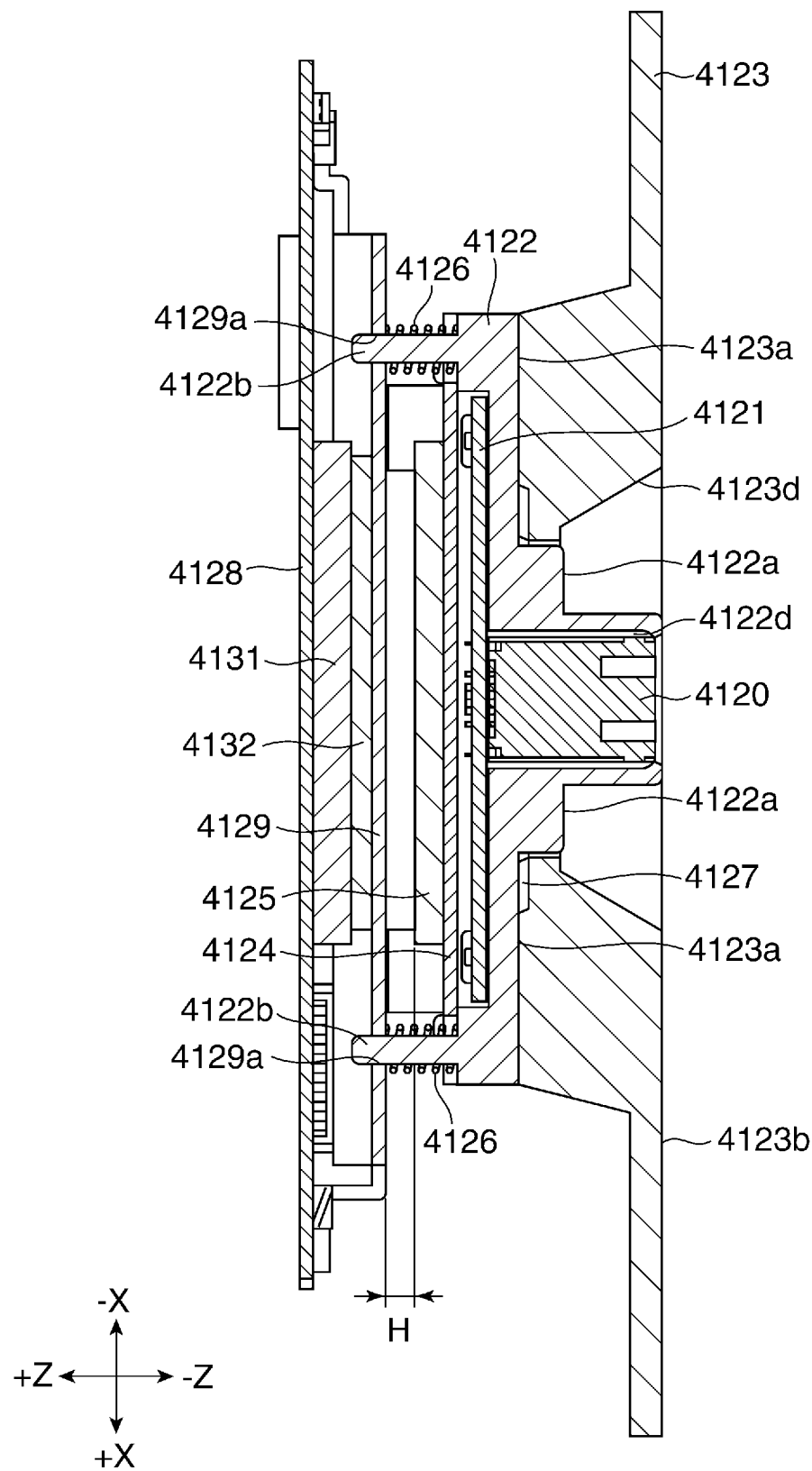
FIG. 56 is a cross-sectional view of the structure of the camera connection unit and components associated therewith.
Figure 57:
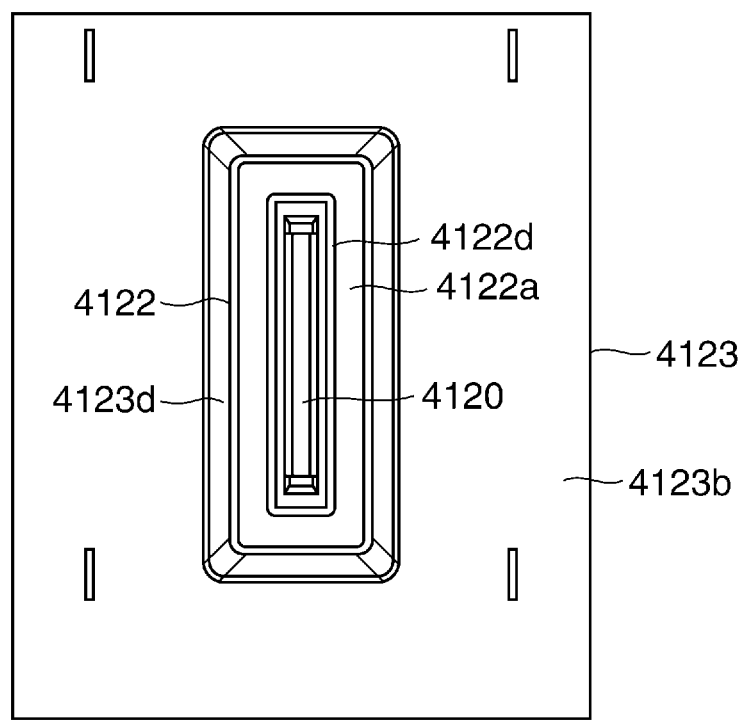
FIG. 57 is a rear view of the structure of the camera connection unit and components associated therewith.
Figure 57:
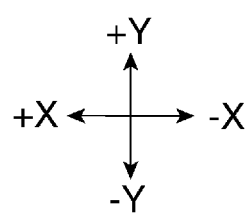

Next, the internal structure around the camera connection unit 4111 of the camera body 4100 will be described with reference to FIGS. 54 to 57. FIG. 54 is an exploded perspective view showing the structure of the camera connection unit 4111 and components associated therewith. FIG. 55 is a right side view of the assembly of the components shown in FIG. 54. FIG. 56 is a cross-sectional view of the structure of the camera connection unit 4111 and components associated therewith, taken along A-A in FIG. 55. FIG. 57 is a rear view of the camera connection unit 4111 as viewed from the rear side of the camera body 4100.

As shown in FIGS. 54 to 56, the camera connection unit 4111 has a camera contact section holder 4122, a camera contact section 4120, a camera contact section board 4121, a camera contact section heat dissipation plate 4124, and a camera contact section heat dissipation rubber 4125, arranged in the mentioned order from the rear surface of the camera body 4100. To the camera contact section holder 4122, the camera contact section board 4121 is fixed with screws in a state in which the camera contact section 4120 is inserted in a hollow portion 4122d of the camera contact section holder 4122, and further, the camera contact section heat dissipation plate 4124 is fixed with screws such that a shadow projection of the camera contact section heat dissipation plate 4124 covers the camera contact section board 4121. The camera contact section heat dissipation rubber 4125 is affixed to a surface of the camera contact section heat dissipation plate 4124 opposite to the camera contact section board 4121.

Further, the camera body 4100 contains a main board 4128 which controls the camera body 4100, and a main board heat dissipation plate 4129 which dissipates heat from the main board 4128. The main board 4128 has a first CPU 4130 and a second CPU 4131 as main heat sources, mounted thereon, and includes main board heat dissipation rubbers 4132 for dissipating heat from the heat sources to the main board heat dissipation plate 4129. The main board heat dissipation plate 4129, the main board heat dissipation rubbers 4132, and the main board 4128 are arranged along the optical axis of the camera body 4100 in the mentioned order from the rear side, substantially in parallel with each other.

The main board heat dissipation plate 4129 is arranged at a location opposed to the camera contact section heat dissipation rubber 4125 affixed to the camera contact section heat dissipation plate 4124. Further, the camera contact section board 4121 and the main board 4128 are electrically connected by wires, not shown, and a video signal and electric power are transmitted and received between the camera contact section board 4121 and the main board 4128.

As shown in FIGS. 54 and 56, a plurality of camera compression springs 4126 are arranged symmetrically with respect to the camera contact section 4120, and are inserted over shaft portions 4122b of the camera contact section holder 4122. The main board heat dissipation plate 4129 has insertion holes 4129a through which the shaft portions 4122b are inserted, and the camera compression springs 4126 are sandwiched between the camera contact section holder 4122 and the main board heat dissipation plate 4129.

As shown in FIGS. 54 and 55, the camera contact section holder 4122 has a plurality of guide rails 4122c each having a substantially U-shape, and is supported by a plurality of guide ribs 4123c arranged on a rear cover 4123, with which the guide rails 4122c are in slidable contact, respectively, such that the camera contact section holder 4122 is slidably movable along the optical axis of the camera body 4100. As shown in FIGS. 55 and 56, the camera contact section holder 4122, which is supported in a state urged rearward of the camera body 4100 by urging forces of the camera compressing springs 4126, is arranged at a location in contact with a contact surface 4123a of the rear cover 4123.

As shown in FIGS. 56 and 57, a camera contact surface portion 4122a of the camera contact section holder 4122 is exposed at a location inward (in the positive direction of the Z-axis) of a rear surface 4123b of the rear cover 4123, when the camera contact section holder 4122 is in a position brought into contact with the contact surface 4123a. The camera contact surface portion 4122a is formed into a hollow rectangular cuboid shape surrounding the camera contact section 4120, whereby the camera contact surface portion 4122a can be exposed such that it can be seen from the outside in a wide range of area surrounding the camera contact section 4120. Further, a camera contact section cushion 4127 is formed into a hollow rectangular cuboid shape which surrounds the camera contact surface portion 4122a, and fills a gap between the camera contact section holder 4122 and the rear cover 4123 at a location surrounding the camera contact surface portion 4122a in a state compressed therebetween.

With the above-described arrangement, the camera connection unit 4111 is supported in a state urged rearward of the camera body 4100by the camera compression springs 4126, and can be moved in the optical axis direction of the camera body 4100 against the urging forces of the camera compression springs 4126. Further, as shown in FIG. 56, the camera contact section heat dissipation rubber 4125 and the main board heat dissipation plate 4129, opposed to each other, are disposed with a gap H therebetween when the camera connection unit 4111 urged by the camera compression springs 4126 is in a position brought into contact with the contact surface 4123a.

Next, a state of heat conduction realized by the camera connection unit 4111 will be described with reference to FIG. 56. When the camera contact section heat dissipation rubber 4125 and the main board heat dissipation plate 4129 are in a state disposed with the gap H by the urging force of the camera compression springs 4126, heat generated by the first CPU 4130 and the second CPU 4131 appearing in FIG. 54 is not transferred to the camera contact section heat dissipation rubber 4125. Further, the heat is not transferred to the camera contact section holder 4122 to which the camera contact section heat dissipation plate 4124 is fixed with the screws, either, and hence the exterior of the camera body 4100 is prevented from being heated.

On the other hand, when the camera connection unit 4111 is pushed into the camera body 4100 in the positive direction of the Z-axis against the urging forces of the camera compression springs 4126, the gap H is reduced. This makes it possible to move the camera contact section heat dissipation rubber 4125 toward the main board heat dissipation plate 4129 to a position where the camera contact section heat dissipation rubber 4125 is brought into contact with the main board heat dissipation plate 4129 and is compressed.

At this time, heat generated by the first CPU 4130 and the second CPU 4131 is transferred to the camera contact section heat dissipation rubber 4125 via the main board heat dissipation rubbers 4132 and the main board heat dissipation plate 4129, and is then transferred to the camera contact section holder 4122 via the camera contact section heat dissipation plate 4124. That is, it is possible to dissipate heat to the exterior of the camera body 4100.

Note that the camera contact section holder 4122 is molded of a material having high thermal conductivity, such as aluminum for die casting, which makes it possible to efficiently dissipate heat transferred to the camera contact section heat dissipation plate 4124 by the movement of the camera connection unit 4111 to the exterior.

Figure 58:
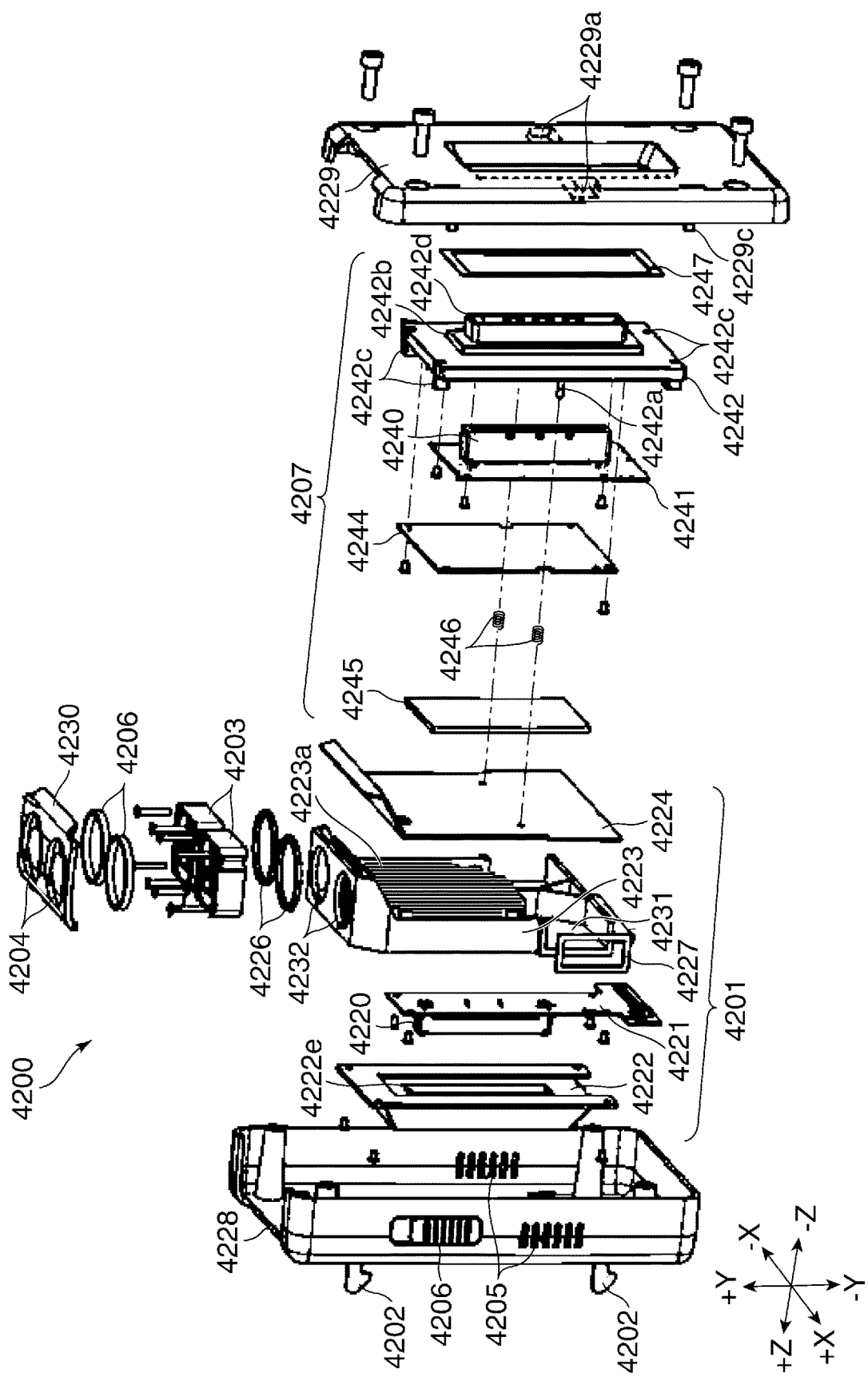
FIG. 58 is an exploded perspective view showing a structure of heat dissipation module connection units and components associated therewith.
Figure 59:
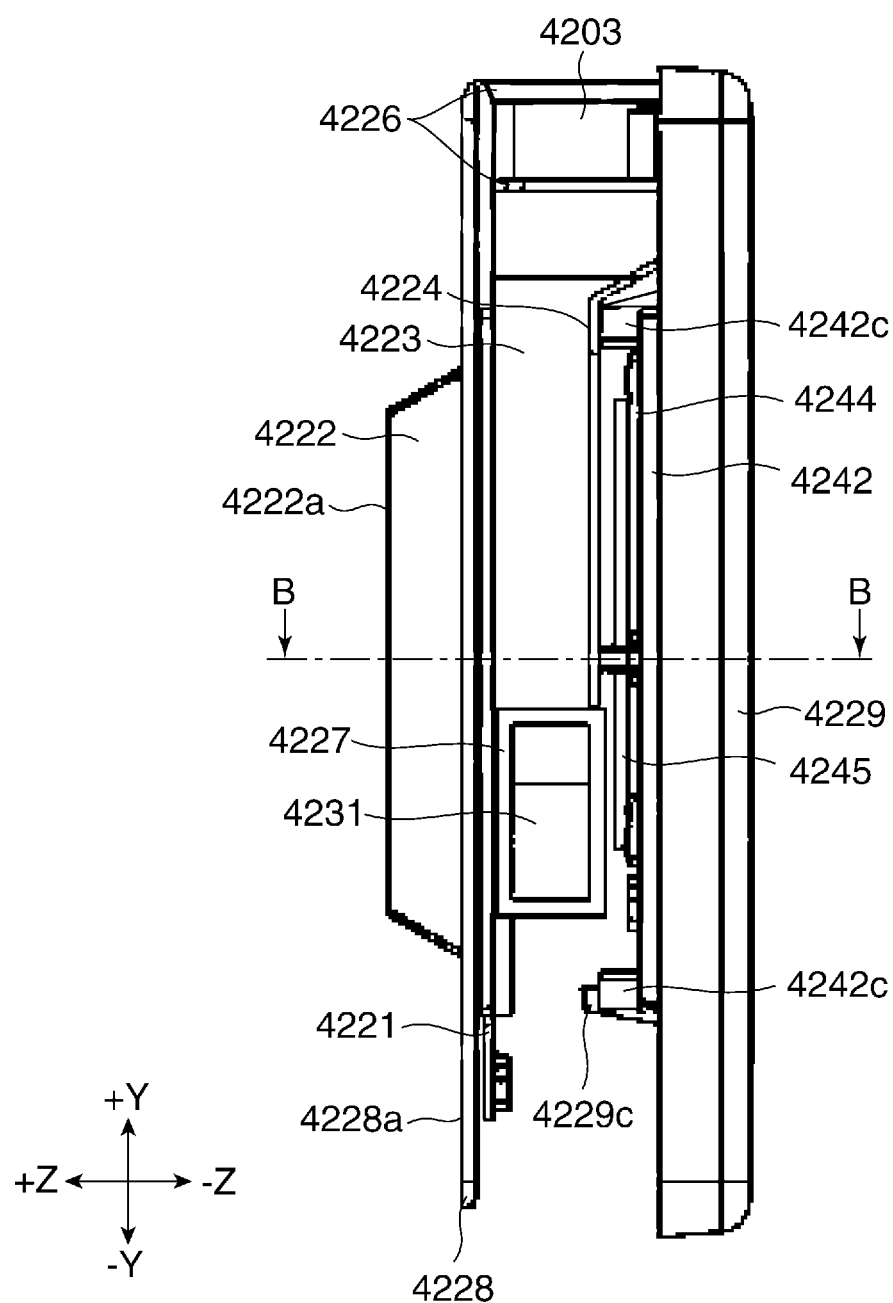
FIG. 59 is a right side view of the assembly of the structure shown in FIG. 58.
Figure 60:
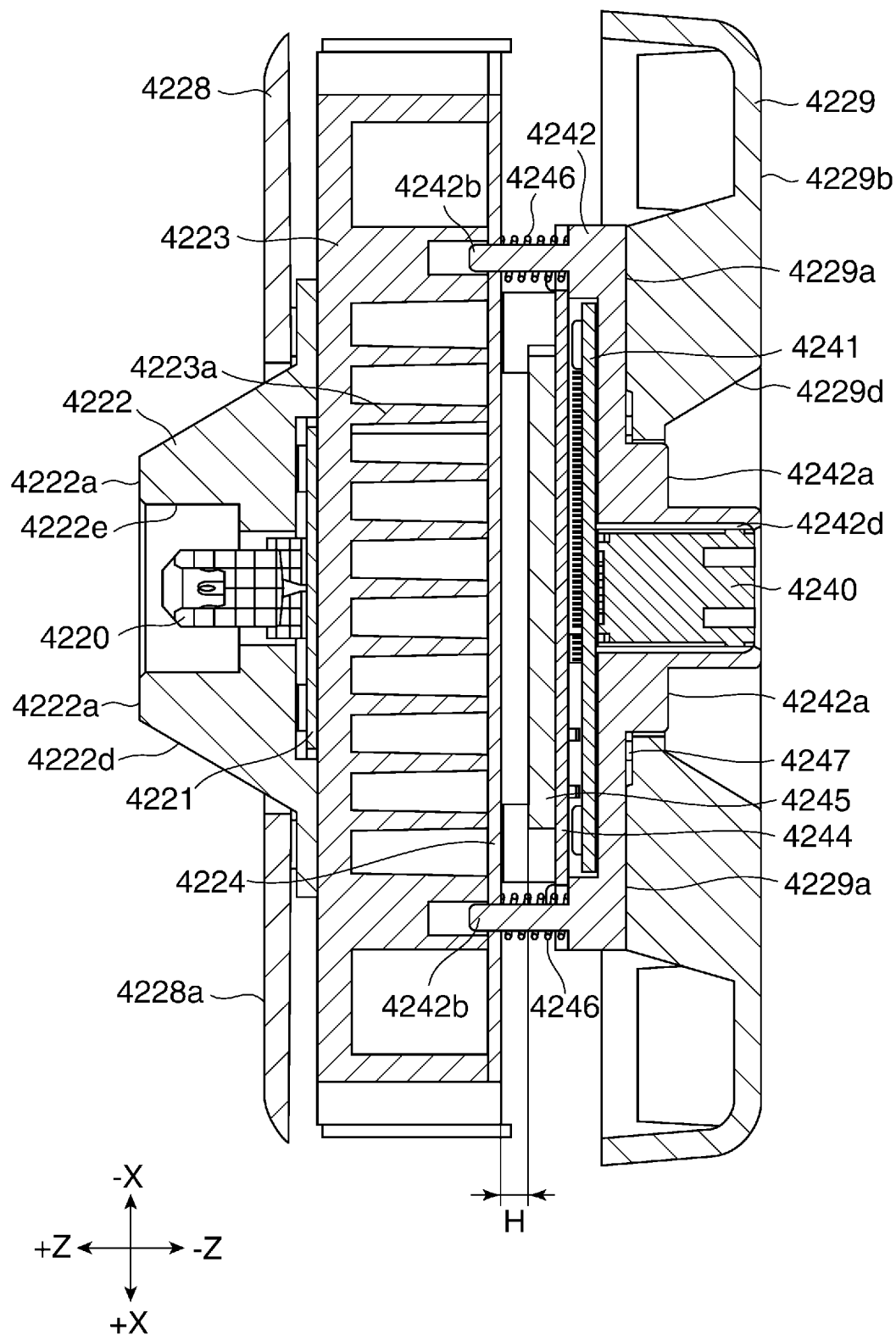
FIG. 60 is a cross-sectional view of the structure of the heat dissipation module connection units and components associated therewith.
Figure 61:
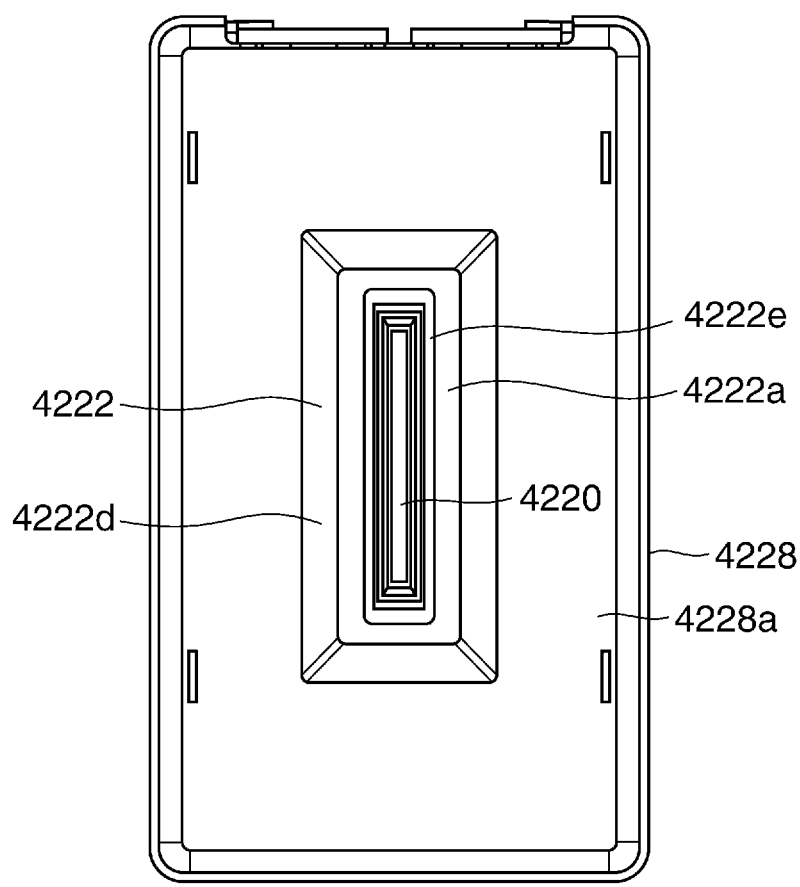
FIG. 61 is a front view showing a structure of a heat dissipation module front-side connection unit and components associated therewith.

Next, the structure in the vicinity of heat dissipation module connection units arranged in the front and rear parts of the heat dissipation module 4200 will be described with reference to FIGS. 58 to 61. FIG. 58 is an exploded perspective view showing a structure of the heat dissipation module connection units and components associated therewith. FIG. 59 is a right side view of the assembly of the components shown in FIG. 58. FIG. 60 is a cross-sectional view of the structure of the heat dissipation module connection units and components associated therewith, which is taken along B-B in FIG. 59. FIG. 61 is a front view showing a structure of a heat dissipation module front-side connection unit 4201 and components associated therewith.

As shown in FIGS. 58 and 60, the heat dissipation module front-side connection unit 4201 includes a heat dissipation module front-side contact section holder 4222, a heat dissipation module front-side contact section 4220, and a heat dissipation module front-side contact section board 4221, arranged in the mentioned order from the front surface of the heat dissipation module 4200. Further, the heat dissipation module front-side connection unit 4201 includes not only the above-mentioned components, but also a heat dissipation module heat sink 4223 and a heat dissipation module heat dissipation plate 4224, both of which are arranged in the direction of the optical axis of the camera body 4100, substantially in parallel with each other.

The heat dissipation module front-side contact section holder 4222 is fixed to the heat dissipation module heat sink 4223 with screws in a state in which the heat dissipation module front-side contact section 4220 is inserted in a hollow portion 4222*e*. Further, the heat dissipation module front-side contact section board 4221 is fixed to the heat dissipation module heat sink 4223 with screws.

As shown in FIGS. 58 and 60, the heat dissipation module front-side connection unit 4201 forms a duct shape by the heat dissipation module heat sink 4223 and the heat dissipation module heat dissipation plate 4224, and forms air suction ports 4231 and air discharge ports 4232. The air suction ports 4231 are connected to the air inlet ports 4205 of the heat dissipation module 4200 via heat dissipation module air inlet port cushions 4227, respectively, and the air discharge ports 4232 are connected to the air outlet ports 4204 of the heat dissipation module 4200 via heat dissipation module outlet port cushions 4226, respectively.

When the fans 4203 are driven, air is introduced into the heat dissipation module 4200 from the air inlet ports 4205 and air is discharged from the air outlet ports 4204 to the outside of the heat dissipation module 4200. The heat dissipation module heat sink 4223 has a plurality of fins 4223*a* extending in a direction of the airflow, and heat is exchanged with air passing the fins 4223*a*.

As shown in FIGS. 59 and 60, a heat dissipation module contact surface 4222*a* of the heat dissipation module front-side contact section holder 4222 is exposed outward (in the positive direction of the Z-axis) from a front surface 4228*a* of a heat dissipation module front cover 4228 of the heat dissipation module 4200. The heat dissipation module contact surface 4222*a* is formed into a hollow rectangular shape surrounding the heat dissipation module front-side contact section 4220, whereby the heat dissipation module contact surface 4222*a* can be exposed in a wide range of area surrounding the heat dissipation module front-side contact section 4220. Further, the heat dissipation module front-side contact section holder 4222 and the heat dissipation module heat sink 4223 are molded of a material having high thermal conductivity, such as aluminum for die casting, which makes it possible to transfer heat between the two components fixed to each other with the screws.

Further, as shown in FIGS. 58 to 60, the heat dissipation module rear-side connection unit 4207 has the same structure as that of the camera connection unit 4111, and can be moved in the direction of the optical axis of the camera body 4100.

As shown in FIGS. 58 and 60, the heat dissipation module rear-side connection unit 4207 includes a heat dissipation module rear-side contact section cushion 4247, a heat dissipation module rear-side contact section holder 4242, a heat dissipation module rear-side contact section 4240, and a heat dissipation module rear-side contact section board 4241, arranged in the mentioned order from the rear side of the heat dissipation module 4200. Further, the heat dissipation module rear-side connection unit 4207 includes not only the above-mentioned components, but also a heat dissipation module rear-side contact section heat dissipation plate 4244 and a heat dissipation module rear-side contact section heat dissipation rubber 4245, both of which are arranged in the direction of the optical axis of the camera body 4100, substantially in parallel with each other.

To the heat dissipation module rear-side contact section holder 4242, the heat dissipation module rear-side contact section board 4241 is fixed with screws in a state in which the heat dissipation module rear-side contact section 4240 is inserted in a hollow portion 4242*d* of the heat dissipation module rear-side contact section holder 4242, and further, the heat dissipation module rear-side contact section heat dissipation plate 4244 is fixed with screws such that a shadow projection of the heat dissipation module rear-side contact section heat dissipation plate 4244 covers the heat dissipation module rear-side contact section board 4241. The heat dissipation module rear-side contact section heat dissipation rubber 4245 is affixed to a surface of the heat dissipation module rear-side contact section heat dissipation plate 4244 opposite to the heat dissipation module rear-side contact section board 4241.

As shown in FIGS. 58 and 60, a plurality of heat dissipation module compression springs 4246 are arranged symmetrically with respect to the heat dissipation module rear-side contact section 4240, and are inserted over shaft portions 4242*b* of the heat dissipation module rear-side contact section holder 4242. The heat dissipation module compression springs 4246 are sandwiched between the heat dissipation module rear-side contact section holder 4242 and the heat dissipation module heat dissipation plate 4224.

As shown in FIGS. 58 and 59, the heat dissipation module rear-side contact section holder 4242 has a plurality of guide rails 4242*c* each having a substantially U-shape. The heat dissipation module rear-side contact section holder 4242 is supported by a plurality of guide ribs 4229*c* arranged on a heat dissipation module rear cover 4229, with which the guide rails 4242*c* are in slidable contact, respectively, such that the heat dissipation module rear-side contact section holder 4242 is slidably movable in the direction of the optical axis of the camera body 4100.

As shown in FIGS. 59 and 60, the heat dissipation module rear-side contact section holder 4242, which is supported in a state urged rearward of the heat dissipation module 4200 by the urging forces of the heat dissipation module compression springs 4246, is arranged at a location in contact with a contact surface 4229*a* of the heat dissipation module rear cover 4229. As shown in FIGS. 60 and 61, a heat dissipation module rear-side contact surface portion 4242*a* of the heat dissipation module rear-side contact section holder 4242 is exposed at a location inward (in the positive direction of the Z-axis) of a rear surface 4229*b* of the heat dissipation module rear cover 4229. Further, the heat dissipation module rear-side contact section cushion 4247 is formed into a hollow rectangular cuboid shape which surrounds the heat dissipation module rear-side contact surface portion 4242a, and fills a gap between the heat dissipation module rear-side contact section holder 4242 and the heat dissipation module rear cover 4229 at a location surrounding the heat dissipation module rear-side contact surface portion 4242a in a state compressed therebetween. Note that reference numeral 4229d indicates a recess inclined surface, which corresponds in shape and function to a recess inclined surface 4123d, referred to hereinafter, of the rear cover 4123 of the camera body 4100.

With the above-described arrangement, the heat dissipation module rear-side connection unit 4207 is supported in a state urged rearward of the heat dissipation module 4200 by the urging forces of the heat dissipation module compression springs 4246. Further, as shown in FIG. 60, the heat dissipation module rear-side contact section heat dissipation rubber 4245 and the heat dissipation module heat sink 4223 are arranged with the gap H.

Further, the heat dissipation module front-side contact section board 4221 and the heat dissipation module rear-side contact section board 4241 are electrically connected by wires, not shown, and a video signal and electric power are transmitted and received between the heat dissipation module front-side contact section board 4221 and the heat dissipation module rear-side contact section board 4241. With this, the heat dissipation module front-side connection unit 4201 and the heat dissipation module rear-side connection unit 4207 of the heat dissipation module 4200 are electrically connected. Further, when a recorder module or the like is connected to the rear side (rear surface) of the heat dissipation module 4200, the camera body 4100 and the recorder module or the like are electrically connected to each other.

Figure 62A:
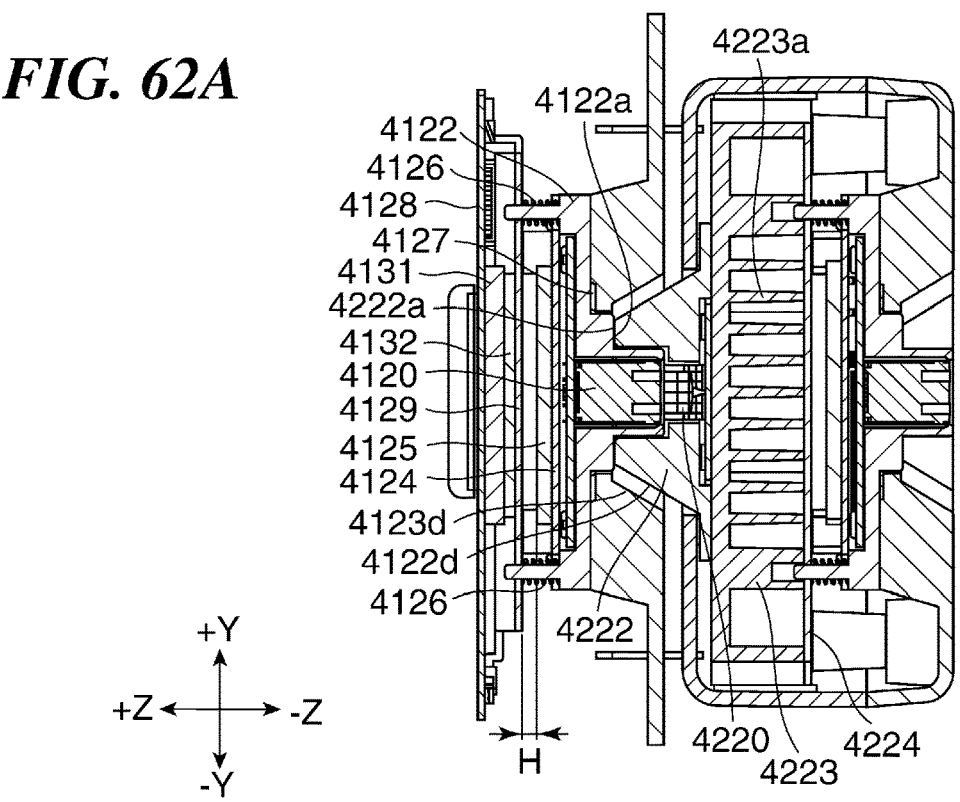
FIGS. 62A and 62B are views useful in explaining a structure formed by connecting the camera body and the heat dissipation module and flow of heat therein.
Figure 62B:
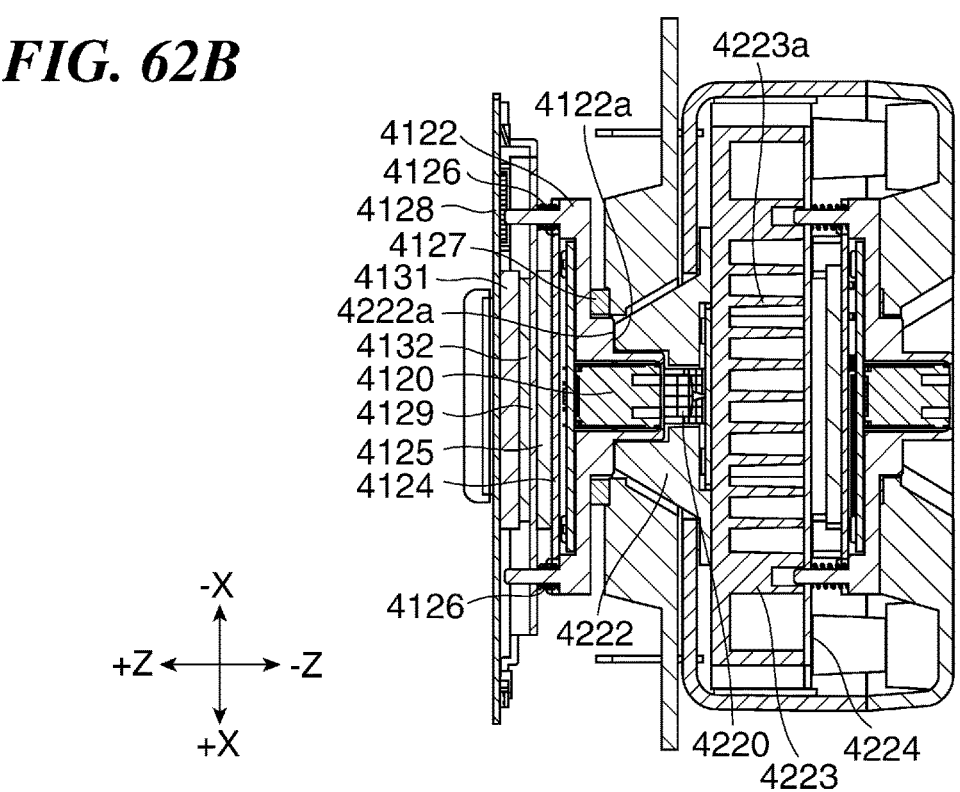

Next, a structure formed by connecting the camera body 4100 and the heat dissipation module 4200 and flow of heat therein will be described with reference to FIGS. 62A and 62B. FIG. 62A is a cross-sectional view of essential parts of the system camera in a state in which the heat dissipation module 4200 is connected to the camera body 4100. FIG. 62B is a cross-sectional view of the essential parts of the system camera in a state in which the heat dissipation module 4200 is fixed to the camera body 4100.

When connecting the heat dissipation module 4200 to the camera body 4100, the camera connection unit 4111 and the heat dissipation module front-side connection unit 4201 are caused to face each other and connected. Then, the heat dissipation module 4200 is pressed into the camera body 4100. At this time, the positions of the camera connection unit 4111 and the heat dissipation module front-side connection unit 4201 in the X-Y directions are guided by the recess inclined surface 4123d of the rear cover 4123 and a protrusion inclined surface 4222d of the heat dissipation module front-side contact section holder 4222. With this, the positions of the both connection units are roughly determined.

After that, the positions of the camera contact section 4120 and the heat dissipation module front-side contact section 4220 in the X-Y directions are determined by catching parts of the camera contact section holder 4122 and the heat dissipation module front-side contact section holder 4222, and the two contact sections are fitted to each other. Then, the camera contact surface portion 4122a and the heat dissipation module contact surface 4222a are brought into contact with each other. This state is shown in FIG. 62A.

A floating structure in which a small space provided between the guide rail 4122c and the guide rib 4123c enables the camera connection unit 4111 to be slightly moved in the X-Y directions is used, and this makes it possible to absorb mounting displacement of the camera contact section 4120 and variation in manufactured products of components. Further, the camera contact surface portion 4122a and the heat dissipation module contact surface 4222a are arranged so as to surround the camera contact section 4120 and the heat dissipation module front-side contact section 4220, respectively, and hence even when these contact sections are fitted to each other, the surface of the camera contact surface portion 4122a and the heat dissipation module contact surface 4222a are stably brought into contact with each other.

Further, the total urging force of the camera compression springs 4126 is set to be larger than the fitting force required to fit the camera contact section 4120 and the heat dissipation module front-side contact section 4220 to each other. By setting such a force relationship, when the heat dissipation module 4200 is pressed into the camera body 4100 first, the position of the camera connection unit 4111 in the optical axis direction is not changed, and the camera contact section 4120 and the heat dissipation module front-side contact section 4220 are fitted to each other, while maintaining the gap H between the camera contact section heat dissipation rubber 4125 and the main board heat dissipation plate 4129.

When the heat dissipation module 4200 is further pressed into the camera body 4100 against the total urging force of the camera compression springs 4126, the camera compression springs 4126 are compressed and deformed, so that the camera connection unit 4111 is pressed into the camera body 4100. Then, the gap H between the camera contact section heat dissipation rubber 4125 and the main board heat dissipation plate 4129 is progressively reduced, and the camera engagement hole 4112 and the heat dissipation module engaging lug 4202 are engaged with each other in a state in which the camera contact section heat dissipation rubber 4125 is compressed. With this, the camera body 4100 and the heat dissipation module 4200 are fixed to each other. This state is shown in FIG. 62B.

At this time, the camera contact section heat dissipation rubber 4125 and the main board heat dissipation plate 4129 are in contact with each other. This allows heat from the main board 4128 (specifically, the first CPU 4130 and the second CPU) to be transferred to the camera contact section holder 4122 via the main board heat dissipation rubbers 4132, the main board heat dissipation plate 4129, the camera contact section heat dissipation rubber 4125, and the camera contact section heat dissipation plate (heat dissipation member) 4124. Further, the camera contact surface portion 4122a of the camera contact section holder 4122 and the heat dissipation module contact surface 4222a of the heat dissipation module front-side contact section holder 4222 are brought into contact with each other. With this, the heat transferred to the camera contact section holder 4122 is transferred to the heat dissipation module heat sink 4223 via the heat dissipation module front-side contact section holder 4222.

The heat transferred to the heat dissipation module heat sink 4223 is transferred to the fins 4223a, exchanged with air by driving the fans 4203 in the heat dissipation module 4200, and discharged from the air discharge port 4232. That is, by fixing the heat dissipation module 4200 to the camera body 4100, heat from the main board 4128 is transferred to the heat dissipation module heat sink 4223 in the heat dissipation module 4200, and is cooled by the fans 4203.

Further, the first CPU 4130 and the second CPU 4131 of the main board 4128, the main board heat dissipation rubbers 4132, and the camera contact section heat dissipation rubber 4125 are arranged in the center of the plurality of camera compression springs 4126 such that the center of each of these components in the X direction substantially coincides with the center of the camera contact section 4120 in the X direction. With this, when the camera contact section heat dissipation rubber 4125 is compressed, and is brought into contact with the camera contact section heat dissipation plate 4124, the camera contact section heat dissipation rubber 4125 and the main board heat dissipation rubbers 4132 are uniformly compressed, which makes it possible to efficiently dissipate heat from the heat sources.

Further, the camera contact section cushion 4127 compressed between the camera contact section holder 4122 and the rear cover 4123 is reduced in the amount of compression in accordance with the movement of the camera contact section holder 4122. However, the space between the camera contact section holder 4122 and the rear cover 4123 remains filled by the camera contact section cushion 4127, and hence it is possible to prevent dust from entering the inside even when the camera contact section holder 4122 is shifted.

As described above, the heat dissipation module 4200 of the present embodiment has the common engagement interfaces on the two surfaces opposite and parallel to each other, respectively, and makes it possible to dissipate heat from various component modules, including the camera body 4100, without impairing the expandability of the system camera.

Further, in the present embodiment, the camera connection unit 4111 urged and supported by the camera compression springs 4126 within the camera body 4100 is thermally disconnected from the heat sources of the main board 4128 by providing a clearance therebetween when in the normal state. Further, when the camera connection unit 4111 is pressed into the camera body 4100, the camera connection unit 4111 is thermally connected to the heat sources of the main board 4128 by being brought into contact therewith.

Further, when the heat dissipation module 4200 is fixed to the camera body 4100, the heat dissipation module front-side connection unit 4201 presses the camera connection unit 4111 into the camera body 4100. With this, the main board 4128 and the camera connection unit 4111 are thermally connected, and also the camera connection unit 4111 and the heat dissipation module front-side connection unit 4201 are thermally connected, whereby the heat sources and the cooling section are thermally connected to make it possible to cool the heat sources.

That is, when the heat dissipation module 4200 is not fixed, heat of the main board 4128 is not transferred to the camera connection unit 4111, whereby it is possible to prevent the camera contact surface portion 4122a forming part of the exterior from being heated. Further, when the heat dissipation module 4200 is fixed, the main board 4128, the camera connection unit 4111, and the heat dissipation module front-side connection unit 4201 are thermally connected, whereby it is possible to efficiently dissipate heat.

Although detailed description is omitted, in a case where a recorder module or the like other than the heat dissipation module 4200 is connected to the camera body 4100, the dimension of each associated component and distances between the components in the optical axis direction are set such that the contact holder of the recorder module or the like is not in contact with the camera contact section holder 4122. With this, the position of the camera connection unit 4111 in the optical axis direction is not changed, and the gap H between the camera contact section heat dissipation rubber 4125 and the main board heat dissipation plate 4129 is maintained. That is, it is also possible to prevent heat generated by the main board 4128 from being transferred to such a module other than the heat dissipation module 4200.

Figure 63A:
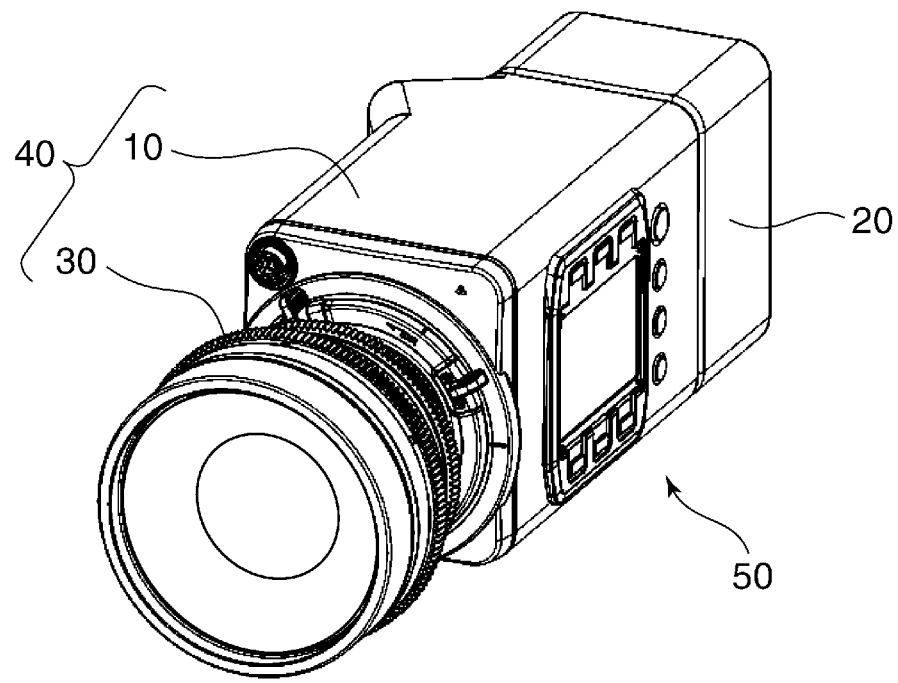
FIG. 63A is a perspective view showing the appearance of a system camera according to an eighth embodiment of the present invention.
Figure 63B:
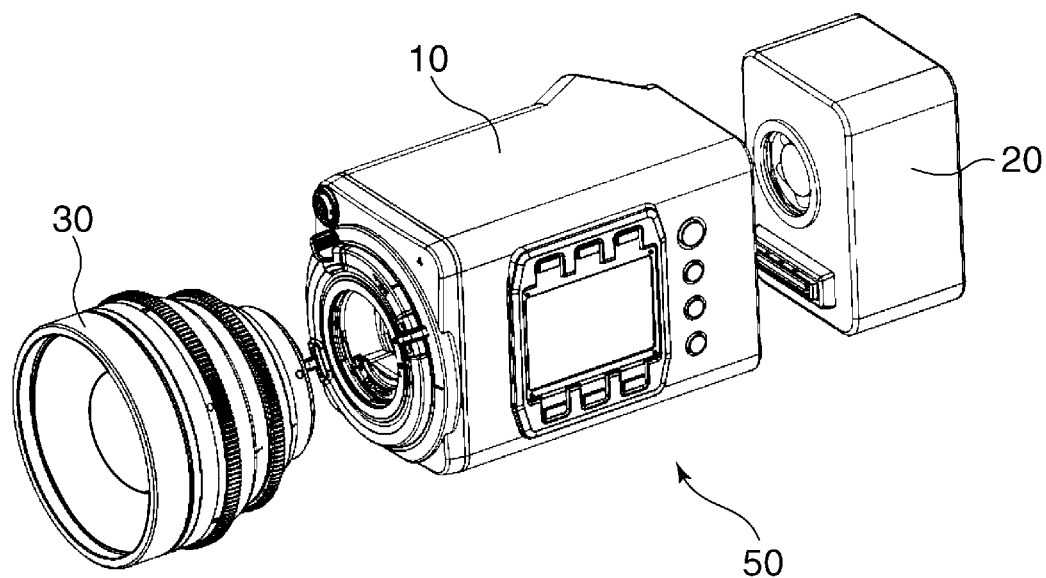
FIG. 63B is an exploded perspective view of the system camera shown in FIG. 63A.

FIG. 63A is a perspective view showing the appearance of a system camera 50 according to an eighth embodiment of the present invention. FIG. 63B is an exploded perspective view of the system camera 50 shown in FIG. 63A.

As shown in FIGS. 63A and 63B, the system camera 50 of the present embodiment is comprised of a digital video camera (hereinafter referred to as the camera) 40 and a heat dissipation module 20. The camera 40 has an interchangeable lens barrel 30 removably mounted on a front side (object side) of a camera body 10. Note that the camera 40 may be one in which the camera body 10 and the lens barrel 30 are integrally formed with each other. The camera 40 corresponds to an example of an image pickup apparatus of the present invention.

On a rear side (rear surface) of the camera body 10, the heat dissipation module 20 is removably mounted. The heat dissipation module 20 and the camera body 10 are fixed with fixing portions, not shown. The lens barrel 30 and the heat dissipation module 20 are electrically connected to the camera body 10 each in a state mounted to the camera body 10.

Figure 64:
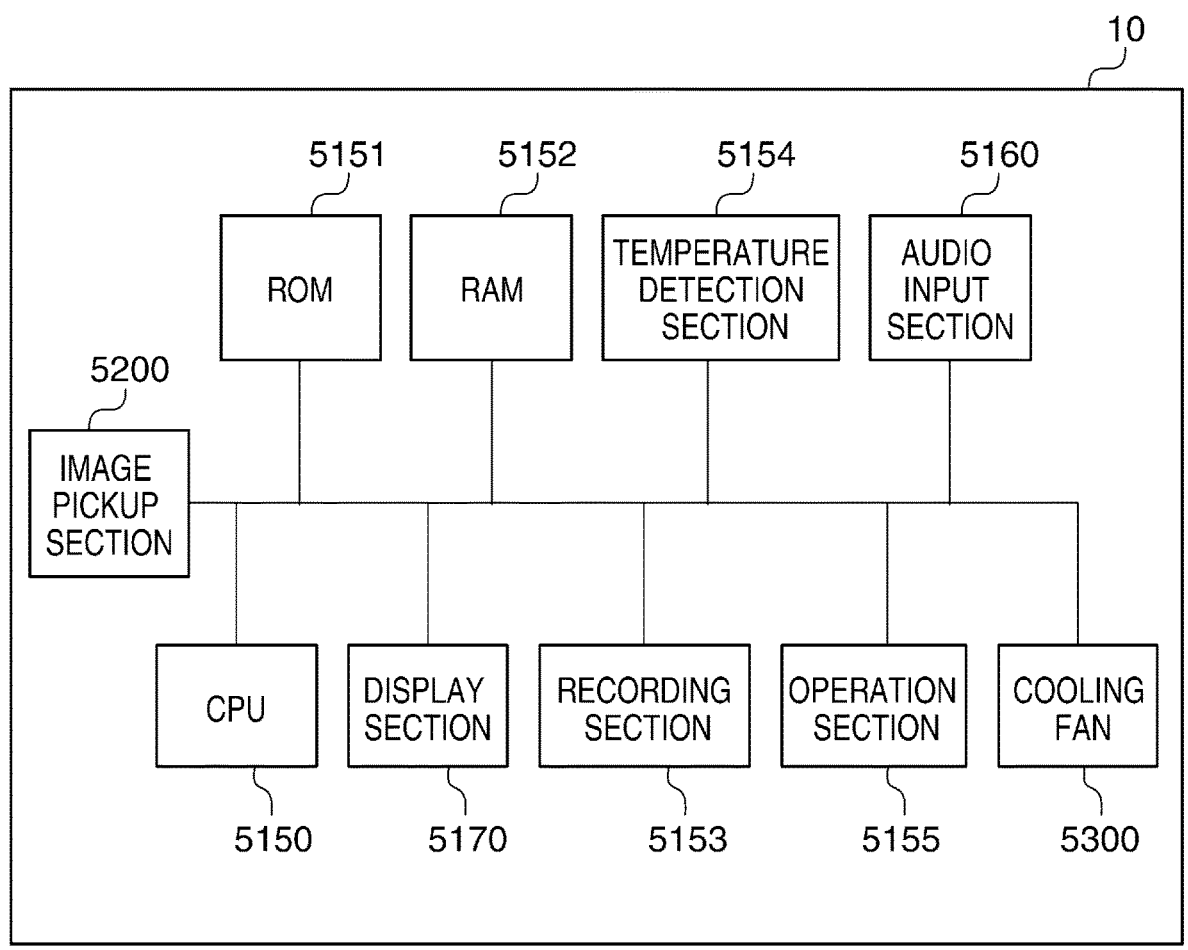
FIG. 64 is a block diagram of the system configuration of a camera body.

FIG. 64 is a block diagram of the system configuration of the camera body 10. Referring to FIG. 64, an image pickup section 5200 includes an image pickup device, such as a CCD sensor or a CMOS sensor, and an analog-to-digital converter. The image pickup device outputs electric signals (analog signals) representing an optical image formed thereon through the lens barrel 30. The analog-to-digital converter converts the analog signals to digital signals, and outputs the digital signals as image data.

An audio input section 5160 includes a microphone that receives external sound and converts the sound to electric signals, and outputs audio data corresponding to the electric signals output from the microphone. A ROM 5151 is an electrically erasable/recordable memory, and an EEPROM or the like is used for the ROM 5151. The ROM 5151 stores constants for the operation of a CPU 5150, and programs. The CPU 5150 controls the overall operation of the camera body 10. The CPU 5150 execute the programs stored in the ROM 5151 to thereby control a rotational speed and a rotational direction of cooling fans 5300 and 5730, described hereinafter, and perform predetermined processing. The cooling fan 5300 corresponds to an example of a first fan of the present invention, and the cooling fan 5730 corresponds to an example of a second fan of the present invention.

A RAM 5152 is used as a system memory, a work memory, an image memory, and an audio memory. The constants for the operation of the CPU 5150, variables, and the programs read out from the ROM 5151 are loaded into the RAM 5152. Image data and audio data output from the audio input section 5160 are temporarily stored e.g. in the RAM 5152.

The CPU 5150 sends image data and audio data recorded in the RAM 5152 to a recording section 5153, and records the data in the recording section 5153. Note that the recording section 5153 is a recording medium, such as a memory card. The CPU 5150 displays an image corresponding to image data recorded in the RAM 5152 on a display section 5170. Note that a liquid crystal panel, an organic EL, or the like is used as the display section 5170.

A temperature detection section 5154 implemented e.g. by a thermistor, and is mounted on a main board 5400, referred to hereinafter. An operation section 5155 is operated by a user, and provides various instructions to the CPU 5150. The cooling fan 5300 is a component of a fan duct unit 5301, referred to hereinafter, and cools the camera body 10.

Figure 65A:
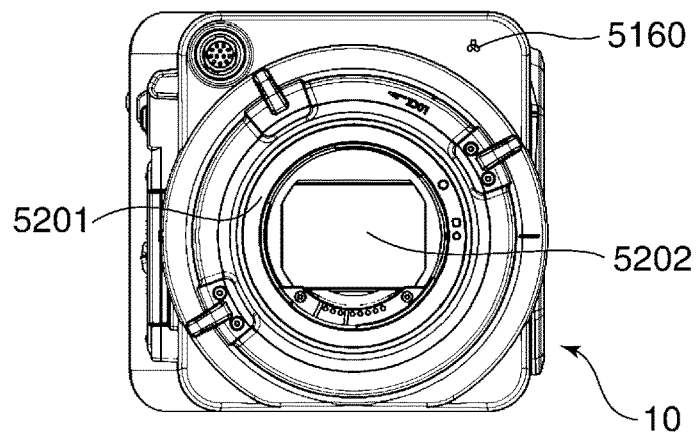
FIGS. 65A to 65C are views useful in explaining the camera body.
Figure 65B:
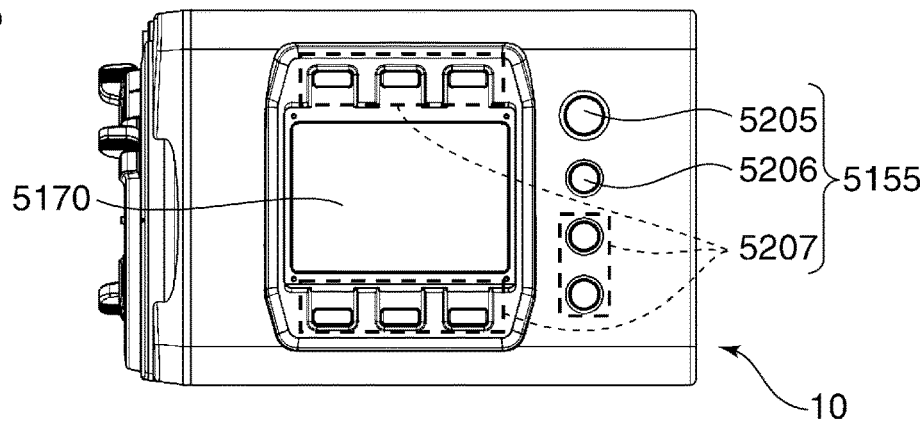
Figure 65C:
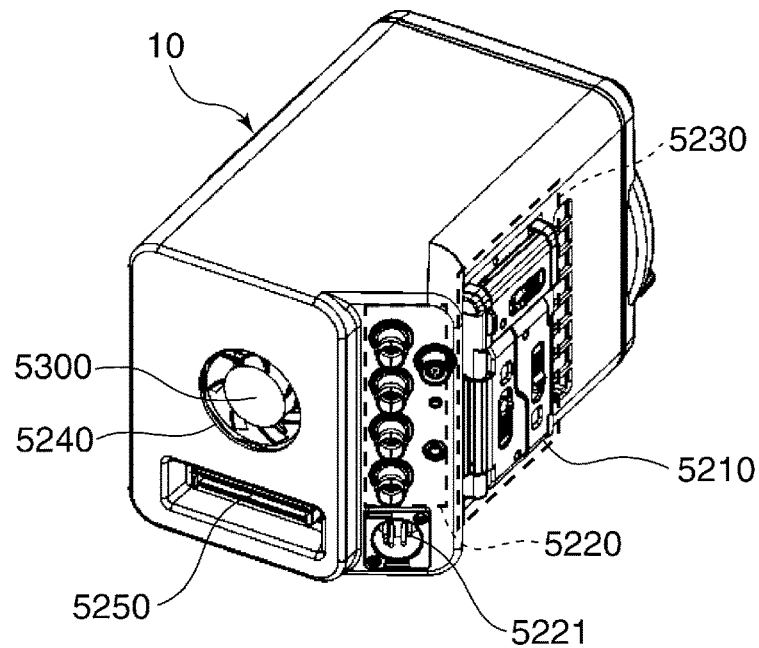

FIG. 65A is a front view of the camera body 10. FIG. 65B is a side view of a right side of the camera body 10 as viewed from the front. FIG. 65C is a perspective view of the camera body 10 as viewed from the rear. As shown in FIG. 65A, the camera body 10 is provided with a mount 5201 for fixing the lens barrel 30, an ND unit 5202 which reduces light entering the image pickup section 5200 (see FIG. 64), and so forth.

Further, the microphone as the audio input section 5160 is provided on the front surface of the camera body 10. Therefore, the audio input section 5160 is arranged at a location remote from the cooling fan 5300 provided on the rear side of the camera body 10 (see FIG. 65C). This prevents the audio input section 5160 from being affected by noise caused by vibration and rotation of the cooling fan 5300.

A shown in FIG. 65B, on the right side of the camera body 10 as viewed from the front of the camera body 10, there are arranged a power button 5205, a photographing button 5206, and an operation button group 5207, which form the operation section 5155, and the display section 5170. As shown in FIG. 65C, on a left side of the camera body 10 as viewed from the front of the camera body 10, there are arranged a card slot cover 5210, an external input/output terminal section 5220, a power supply terminal 5221, and a body air inlet port 5230. The card slot cover 5210 openably covers an opening of a card slot, not shown.

Further, as shown in FIG. 65C, on a rear side of the camera body 10, there are arranged a rear air outlet port 5240 and a connector 5250, and the cooling fan 5300 is disposed in the vicinity of the rear air outlet port 5240. The inside of the camera body 10 is cooled by the cooling fan 5300, using the body air inlet port 5230 and the rear air outlet port 5240 which communicates with the body air inlet port 5230.

Figure 66:
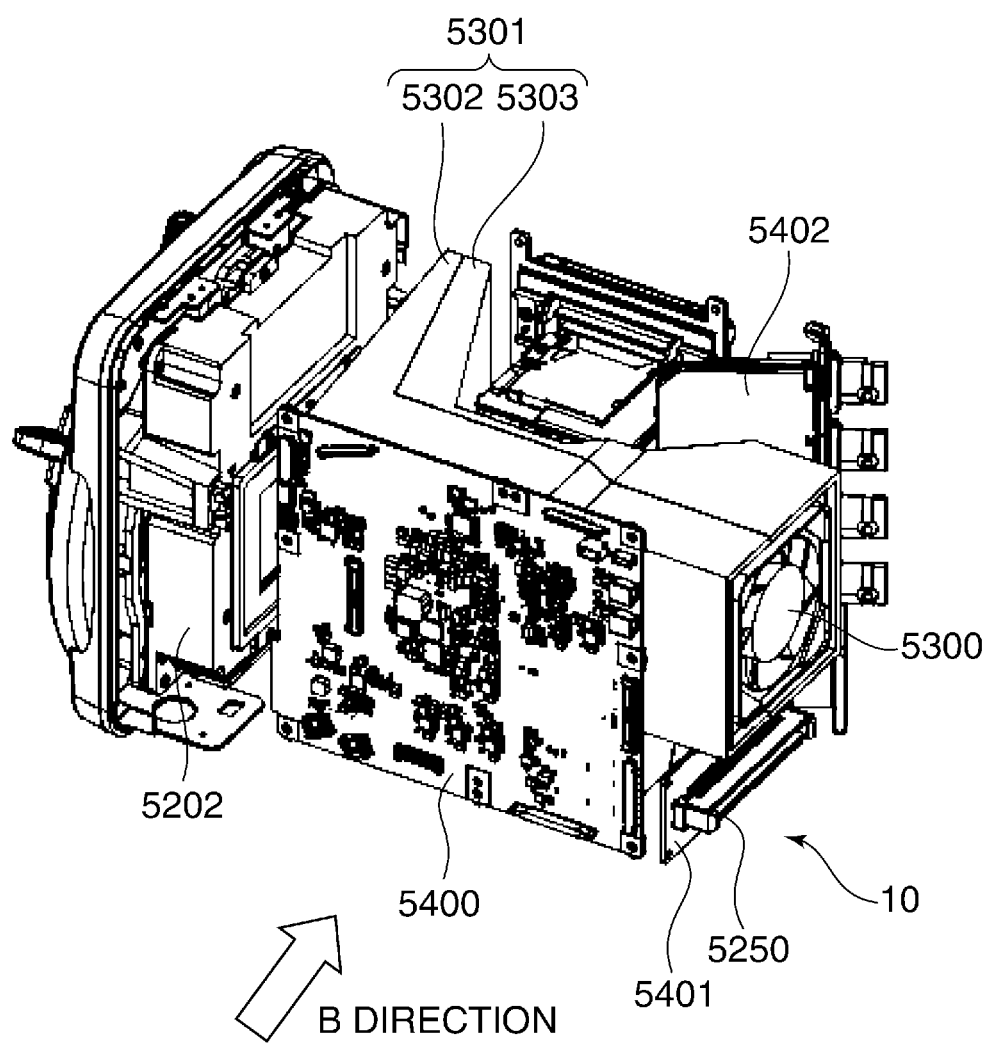
FIG. 66 is an exploded perspective view of the camera body.

FIG. 66 is an exploded perspective view of the camera body 10. As shown in FIG. 66, the camera body 10 includes the fan duct unit 5301, the main board 5400, a connection board 5401, and an input/output board 5402. The fan duct unit 5301 is comprised of a right duct 5302, a left duct 5303, and the cooling fan 5300, and dissipates heat from heat generating components mounted on the main board 5400.

The right duct 5302 and the left duct 5303 are formed of a metallic material, such as aluminum or magnesium. The connector 5250 is mounted on the connection board 5401, and is electrically connected to a connector 5501 of the heat dissipation module 20 to transmit and receive power supply, control signals, and a video signal.

Figure 67A:
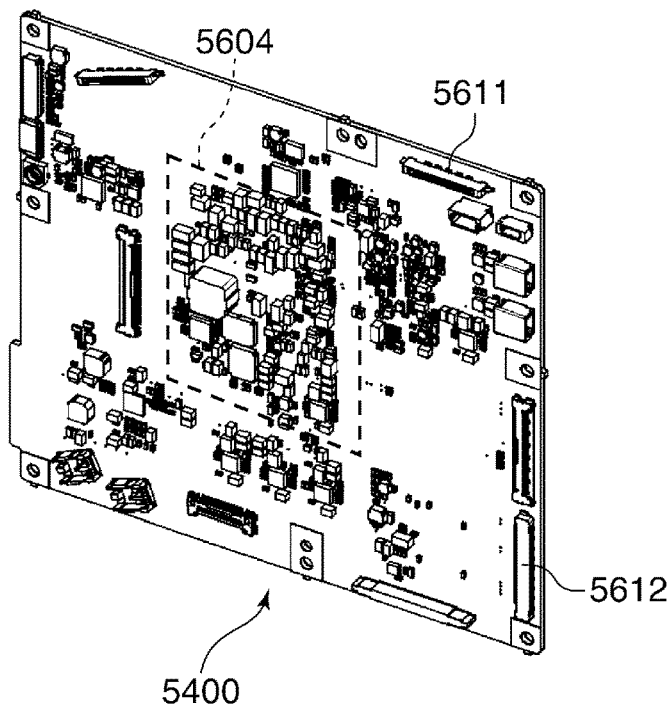
FIGS. 67A and 67B are views useful in explaining a main board.
Figure 67B:
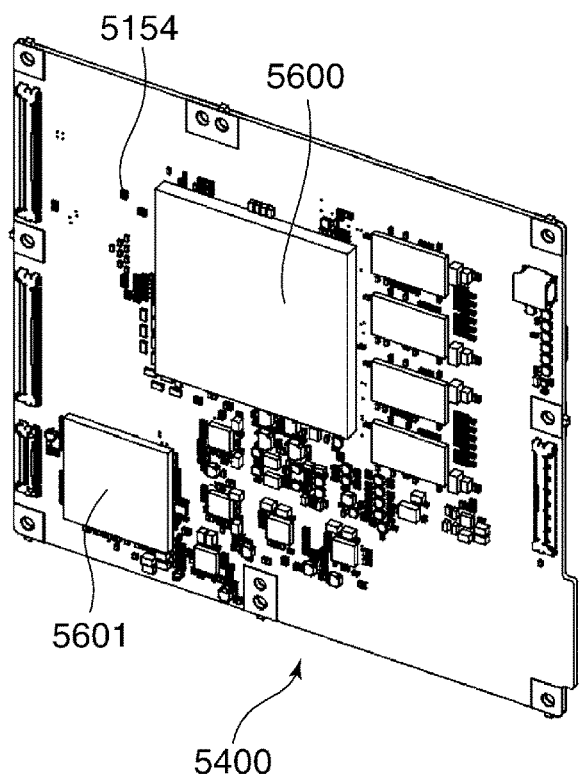

FIG. 67A is a perspective view of the main board 5400 as viewed from an arrow B shown in FIG. 66. FIG. 67B is a perspective view of the main board 5400 shown in FIG. 67A, as viewed from the opposite side. As shown in FIG. 67A, power supply circuit components 5604 for supplying electric power to other electric components, and a connector 5611 and a connector 5612 for connecting to the connection board 5401 and the input/output board 5402, via thin coaxial cables, not shown, are mounted on the main board 5400. The temperature detection section 5154 is mounted in the vicinity of an IC 5600, and detects the temperature of the IC 5600 based on a change of electric resistance. The rotational speed and the rotational direction of the cooling fan 5300 are controlled by the controller, such as the CPU 5150 mounted on the main board 5400, according to a temperature acquired from the temperature detection section 5154.

As shown in FIGS. 67A and 67B, the main board 5400 is electrically connected to all electronic devices, and hence a large number of ICs are mounted on the main board 5400.

In the present embodiment, the IC 5600 and an IC 5601 are large in heat generation amount, and hence these ICs are mounted on an area of the main board 5400, close to the fan duct unit 5301. Heat generated by the IC 5600 and the IC 5601 is transferred to the fan duct unit 5301 using heat dissipation rubber, not shown.

Figure 68A:
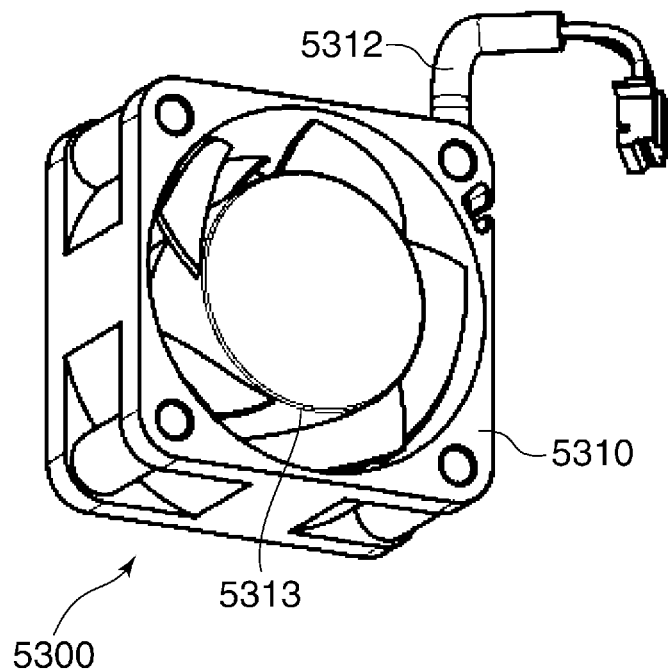
FIGS. 68A and 68B are views useful in explaining a cooling fan incorporated in the camera body.
Figure 68B:
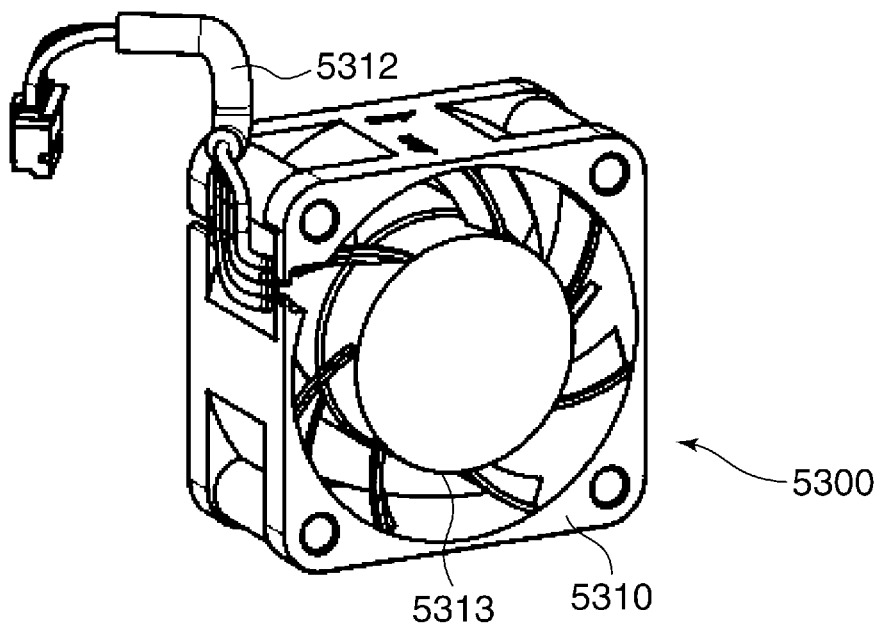

Next, the cooling fan 5300 incorporated in the camera body 10 will be described with reference to FIGS. 68A and 68B. FIG. 68A is a perspective view of the cooling fan 5300 as viewed from the front. FIG. 68B is a perspective view of the cooling fan 5300 shown in FIG. 68A as viewed from the rear. As shown in FIGS. 68A and 68B, the cooling fan 5300 is a compact-type axial fan, with an exterior formed by a frame 5310 made of resin, and includes fan wires 5312 for electrically connecting to the main board 5400, and a fan board, not shown.

The cooling fan 5300 holds therein a motor, not shown, to which the cooling fan 5300 is electrically connected via the fan board, and generates a pressure difference by rotating a blade assembly 5313 using the motor to feed air. Further, as means for detecting rotation of the blade assembly 5313, a magnet, not shown, is provided on the blade assembly 5313, and a magnetic sensor, such as a hall element, not shown, is provided on the fan board.

The fan board includes control means for detecting the rotational speed of the blade assembly 5313 and performing feedback control so as to rotate the blade assembly 5313 at a predetermined rotational speed, and hence is capable of controlling the rotational speed of the blade assembly 5313. In general, the axial fan can achieve a sufficient airflow rate even when the bade assembly 5313 is rotated at a low speed. By rotating the blade assembly 5313 at a low speed, it is also possible to reduce noise, such as wind noise and motor noise.

Figure 69A:
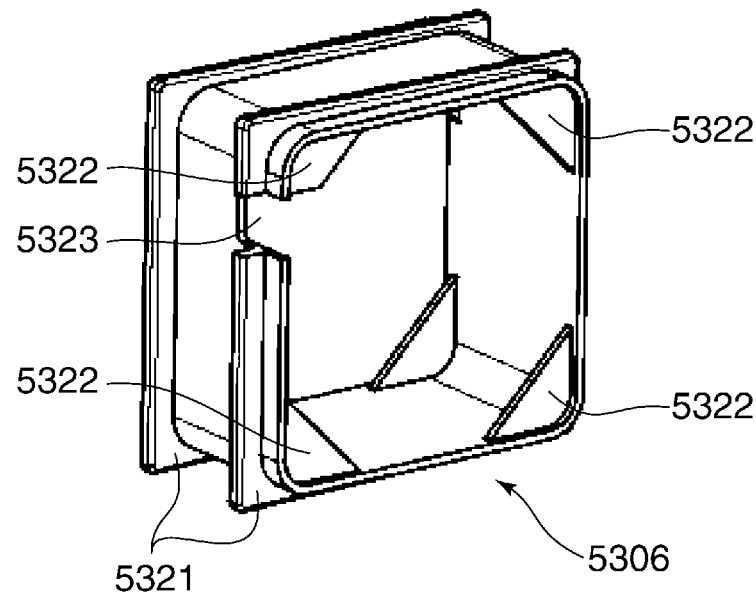
FIG. 69A is a perspective view of a fan rubber.
Figure 69B:
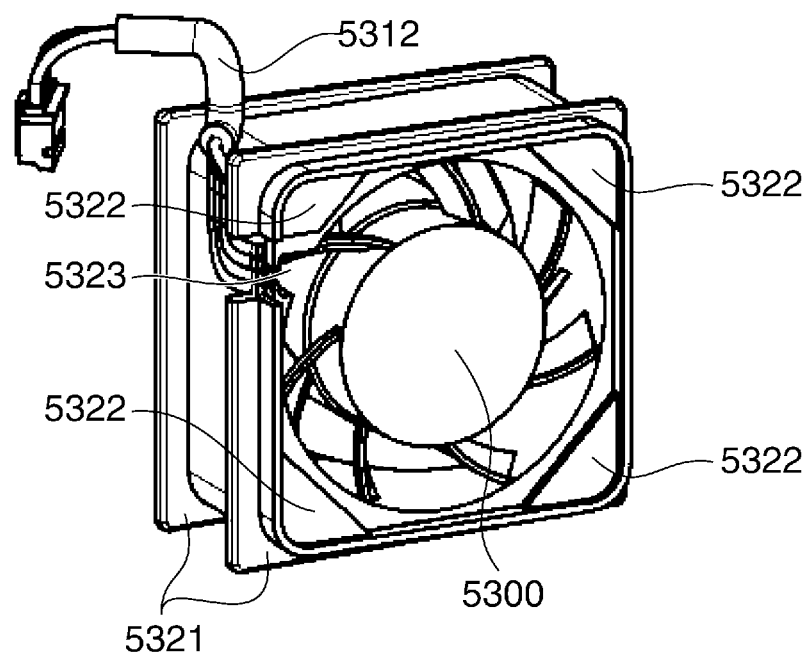
FIG. 69B is a perspective view of the fan rubber in a state having the cooling fan of the camera body assembled thereto.

Next, a fan rubber 5306 in which the cooling fan 5300 is assembled will be described with reference to FIGS. 69A and 69B. FIG. 69A is a perspective view of the fan rubber 5306. FIG. 69B is a perspective view of the fan rubber 5306 in a state having the cooling fan 5300 assembled therein. As shown in FIG. 69A, the fan rubber 5306 is provided with outer ribs 5321 formed of an elastic material, such as silicone rubber, inner ribs 5322, and a cutout 5323. The inner ribs 5322 are provided in four corners inside the fan rubber 5306, respectively.

As shown in FIG. 69B, the fan rubber 5306 sandwiches and holds the cooling fan 5300 between the inner ribs 5322 in the axial direction so as not to cover the openings of the inlet side and the outlet side of the cooling fan 5300. By assembling the cooling fan 5300 in the fan rubber 5306, the camera body 10 is prevented from being affected by vibration caused by rotation of the blade assembly 5313 of the cooling fan 5300. Further, the outer ribs 5321 are brought into contact with the right duct 5302 and the left duct 5303 of the fan duct unit 5301 (see FIG. 66), to thereby prevent air from flowing backward within the fan duct unit 5301.

Figure 70A:
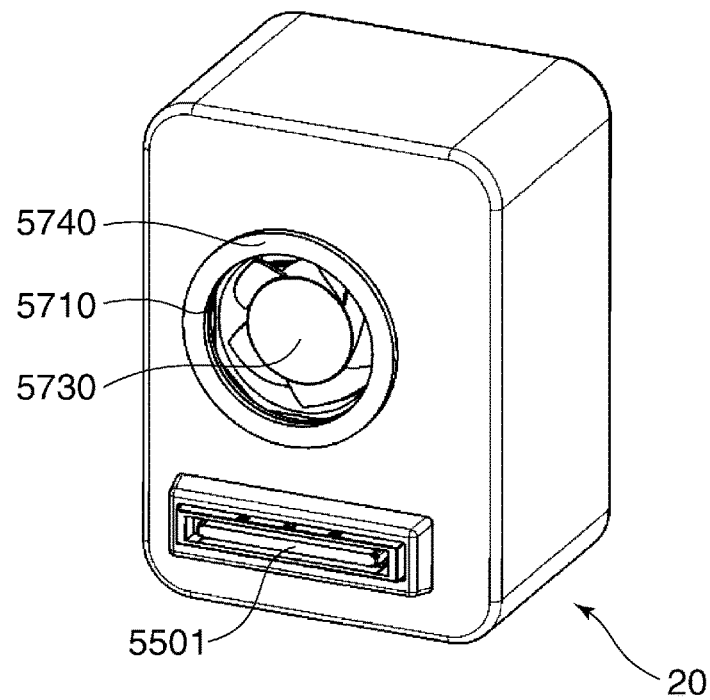
FIG. 70A is a perspective view of a heat dissipation module, as viewed from a mounting surface side of the camera body.
Figure 70B:
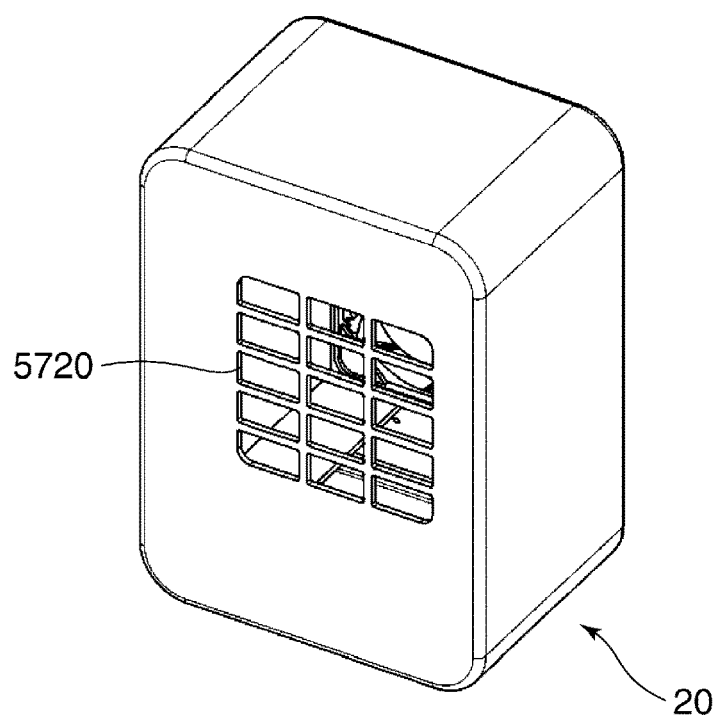
FIG. 70B is a perspective view of the heat dissipation module, as viewed from a reverse side of FIG. 70A.

FIG. 70A is a perspective view of the heat dissipation module 20, as viewed from a mounting surface side of the camera body 10. FIG. 70B is a perspective view of the heat dissipation module 20, as viewed from a side opposite to the side in FIG. 70A. As shown in FIG. 70A, the heat dissipation module 20 is provided with the connector 5501 which is connected to the connector 5250 of the camera body 10. An air inlet port 5710 of the cooling fan 5730 is provided at a location upward of the connector 5501, and an elastic member 5740 is provided along the periphery of the opening of the air inlet port 5710. The cooling fan 5730 is assembled in a fan rubber 5760 (see FIG. 71B), and is fixed inside a duct 5750 (see FIG. 71B).

Further, as shown in FIG. 70B, a rear surface of the heat dissipation module 20 is provided with an air outlet port 5720, and when the cooling fan 5730 is operated, air is drawn from the air inlet port 5710, and is discharged from the air outlet port 5720.

Figure 71A:
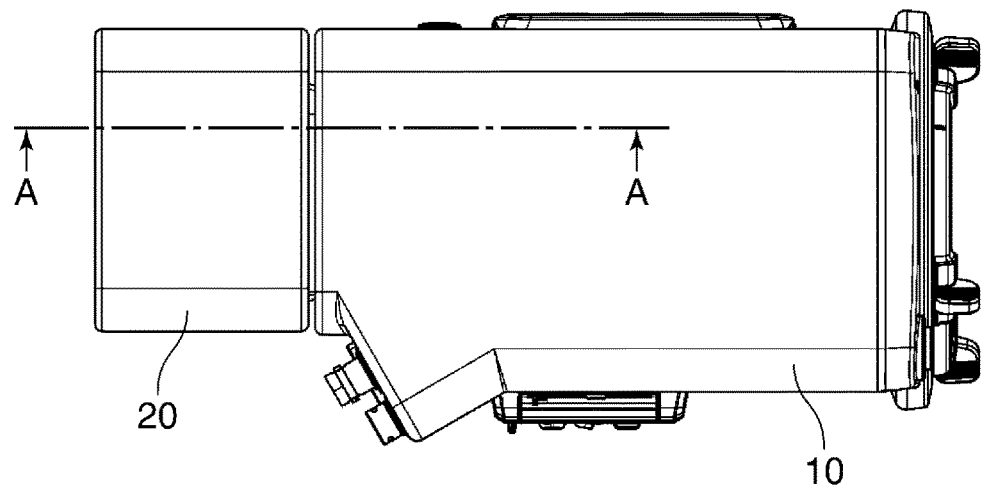
FIG. 71A is a view of the heat dissipation module in a state mounted to the camera body, as viewed from above.
Figure 71B:
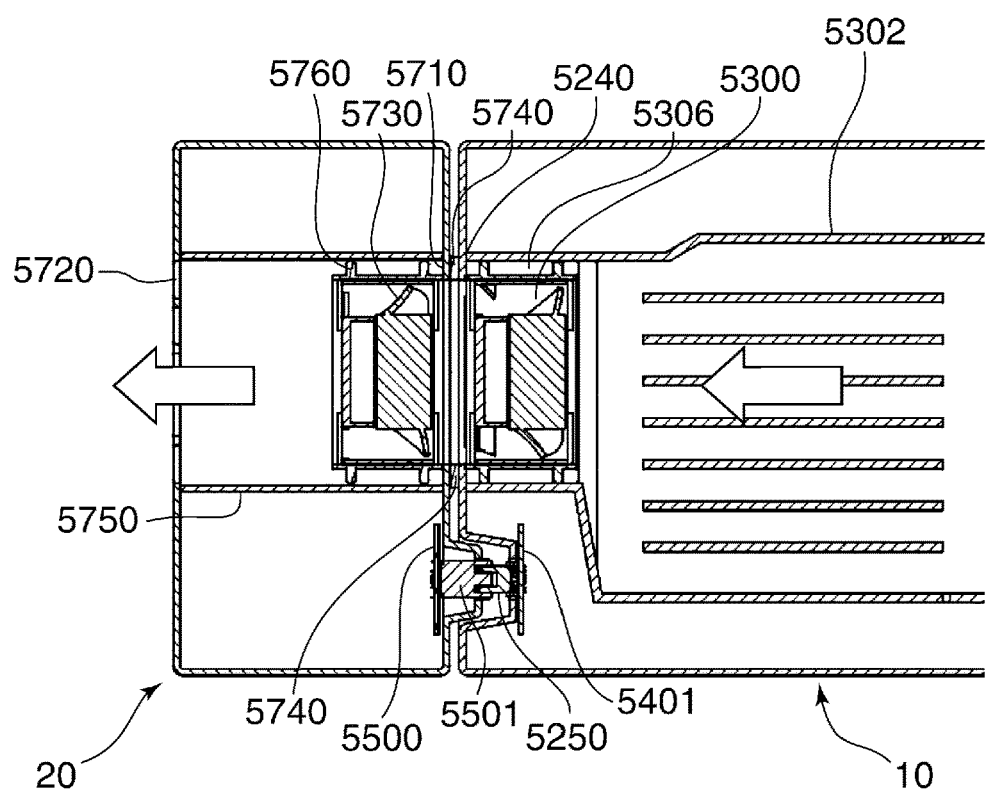
FIG. 71B is a cross-sectional view taken along A-A in FIG. 71A.

FIG. 71A is a view of the heat dissipation module 20 in a state mounted to the camera body 10, as viewed from above. FIG. 71B is a cross-sectional view taken along A-A in FIG. 71A. In FIG. 71A, the line A-A indicates the approximate center of the fan duct unit 5301 of the camera body 10. As shown in FIG. 71B, the rear air outlet port 5240 of the camera body 10 and the air inlet port 5710 of the heat dissipation module 20 are engaged with each other via the elastic member 5740, and the heat dissipation module 20 is mounted to the camera body 10 e.g. with screws, not shown, in this state.

The fan rubber 5760 is brought into contact with the inner wall of the duct 5750 via its outer ribs, not shown, each having the same shape as that of each of the outer ribs 5321 of the fan rubber 5306, to thereby prevent air from flowing backward. By operating the cooling fans 5300 and 5730 in this state, flow of air is generated in the internal space of the fan duct unit 5301 and the duct 5750.

Then, the air drawn from the body air inlet port 5230 of the camera body 10 flows through the camera body 10 and the heat dissipation module 20 via the fan duct unit 5301, the rear air outlet port 5240, the air inlet port 5710, the cooling fan 5730, and the duct 5750, and is discharged from the air outlet port 5720. Note that arrows in FIG. 71B indicate flow of air.

Here, as mentioned above, the elastic member 5740 is provided between the rear air outlet port 5240 of the camera body 10 and the air inlet port 5710 of the heat dissipation module 20. This elastic member makes it difficult to transfer vibration generated when the cooling fan 5730 is rotated to the camera body 10, and prevents air from leaking between the rear air outlet port 5240 and the air inlet port 5710.

Further, when the heat dissipation module 20 is mounted to the camera body 10, the connector 5501 mounted on a connection board 5500 of the heat dissipation module 20 is connected to the connector 5250 mounted on the connection board 5401 of the camera body 10. Supply of electric power for driving the cooling fan 5730 and communication of an operation signal of the cooling fan 5730 are performed between the camera body 10 and the heat dissipation module 20 via the connectors 5250 and 5501.

The rotational speed and the rotational direction of the cooling fan 5730 are controlled by the controller, such as the CPU 5150 mounted on the main board 5400 of the camera body 10. Further, in a case where the temperature detected by the temperature detection section 5154 is higher than a predetermined temperature, not only the cooling fan 5300 but also the cooling fan 5730 has its rotational speed and rotational direction controlled by the controller. In doing this, by controlling the cooling fan 5730 and the cooling fan 5730 such that the rotational direction of the blades of the cooling fan 5730 and the rotational direction of the blades of the cooling fan 5300 are opposite to each other, it is possible to realize a high airflow rate and high static pressure based on the contra-rotating propeller principle.

This makes it possible to cause a large amount of air to flow even without causing the cooling fan 5730 and the cooling fan 5300 of the camera body 10 to rotate at high rotational speed, whereby the components mounted on the main board 5400 of the camera body 10, such as the IC 5600 and the IC 5601, are effectively cooled. Therefore, it is possible to increase the heat dissipation capability with low-speed rotation of the cooling fans 5300 and 5730 without increasing vibration components thereof.

As described above, in the present embodiment, in a case where it is desired to obtain sufficient heat dissipation performance e.g. in a very high use environmental temperature, the heat dissipation module 20 is mounted to the camera body 10, whereby it is possible to efficiently cool the components mounted on the boards using the cooling fans 5300 and the cooling fan 5730. In doing this, the operation conditions, such as the rotational speed and the rotational direction, of the cooling fans 5300 and 5730 are controlled so as to reduce the influence of vibration of the cooling fans 5300 and 5730, whereby it is possible to increase the heat dissipation capability without increasing the vibration components of the cooling fans 5300 and 5730. Further, in a case where the system camera is used in a power saving operation mode, such as low-resolution imaging, or in a relatively low use environment temperature, by removing the heat dissipation module 20 from the camera body 10, it is possible to efficiently cool the camera body 10 with the cooling fan 5300 alone, and operate the camera body 10 as one compact in size.

Figure 72A:
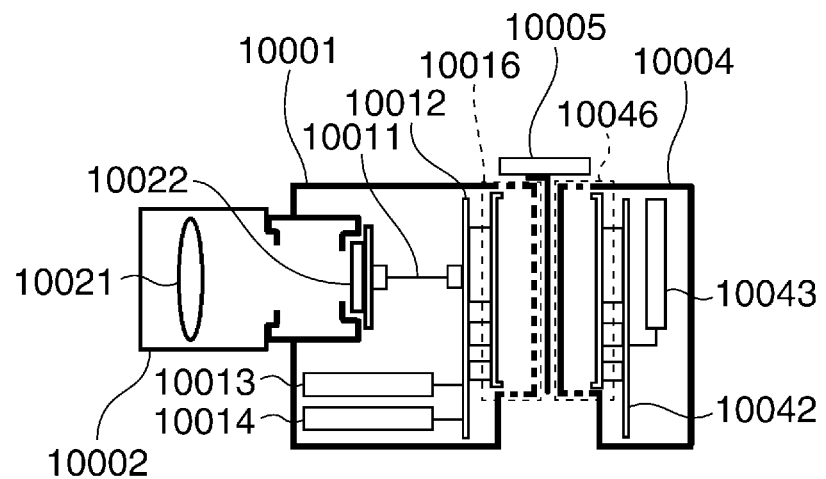
FIGS. 72A to 72D are conceptual views of a system camera according to a ninth embodiment of the present invention.

FIG. 72A is a conceptual view of a system camera according to a ninth embodiment of the present invention. FIG. 72A shows the system camera in a state in which an expansion module 10004 and a cooling module 10005 are mounted to a digital video camera 10001 (hereinafter referred to as the camera 10001). A user can additionally mount and connect any of a plurality of types of expansion modules to the camera, to thereby add a function or functions suitable for the form of use of the system camera. Further, power consumption of the system camera changes according to the form of use or the operation mode.

In view of this, it is possible to mount the cooling module 10005 to thereby prevent the temperatures of the camera 10001 and the expansion module 10004 from becoming higher than a specified temperature. Examples of the expansion module 10004 include a recording module having a recording function for recording imaging data transferred from the camera 10001, a module having a function for supplying electric power to the camera 10001, a module having operating means for enabling a user to operate the camera 10001, a module having an interface for connecting to another electronic device, a module having a display function for displaying imaging data transferred from the camera 10001, and so forth. In the present embodiment, the expansion module 10004 will be described as the recording module.

In the form of use shown in FIG. 72A, video data is not recorded in a recording section 10013 within the camera 10001, but is output to the expansion module 10004, and is recorded therein. This form of use is suitable, for example, for a case where large-volume data requiring high-load processing, such as a high bit rate video, is recorded for a long time period.

Figure 72B:
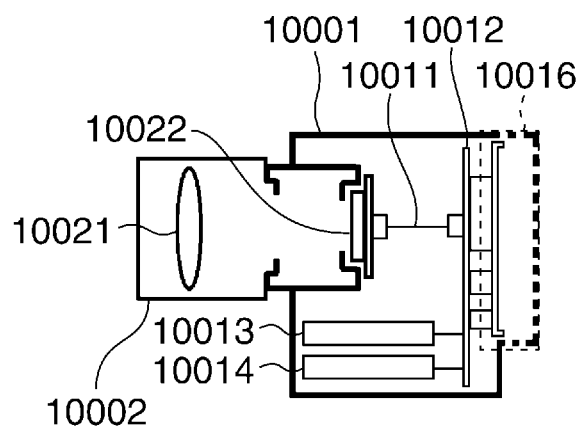

FIG. 72B is a conceptual views of the system camera in a state in which the camera 10001 is used as a single unit without having the expansion module 10004 or the cooling module 10005 mounted thereto. The camera 10001 used as a single unit is suitable for a case where small-volume data is recorded in the recording section 10013 included in the camera 10001.

Figure 72C:
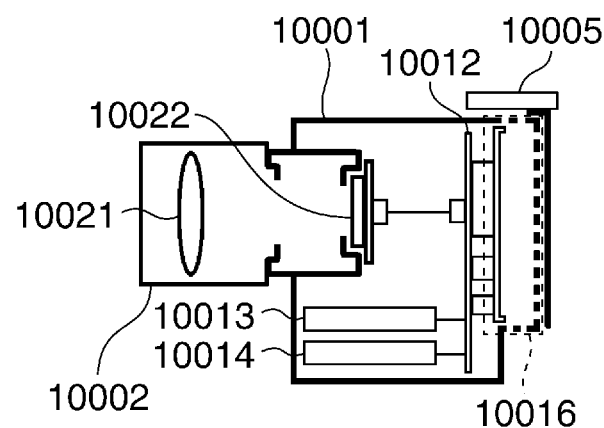

FIG. 72C is a conceptual view of the system camera in a state in which the camera 10001 has the cooling module 10005 mounted thereto without having the expansion module 10004 mounted thereto. The form of use shown in FIG. 72C is suitable for a case where video data is recorded in the recording section 10013 included in the camera 10001 for a short time period, and high load processing is executed at the same time, for example, a case where high bit rate video data is recorded for a short time period. The form of use shown in FIG. 72C can be applied to a system camera formed by the camera 10001 and the cooling module 10005 without an expansion module.

Figure 72D:
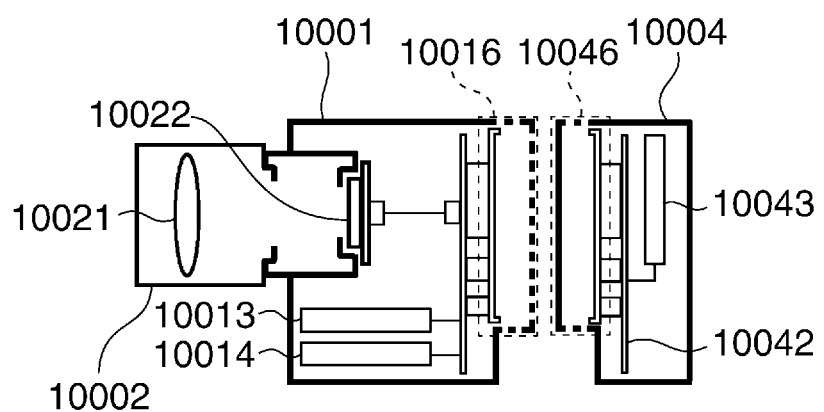

FIG. 72D is a conceptual view of the system camera in a state in which the camera 10001 has the expansion module 10004 mounted thereto without having the cooling module mounted thereto. The form of use shown in FIG. 72D is suitable for a case where although video data is output from the camera 10001 to the expansion module 10004 and recorded therein, cooling is not needed during photographing e.g. under a low temperature environment.

Referring again to FIG. 72A, the configuration and basic operation of the system camera will be described. The camera 10001 has a lens barrel 10002 including a lens 10021, disposed on a front side thereof. The lens barrel 10002 may be removably mounted to the camera 10001 by a mount method using e.g. a bayonet mount, or may be provided integrally with the camera 10001.

Further, the camera 10001 includes an image pickup device 10022, a flexible board 10011, a circuit board 10012, a recording section 10013, a power supply section 10014, and a heat dissipation section 10016. The image pickup device 10022 converts optical information of an image formed through the lens 10021 to electric signals, and transfers the electric signals to the circuit board 10012 via the flexible board 10011.

The circuit board 10012 performs processing for transferring electric signals sent from the image pickup device 10022 to the recording section 10013, and recording the electric signals in the recording section 10013, and like other processing. The power supply section 10014 supplies electric power required for executing the above-mentioned processings. The recording section 10013 is implemented by a recording medium, such as a memory card which is removably mounted to the camera 10001. The recording medium is a small capacity memory, and is not suitable for recording large-volume data for a long time period.

Therefore, when recoding large-volume data, the expansion module 10004 is removably mounted to the rear side (rear surface) of the camera 10001, whereby data is output from the camera 10001 to the expansion module 10004, and is recorded therein. The expansion module 10004 receives electric signals processed by the circuit board 10012 and transmitted therefrom via an external interface, not shown in FIGS. 72A and 72D, at a circuit board 10042 thereof.

The circuit board 10042 sends the received electric signals to a recording section 10043 thereof, and causes the electric signals to be recorded therein. The heat dissipation section 10016 of the camera 10001 dissipates heat generated from the circuit board 10012. A heat dissipation section 10046 of the expansion module 10004 dissipates heat generated from the circuit board 10042.

Thick broken lines of the heat dissipation section 10016 and the heat dissipation section 10046 indicate where the ventilation ports are formed in exterior covers of the camera 10001 and the expansion module 10004. These ventilation ports exchange heat between the inside and the outside of each unit. The relationship between the cooling module 10005, the heat dissipation section 10016, and the heat dissipation section 10046 will be described hereinafter with reference to FIGS. 73A to 73C.

Figure 73A:
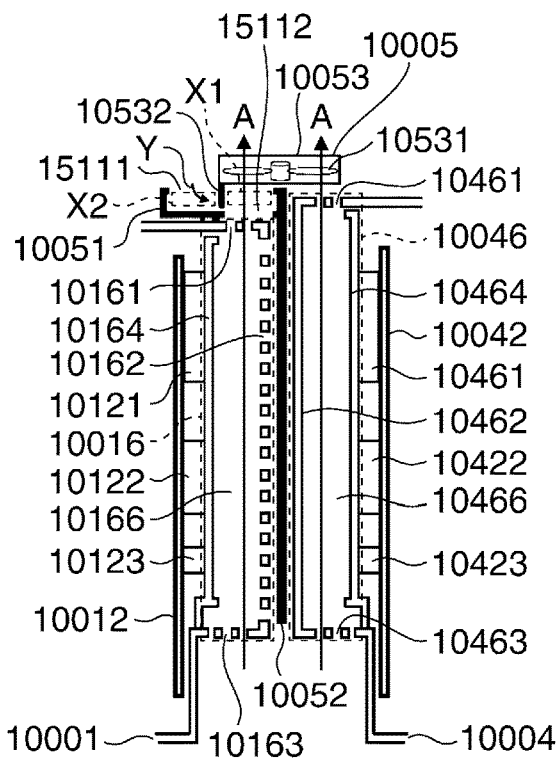
FIGS. 73A to 73C are conceptual views useful in explaining a cooling module, a heat dissipation section of a camera, and a heat dissipation section of an expansion module, and components associated therewith.
Figure 73B:
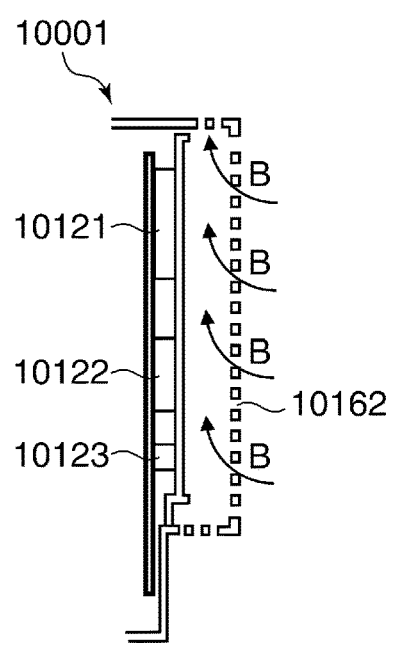
Figure 73C:
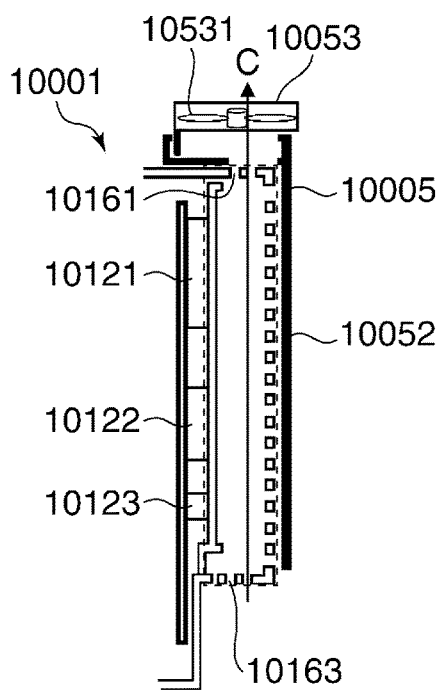

FIGS. 73A to 73C are conceptual views useful in explaining the cooling module 10005, the heat dissipation section 10016 of the camera, and the heat dissipation section 10046 of the expansion module 10004, and components associated therewith. FIG. 73A shows the camera 10001 in a state in which the expansion module 1004 and the cooling module 10005 are mounted thereto. FIG. 73B shows the camera 10001, as a single unit, in which neither the expansion module 1004 nor the cooling module 10005 is mounted thereto. FIG. 73C shows the camera 10001 in a state in which the expansion module 1004 is not mounted thereto, but the cooling module 10005 is mounted thereto.

As shown in FIG. 73A, the heat dissipation section 10016 of the camera 10001 has ventilation ports 10161 formed in the top (top surface) of the camera 10001, ventilation ports 10162 formed in a rear side (side surface) of the camera 10001, ventilation ports 10163 formed in the bottom (bottom surface) of the camera 10001, and a duct 10164. The duct 10164 may be formed with fin-shaped portions or pin-shaped portions for increasing heat transfer efficiency.

The circuit board 10012 has devices 10121 to 10123 mounted thereon for executing predetermined processing. The devices 10121 to 10123 are main heat sources during operation of the camera, and heat from the devices 10121 to 10123 is transferred to the duct 10164, and is discharged to a space 10166 formed by the ventilation ports 10161 to 10163 and the duct 10164.

On the other hand, the heat dissipation section 10046 of the expansion module 10004 has ventilation ports 10461 formed in the top of the expansion module 10004, a front portion 10462 of the expansion module 10004, which provides a heat dissipation surface, ventilation ports 10463 formed in the bottom of the expansion module 10004, and a duct 10464. The duct 10464 may be formed with fin-shaped portions or pin-shaped portions for increasing heat transfer efficiency.

The circuit board 10042 has devices 10421 to 10423 mounted thereon for executing processing for recording data in the recording section 10043. The devices 10421 to 10423 are main heat sources during operation of the expansion module 10004 is operated. Heat from the devices 10421 to 10423 is transferred to the duct 10464, and is discharged to a space 10466 formed by the ventilation ports 10461, the front portion 10462, the ventilation ports 10463, and the duct 10464.

The expansion module 10004 is fixed to the camera 10001 in such a manner that the front portion 10462 is opposed to the ventilation ports 10162 of the rear side of the camera 10001.

The cooling module 10005 includes a base portion 10051, a cover portion 10052, and a fan unit 10053. The cover portion 10052 is arranged at a location adjacent to the ventilation ports 10162 of the camera 10001, and covers the ventilation ports 10162. Details of the cover portion 10052 will be described with reference to FIG. 74.

The fan unit 10053 is arranged such that it can be shifted between a first position and a second position with respect to the base position 10051. Here, the first position is a position where the position of the cover portion 10052 coincides with the center of the fan unit 10053, so that the fan unit 10053 and the cover portion 10052 form a T shape, as shown in FIG. 73A. Further, the second position is a position where a read end portion of the fan unit 10053 substantially coincides with the cover portion 10052, as shown in FIG. 73C.

The fan unit 10053 includes axial fans 10531, and produces streams of air flow indicated by arrows A in FIG. 73A, and a stream of air indicated by an arrow C in FIG. 73C. The base portion 10051 has openings 15111 formed in a top surface via which it is mounted to the fan unit 10053, and has openings 15112 in a bottom surface via which it is mounted to the camera 10001. The openings 15111a re formed at respective locations immediately above the ventilation ports 10161.

Referring again to FIG. 73A, the fan unit 10053 in the first position extends over the space 10166 and the space 10466, and forms forced cooling airflow paths in both of the heat dissipation section 10016 and the heat dissipation section 10046 to cool the devices 10121 to 10123 and the devices 10421 to 10423.

At this time, the fan unit 10053 in the first position covers part (area X1) of the openings 15111, described hereinafter with reference to FIGS. 79A to 79C. Cover portions 10532 separate an overlapping area (area X1) and a non-overlapping area (area X2), and prevents outside air (arrow Y) from flowing into the forced cooling airflow paths formed by the cover portions 10532 and the heat dissipation section 10016.

As shown in FIG. 73B, when the camera 10001 is used as a single unit, the devices 10121 to 10123 are cooled by natural air cooling. In natural air cooling, it is desirable that outside air can be supplied to the vicinity of the heat sources of the camera 10001. In the present embodiment, it is possible to supply outside air B from the ventilation ports 10162 to the vicinity of the heat sources.

As shown in FIG. 73C, in a case where the expansion module 10004 is not mounted to the camera 10001 but the cooling module 10005 is mounted, the fan unit 10053 is disposed in the second position where the fan unit 10053 and the cover portion 10052 do not form the T shape. In this state, the cover portion 10052 covers the ventilation ports 10162, and a forced cooling airflow path C having the ventilation ports 10163 as air inlet ports and the ventilation ports 10161 as air outlet ports is formed. At this time, the fan unit 10053 covers the whole openings 15111.

Therefore, it is possible to draw up air by the whole axial fans 10531, and it is possible to rotate the axial fans 10531 at a lower speed than in FIG. 73A to thereby reduce noise, or cause the camera 10001 to perform high-load processing by increasing the cooling efficiency of the camera 10001.

Figure 74:
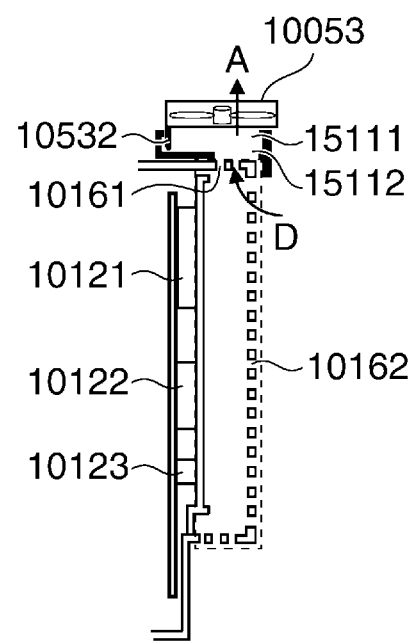
FIG. 74 is a view useful in explaining the function of a cover portion.

Next, a role played by the cover portion 10052 will be described with reference to FIGS. 73C and 74. In a case where the cover portion 10052 is not provided, even when the streams of air indicated by an arrow A in FIG. 74 are generated by the fan unit 10053, air is drawn from ones of the ventilation ports 10162 in the vicinity of the ventilation ports 10161 (air stream D), it is impossible to cool the devices 10121 to 10123.

As shown in FIG. 73C, by covering the ventilation ports 10162 with the cover portion 10052, the forced cooling airflow path C having the ventilation ports 10163 as the air inlet ports and the ventilation ports 10161 as the air outlet ports is formed. With this, outside air passes an area of the heat dissipation section in the vicinity of the devices 10121 to 10123, whereby it is possible to efficiently cool the devices 10121 to 10123.

Figure 75A:
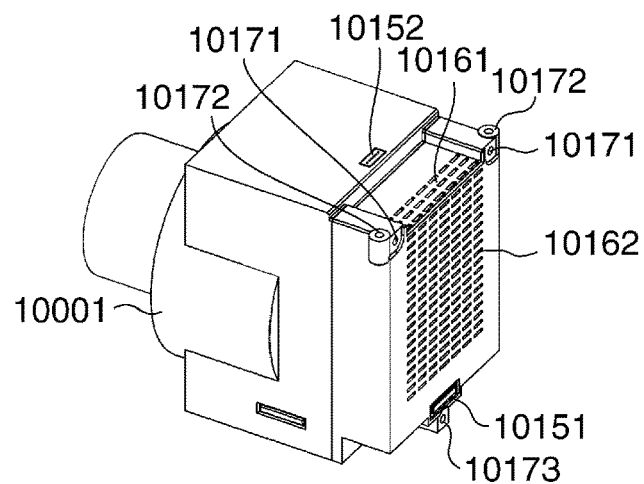
FIGS. 75A and 75B are perspective views showing a camera alone as a component of the system camera.
Figure 75B:
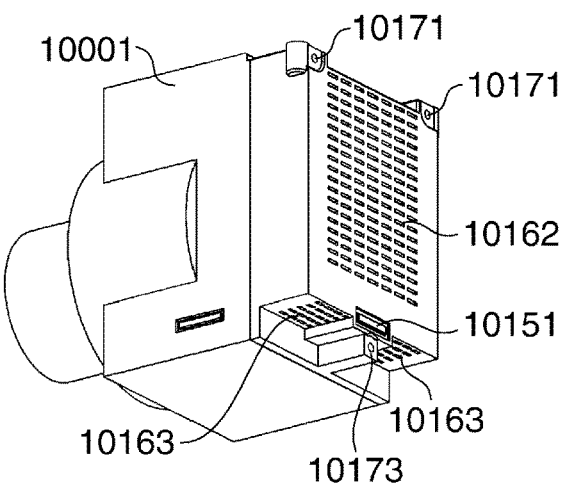

FIGS. 75A and 75B are perspective views showing the camera 10001 as a component of the system camera, in a state used as a single unit. The camera 10001 has the ventilation ports 10161 formed in the top thereof, the ventilation ports 10162 formed in the rear side thereof, and the ventilation ports 10163 formed in the bottom thereof. Further, the rear side (rear surface) of the camera 10001 is provided with an external interface 10151 at a location outside the ventilation ports 10162. The top of the camera 10001 is provided with an external interface 10152 for communicating with the cooling module 10005.

Fixing portions 10171 and 10173 fix the expansion module 10004, and are described, in the present embodiment, as screw fastening portions for screwing screws in the optical direction. Fixing portions 10172 fix the cooling module 10005, and are described, in the present embodiment, as screw fastening portions for screwing screws from the top.

Figure 76:
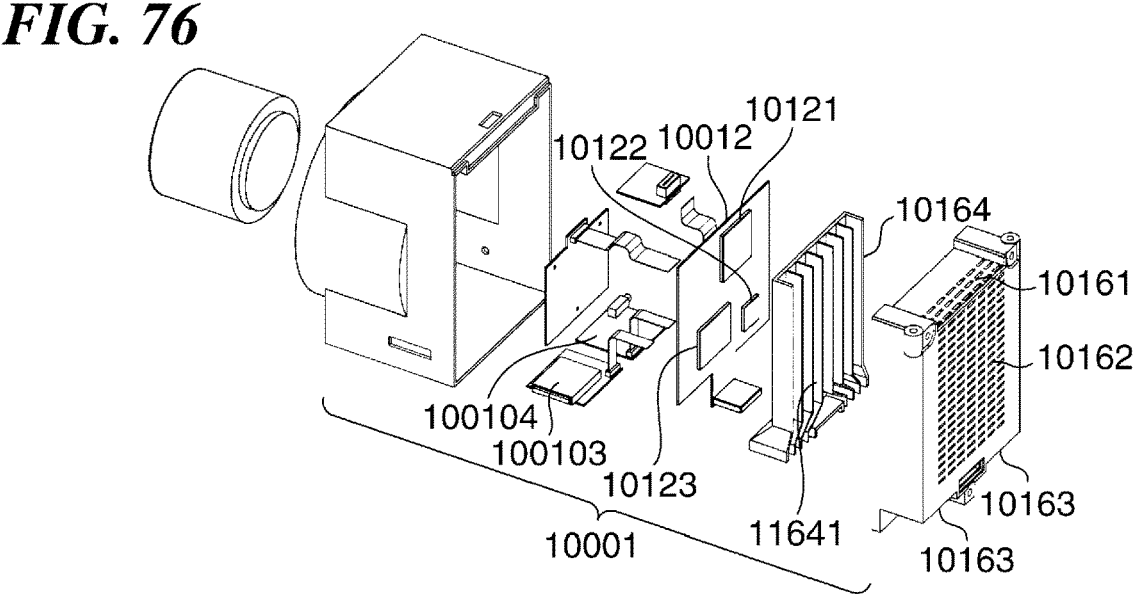
FIG. 76 is a perspective view, partly exploded, of the camera.

FIG. 76 is a perspective view, partly exploded, of the camera 10001. The circuit board 10012 has the devices 10121 to 10123, mounted thereon, which are main heat sources during recording operation. The devices 10121 to 10123 are in contact with the duct 10164. In the duct 10164, heat dissipation fins 11641 for increasing the heat transfer efficiency are arranged such that they extend along a direction toward the ventilation ports 10161 from the ventilation ports 10163.

Figure 77A:
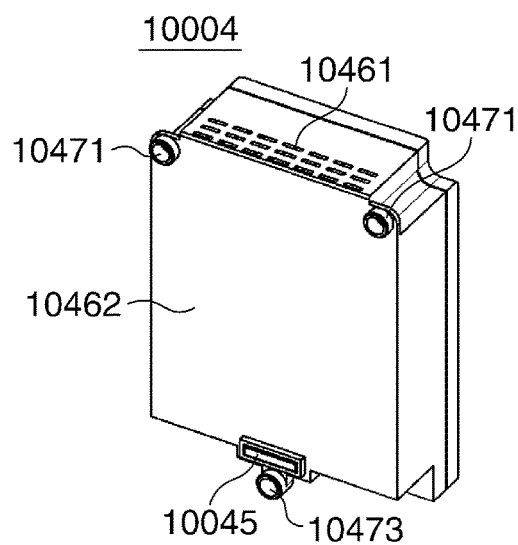
FIGS. 77A and 77B are perspective views of the expansion module.
Figure 77B:
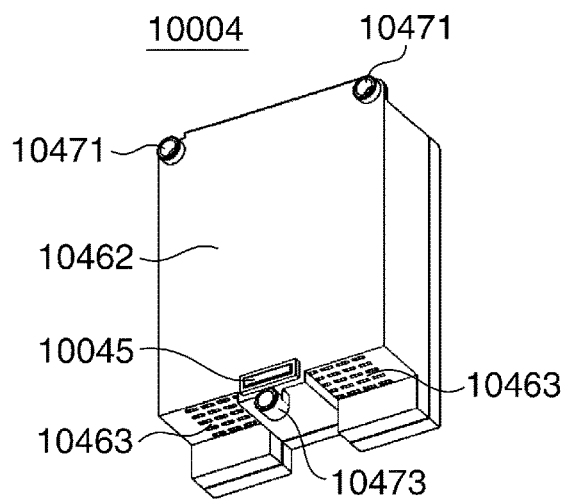

FIGS. 77A and 77B are perspective views of the expansion module 10004. The expansion module 10004 has the ventilation ports 10461 formed in the top (top surface) thereof and the ventilation ports 10463 formed in the bottom (bottom surface) thereof. Further, fixing portions 10471 and 10473 fix the expansion module 10004 to the camera 10001. In the present embodiment, the fixing portions 10471 and 10473 are described as screw seats for screwing screws in the optical axis direction, but this is not limitative. Any other means may be employed insofar as it is compatible with the fixing method used by the camera 10001.

The front portion 10462 is provided with an external interface 10045 for communicating with the external interface 10151 of the camera 10001. The communication method used by the external interface 10045 is known similar to the communication method used by the external interface 10151, and hence description thereof is omitted.

Figure 78:
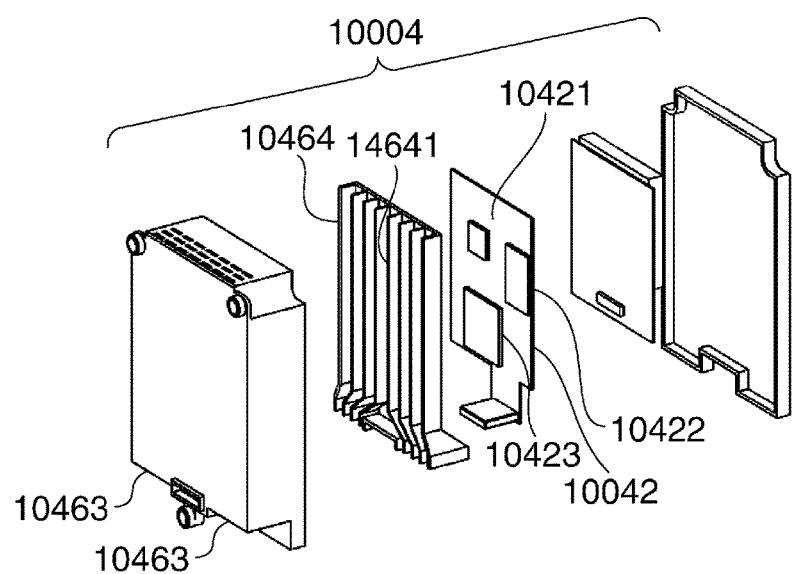
FIG. 78 is a perspective view, partly exploded, of the expansion module.

FIG. 78 is a perspective view, partly exploded, of the expansion module 10004. The circuit board 10042 has the devices 10421 to 10423, mounted thereon, which are main heat sources during imaging and recording operation, and the devices 10421 to 10423 are in contact with the duct 10464. In the duct 10464, heat dissipation fins 14641 for increasing the heat transfer efficiency are arranged such that they extend along a direction toward the ventilation ports 10461 from the ventilation ports 10463.

Figure 79A:
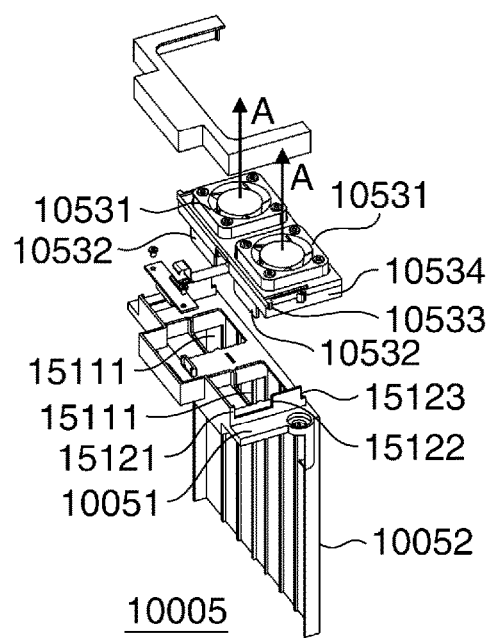
FIGS. 79A to 79C are exploded perspective views of the cooling module.
Figure 79B:
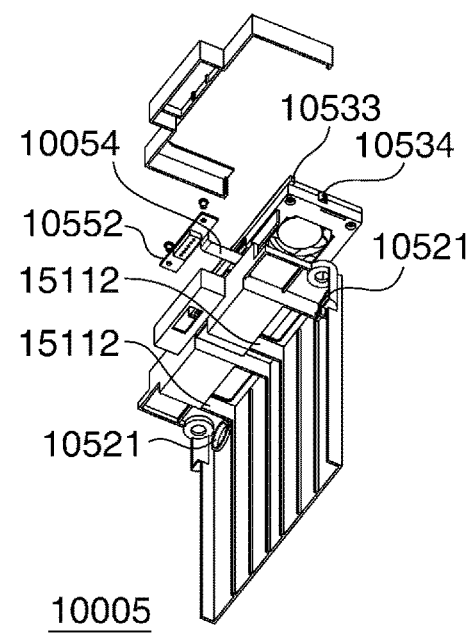
Figure 79C:
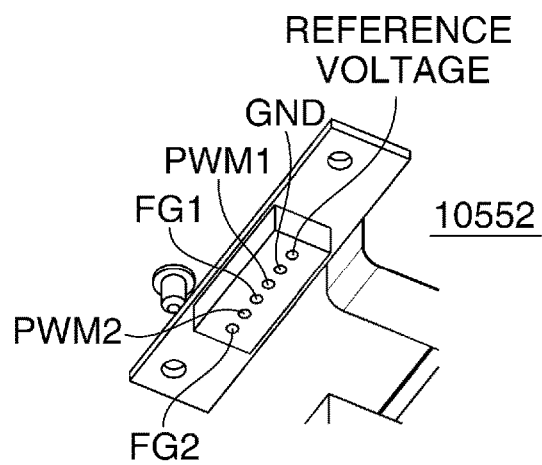

FIGS. 79A to 79C are exploded perspective views of the cooling module 10005. The cover portion 10052 is provided such that it protrudes from the base portion 10051, and is formed with openings 10521. The base portion 10051 has the openings 15111 formed in the top (top surface) thereof, and the openings 15112 formed in the bottom (bottom surface) thereof, as described hereinabove. The fan unit 10053 is provided with the cover portions 10532. A role played by the cover portions 10532 will be described hereinafter with reference to FIGS. 80A and 80B.

The fan unit 10053 has protruding portions 15121, 15122, and 15123, a protruding portion 10533, and a click spring 10534 which protrudes from the fan unit 10053 and charges in the protruding direction. The protruding portion 15123 is brought into contact with the restriction portion 15122, and the click spring 10534 is brought into contact with the restriction portion 15123, whereby the fan unit 10053 is held in the first position. Further, the protruding portion 10533 is brought into contact with the restriction portion 15121, and the click spring 10534 is brought into contact with the restriction portion 15122, whereby the fan unit 10053 is held in the second position.

An external interface 10552 is for communicating with the camera 10001. Electric power and control signals are delivered from the external interface 10552 via a flexible board 10054, whereby the axial fans 10531 fixed to the fan unit 10053 are rotated, and generate the streams of air in a direction indicated by arrows A in FIG. 79A. The external interface 10552 includes a plurality of terminals for transmitting and receiving electric power and control signals, and more specifically, as shown in FIG. 79C, the terminals for the respective signals of reference voltage, GND, PWM1, FG1, PWM2, and FG2 are arranged from an end.

The PWM (Pulse Width Modulation) signals (PWM1 signal and PWM2 signal) are each an input signal which transmits a duty ratio for PWM control of an associated axial fan 10531, from the outside. The FG (Frequency Generator) signals (FG1 signal and FG2 signal) are each an output signal for notifying the rotational speed of the associated axial fan 10531. In the present embodiment, the two axial fans 10531 are arranged close and parallel to each other. It is desirable that the plurality of fans arranged close to each other are rotated at the same speed. This is because if the plurality of fans are rotated at different rotational speeds, whine noise is generated.

Therefore, in the present embodiment, rotational speed feedback control is performed, in which appropriate PWM signals for realizing a desired rotational speed is calculated by the circuit board 10012 of the camera 10001 with reference to the FG signals, respectively, and different PWM signals are input to the two axial fans 10531, respectively. The rotational speeds of the two axial fans 10531 are determined based on the form of use, the operation mode, and the use environment condition, and so forth, of the system camera. The external interface 10152 of the camera 10001 is also provided with the corresponding terminals (for the signals of reference voltage, GND, PWM1, FG1, PWM2, and FG2).

Figure 80A:
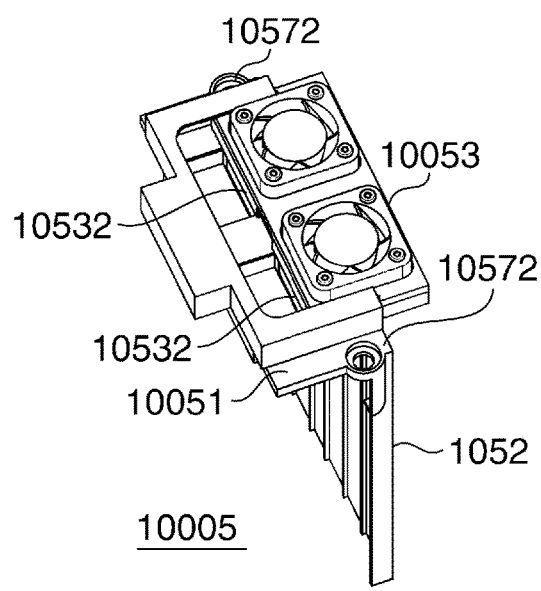
FIGS. 80A and 80B are perspective views of the cooling module.
Figure 80B:
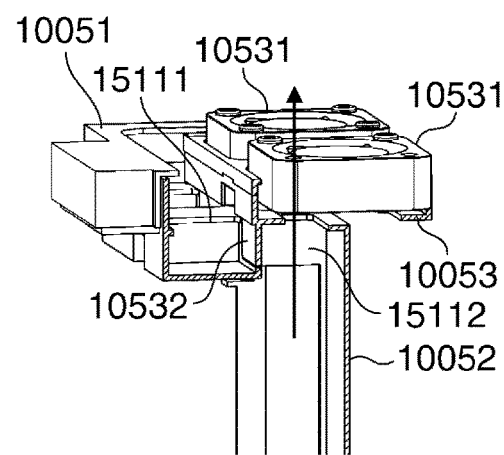

FIGS. 80A and 80B are perspective views of the cooling module 10005. The base portion 10051 holds the fan unit 10053 such that the fan unit 10053 is slidable between the first position and the second position. In FIGS. 80A and 80B, the fan unit 10053 is held in the first position, and half part of the fan unit 10053 protrudes from the cover portion 10052. Further, the fan unit 10053 covers the half area of the openings 15111, and the cover portions 10532 shield the overlapping area such that the overlapping area is partitioned from the non-overlapping area of the openings 15111.

Figure 81:
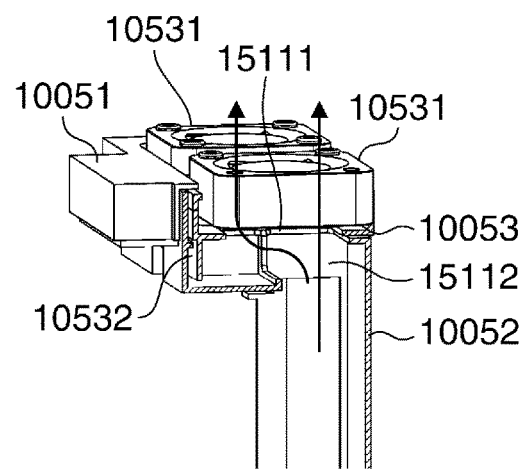
FIG. 81 is a cross-sectional perspective view, partly broken away, of the cooling module holding a fan unit in a second position.

FIG. 81 is a cross-sectional perspective view, partly broken away, of the cooling module 10005 holding the fan unit 10053 in the second position. In the second position, the fan unit 10053 is in the position where the fan unit 1053 does not protrude from the cover portion 10052. Further, the fan unit 10053 covers the whole area of the openings 15111, and as described hereinafter with reference to FIGS. 82A and 82B, it is possible to draw up air flowing from the openings 15112 by the whole axial fans 10531.

Figure 82A:
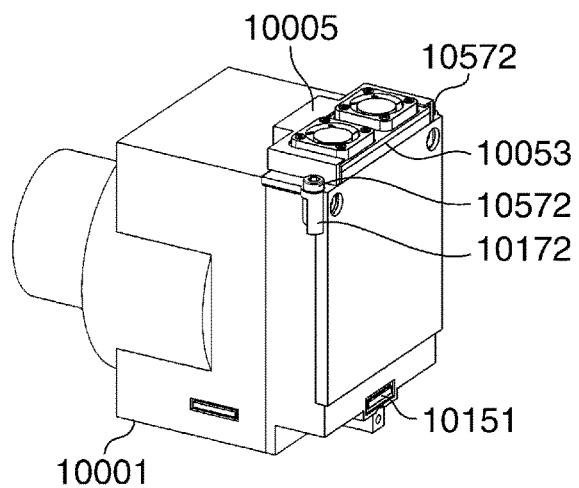
FIGS. 82A and 82B are perspective views of the camera in a state having the cooling module mounted thereto.
Figure 82B:
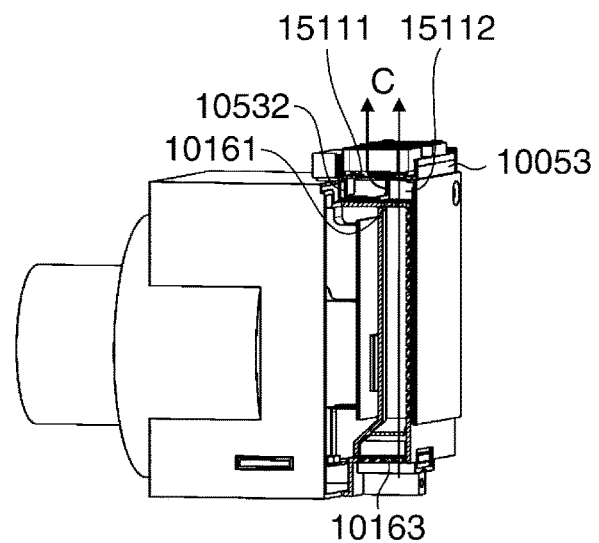

FIG. 82A is a perspective view of the camera 10001 in a state having the cooling module 10005 mounted thereto, which corresponds to FIG. 72C. FIG. 82B is a perspective view, partly broken away, of the camera 10001 in the state having the cooling module 10005 mounted thereto.

The cooling module 10005 is fixed to the camera 10001 by fastening fixing portions 10572 to the fixing portions 10172 of the camera 10001 with screws, respectively. In such a fixed state, the openings 15112 are arranged immediately above the ventilation ports 10161 of the top of the camera 10001. The fan unit 10053 covers the whole openings 15111, and generates the air stream C shown in FIG. 82B using the whole axis fans 10531.

Figure 83:
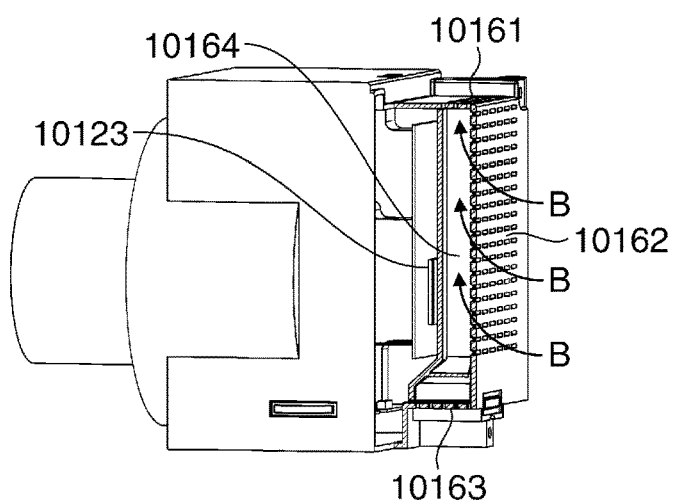
FIG. 83 is a perspective view, partly broken away, of the camera alone.

FIG. 83 is a perspective view, partly broken away, of the camera 10001 as a single unit, which corresponds to FIG. 72B. FIG. 83 shows the configuration that the devices 10121 to 10123 (10121 and 10122 are not shown) are cooled by natural cooling. In natural cooling, it is desirable that it is possible to supply outside air in the vicinity of the heat sources. Outside air is directly supplied from the ventilation ports 10162 to the vicinity of the heat sources (as indicated by arrows B), and hence it is possible to efficiently cool the devices 10121 to 10123.

Although the temperature of the duct 10164 rises due to heat transferred from the devices 10121 to 10123, part provided with the ventilation ports 10161 to 10163 is not in direct contact with the duct 10164, and hence the user is prevented from directly touching the high-temperature part.

Figure 84A:
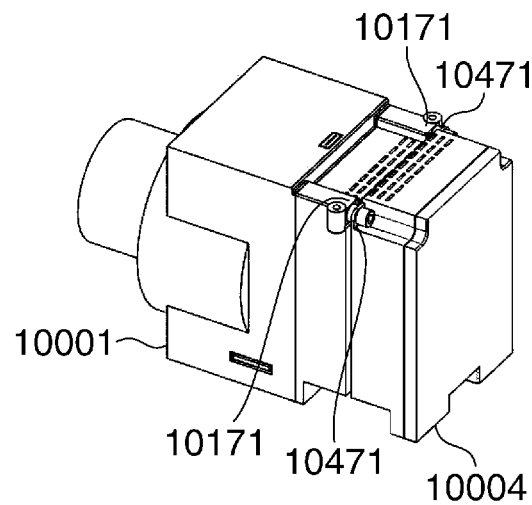
FIGS. 84A and 84B are perspective views of the camera in a state having the expansion module mounted thereto.
Figure 84B:
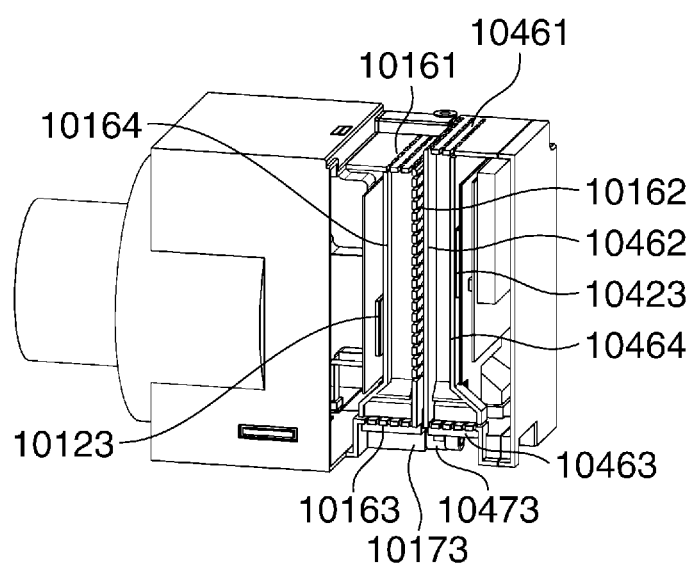

FIG. 84A is a perspective view of the camera 10001 in a state having the expansion module 10004 mounted thereto, which corresponds to FIG. 72D. FIG. 84B is a perspective view, partly broken away, of the camera 10001 in the state having the expansion module 10004 mounted thereto.

The expansion module 10004 fastens the fixing portions 10471 to the fixing portions 10171, and the fixing portions 10473 to the fixing portions 10173 with screws. Further, the external interface 10045 is directly connected to the external interface 10151 (not shown in FIGS. 84A and 84B).

FIGS. 84A and 84B show the configuration that the devices 10121 to 10123 (10121 and 10122 are not shown) and the devices 10421 to 10423 (10421 and 10422 are not shown) are cooled by natural cooling. In the camera 10001, a natural cooling airflow path is formed by the ventilation ports 10161, the duct 10164, the ventilation ports 10163, and the front portion 10462. Further, in the expansion module 10004, a natural cooling airflow path is formed by the ventilation ports 10461, the duct 10464, the ventilation ports 10463, and the front portion 10462.

Figure 85:
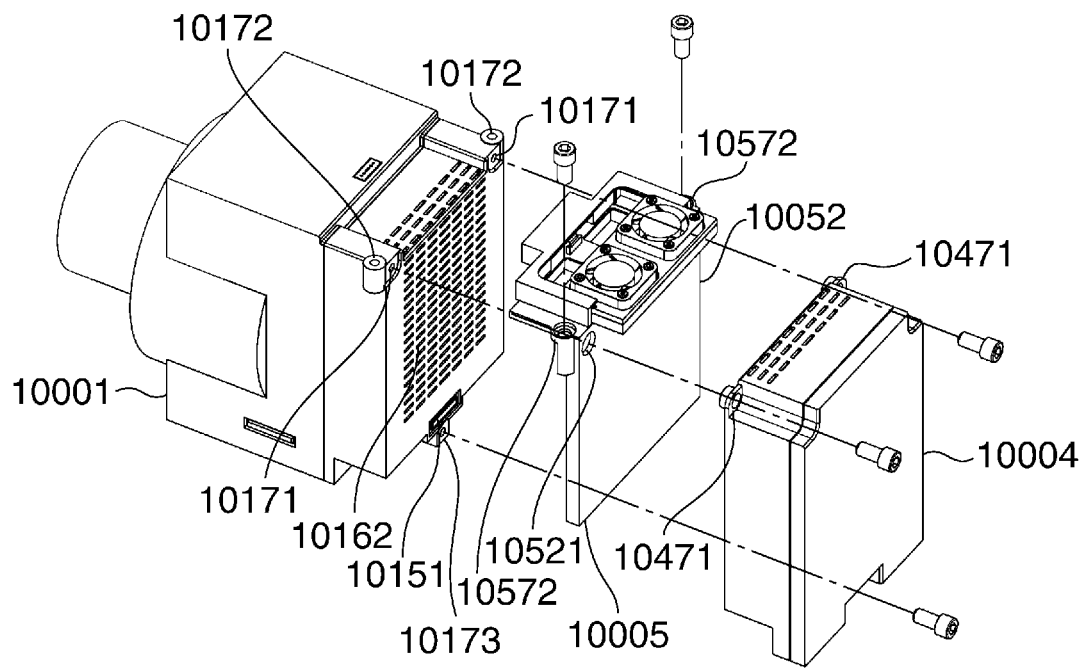
FIG. 85 is an exploded perspective view useful in explaining a procedure of mounting the expansion module and the cooling module to the camera.

FIG. 85 is an exploded perspective view useful in explaining a procedure of mounting the expansion module 10004 and the cooling module 10005 to the camera 10001. First, the fixing portions 10572 of the cooling module 10005 are fastened to the fixing portions 10172 of the camera 10001 with screws to thereby fix the cooling module 10005.

Next, the fixing portions 10471 of the expansion module 10004 are fastened to the fixing portions 10171 of the camera 10001 with screws, and the fixing portions 10473 (not shown in FIG. 85) are fastened to the fixing portions 10173 with screws to thereby fix the expansion module 10004. At this time, the fixing portions 10471 are inserted in the openings 10521 to thereby directly fix the expansion module 10004 to the camera 10001.

Figure 86A:
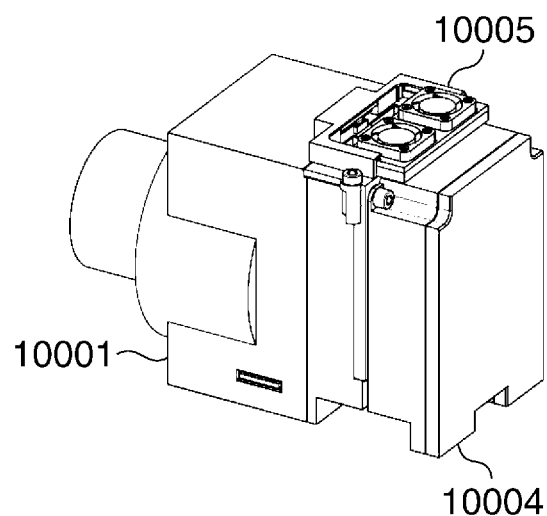
FIGS. 86A and 86B are perspective views of the camera in a state having the expansion module and the cooling module mounted thereto.
Figure 86B:
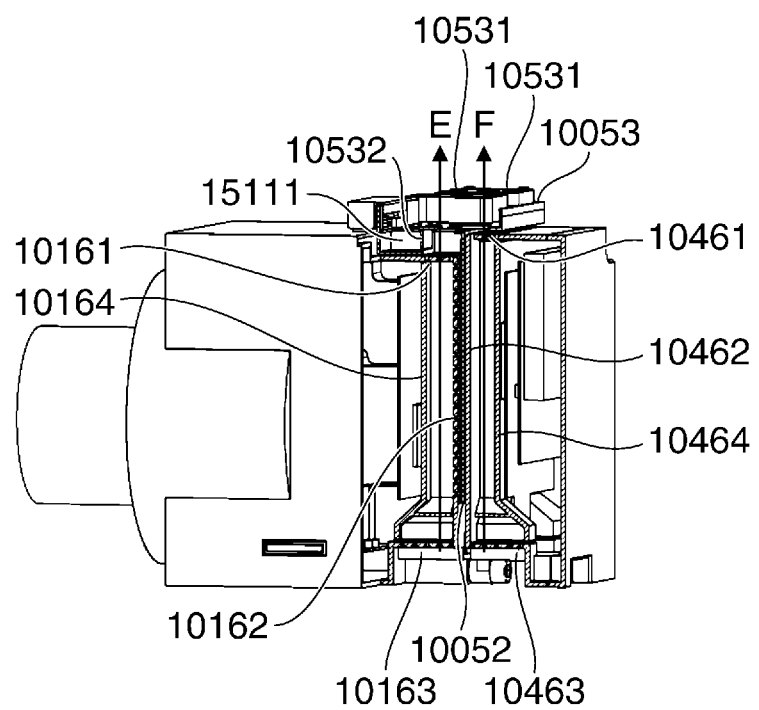

FIG. 86A is a perspective view of the camera 10001 in a state having the expansion module 10004 and the cooling module 10005 mounted thereto, which corresponds to FIG. 72A. FIG. 86B is a perspective view, partly broken away, of the camera 10001 in the state having the expansion module 10004 and the cooling module 10005 mounted thereto.

The expansion module 10004 is directly fastened and fixed to the camera 10001 with screws, following the procedure described with reference to FIG. 85. Further, although not shown in FIGS. 86A and 86B, the external interface 10045 is directly connected to the external interface 10151.

As for the heat sources of the camera 10001, the cover portion 10052 covers the ventilation ports 10162, and the airflow path is formed by the ventilation ports 10161, the ventilation ports 10163, the duct 10164, and the cover portion 10052. On the other hand, as for the heat sources of the expansion module 10004, the airflow path is formed by the ventilation ports 10461, the front portion 10462, the ventilation ports 10463, and the duct 10464.

The fan unit 10053 is arranged over both of the airflow path of the camera 10001 and the airflow path of the expansion module 10004. Then, forced cooling airflow paths (indicated by arrows E and F) are formed in both of the camera 10001 and the expansion module 10004 by rotation of the axial fans 10531, respectively. Further, the fan unit 10053 covers the half area of the openings 15111, and the cover portions 10532 prevents outside air from flowing from the non-overlapping area of the openings 15111 into the forced cooling airflow paths.

As described above, in the present embodiment, the expansion module 10004 and the cooling module 10005 are separately fixed to the camera 10001. Therefore, even when the cooling module 10005 is inserted between the camera 10001 and the expansion module 10004, there is no influence on the force for holding the expansion module 10004 and the rigidity of the whole system camera. Further, part of the cooling module 10005, inserted between the camera 10001 and the expansion module 10004, is only the cover portion 10052, and hence it is possible to prevent the size of the system camera in the optical axis direction from being increased due to insertion of the cooling module 10005. Further, as described with reference to FIG. 83, even when the camera 10001 alone is operated, the user is prevented from touching high-temperature part.

Figure 87A:
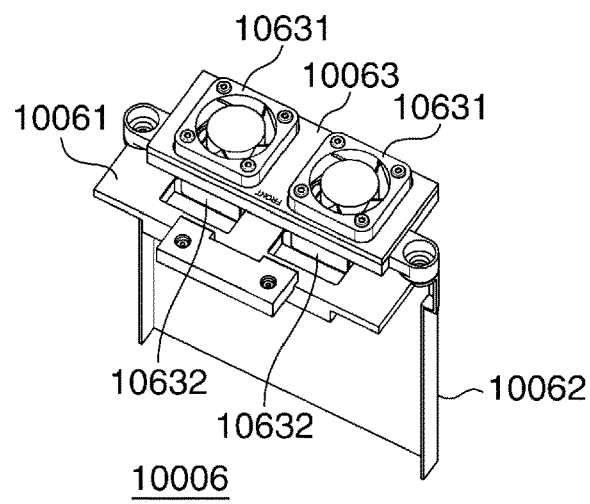
FIGS. 87A to 87C are perspective views of a cooling module of a system camera according to a tenth embodiment of the present invention.
Figure 87B:
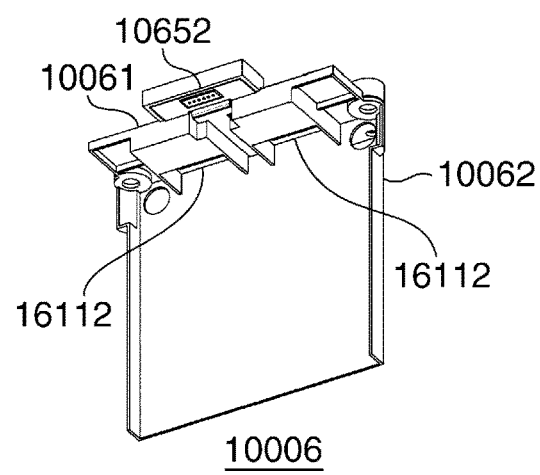
Figure 87C:
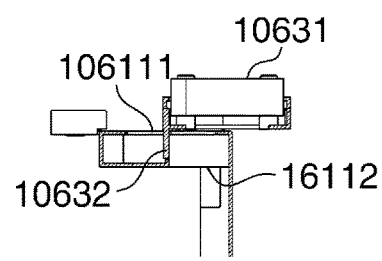

FIGS. 87A to 87C are perspective views of a cooling module 10006 of a system camera according to a tenth embodiment of the present invention. In the present embodiment, the camera 10001 and the expansion module 10004 are the same as in the above-described ninth embodiment, but the cooling module 10006 differs from the cooling module 10005 in the method of changing the position of the fan unit.

In FIGS. 87A to 87C, a fan unit 10063 is held in the first position. Here, the first position and the second position in the present embodiment are the same as the first position and the second position in the ninth embodiment. Further, an external interface 10652 of the fan unit 10063 is for communicating with the camera 10001.

A base portion 10061 has openings 16111 formed in the top (top surface) thereof and openings 16112 formed in the bottom (bottom surface) thereof, and the fan unit 10063 is provided with cover portions 10632. When the fan unit 10063 is in the first position, the fan unit 10063 covers the half area of each opening 16111, and the cover portions 10632 separate an overlapping area and a non-overlapping area of each opening 16111.

Figure 88A:
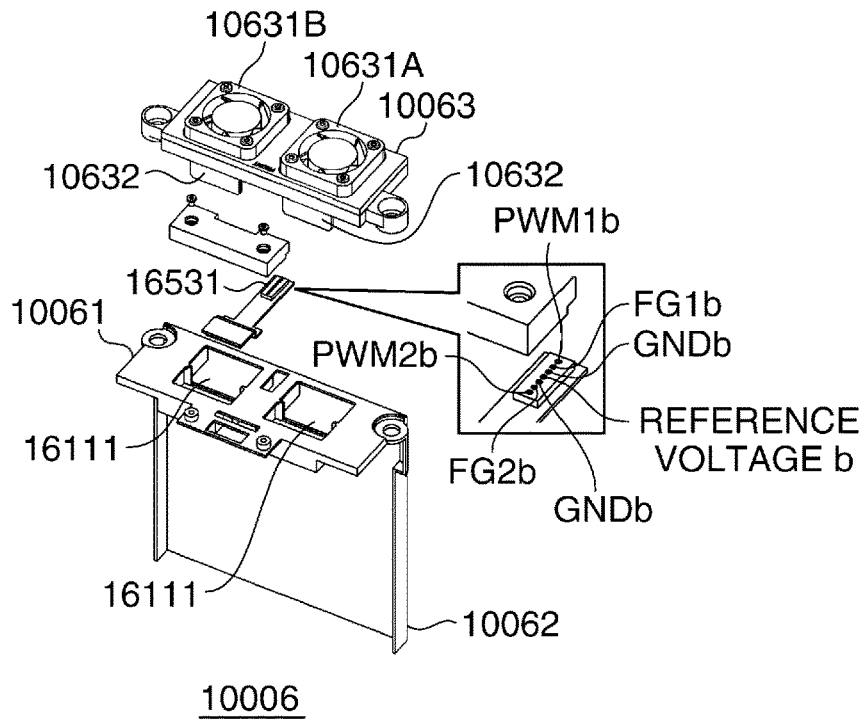
FIGS. 88A and 88B are exploded perspective views of the cooling module.
Figure 88B:
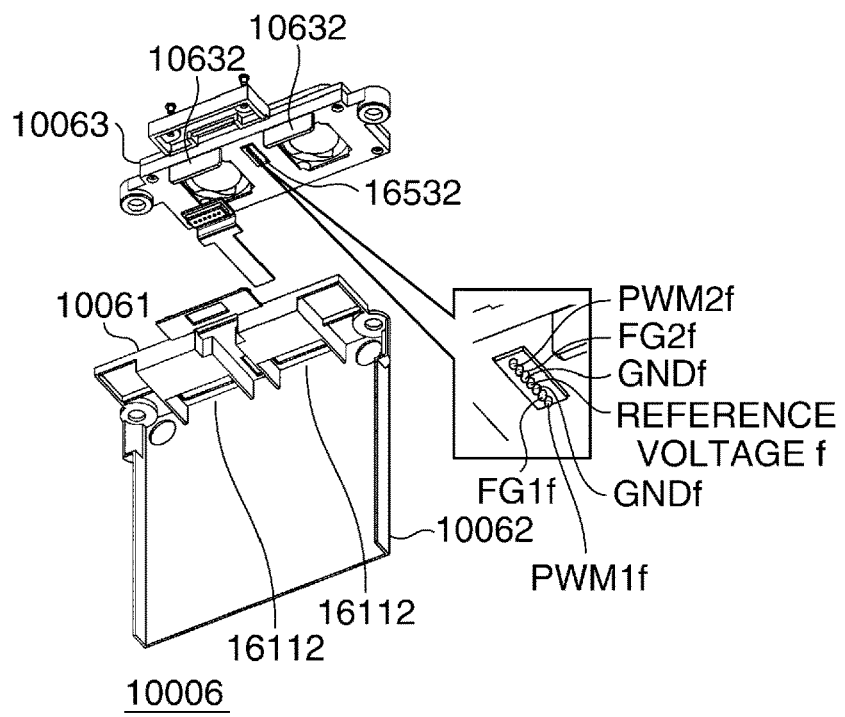

FIGS. 88A and 88B are exploded perspective views of the cooling module 10006. The fan unit 10063 is removably mounted to the base portion 10061. In FIGS. 88A and 88B, the fan unit 10063 is held in the first position. An external interface 16531 of the base portion 10061 is for communication with the fan unit 10063.

The external interface 16531 includes a plurality of terminals for transmitting and receiving electric power and control signals, and more specifically, as shown in FIG. 88A, the terminals for the respective signals of PWM1$b$, FG1$b$, GNDb, reference voltage b, GNDb, FG2$b$, and PWM2$b$ are arranged from an end. The PWM (Pulse Width Modulation) signals (PWM1$b$ signal and PWM2$b$ signal) are input signals for individually transmit duty ratios for performing PWM control of axial fans 10631A and 10631B of an axial fan unit 10063 from the outside. The FG (Frequency Generator) signals (FG1$b$ signal and FG2$b$ signal) are output signals for notifying the rotational speed of the axial fans 10631A and 10631B, respectively.

On the other hand, in the fan unit 10063, the axial fan 10631A and the axial fan 10631B are arranged parallel and close to each other. An external interface 16532 of the fan unit 1006 includes a plurality of terminals for transmitting and receiving electric power and control signals, and more specifically, as shown in FIG. 88B, the terminals for the respective signals of PWM1$f$, FG1$f$, GNDf, reference voltage f, GNDf, FG2$f$, and PWM2$f$ are arranged in the mentioned order from an end. The terminals for the signals of PWMf, FG1$f$, and GNDf are connected to the axial fan 10631A. The terminals for the signals of GNDf, FG2$f$, and PWM2$f$ are connected to the axial fan 10631B. The terminal for the signal of reference voltage f is connected to both of the axial fans 10631A and 10631B.

When the fan unit 10063 is in the first position, connection is established between the terminals for the signals of PWM1$f$ and PWM1$b$, between the terminals for the respective signals of FG1$f$ and FG1$b$, between the terminals of the respective signals of GNDf and GNDb, between the terminals for the respective signals of reference voltage f and reference voltage b, between the terminals for the respective signals of GNDf and GNDb, between the terminals for the respective signals of FG2$f$ and FG2$b$, and between the terminals for the respective signals of PWM2$f$ and PWM2$b$.

Figure 89A:
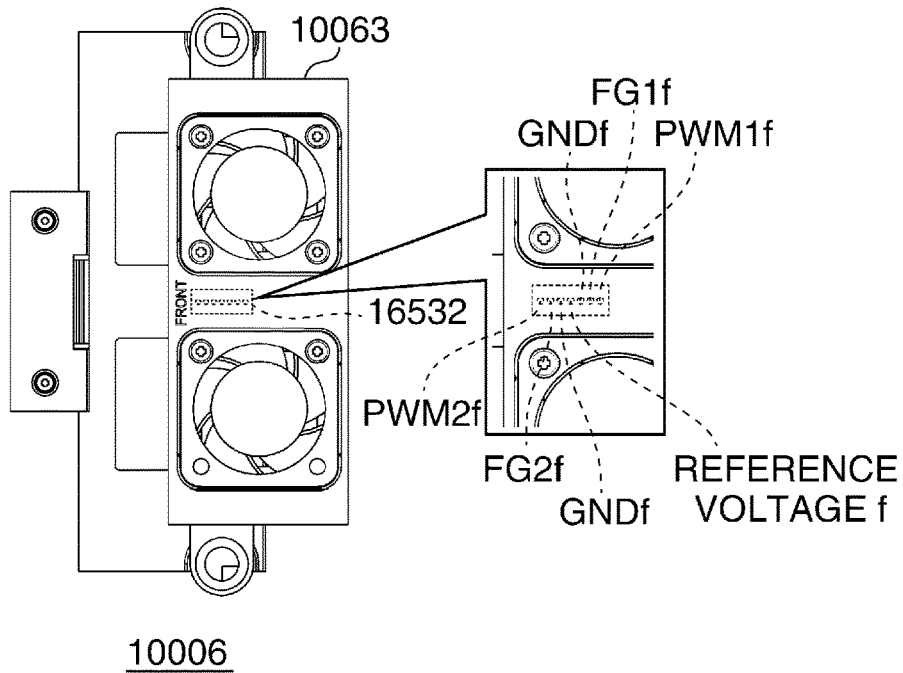
FIGS. 89A and 89B are views of the cooling module, as viewed from above.
Figure 89B:
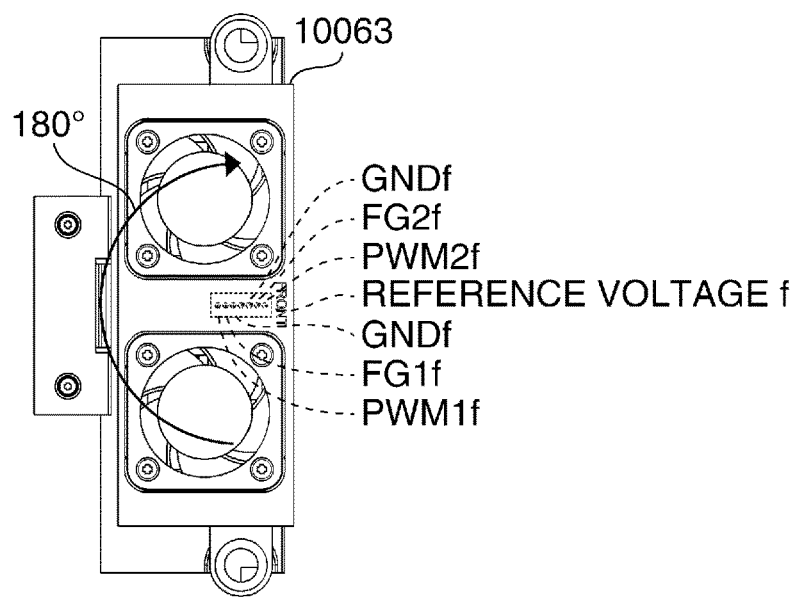

FIG. 89A is a view of the cooling module 10006 in the first position, as viewed from above. FIG. 89B is a view of the cooling module 10006 in the second position, as viewed from above. The cooling module 10006 can be held in the second position by removing the fan unit 10063 held in the first position, and horizontally rotating the fan unit 10063 with the external interface 16532 in the center, through 180 degrees.

When the cooling module 10006 is in the second position, connection is established between the terminals for the respective signals of PWM1$f$ and PWM2$b$, between the terminals for the respective signals of FG1 and FG2$b$, between the terminals for the respective signals of GNDf and GNDb, between the terminals for the respective signals of reference voltage f and reference voltage b, between the terminals for the respective signals of GNDf and GNDb, between the terminals for the respective signals of FG2$f$ and FG1$b$, and between the terminals for the respective signals of PWM2$f$ and PWM1$b$.

The camera 10001 outputs a duty ratio to the terminal for the signal of PWM1$b$ with reference to the signal of FG1$b$, and outputs a duty ratio to the terminal for the signal of PWM2$b$ with reference to the signal of FG2$b$, regardless of a connected destination. Therefore, even when the connected destination is changed, it is possible to realize rotational speed feedback control without any problem.

Figure 90A:
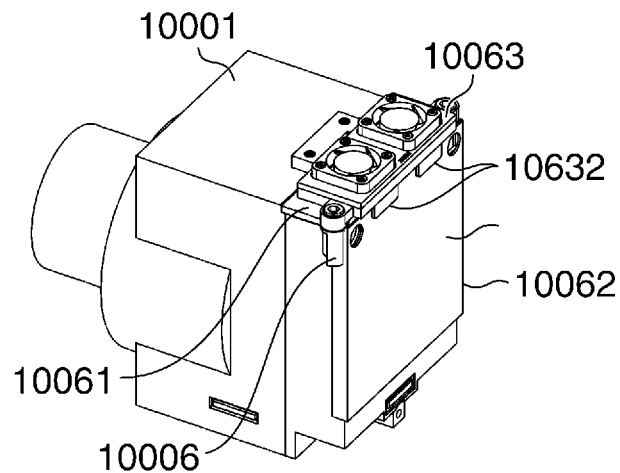
FIGS. 90A and 90B are perspective views of the camera in a state having the cooling module mounted thereto.
Figure 90B:
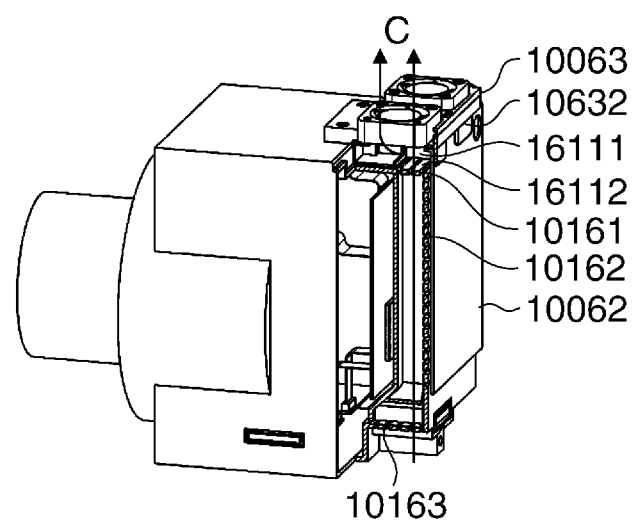

FIG. 90A is a perspective view of the camera 1000 in a state having the cooling module 10006 mounted thereto. FIG. 90B is a perspective view, partly broken away, of the camera 1000 in the state having the cooling module 10006 mounted thereto. As shown in FIGS. 90A and 90B, the fan unit 10063 is disposed in the second position, and is fastened to the camera 10001 together with the base portion 10061.

Further, a cover portion 10062 covers the ventilation ports 10162, and a forced cooling airflow path having the ventilation ports 10161 as air outlet ports and the ventilation ports 10163 as air inlet ports is formed. The fan unit 10063 covers the whole area of the openings 16111, and hence a stream of air discharged from the ventilation ports 10161 can be drawn up by the whole of axial fans 10631 (as indicative by arrows C).

Figure 91A:
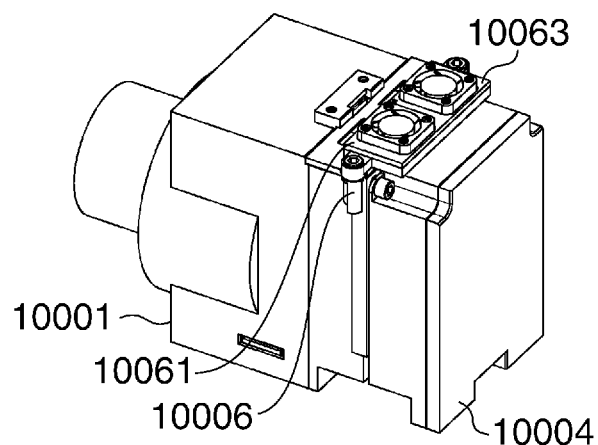
FIGS. 91A and 91B are perspective views of the camera in a state having the expansion module and the cooling module mounted thereto.
Figure 91B:
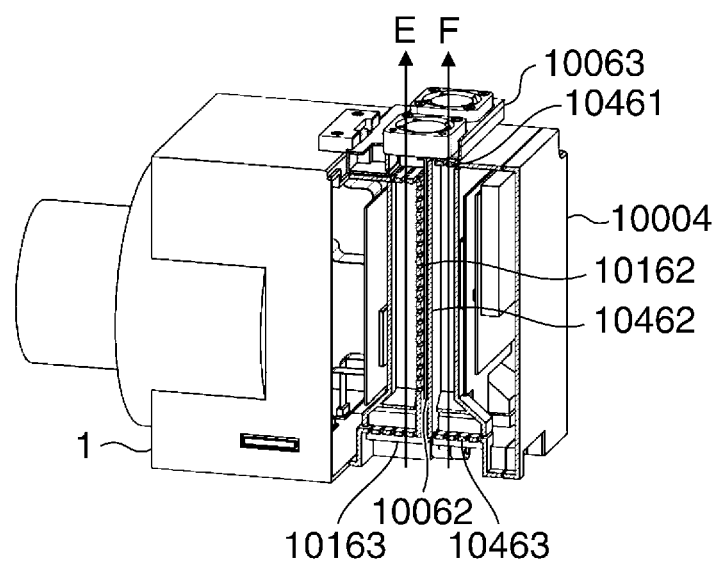

FIG. 91A is a perspective view of the camera 10001 in a state having the expansion module 10004 and the cooling module 10006 mounted thereto. FIG. 91B is a perspective view, partly broken away, of the camera 10001 in the state having the expansion module 10004 and the cooling module 10006 mounted thereto. As shown in FIGS. 91A and 91B, the fan unit 10063 is arranged in the first position, and is fastened to the camera 10001 together with the base portion 10061.

In the camera 10001, the cover portion 10062 covers the ventilation ports 10162, and an airflow path is formed by the ventilation ports 10161, the ventilation ports 10163, the duct 10164, and the cover portion 10062. On the other hand, in the expansion module 10004, an airflow path is formed by the ventilation ports 10461, the front portion 10462, the ventilation ports 10463, and the duct 10464.

The fan unit 10063 is disposed such that it extends over both of the airflow path of the camera 10001 and the airflow path of the expansion module 10004, and the forced cooling airflow paths (indicated by arrows E and F) are formed in both of the camera 10001 and the expansion module 10004 by rotation of the axial fans 10631. Further, the fan unit 10053 covers the half area of the openings 16111, and the cover portions 10632 prevents outside air from flowing from the non-overlapping area of the openings 16111 into the forced cooling airflow paths. The other configuration and advantageous effects are the same as those of the ninth embodiment.

Figure 92A:
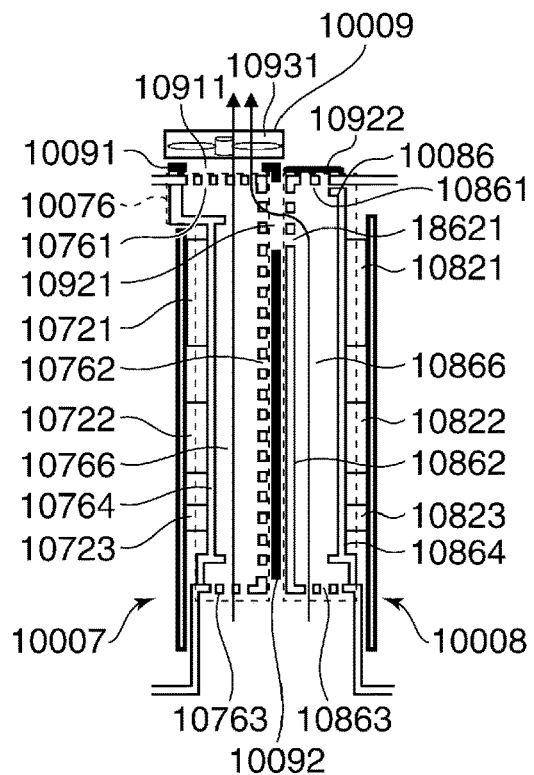
FIGS. 92A to 92C are conceptual views of a cooling module, a heat dissipation section, and components associated therewith, of a system camera according to an eleventh embodiment of the present invention.
Figure 92B:
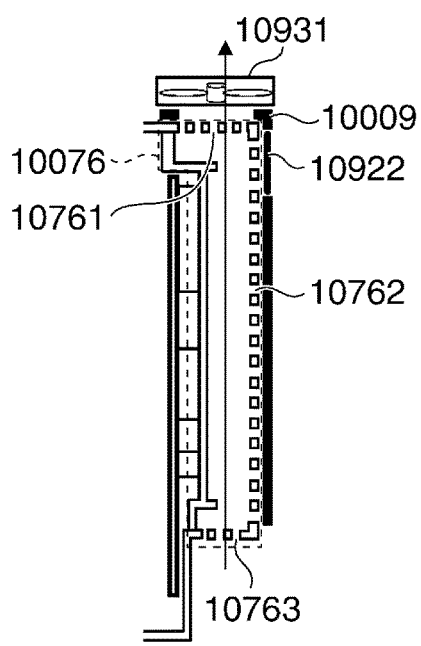
Figure 92C:
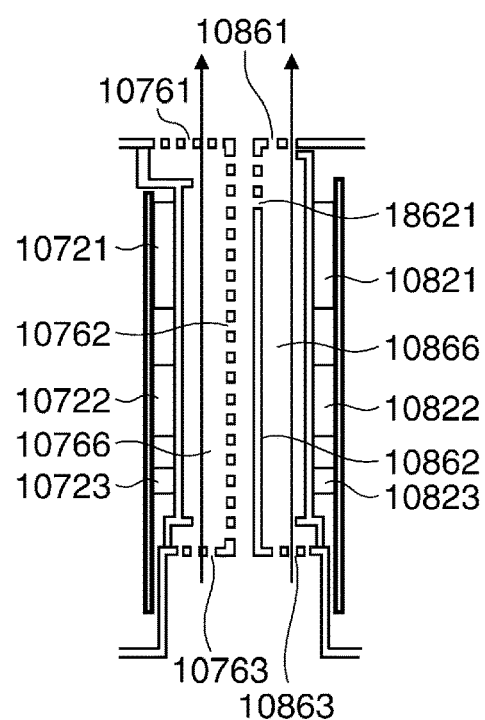

FIGS. 92A to 92C are conceptual views of a cooling module 10009, a heat dissipation section 10076, and components associated therewith of a system camera according to an eleventh embodiment of the present invention. FIG. 92A is a conceptual view of the camera 10007 in a state having the expansion module 10008 and the cooling module 10009 mounted thereto, showing the cooling module 10009, the heat dissipation section 10076, and components associated therewith of a heat dissipation section 10086. FIG. 92B is a conceptual view of the camera 10007 in a state having t the cooling module 10009 is mounted thereto without having the expansion module 10008 mounted thereto.

The cooling module 10009 includes a base portion 10091, a cover portion 10092, and axial fans 10931, and the cover portion 10092 has openings 10921 and a lid member 10922 which is supported such that it can open and close the openings 10921. When the lid member 10922 is set to an opening position, the lid member 10922 is disposed such that it horizontally extends on a side of the cover portion 10092 opposite to openings 10911, as shown in FIG. 92A.

In the form of use shown in FIG. 92B, the lid member 10922 is arranged in a position where the lid member 10922 covers the openings 10921. The cover portion 10092 and the lid member 10922 covers ventilation ports 10762 of the camera 10007, and the axial fans 10931 are arranged immediately above ventilation ports 10761, whereby a forced cooling airflow path having ventilation ports 10763 as air inlet ports, and the ventilation ports 10761 as air outlet ports is formed.

Referring again to FIG. 92A, the heat dissipation section 10086 of the expansion module 10008 includes ventilation ports 10861 formed in the top (top surface) of the expansion module 10008, a front portion 10862 of the expansion module 10008, ventilation ports 10863 formed in the bottom (bottom surface) of the expansion module 10008, and a duct 10864. The duct 10864 may be provided with fin-shaped portions or pin-shaped portions so as to increase the heat dissipation efficiency. The front portion 10862 has ventilation ports 18621 at a location opposed to the openings 10921. The lid member 10922 of the cooling module 10009 is in the opening position.

At this time, the lid member 10922 closes the ventilation ports 10861 of the expansion module 10008. On the other hand, a space 10866 communicates with a space 10766 via the openings 10921 and the ventilation ports 108621, whereby forced cooling airflow paths are formed in both of the heat dissipation section 10076 and the heat dissipation section 10086 to efficiently cool elements 10721 to 10723 and elements 10821 to 10823.

FIG. 92C is a conceptual view of the camera 10007 in a state having the expansion module 10008 connected thereto without having the cooling module 10009 connected thereto. In this configuration, natural cooling airflow paths are formed in the space 10766 and the space 10866 to cool the elements 10721 to 10723 and the elements 10821 to 10823.

Figure 93A:
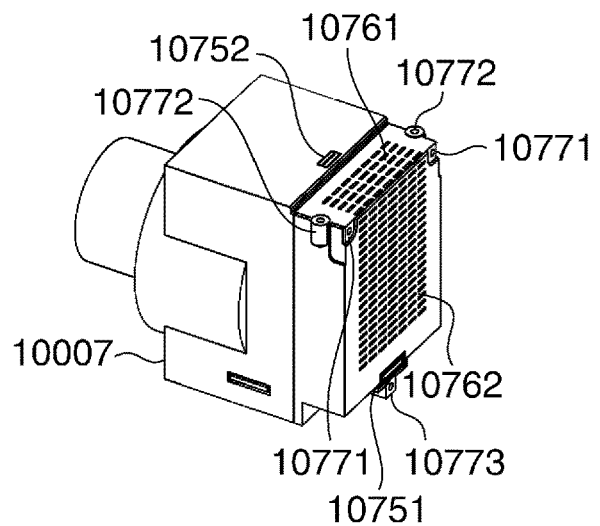
FIGS. 93A to 93C are perspective views of a camera.
Figure 93B:
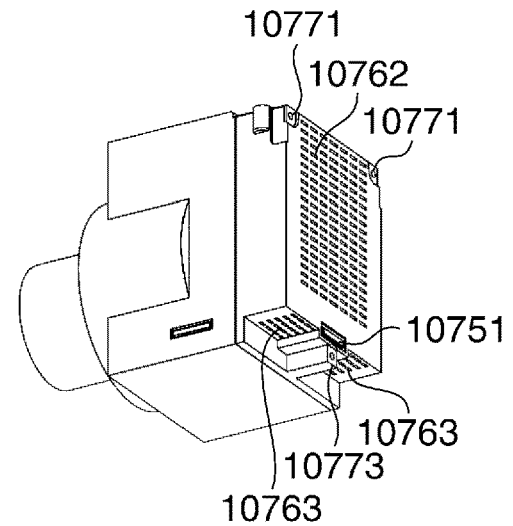
Figure 93C:
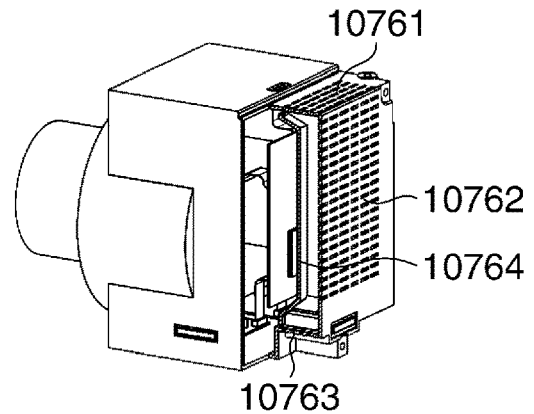

FIGS. 93A and 93B are perspective views of the camera 10007. FIG. 93C is a perspective view, partly broken away, of the camera 10007. The camera 10007 has the ventilation ports 10761 formed in the top (top surface) thereof, the ventilation ports 10762 formed in the rear side (rear surface) thereof, and the ventilation ports 10763 formed in the bottom (bottom surface) thereof.

Further, the camera 10007 has an external interface 10751 provided on the rear side (rear surface) thereof, and an external interface 10752 provided on the top (top surface) thereof for communicating with the cooling module 10009. Fixing portions 10771 and a fixing portion 10773 are fixing portions with which the camera 10007 is fixed to the expansion module 10008, and are described e.g. as screw fastening portions for screwing screws in the optical axis direction.

Figure 94A:
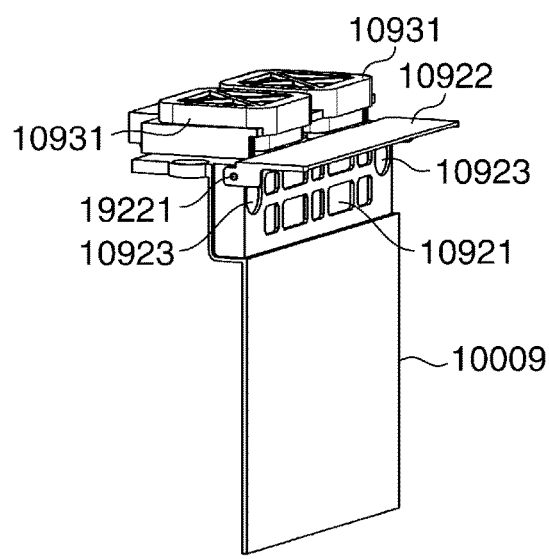
FIGS. 94A and 94B are perspective views of the cooling module.
Figure 94B:
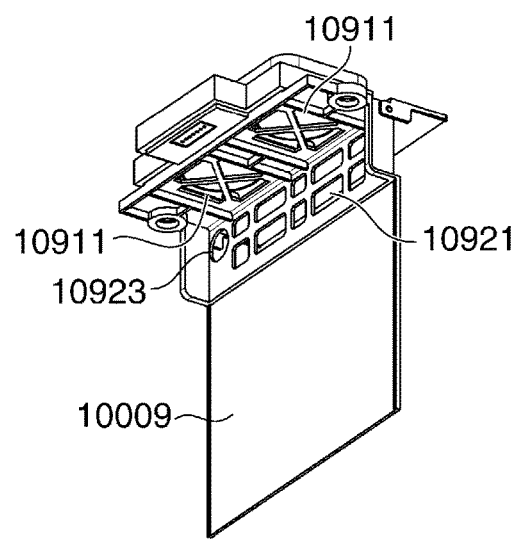

FIGS. 94A and 94B are perspective views of the cooling module 10009. The lid member 10922 can be rotated about a shaft 19221 between a closing position where the lid member 10922 closes the openings 10921 and openings 10923 formed in the cover portion 10092, and an opening position where the lid member 10922 does not close them. The two axial fans 10931 are fixed immediately above the openings 10911 of the base portion 10091.

Figure 95A:
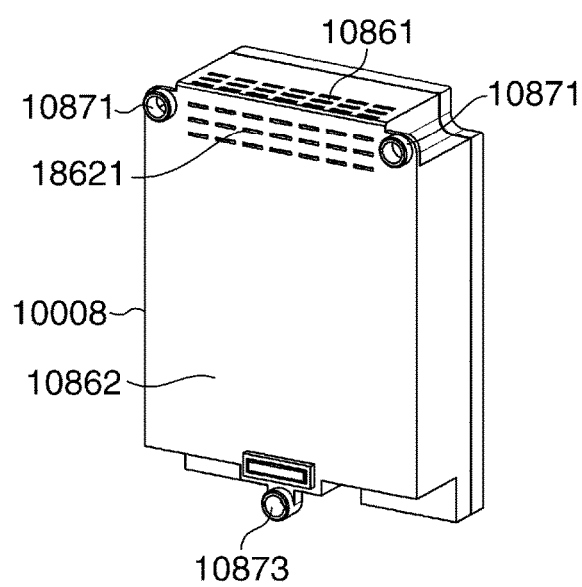
FIGS. 95A and 95B are perspective views of an expansion module.
Figure 95B:
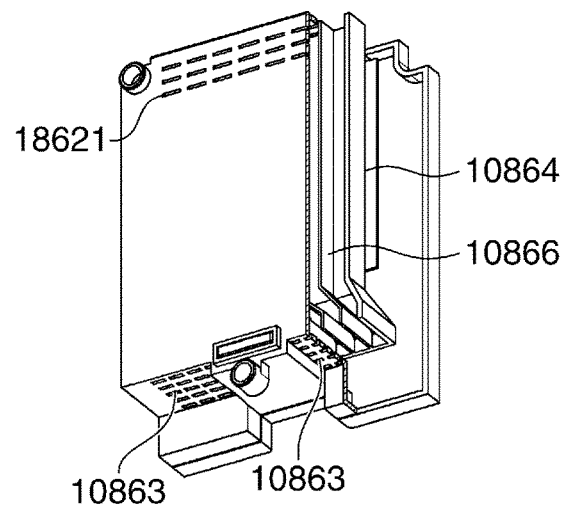

FIG. 95A is a perspective view of the expansion module 10008. FIG. 95B is a perspective view, partly broken away, of the expansion module 10008. The expansion module 10008 has not only the ventilation ports 10861 formed in the top (top surface) thereof and the ventilation ports 10863 formed in the bottom (bottom surface) thereof, but also the ventilation ports 18621 formed in the front portion 10862 at a location opposed to the openings 10921 of the cooling module 10009. The expansion module 10008 has the space 10866 formed by the ventilation ports 10861, the ventilation ports 18621, the ventilation ports 10863, the front portion 10862, and the duct 10864. Fixing portions 10871 and a fixing portion 10873 are portions with which the camera 10007 is fixed to the camera 10007.

Figure 96A:
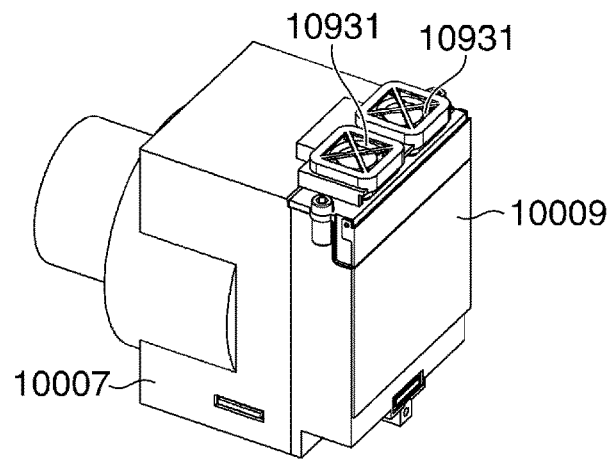
FIGS. 96A and 96B are perspective views of the camera in a state having the cooling module mounted thereto.
Figure 96B:
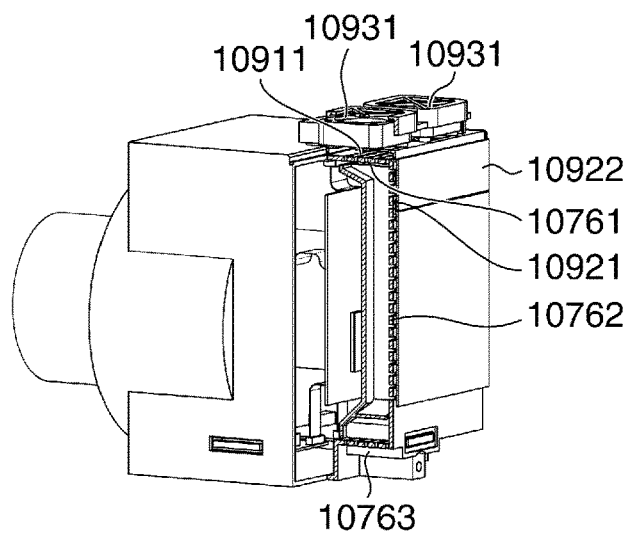

FIG. 96A is a perspective view of the camera 10007 in a state having the cooling module 10009 mounted thereto. FIG. 96B is a perspective view, partly broken away, of the camera 10007 in the state having the cooling module 10009 mounted thereto. The cooling module 10009 is used in a state in which the lid member 10922 is closed. The axial fans 10931 and the openings 10911 are arranged immediately above the ventilation ports 10761, and the lid member 10922 and the cover portion 10092 cover the ventilation ports 10762, whereby a forced cooling airflow path having the ventilation ports 10761 as air outlet ports and the ventilation ports 10763 as air inlet ports is formed.

Figure 97:
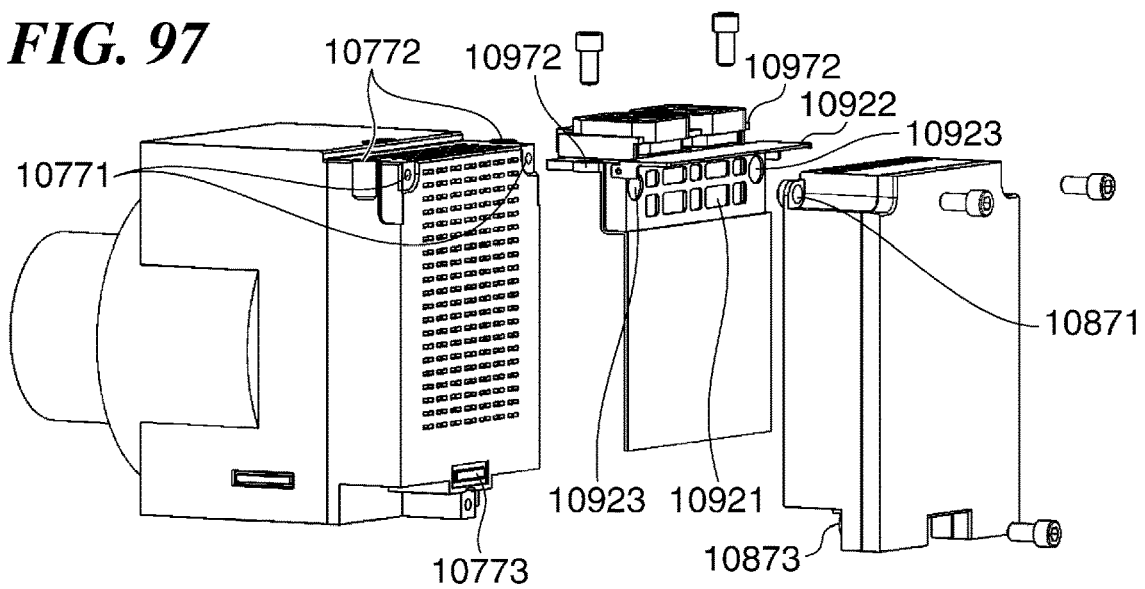
FIG. 97 is a perspective view useful in explaining a procedure of mounting the expansion module and the cooling module to the camera.

FIG. 97 is a perspective view useful in explaining a procedure of mounting the expansion module 10008 and the cooling module 10009 to the camera 10007. The lid member 10922 of the cooling module 10009 is set to the opening position, whereby the openings 10921 and the openings 10923 are exposed.

After fixing portions 10972 of the cooling module 10009 are fastened and fixed to fixing portions 10772 of the camera 10007 with screws, the fixing portions 10871 are inserted through the openings 10923, and fastened to the fixing portions 10771 of the camera 10007 with screws, and the fixing portion 10873 is fastened to the fixing portion 10773 with a screw at the same time. In a case where the lid member 10922 is closed, the fixing portions 10871 interfere with the lid member 10922, and hence the expansion module 10008 cannot be mounted.

Figure 98A:
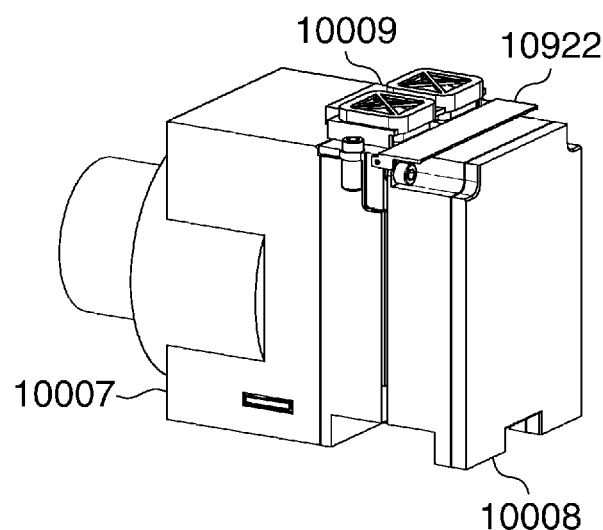
FIGS. 98A and 98B are perspective views of the camera in a state having the expansion module and the cooling module mounted thereto.
Figure 98B:
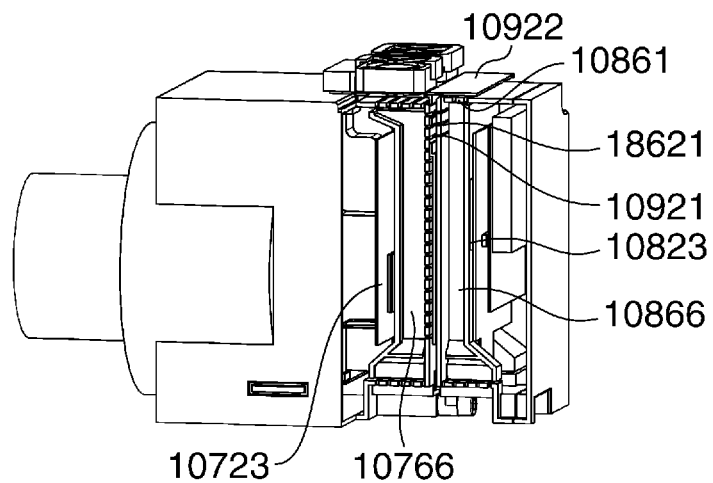

FIG. 98A is a perspective view of the camera 10007 in a state having the expansion module 10008 and the cooling module 10009 mounted thereto. FIG. 98B is a perspective view, partly broken away, of the camera 10007 in the state having the expansion module 10008 and the cooling module 10009 mounted thereto. The lid member 10922 of the cooling module 10009 is set to the opening position. At this time, the lid member 10922 is positioned immediately above the ventilation ports 10861 of the expansion module 10008, and covers the ventilation ports 10861.

On the other hand, the space 10866 communicates with the space 10766 via the openings 10921 and the ventilation ports 18621. The axial fans 10931 extends over the space 10766 and the space 10866, and form forced cooling airflow paths in both of the heat dissipation section 10076 and the heat dissipation section 10086 to thereby cool the elements 10721 to 10723 (elements 10721 and 10722 are not shown in FIG. 98A) and the elements 10821 to 10823 (elements 10821 and 10822 are not shown in FIG. 98A)).

To forcedly cool both of the camera 10007 and the expansion module 10008, the lid member 10922 is required to be in the opening position to close the ventilation ports 10863, and open the openings 10921. Further, as shown in FIG. 97, unless the lid member 10922 is opened, the expansion module 10008 cannot be mounted, and hence it is possible to prevent the user from erroneously assembling the system camera. The other configuration and advantageous effects are the same as those of the ninth embodiment.

Although in the eleventh embodiment, the system camera is described as one comprised of the camera body, the cooling module, and the expansion module, the system camera may be one comprised of the camera body and the cooling module, as described with reference to FIGS. 72C and 73C.

Further, although in the embodiments except the eighth embodiment, the fan unit has the two axial fans arranged in parallel and close to each other, the fan unit may have a sirocco fan, and the number of fans may be one or three or more.

Further, although in the ninth to eleventh embodiments, the fan unit is arranged on the top surface of the camera, the fan unit may be disposed to overlap ventilation ports formed in another side of the camera. Further, by disposing the fan unit at a location where the fan unit does not interfere with the expansion module on the rear side (rear surface) of the camera, such that the fan unit overlaps the ventilation ports, a forced cooling airflow path having ventilation ports formed in the top or another side of the camera as air inlet ports may be formed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-223952 filed Nov. 21, 2017, Japanese Patent Application No. 2017-232685 filed Dec. 4, 2017, Japanese Patent Application No. 2017-223951 filed Nov. 21, 2017, which are hereby incorporated by reference herein in their entirety.

What is claimed is:

1. A heat dissipation module comprising:
a first engagement structure which is provided on a first surface and with which a first mating module is removably engaged;
a first heat reception portion configured to receive heat from the first mating module;
a first interface which is electrically connected to the first mating module;
a second engagement structure which is provided on a second surface parallel to the first surface and with which a second mating module is removably engaged;
a second interface which is electrically connected to the first interface and is electrically connected to the second mating module; and
a fan unit which is provided between the first surface and the second surface, for dissipating heat received by the first heat reception portion to the outside,
wherein the second surface is provided with a second heat reception portion which receives heat from the second mating module engaged with the second surface, and
wherein the fan unit dissipates heat received by the first heat reception portion and the second heat reception portion.

2. The heat dissipation module according to claim 1, wherein heat conduction is blocked between the first heat reception portion and the second heat reception portion.

3. The heat dissipation module according to claim 1, wherein heat conduction is performed between the first heat reception portion and the second heat reception portion.

4. The heat dissipation module according to claim 1, further comprising a heat discharge portion provided on a surface except the first surface and the second surface, for discharging heat dissipated by the fan unit to the outside.

5. The heat dissipation module according to claim 4, wherein the heat discharge portion is provided on a surface orthogonal to the first surface and the second surface.

6. The heat dissipation module according to claim 4, wherein the heat discharge portion is provided with a fan.

7. The heat dissipation module according to claim 1, wherein the first engagement structure and the second engagement structure can be engaged with each other.

8. The heat dissipation module according to claim 1, wherein the first interface and the second interface are interfaces for transmitting and receiving power.

9. The heat dissipation module according to claim 1, wherein the first interface and the second interface are interfaces for transmitting and receiving signals.

10. The heat dissipation module according to claim 1, wherein the first interface and the second interface are capable of transmitting signals of image data with a resolution of at least 4K.

11. The heat dissipation module according to claim 9, wherein the first interface and the second interface are capable of transmitting signals of image data at a frame rate of at least 60 p.

12. The heat dissipation module according to claim 1, wherein the fan unit includes a first heat sink for receiving heat from the first heat reception portion, and a second heat sink disposed at a location opposed to the first heat sink,
   wherein the first heat sink has first fins extending toward the second heat sink,
   wherein the second heat sink has second fins extending toward the first heat sink, and
   wherein the second heat sink is capable of assuming a first position in which the second heat sink is thermally connected to the second heat reception portion and not thermally connected to the first heat sink, and a second position in which the second heat sink is not thermally connected to the second heat reception portion and thermally connected to the first heat sink.

13. The heat dissipation module according to claim 12, wherein when the second heat sink is in the second position, the second fins are in contact with the first heat sink.

14. The heat dissipation module according to claim 12, wherein the second heat reception portion is a member made of a metal, and
   wherein when the second heat sink is in the second position, a space is formed between the second heat sink and the second heat reception portion.

15. A heat dissipation module that is removably mountable to an image pickup apparatus that includes a first cooling fan, an air outlet port, and a control unit, the heat dissipation module comprising:
   a second cooling fan; and
   an air inlet port communicating with the air outlet port of the image pickup apparatus in a case where the heat dissipation module is removably mounted to the image pickup apparatus,
   wherein the heat dissipation module is removably mountable to the image pickup apparatus as one module among a plurality of modules configured to be interchangeably, removably mounted to the image pickup apparatus, and
   wherein in the case where the heat dissipation module is removably mounted to the image pickup apparatus, the heat dissipation module is electrically connected to the image pickup apparatus, and an operating state of the second cooling fan is controlled by the control unit of the image pickup apparatus.

16. A system camera including a heat dissipation module and a camera,
   wherein the heat dissipation module comprises:
   a first engagement structure which is provided on a first surface and with which a first mating module is removably engaged;
   a first heat reception portion configured to receive heat from the first mating module;
   a first interface which is electrically connected to the first mating module;
   a second engagement structure which is provided on a second surface parallel to the first surface and with which a second mating module is removably engaged;
   a second interface which is electrically connected to the first interface and is electrically connected to the second mating module; and
   a fan unit which is provided between the first surface and the second surface, for dissipating heat received by the first heat reception portion to the outside,
   wherein the second surface is provided with a second heat reception portion which receives heat from the second mating module engaged with the second surface, and
   wherein the fan unit dissipates heat received by the first heat reception portion and the second heat reception portion, and
   wherein the camera forms the first mating module, and the first surface of the heat dissipation module is engaged with the camera.

17. The system camera according to claim 16, further comprising:
   a first ventilation port provided in a surface of the camera different from a surface with which the first surface of the heat dissipation module is engaged,
   a second ventilation port provided in a surface different from the surface with which the first surface is engaged and the surface in which the first ventilation port is provided,
   an airflow path connecting between the first ventilation port and the second ventilation port, and
   a third ventilation port which is provided in a surface with which the first surface is engaged, and is connected to the airflow path.

18. The system camera according to claim 17, wherein when the first surface of the heat dissipation module is engaged with the camera, the third ventilation port is connected to a ventilation port provided in the first surface of the heat dissipation module.

19. The system camera according to claim 18, further comprising a partition plate that divides a ventilation space formed by connection of the third ventilation port and the ventilation port provided in the first surface of the heat dissipation module, when the first surface of the heat dissipation module is engaged with the camera.

20. The system camera according to claim 19, wherein the partition plate has a shape which causes a change in a cross-sectional area of an airflow path of at least one of sections into which the partition plate divides the ventilation space.

21. The system camera according to claim 18, wherein the ventilation port provided in the first surface of the heat dissipation module is larger than the third ventilation port.

22. The system camera according to claim 17, wherein a distance from the first ventilation port to the third ventilation port and a distance from the second ventilation port to the third ventilation port are different from each other.

23. The system camera according to claim 16, wherein the camera includes an urging unit that supports a heat dissipation member for dissipating heat from a heat source of the camera such that the urging unit urges the heat dissipation member toward the surface with which the first surface of the heat dissipation module is engaged, and
   wherein when the heat dissipation module is mounted to the camera, the heat dissipation member and the first heat reception portion of the heat dissipation module are brought into contact with each other, and the urging unit is deformed to bring the heat dissipation member into contact with the heat source.

24. The system camera according to claim 23, wherein the camera and the heat dissipation module have respective inclined surfaces that are opposed to each other while surrounding each other's interfaces.

25. The system camera according to claim 23, wherein the urging unit is formed by a plurality of urging units arranged symmetrical around an interface of the camera.

26. The system camera according to claim 23, wherein the urging unit has an urging force which is larger than a fitting force required to fit an interface of the camera to an interface of the heat dissipation module.

27. The system camera according to claim 23, wherein the heat source is disposed such that heat source is aligned with a center of an interface of the camera.

28. A system camera comprising:
an image pickup apparatus having a first cooling fan and an air outlet port;
a heat dissipation module that is removably mountable to the image pickup apparatus and that includes a second cooling fan and an air inlet port communicating with the air outlet port in a case where the heat dissipation module is removably mounted to the image pickup apparatus; and
a control unit that controls an operating state of the first cooling fan and an operating state of the second cooling fan,
wherein the heat dissipation module is removably mountable to the image pickup apparatus as one module among a plurality of modules configured to be interchangeably, removably mounted to the image pickup apparatus, and
wherein in the case where the heat dissipation module is removably mounted to the image pickup apparatus, the image pickup apparatus and the heat dissipation module are electrically connected to each other, and
wherein in the case where the heat dissipation module is removably mounted to the image pickup apparatus, the control unit changes at least one of the operating state of the first cooling fan and the operating state of the second cooling fan.

29. The system camera according to claim 28, further comprising a detection unit configured to detect a temperature of the image pickup apparatus, and
wherein the control unit changes at least one of the operating state of the first cooling fan and the operating state of the second cooling fan, when the detection unit detects that the temperature of the image pickup apparatus exceeds a predetermined temperature.

30. The system camera according to claim 28, wherein the first cooling fan is disposed in the vicinity of the air outlet port of the image pickup apparatus, and the second cooling fan is disposed in the vicinity of the air inlet port of the heat dissipation module.

31. The system camera according to claim 28, wherein the control unit changes at least one of a rotational speed of the first cooling fan and a rotational speed of the second cooling fan.

32. The system camera according to claim 28, wherein the control unit performs control such that a direction of rotation of the first cooling fan and a direction of rotation of the second cooling fan are opposite to each other.

33. The system camera according to claim 28, wherein the heat dissipation module is mounted to the image pickup apparatus with an elastic member interposed therebetween.

34. The system camera according to claim 28, wherein the image pickup apparatus has an audio input section disposed in a surface opposite to a surface on which the heat dissipation module is mounted.

35. A system camera comprising:
a camera including at least one surface provided with a first ventilation port, and a first flow path including the first ventilation port, the camera being capable of performing heat exchange between an inside and an outside thereof via the first ventilation port; and
a cooling module removably mountable to the camera, and including a base portion holding a fan unit, and a first cover portion,
wherein the cooling module is removably mountable to the camera as one module among a plurality of modules configured to be interchangeably, removably mounted to the camera, and
wherein in a case where the cooling module is removably mounted to the camera, the fan unit is disposed to overlap part of the first ventilation port, and the first cover portion covers at least part of a non-overlapping area of the first ventilation port where the fan unit does not overlap such that the first flow path forms a forced air cooling path.

36. The system camera according to claim 35, further including an expansion module removably mountable to the camera, for function expansion, and
wherein the expansion module has a surface provided with a second ventilation port and a second flow path including the second ventilation port, and is capable of performing heat exchange between an inside and an outside thereof via the second ventilation port, and
wherein the cooling module is mounted, in a state in which the expansion module is removably mounted to the camera, such that the first cover portion is disposed between the camera and the expansion module, and that the fan unit can be disposed to extend over the first flow path and the second flow path.

37. The system camera according to claim 36, wherein the cooling module is capable of shifting between a first position in which the fan unit extends over both of the first flow path and the second flow path, and a second position in which the fan unit is in the first flow path and at the same time is not in the second flow path.

38. The system camera according to claim 37, wherein the cooling module is capable of shifting between the first position and the second position by sliding movement of the fan unit.

39. The system camera according to claim 37, wherein the fan unit has two fans provided parallel to each other,
the system camera further comprising interfaces provided for the fan unit and the base portion, respectively, for communicably connecting between the fan unit and the base portion, and
wherein the fan unit is removably mountable on the base portion, and is capable of shifting between the first position and the second position, by being mounted on the base portion after being rotated through 180 degrees in a state removed from the base portion, and
wherein the interfaces connect the fan unit and the base portion such that rotational speeds of the two fans of the fan unit can be separately controlled in each of the first position and the second position.

40. The system camera according to claim 38, wherein the base portion has an opening in a surface on which the fan unit is held, and
wherein the fan unit covers part of the opening when the fan unit is in the first position and all area of the opening when the fan unit is in the second position, and includes a second cover portion that prevents the fan unit from causing outside air to flow from the non-overlapping area into the fan unit when the fan unit is in the first position.

41. The system camera according to claim 35, wherein the first cover portion has an opening at a location opposed to part of the first ventilation port, wherein the cooling module includes a lid member capable of shifting between a closing position for closing the opening of the first cover portion and an opening position for not closing the opening of the first cover portion, wherein the second flow path of the expansion module has a third ventilation port at a location opposed to the opening, and is capable of performing heat exchange between an inside and an outside of the expansion module, and wherein the lid member interferes with a fixing portion of the expansion module to the camera when the lid member is in the closing position, and covers the second ventilation port when the lid member is in the opening position.

42. The system camera according to claim 35, wherein the expansion module has at least one of a function of recording imaging data transmitted from the camera, a function of supplying power to the camera, an operation unit for an user to operate the camera, an interface to connecting to another electronic device, and a function of displaying imaging data transmitted from the camera.

\* \* \* \* \*